(12) United States Patent
Khetawat et al.

(10) Patent No.: US 8,041,335 B2
(45) Date of Patent: Oct. 18, 2011

(54) METHOD AND APPARATUS FOR ROUTING OF EMERGENCY SERVICES FOR UNAUTHORIZED USER EQUIPMENT IN A HOME NODE B SYSTEM

(75) Inventors: Amit Khetawat, San Jose, CA (US); Patrick Tao, San Jose, CA (US); Michael D. Gallagher, San Jose, CA (US); Rajeev Gupta, Sunnyvale, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 339 days.

(21) Appl. No.: 12/426,211

(22) Filed: Apr. 17, 2009

(65) Prior Publication Data

US 2009/0264095 A1    Oct. 22, 2009

Related U.S. Application Data

(60) Provisional application No. 61/046,401, filed on Apr. 18, 2008, provisional application No. 61/055,961, filed on May 23, 2008, provisional application No. 61/058,912, filed on Jun. 4, 2008, provisional application No. 61/080,227, filed on Jul. 11, 2008, provisional application No. 61/101,148, filed on Sep. 29, 2008.

(51) Int. Cl.
*H04M 11/04* (2006.01)

(52) U.S. Cl. ................................. 455/404.2; 455/404.1

(58) Field of Classification Search .................. 455/403, 455/404.1, 404.2

See application file for complete search history.

(56) References Cited

U.S. PATENT DOCUMENTS

| | | |
|---|---|---|
| 5,014,197 A | 5/1991 | Wolf |
| 5,101,501 A | 3/1992 | Gilhousen et al. |
| 5,109,528 A | 4/1992 | Uddenfeldt |
| 5,226,045 A | 7/1993 | Chuang |
| 5,235,632 A | 8/1993 | Raith |
| 5,260,944 A | 11/1993 | Tomabechi |
| 5,260,988 A | 11/1993 | Schellinger et al. |

(Continued)

FOREIGN PATENT DOCUMENTS

EP    0936777    8/1999

(Continued)

OTHER PUBLICATIONS

U.S. Appl. No. 12/426,200, filed Apr. 17, 2009, Khetawat, Amit, et al.

(Continued)

*Primary Examiner* — David Mis
(74) *Attorney, Agent, or Firm* — Adeli & Tollen LLP

(57) ABSTRACT

Some embodiments are implemented in a communication system that includes a first communication system comprised of a licensed wireless radio access network and a core network, and a second communication system comprising a plurality of user hosted access points and a network controller. In some embodiments, each access point operates using short range licensed wireless frequencies to establish a service region. In some embodiments, the network controller communicatively couples the core network to the plurality of access points. The method enables an unauthorized user equipment to call from an access point it is not allowed to use for emergency purposes. The method receives at an access point a service request from an unauthorized user equipment with an establishment cause of emergency call. The method sends a registration request to the network controller. The method sends a message to the core network indicating the location of the user equipment.

20 Claims, 53 Drawing Sheets

U.S. PATENT DOCUMENTS

| | | |
|---|---|---|
| 5,267,261 A | 11/1993 | Blakeney, II et al. |
| 5,327,578 A | 7/1994 | Breeden et al. |
| 5,333,175 A | 7/1994 | Ariyavisitakul |
| 5,367,558 A | 11/1994 | Gillig et al. |
| 5,390,233 A | 2/1995 | Jensen et al. |
| 5,392,331 A | 2/1995 | Patsiokas et al. |
| 5,406,615 A | 4/1995 | Miller, II et al. |
| 5,428,601 A | 6/1995 | Owen |
| 5,442,680 A | 8/1995 | Schellinger et al. |
| 5,448,619 A | 9/1995 | Evans et al. |
| 5,475,677 A | 12/1995 | Arnold et al. |
| 5,488,649 A | 1/1996 | Schellinger |
| 5,507,035 A | 4/1996 | Bantz et al. |
| 5,509,052 A | 4/1996 | Chia et al. |
| 5,515,420 A | 5/1996 | Urasaka et al. |
| 5,533,027 A | 7/1996 | Akerberg et al. |
| 5,594,782 A | 1/1997 | Zicker et al. |
| 5,610,969 A | 3/1997 | McHenry et al. |
| 5,634,193 A | 5/1997 | Ghisler |
| 5,640,414 A | 6/1997 | Blakeney, II et al. |
| 5,659,598 A | 8/1997 | Byrne et al. |
| 5,659,878 A | 8/1997 | Uchida et al. |
| 5,664,005 A | 9/1997 | Emery et al. |
| 5,673,307 A | 9/1997 | Holland et al. |
| 5,675,629 A | 10/1997 | Raffel et al. |
| 5,724,658 A | 3/1998 | Hasan |
| 5,732,076 A | 3/1998 | Ketseoglou et al. |
| 5,745,852 A | 4/1998 | Khan et al. |
| 5,758,281 A | 5/1998 | Emery et al. |
| 5,796,727 A | 8/1998 | Harrison et al. |
| 5,796,729 A | 8/1998 | Greaney et al. |
| 5,812,522 A | 9/1998 | Lee et al. |
| 5,815,525 A | 9/1998 | Smith et al. |
| 5,818,820 A | 10/1998 | Anderson et al. |
| 5,822,681 A | 10/1998 | Chang et al. |
| 5,822,767 A | 10/1998 | MacWilliams et al. |
| 5,825,759 A | 10/1998 | Liu |
| 5,852,767 A | 12/1998 | Sugita |
| 5,862,345 A | 1/1999 | Okanoue et al. |
| 5,870,677 A | 2/1999 | Takahashi et al. |
| 5,887,020 A | 3/1999 | Smith et al. |
| 5,887,260 A | 3/1999 | Nakata |
| 5,890,055 A | 3/1999 | Chu et al. |
| 5,890,064 A | 3/1999 | Widergen et al. |
| 5,903,834 A | 5/1999 | Wallstedt et al. |
| 5,915,224 A | 6/1999 | Jonsson |
| 5,926,760 A | 7/1999 | Khan et al. |
| 5,936,949 A | 8/1999 | Pasternak et al. |
| 5,940,512 A | 8/1999 | Tomoike |
| 5,946,622 A | 8/1999 | Bojeryd |
| 5,949,773 A | 9/1999 | Bhalla et al. |
| 5,960,341 A | 9/1999 | LeBlanc et al. |
| 5,960,361 A | 9/1999 | Chen |
| 5,960,364 A | 9/1999 | Dent |
| 5,987,010 A | 11/1999 | Schnizlein |
| 5,995,828 A | 11/1999 | Nishida |
| 6,016,318 A | 1/2000 | Tomoike |
| 6,035,193 A | 3/2000 | Buhrmann et al. |
| 6,052,592 A | 4/2000 | Schellinger et al. |
| 6,101,176 A | 8/2000 | Honkasalo et al. |
| 6,112,080 A | 8/2000 | Anderson et al. |
| 6,112,088 A | 8/2000 | Haartsen |
| 6,119,000 A | 9/2000 | Stephenson et al. |
| 6,130,886 A | 10/2000 | Ketseoglou et al. |
| 6,134,227 A | 10/2000 | Magana |
| 6,138,019 A | 10/2000 | Trompower et al. |
| 6,167,279 A | 12/2000 | Chang et al. |
| 6,226,515 B1 | 5/2001 | Burkhard et al. |
| 6,229,792 B1 | 5/2001 | Anderson et al. |
| 6,236,852 B1 | 5/2001 | Veerasamy et al. |
| 6,243,581 B1 | 6/2001 | Jawanda |
| 6,256,511 B1 | 7/2001 | Brown et al. |
| 6,263,211 B1 | 7/2001 | Brunner et al. |
| 6,269,086 B1 | 7/2001 | Magana et al. |
| 6,320,873 B1 | 11/2001 | Nevo et al. |
| 6,324,470 B1 | 11/2001 | White |
| 6,327,470 B1 | 12/2001 | Ostling |
| 6,359,872 B1 | 3/2002 | Mahany et al. |
| 6,374,102 B1 | 4/2002 | Brachman et al. |
| 6,381,457 B1 | 4/2002 | Carlsson et al. |
| 6,389,059 B1 | 5/2002 | Smith et al. |
| 6,393,007 B1 | 5/2002 | Haartsen |
| 6,415,158 B1 | 7/2002 | King et al. |
| 6,426,819 B1 | 7/2002 | Crimmins et al. |
| 6,430,395 B2 | 8/2002 | Arazi et al. |
| 6,434,389 B1 | 8/2002 | Meskanen et al. |
| 6,438,383 B1 | 8/2002 | Hall et al. |
| 6,445,921 B1 | 9/2002 | Bell |
| 6,463,307 B1 | 10/2002 | Larsson et al. |
| 6,498,934 B1 | 12/2002 | Muller |
| 6,539,237 B1 | 3/2003 | Sayers et al. |
| 6,542,516 B1 | 4/2003 | Vialen et al. |
| 6,553,219 B1 | 4/2003 | Vilander et al. |
| 6,556,822 B1 | 4/2003 | Matsumoto |
| 6,556,825 B1 | 4/2003 | Mansfield |
| 6,556,830 B1 | 4/2003 | Lenzo |
| 6,574,266 B1 | 6/2003 | Haartsen |
| 6,587,444 B1 | 7/2003 | Lenzo |
| 6,600,925 B1 | 7/2003 | Rams |
| 6,633,614 B1 | 10/2003 | Barton et al. |
| 6,633,761 B1 | 10/2003 | Singhal et al. |
| 6,643,512 B1 | 11/2003 | Ramaswamy |
| 6,658,250 B1 | 12/2003 | Ganesan et al. |
| 6,665,276 B1 | 12/2003 | Culbertson et al. |
| 6,675,009 B1 | 1/2004 | Cook |
| 6,680,923 B1 | 1/2004 | Leon |
| 6,711,400 B1 | 3/2004 | Aura |
| 6,766,160 B1 | 7/2004 | Lemilainen et al. |
| 6,788,656 B1 | 9/2004 | Smolentzov et al. |
| 6,801,519 B1 | 10/2004 | Mangel |
| 6,801,772 B1 | 10/2004 | Townend et al. |
| 6,801,777 B2 | 10/2004 | Rusch |
| 6,807,417 B2 | 10/2004 | Sallinen et al. |
| 6,823,154 B2 | 11/2004 | Koga et al. |
| 6,824,048 B1 | 11/2004 | Itabashi et al. |
| 6,826,154 B2 | 11/2004 | Subbiah et al. |
| 6,829,227 B1 | 12/2004 | Pitt |
| 6,842,462 B1 | 1/2005 | Ramjee et al. |
| 6,842,621 B2 | 1/2005 | Labun et al. |
| 6,845,095 B2 | 1/2005 | Krishnarajah et al. |
| 6,850,503 B2 | 2/2005 | Dorenbosch |
| 6,853,851 B1 | 2/2005 | Rautiola et al. |
| 6,895,255 B1 | 5/2005 | Bridgelall |
| 6,909,705 B1 | 6/2005 | Lee et al. |
| 6,922,559 B2 | 7/2005 | Mohammed |
| 6,925,074 B1 | 8/2005 | Vikberg et al. |
| 6,937,862 B2 | 8/2005 | Back et al. |
| 6,957,249 B2 | 10/2005 | Salo et al. |
| 6,970,719 B1 | 11/2005 | McConnell et al. |
| 6,993,359 B1 | 1/2006 | Nelakanti et al. |
| 7,009,952 B1 | 3/2006 | Razavilar et al. |
| 7,028,186 B1 | 4/2006 | Stenman et al. |
| 7,039,025 B1 | 5/2006 | Menon et al. |
| 7,065,353 B1 | 6/2006 | Bolinth et al. |
| 7,099,339 B1 | 8/2006 | Wang et al. |
| 7,200,112 B2 | 4/2007 | Sundar et al. |
| 7,200,383 B2 | 4/2007 | Eronen |
| 7,209,744 B2 | 4/2007 | Gallagher et al. |
| 7,215,961 B2 | 5/2007 | Gallagher et al. |
| 7,231,046 B1 | 6/2007 | Einola et al. |
| 7,349,698 B2 | 3/2008 | Gallagher et al. |
| 7,369,859 B2 | 5/2008 | Gallagher |
| 7,389,412 B2 | 6/2008 | Sharma et al. |
| 7,420,964 B2 | 9/2008 | Narvanen et al. |
| 7,606,568 B2 | 10/2009 | Gallagher et al. |
| 7,640,008 B2 * | 12/2009 | Gallagher et al. ......... 455/414.1 |
| 2001/0029186 A1 | 10/2001 | Canyon et al. |
| 2001/0031645 A1 | 10/2001 | Jarrett |
| 2001/0046860 A1 | 11/2001 | Lee |
| 2001/0049790 A1 | 12/2001 | Faccin et al. |
| 2002/0009199 A1 | 1/2002 | Ala-Laurila et al. |
| 2002/0032030 A1 | 3/2002 | Berglund et al. |
| 2002/0045459 A1 | 4/2002 | Morikawa |
| 2002/0059516 A1 | 5/2002 | Turtiainen et al. |
| 2002/0065099 A1 | 5/2002 | Bjorndahl |
| 2002/0066036 A1 | 5/2002 | Makineni et al. |
| 2002/0075844 A1 | 6/2002 | Hagen |

| | | |
|---|---|---|
| 2002/0080797 A1 | 6/2002 | Kim |
| 2002/0082015 A1 | 6/2002 | Wu |
| 2002/0085516 A1 | 7/2002 | Bridgelall |
| 2002/0086682 A1 | 7/2002 | Naghian |
| 2002/0101848 A1 | 8/2002 | Lee et al. |
| 2002/0102974 A1 | 8/2002 | Raith |
| 2002/0118674 A1 | 8/2002 | Faccin et al. |
| 2002/0123325 A1 | 9/2002 | Cooper |
| 2002/0131387 A1 | 9/2002 | Pitcher et al. |
| 2002/0132630 A1 | 9/2002 | Arazi et al. |
| 2002/0142761 A1 | 10/2002 | Wallstedt et al. |
| 2002/0147008 A1 | 10/2002 | Kallio |
| 2002/0147016 A1 | 10/2002 | Arazi et al. |
| 2002/0150091 A1 | 10/2002 | Lopponen et al. |
| 2002/0155829 A1 | 10/2002 | Proctor, Jr. et al. |
| 2002/0160811 A1 | 10/2002 | Jannette et al. |
| 2002/0161905 A1 | 10/2002 | Haverinen et al. |
| 2002/0166068 A1 | 11/2002 | Kilgore |
| 2002/0174335 A1 | 11/2002 | Zhang et al. |
| 2002/0191556 A1 | 12/2002 | Krishnarajah et al. |
| 2002/0191575 A1 | 12/2002 | Kalavade et al. |
| 2002/0196840 A1 | 12/2002 | Anderson et al. |
| 2002/0197984 A1 | 12/2002 | Monin et al. |
| 2003/0007475 A1 | 1/2003 | Tsuda et al. |
| 2003/0026269 A1 | 2/2003 | Paryani |
| 2003/0031151 A1 | 2/2003 | Sharma et al. |
| 2003/0043773 A1 | 3/2003 | Chang |
| 2003/0058816 A1 | 3/2003 | Shearer, III |
| 2003/0087653 A1 | 5/2003 | Leung |
| 2003/0092445 A1 | 5/2003 | Timonen et al. |
| 2003/0112789 A1 | 6/2003 | Heinonen et al. |
| 2003/0119527 A1 | 6/2003 | Labun et al. |
| 2003/0130008 A1 | 7/2003 | Rajaniemi et al. |
| 2003/0139180 A1 | 7/2003 | McIntosh et al. |
| 2003/0142673 A1 | 7/2003 | Patil et al. |
| 2003/0172264 A1 | 9/2003 | Dillon |
| 2003/0176181 A1 | 9/2003 | Boesjes |
| 2003/0193952 A1 | 10/2003 | O'Neill |
| 2003/0202486 A1 | 10/2003 | Anton et al. |
| 2003/0210199 A1 | 11/2003 | Sward et al. |
| 2003/0217132 A1 | 11/2003 | Batten et al. |
| 2003/0219022 A1 | 11/2003 | Dillon et al. |
| 2003/0219024 A1 | 11/2003 | Purnadi et al. |
| 2003/0224820 A1 | 12/2003 | Einola et al. |
| 2003/0226017 A1 | 12/2003 | Palekar et al. |
| 2003/0235186 A1 | 12/2003 | Park |
| 2004/0003060 A1 | 1/2004 | Asoh et al. |
| 2004/0008649 A1 | 1/2004 | Wybenga et al. |
| 2004/0009749 A1 | 1/2004 | Arazi et al. |
| 2004/0010620 A1 | 1/2004 | Salo et al. |
| 2004/0013099 A1 | 1/2004 | O'Neill |
| 2004/0025018 A1 | 2/2004 | Haas et al. |
| 2004/0037312 A1 | 2/2004 | Spear |
| 2004/0053623 A1 | 3/2004 | Hoff et al. |
| 2004/0057408 A1 | 3/2004 | Gray |
| 2004/0063451 A1 | 4/2004 | Bonta et al. |
| 2004/0068571 A1 | 4/2004 | Ahmavaara |
| 2004/0068653 A1 | 4/2004 | Fascenda |
| 2004/0072593 A1 | 4/2004 | Robbins et al. |
| 2004/0077346 A1 | 4/2004 | Krenik et al. |
| 2004/0077354 A1 | 4/2004 | Jason et al. |
| 2004/0077355 A1 | 4/2004 | Krenik et al. |
| 2004/0077356 A1 | 4/2004 | Krenik et al. |
| 2004/0077374 A1 | 4/2004 | Terry |
| 2004/0087307 A1 | 5/2004 | Ibe et al. |
| 2004/0147223 A1 | 7/2004 | Cho |
| 2004/0171378 A1 | 9/2004 | Rautila |
| 2004/0202132 A1 | 10/2004 | Heinonen et al. |
| 2004/0203346 A1 | 10/2004 | Myhre et al. |
| 2004/0203737 A1 | 10/2004 | Myhre et al. |
| 2004/0203800 A1 | 10/2004 | Myhre et al. |
| 2004/0203815 A1 | 10/2004 | Shoemake et al. |
| 2004/0240525 A1 | 12/2004 | Karabinis et al. |
| 2004/0259541 A1 | 12/2004 | Hicks, III et al. |
| 2005/0059396 A1 | 3/2005 | Chuah et al. |
| 2005/0064896 A1 | 3/2005 | Rautiola et al. |
| 2005/0101245 A1 | 5/2005 | Ahmavaara |
| 2005/0144647 A1 | 6/2005 | Zussman et al. |
| 2005/0147077 A1 | 7/2005 | Sutinen |
| 2005/0198199 A1 | 9/2005 | Dowling |
| 2005/0198306 A1 | 9/2005 | Palojarvi et al. |
| 2005/0213546 A1 | 9/2005 | Reitter et al. |
| 2005/0239441 A1 | 10/2005 | Eronen |
| 2005/0239453 A1 | 10/2005 | Vikberg et al. |
| 2005/0250522 A1 | 11/2005 | Gilbert |
| 2005/0260982 A1 | 11/2005 | Ko et al. |
| 2005/0265279 A1 | 12/2005 | Markovich et al. |
| 2006/0019667 A1 | 1/2006 | Hicks, III |
| 2006/0035645 A1 | 2/2006 | Kim |
| 2006/0094416 A1 | 5/2006 | Endo et al. |
| 2006/0094431 A1 | 5/2006 | Saifullah et al. |
| 2006/0111112 A1 | 5/2006 | Maveddat |
| 2006/0111113 A1 | 5/2006 | Waris |
| 2006/0116125 A1 | 6/2006 | Buckley et al. |
| 2006/0203778 A1 | 9/2006 | Han et al. |
| 2007/0004405 A1 | 1/2007 | Buckley et al. |
| 2007/0054668 A1 | 3/2007 | Scheinert et al. |
| 2007/0293222 A1 | 12/2007 | Vikberg et al. |
| 2008/0076420 A1 | 3/2008 | Khetawat et al. |
| 2008/0125120 A1 | 5/2008 | Gallagher et al. |
| 2008/0254833 A1 | 10/2008 | Keevill et al. |
| 2008/0267405 A1 | 10/2008 | Vialen et al. |
| 2009/0082012 A1 | 3/2009 | Gallagher et al. |
| 2009/0262683 A1 | 10/2009 | Khetawat et al. |
| 2009/0264126 A1 | 10/2009 | Khetawat et al. |

FOREIGN PATENT DOCUMENTS

| | | |
|---|---|---|
| EP | 1207708 | 5/2002 |
| EP | 2074839 | 7/2009 |
| GB | 2282735 | 4/1995 |
| GB | 2315193 | 1/1998 |
| JP | 06-133358 | 5/1994 |
| JP | 09-130405 | 5/1997 |
| KR | 2001-0053160 | 6/2001 |
| WO | WO 92/04796 | 3/1992 |
| WO | WO 95/10922 | 4/1995 |
| WO | WO 97/24004 | 7/1997 |
| WO | WO 99/48312 | 9/1999 |
| WO | WO 99/48315 | 9/1999 |
| WO | WO 99/57876 | 11/1999 |
| WO | WO 99/67967 | 12/1999 |
| WO | WO 00/28762 | 5/2000 |
| WO | WO 00/51387 | 8/2000 |
| WO | WO 02/45456 | 6/2002 |
| WO | WO 02/062094 | 8/2002 |
| WO | WO 03/039009 | 5/2003 |
| WO | WO 03/092312 | 11/2003 |
| WO | WO 2004/002051 | 12/2003 |
| WO | WO 2004/034219 | 4/2004 |
| WO | WO 2004/039111 | 5/2004 |
| WO | WO 2005/006597 | 1/2005 |
| WO | WO 2005/065214 | 7/2005 |
| WO | WO 2008/009016 | 1/2008 |
| WO | WO 2008/036961 | 3/2008 |
| WO | PCT/US2009/041055 | 4/2009 |
| WO | WO 2009/129516 | 10/2009 |

OTHER PUBLICATIONS

U.S. Appl. No. 12/426,203, filed Apr. 17, 2009, Khetawat, Amit, et al.
U.S. Appl. No. 12/426,204, filed Apr. 17, 2009, Khetawat, Amit, et al.
U.S. Appl. No. 12/426,205, filed Apr. 17, 2009, Khetawat, Amit, et al.
U.S. Appl. No. 12/426,206, filed Apr. 17, 2009, Khetawat, Amit, et al.
U.S. Appl. No. 12/426,207, filed Apr. 17, 2009, Khetawat, Amit, et al.
U.S. Appl. No. 12/426,209, filed Apr. 17, 2009, Khetawat, Amit, et al.
U.S. Appl. No. 12/426,215, filed Apr. 17, 2009, Khetawat, Amit, et al.
U.S. Appl. No. 12/426,217, filed Apr. 17, 2009, Khetawat, Amit, et al.
International Search Report and Written Opinion for PCT/US2009/041055, Jul. 14, 2009 (mailing date), Kineto Wireless, Inc.
Portions of prosecution history of U.S. Appl. No. 11/096,800, filed Dec. 20, 2007, Gallagher, Michael.
Portions of prosecution history of U.S. Appl. No. 11/225,870, filed Feb. 16, 2007, Gallagher, Michael, et al.
Portions of prosecution history of U.S. Appl. No. 11/225,398, filed Feb. 9, 2007, Gallagher, Michael, et al.
Portions of prosecution history of U.S. Appl. No. 11/226,617, filed Jun. 8, 2009, Gallagher, Michael, et al.

Portions of prosecution history of U.S. Appl. No. 11/129,131, filed Oct. 9, 2007, Gallagher, Michael, et al.
Portions of prosecution history of U.S. Appl. No. 11/859,767, filed Dec. 9, 2009, Gallagher, Michael, et al.
Portions of prosecution history of U.S. Appl. No. 12/328,732, filed Mar. 12, 2010, Gallagher, Michael, et al.
International Search Report and Written Opinion for PCT/2007/079258, Mar. 11, 2008 (mailing date), Kineto Wireless, Inc.
International Preliminary Report on Patentability for PCT/2007/079258, Mar. 24, 2009 (issuance date), Kineto Wireless, Inc.
ERRICSON Press Release: "Ericsson presents the Mobile@Hometm concept," Mar. 21, 2001, http://www.ericsson.com/press/archive/2001Q1/20010321-0048.html, NPL Date Unknown, printed Jan. 6, 2004, pp. 1-2.
Claus Lindholt Hansen et al., "Mobile@Home- a NEW 1 Use Case for Bluetooth in the Access Network," *LM Ericsson Business Unit Multi-Service Networks*, ISSLS 2002, Apr. 14-18, 2002, Seoul, Korea, www.issls-council.org/proc02/papers/S6A3m.pdf, NPL Date Unknown, printed Dec. 8, 2003, 10 pages.
Perkins, Charles E., "Simplified Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.
Wu, Jon C., et al., "Intelligent Handoff for Mobile Wireless Internet," *Mobile Networks and Applications*, Jan. 6, 2001 Kluwer Academic Publishers, Manufactured in the Netherlands (2001) pp. 67-79.
EP Supplementary Search Report of EP07843030, Apr. 7, 2010 (mailing date), Kineto Wireless, Inc.
ETSI TS 124 008 V5.6.0 (Dec. 2002) Digital cellular telecommunications system (Phase 2+); Universal Mobile Telecommunications System (UMTS); Mobile radio interface Layer 3 specification; Core network protocols; Stage 3; (3GPP TS 24.008 version 5.6.0 Release 5); ETSI Standards, European Telecommunications Standards Institute, Sophia-Antipolis, FR, Dec. 2002, pp. 293-317.
ETSI TS 100 940 V7.19.1 (Apr. 2003) Digital cellular telecommunications system (Phase 2+); Mobile radio interface layer 3 specification; (3GPP TS 04.08 version 7.19.1 Release 1998); ETSI Standards, European Telecommunications Standards Institute, Sophia-antipolis, FR, Apr. 2003, 13 pages.
"3$^{rd}$ Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.
*Digital Enhanced Cordless Telecommunications (DECT); Global System for Mobile Communications (GSM); DECT/GSM Interworking Profile (IWP); Access and Mapping* (protocol/procedure description for 3,1 kHz speech service): ETSI EN 300 370 V1.3.1 European Standard (Telecommunications Series), European Telecommunications Standards Institute, Sophia Antipolis, FR, Jan. 2001, 110 pages.
*Digital Enhanced Cordless Telecommunications (DECT); Global System for Mobile Communications (GSM); DECT/GSM Integration Based on Dual-Mode Terminals*: ETSI EN 301 242 V1.2.2 European Standard (Telecommunications Series), European Telecommunications Standards Institute, Sophia Antipolis, FR, Sep. 1999, 23 pages.
*Digital Enhanced Cordless Telecommunications (DECT); DECT/UMTS Interworking Profile (IWP); Part 1: General Description and Overview*: ETSI TS 101 863-1 V1.1.2, Technical Specification, European Telecommunications Standards Institute. Sophia Antipolis, FR, Nov. 2001, 38 pages.
*Radio Equipment and Systems (RES); Digital Enhanced Cordless Telecommunications/Global System for Mobile Communications (DECT/GSM) Interworking Profile; Profile Overview*: ETSI Technical Report, ETR 341, Source: ETSI DECT, ICS: 33.020, Reference: DTR/RES-03058, European Telecommunications Standards Institute, Sophia Antipolis, FR, Dec. 1996, 27 pages.
"Unlicensed Mobile Access (UMA); User Perspective (Stage 1);" UMA User Perspective (Stage 1) R1.0.0 (Sep. 1, 2004) Technical Specification, Sep. 1, 2004, 29 pages.
"Unlicensed Mobile Access (UMA); Architecture (Stage 2);" UMA Architecture (Stage 2) R1.0.0 (Sep. 1, 2004) Technical Specification, Sep. 1, 2004, 78 pages.
"Unlicensed Mobile Access (UMA); Protocols (Stage 3);" UMA Protocols (Stage 3) R1.0.0 (Sep. 1, 2004) Technical Specification, Sep. 1, 2004, 142 pages.
"Unlicensed Mobile Access (UMA); Architecture (Stage 2);" UMA Architecture (Stage 2) R1.0.1 (Oct. 8, 2004) Technical Specification, Oct. 8, 2004, 80 pages.
"Unlicensed Mobile Access (UMA); Protocols (Stage 3);" UMA Protocols (Stage 3) R1.0.1 (Oct. 8, 2004) Technical Specification, Oct. 8, 2004, 142 pages.
"Unlicensed Mobile Access (UMA); Architecture (Stage 2);" UMA Architecture (Stage 2) R1.0.2 (Nov. 3, 2004) Technical Specification, Nov. 3, 2004, 79 pages.
"Unlicensed Mobile Access (UMA); Protocols (Stage 3);" UMA Protocols (Stage 3) R1.0.2 (Nov. 5, 2004) Technical Specification, Nov. 5, 2004, 142 pages.
"Unlicensed Mobile Access (UMA); Architecture (Stage 2);" UMA Architecture (Stage 2) R1.0.3 (Feb. 28, 2005) Technical Specification, Feb. 28, 2005, 85 pages.
"Unlicensed Mobile Access (UMA); Protocols (Stage 3);" UMA Protocols (Stage 3) R1.0.3 (Feb. 26, 2005) Technical Specification, Feb. 26, 2005, 156 pages.
"Unlicensed Mobile Access (UMA); Architecture (Stage 2);" UMA Architecture (Stage 2) R1.0.4 (May 2, 2005) Technical Specification, May 2, 2005, 87 pages.
"Unlicensed Mobile Access (UMA); Protocols (Stage 3);" UMA Protocols (Stage 3) R1.0.4 (May 2, 2005) Technical Specification, May 2, 2005, 162 pages.
"3$^{rd}$ Generation Partnership Project; Technical Specification Group GSM/EDGE Radio Access Network; Generic Access to the A/GB interface; Stage 2 (Release X);" 3GPP TS 43.318 V0.3.0, Jan. 2005, 64 pages.
"Proposal for Stage 2 description for Generic Access to A/Gb interface", Tdoc GP-050403, Jan. 24-28, 2005, 1 page.
"3$^{rd}$ Generation Partnership Project; Technical Specification Group GSM/EDGE Radio Access Network; Generic Access to the A/Gb interface; Stage 2 (Release 6)" 3GPP TS 43.318 V0.4.0, Jan. 2005, 68 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V2.0.0, Jan. 2005, 66 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V6.0.0, Jan. 2005, 68 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V6.1.0(Jan. 2005), Apr. 2005, 68 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V6.2.0, Jun. 2005, 68 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V6.3.0, Sep. 2005, 68 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V6.4.0, Nov. 2005, 68 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V6.5.0, Jan. 2006, 70 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V6.6.0, Apr. 2006, 70 pages.
"3$^{rd}$ Generation Partnership Project; Technical Specification Group GSM/EDGE Radio Access Network; Generic Access to the A/Gb interface; Stage 2 (Release 6)" 3GPP TS 43.318 V6.7.0, Jun. 2006, 71 pages.

"3rd Generation Partnership Project; Technical Specification Group GSM/EDGE Radio Access Network; Generic Access to the A/Gb interface; Stage 2 (Release 6)" 3GPP TS 43.318 V6.8.0, Nov. 2006, 71 pages.

"3rd Generation Partnership Project; Technical Specification Group GSM/EDGE Radio Access Network; Generic Access to the A/Gb interface; Stage 2 (Release 6)" 3GPP TS 43.318 V6.9.0, Feb. 2007, 71 pages.

"3rd Generation Partnership Project; Technical Specification Group GSM/EDGE Radio Access Network; Generic access to the A/Gb interface; Stage 2 (Release 7)" 3GPP TS 43.318 V7.0.0, Nov. 2006, 71 pages.

"3rd Generation Partnership Project; Technical Specification Group GSM/EDGE Radio Access Network; Generic access to the A/Gb interface; Stage 2 (Release 7)" 3GPP TS 43.318 V7.1.0, Feb. 2007, 71 pages.

"Proposal for Stage 3 description for Generic Access to A/Gb interface", Tdoc GP-050279, Jan. 18, 2005, 1 page.

"3rd Generation Partnership Project; Technical Specification Group GSM/EDGE Radio Access Network; Generic Access to the A/Gb interface; Mobile Generic Access Interface Layer 3 Specification (Release x)" 3GPP TS 44.318 Vx.1.0, Jan. 2005, 133 pages.

"3rd Generation Partnership Project; Technical Specification Group GSM/EDGE Radio Access Network; Generic Access to the A/Gb interface; Mobile Generic Access Interface Layer 3 Specification (Release x)" 3GPP TS 44.318 V0.4.0, Apr. 2005, 161 pages.

"3rd Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V0.5.0, Apr. 2005, 160 pages.

"3rd Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V2.0.0, Apr. 2005, 152 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.0.0, Apr. 2005, 146 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.1.0, Jul. 2005, 149 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.2.0, Sep. 2005, 148 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.3.0, Nov. 2005, 149 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.4.0, Jan. 2006, 152 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.5.0, May 2006, 153 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.6.0, Jul. 2006, 153 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.7.0, Dec. 2006, 154 pages.

"3rd Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.8.0, Mar. 2007, 154 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.0.0, Jul. 2006, 153 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.1.0, Dec. 2006, 154 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.2.0, Mar. 2007, 163 pages.

3rd Generation Partnership Project; Technical Specification Group GSM/EDGE Radio Access Network; Generic access to the A/Gb interface; Stage 2 (Release 7)3GPP TS 43.318 V7.2.0, May 2007, 71 pages.

3rd Generation Partnership Project; Technical Specification Group GSM/EDGE Radio Access Network; Generic access to the A/Gb interface; Stage 2 (Release 7) 3GPP TS 43.318 V7.3.0, Aug. 2007, 71 pages.

3rd Generation Partnership Project; Technical Specification Group GSM/EDGE Radio Access Network; Generic access to the A/Gb interface; Stage 2 (Release 7) 3GPP TS 43.318 V7.4.0, Nov. 2007, 71 pages.

3rd Generation Partnership Project; Technical Specification Group GSM/EDGE Radio Access Network; Generic access to the A/Gb interface; Stage 2 (Release 7) 3GPP TS 43.318 V7.5.0, May 2008, 71 pages.

3rd Generation Partnership Project; Technical Specification Group GSM/EDGE Radio Access Network; Generic access to the A/Gb interface; Stage 2 (Release 8) 3GPP TS 43.318 V8.0.0, Nov. 2007, 122 pages.

3rd Generation Partnership Project; Technical Specification Group GSM/EDGE Radio Access Network; Generic access to the A/Gb interface; Stage 2 (Release 8) 3GPP TS 43.318 V8.1.0, May 2008, 71 pages.

3rd Generation Partnership Project; Technical Specification Group GSM/EDGE Radio Access Network; Generic access to the A/Gb interface; Stage 2 (Release 8) 3GPP TS 43.318 V8.2.0, May 2008, 127 pages.

3rd Generation Partnership Project; Technical Specification Group GSM/EDGE Radio Access Network; Generic access to the A/Gb interface; Stage 2 (Release 8) 3GPP TS 43.318 V8.3.0, Aug. 2008, 127 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.3.0, Jun. 2007, 163 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.4.0, Sep. 2007, 167 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.5.0, Dec. 2007, 166 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.6.0, Mar. 2008, 167 pages.

"3rd Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.7.0, May 2008, 169 pages.

"3rd Generation Partnership Project; Technical Specification Group GSM/EDGE Radio Access Network; Generic Access (GA) to the A/Gb interface; Mobile GA interface layer 3 specification (Release 8)" 3GPP TS 44.318 V8.0.0, Dec. 2007, 166 pages.

"3rd Generation Partnership Project; Technical Specification Group GSM/EDGE Radio Access Network; Generic Access (GA) to the A/Gb interface; Mobile GA interface layer 3 specification (Release 8)" 3GPP TS 44.318 V8.1.0, Mar. 2008, 242 pages.

"3rd Generation Partnership Project; Technical Specification Group GSM/EDGE Radio Access Network; Generic Access (GA) to the A/Gb interface; Mobile GA interface layer 3 specification (Release 8)" 3GPP TS 44.318 V8.2.0, May 2008, 243 pages.

3rd Generation Partnership Project; Technical Specification Group Services and System Aspects; 3GPP system to Wireless Local Area Network (WLAN) interworking; System Description (Release 6) 3GPP TS 23.234 V6.5.0, Jun. 2005, 79 pages.

3rd Generation Partnership Project; Technical Specification Group GSM/EDGE Radio Access Network; Generic Access Network (GAN); Mobile GAN interface layer 3 specification (Release 8) 3GPP TS 44.318 V8.3.0, Sep. 2008, 244 pages.

3rd Generation Partnership Project; Technical Specification Group GSM/EDGE Radio Access Network; Generic Access Network (GAN); Mobile GAN interface layer 3 specification (Release 8) 3GPP TS 44.318 V8.4.0, Dec. 2008, 243 pages.

3rd Generation Partnership Project; Technical Specification Group GSM/EDGE Radio Access Network; Generic Access Network (GAN); Mobile GAN interface layer 3 specification (Release 8) 3GPP TS 44.318 V8.5.0, Feb. 2009, 245 pages.

3rd Generation Partnership Project; Technical Specification Group Radio Access Network; UTRAN architecture for 3G Home NodeB; Stage 2 (Release 8) 3GPP TS 25.467 V1.0.0, Dec. 2008, 23 pages.

3rd Generation Partnership Project; Technical Specification Group Radio Access Network; UTRAN architecture for 3G Home NodeB; Stage 2 (Release 8) 3GPP TS 25.467 V8.0.0, Dec. 2008, 22 pages.

3rd Generation Partnership Project; Technical Specification Group Radio Access Network; UTRAN Iuh Interface RUA signalling (Release 8) 3GPP TS 25.468 V1.0.0, Nov. 2008, 44 pages.

3rd Generation Partnership Project; Technical Specification Group Radio Access Network; UTRAN Iuh Interface RANAP User Adaptation (RUA) signalling (Release 8) 3GPP TS 25.486 v8.0.0, Dec. 2008, 43 pages.

3rd Generation Partnership Project; Technical Specification Group Radio Access Network; UTRAN Iuh Interface RANAP User Adaptation (RUA) signalling (Release 8) 3GPP TS 25.468 V8.0.1, Jan. 2009, 43 pages.

3rd Generation Partnership Project; Technical Specification Group Radio Access Network; UTRAN Iuh Interface RANAP User Adaptation (RUA) signalling (Release 8) 3GPP TS 25.468 V8.1.0, Mar. 2009, 43 pages.

3rd Generation Partnership Project; Technical Specification Group Radio Access Network; UTRAN Iuh Interface HNBAP signalling (Release 8) 3GPP TS 25.469 V1.0.0, Nov. 2008, 56 pages.

3rd Generation Partnership Project; Technical Specification Group Radio Access Network; UTRAN Iuh Interface Home Node B Application Part (HNBAP) signalling (Release 8) 3GPP TS 25.469 V8.0.0, Dec. 2008, 56 pages.

3rd Generation Partnership Project; Technical Specification Group Radio Access Network; UTRAN Iuh Interface Home Node B Application Part (HNBAP) signalling (Release 8) 3GPP TS 25.469 V8.1.0, Mar. 2009, 58 pages.

3rd Generation Partnership Project; Technical Specification Group Radio Access Network; UTRAN Iu Interface; Radio Access Network Application Part (RANAP) signalling (Release 8) 3GPP TS 25.413 V8.1.0, Dec. 2008, 380 pages.

* cited by examiner

| Information Element | Type/Reference | Presence | Format | Length |
|---|---|---|---|---|
| Length Indicator | Length Indicator | M | V | 2 |
| Protocol Discriminator | Protocol Discriminator | M | V | 1 |
| INITIAL DIRECT TRANSFER message identity | Message Type | M | V | 1 |
| CN Domain Identity | CN Domain Identity | M | TLV | 3 |
| Intra Domain NAS Node Selector (IDNNS) | Intra Domain NAS Node Selector | M | TLV | 5 |
| RANAP Message | RANAP Message (per TS 25.413) | M | TLV | Var. Length |

*Figure 7*

| Information Element | Type/Reference | Presence | Format | Length |
|---|---|---|---|---|
| Length Indicator | Length Indicator | M | V | 2 |
| Protocol Discriminator | Protocol Discriminator | M | V | 1 |
| UPLINK DIRECT TRANSFER message identity | Message Type | M | V | 1 |
| CN Domain Identity | CN Domain Identity | M | TLV | 3 |
| RANAP Message | RANAP Message (per TS 25.413) | M | TLV | Var. Length |

*Figure 8*

| Information Element | Type/Reference | Presence | Format | Length |
|---|---|---|---|---|
| Length Indicator | Length Indicator | M | V | 2 |
| Protocol Discriminator | Protocol Discriminator | M | V | 1 |
| DOWNLINK DIRECT TRANSFER message identity | Message Type | M | V | 1 |
| CN Domain Identity | CN Domain Identity | M | TLV | 3 |
| RANAP Message | RANAP Message (per TS 25.413) | M | TLV | Var. Length |

*Figure 9*

| Octets | Bits | | | | | | | |
|---|---|---|---|---|---|---|---|---|
| | 8 | 7 | 6 | 5 | 4 | 3 | 2 | 1 |
| 1-2 | Length ||||||||
| 3 | HNBAP Message Type ||||||||
| 5-6 | HNB Context Id 3005 ||||||||
| 7-8 | HNB-GW Context Id 3010 ||||||||

*Figure 30*

| Octets | Bits | | | | | | | |
|---|---|---|---|---|---|---|---|---|
| | 8 | 7 | 6 | 5 | 4 | 3 | 2 | 1 |
| 1-2 | Length 2205 ||||||||
| 3 | Iuh RANAP Header Version 2210 ||||||||
| 4 | RANAP Procedure Code 2215 ||||||||
| 5-6 | HNB Context Id 2220 ||||||||
| 7-8 | HNB-GW Context Id 2225 ||||||||
| 9 | CN Domain ID 2230 ||||||||
| 10 | Initial UE Message Cause 2235 ||||||||
| 11-12 | Initial UE Message IDNNS 2240 ||||||||

| Octets | Bits | | | | |
|---|---|---|---|---|---|
| | 4 | 3 | 2 | 1 | |
| 1-2 | Length | | | | 2505 |
| 3 | RANAP Procedure Code | | | | 2510 |
| 4-5 | HNB Context Id | | | | 2515 |
| 6-7 | HNB-GW Context Id | | | | 2520 |

*Figure 25*

| Octets | Bits | | | | | |
|---|---|---|---|---|---|---|
| | 5 | 4 | 3 | 2 | 1 | |
| 1-2 | Length | | | | | 2605 |
| 3 | HNBAP Message Type | | | | | 2610 |
| 4-n | List of IEs | | | | | 2615 |

*Figure 26*

| Octets | Bits 8 | 7 | 6 | 5 | 4 | 3 | 2 | 1 | |
|---|---|---|---|---|---|---|---|---|---|
| 1-2 | Length ||||||||  |
| 3 | HNBAP Message Type ||||||||  |
| 5-6 | HNB Context Id |||||||| 2705 |
| 7 | CN Domain ID |||||||| 2710 |
| 8 | Context Request Reason |||||||| 2715 |
| 9-10 | IDNNS |||||||| 2720 |

*Figure 27*

| Octets | Bits 8 | 7 | 6 | 5 | 4 | 3 | 2 | 1 | |
|---|---|---|---|---|---|---|---|---|---|
| 1-2 | Length ||||||||  |
| 3 | HNBAP Message Type ||||||||  |
| 5-6 | HNB Context Id |||||||| 2805 |
| 7-8 | HNB-GW Context Id |||||||| 2810 |

*Figure 28*

| Octets | Bits 8 | 7 | 6 | 5 | 4 | 3 | 2 | 1 | |
|---|---|---|---|---|---|---|---|---|---|
| 1-2 | Length ||||||||  |
| 3 | HNBAP Message Type ||||||||  |
| 5-6 | HNB Context Id |||||||| 2905 |
| 7-8 | HNB-GW Context Id |||||||| 2910 |

METHOD AND APPARATUS FOR ROUTING OF EMERGENCY SERVICES FOR UNAUTHORIZED USER EQUIPMENT IN A HOME NODE B SYSTEM

CLAIM OF BENEFIT TO RELATED APPLICATIONS

This application claims the benefit of U.S. Provisional Application 61/046,401, entitled "Mechanisms to Relay or Transfer RANAP Messages between 3 G Home Node-B and the Core Network via the Home Node-B Gateway", filed Apr. 18, 2008; U.S. Provisional Application 61/055,961, entitled "Mechanisms to Transport RANAP Messages between 3 G Home Node-B and the Core Network via the Home Node-B Gateway", filed May 23, 2008; U.S. Provisional Application 61/058,912, entitled "Transport of RANAP Messages over the Iuh Interface", filed Jun. 4, 2008; U.S. Provisional Application 61/080,227, entitled "HNB System Architecture", filed Jul. 11, 2008; and U.S. Provisional Application 61/101,148, entitled, "Support for Closer Subscriber Group (CSG) in Femtocell System", filed Sep. 29, 2008. The contents of Provisional Applications 61/046,401, 61/055,961, 61/058,912, 61/080,227, and 61/101,148 are hereby incorporated by reference.

FIELD OF THE INVENTION

The invention relates to telecommunication. More particularly, this invention relates to a Home Node-B system architecture.

BACKGROUND OF THE INVENTION

Licensed wireless systems provide mobile wireless communications to individuals using wireless transceivers. Licensed wireless systems refer to public cellular telephone systems and/or Personal Communication Services (PCS) telephone systems. Wireless transceivers, also referred to as user equipment (UE), include cellular telephones, PCS telephones, wireless-enabled personal digital assistants, wireless modems, and the like.

Licensed wireless systems utilize wireless signal frequencies that are licensed from governments. Large fees are paid for access to these frequencies. Expensive base station (BS) equipment is used to support communications on licensed frequencies. Base stations are typically installed approximately a mile apart from one another (e.g., cellular towers in a cellular network). In a Universal Mobile Telecommunications System (UMTS), these base stations are system provider controlled and include Node-Bs which are high power and long range radio frequency transmitters and receivers used to directly connect with the user equipment. The wireless transport mechanisms and frequencies employed by typical licensed wireless systems limit both data transfer rates and range.

Licensed wireless systems continually upgrade their networks and equipment in an effort to deliver greater data transfer rates and range. However, with each upgrade iteration (e.g., 3 G to 4 G), the licensed wireless system providers incur substantial costs from licensing additional bandwidth spectrum to upgrading the existing radio network equipment or core network equipment. To offset these costs, the licensed wireless system providers pass down the costs to the user through the licensed wireless service fees. Users also incur equipment costs with each iterative upgrade of the licensed wireless network as new user equipment is needed to take advantage of the new services or improved services of the upgraded network.

Landline (wired) connections are extensively deployed and generally perform at a lower cost with higher quality voice and higher speed data services than the licensed wireless systems. The problem with landline connections is that they constrain the mobility of a user. Traditionally, a physical connection to the landline was required.

Unlicensed Mobile Access (UMA) emerged as one solution to lower costs associated with the licensed wireless systems while maintaining user wireless mobility and taking advantage of the higher quality voice and higher speed data services of the landline connections. UMA allowed users the ability to seamlessly and wirelessly roam in and out of licensed wireless systems and unlicensed wireless systems where the unlicensed wireless systems facilitate mobile access to the landline-based networks. Such unlicensed wireless systems support wireless communication based on the IEEE 802.11a, b or g standards (WiFi), or the Bluetooth® standard. The mobility range associated with such unlicensed wireless systems is typically on the order of 100 meters or less. A typical unlicensed wireless communication system includes a base station comprising a wireless access point (AP) with a physical connection (e.g., coaxial, twisted pair, or optical cable) to a landline-based network. The AP has a RF transceiver to facilitate communication with a wireless handset that is operative within a modest distance of the AP, wherein the data transport rates supported by the WiFi and Bluetooth® standards are much higher than those supported by the aforementioned licensed wireless systems.

UMA allowed users to purchase ordinary off-the-shelf access points in order to deploy a UMA service region that allowed for access to UMA service. In this manner, UMA was able to provide higher quality services at a lower cost than the licensed wireless systems. However, other UMA associated costs remained an obstacle to the large scale adoption of UMA.

With the emergence of UMA and licensed devices equipped with unlicensed radios that bypass the mobile operators' network/service, mobile operators sought to provide an equivalent solution using their licensed spectrum. Home Node Bs (HNBs) are low cost versions of the expensive Base Stations that comprise the mobile network that still use the operator's licensed spectrum for communication with licensed devices. The HNBs employ similar techniques as unlicensed access points such as the support of lower transmission power and range, integrated design, and use of regular landlines to communicate with the mobile operators' network to be cost and performance competitive with UMA. The use of regular landlines required the HNBs to adopt proprietary messaging and signaling standards that were different than those used by the licensed wireless systems for the expensive Base Stations.

Accordingly, there is a need in the art to develop a simplified integrated system that leverages the mobility provided by licensed wireless systems while maintaining the quality of service and data transfer rates of landline connections. Such a simplified integrated system needs to reduce adoption costs for both the individual user and the system provider that deploys such a system.

SUMMARY OF THE INVENTION

Some embodiments provide methods and systems for integrating a first communication system with a core network of a second communication system that has a licensed wireless radio access network. In some embodiments, the first communication system includes one or more user hosted access points that operate using short range licensed wireless frequencies in order to establish service regions of the first communication system and a network controller for communicatively coupling the service regions associated with the access points to the core network.

The first communication system of some embodiments includes a Home Node-B (HNB) Access Network (HNB-AN) where the access points are Home Node-Bs and the network controller is a HNB Gateway (HNB-GW). The licensed wireless radio access network of the second communication system of some embodiments includes a Universal Mobile Telecommunications System (UMTS) Terrestrial Radio Access Network (UTRAN) and the core network of the second communication system includes a core network of the UMTS.

The network controller of some embodiments seamlessly integrates each of the short range licensed wireless service regions with the core network. In some such embodiments, the network controller seamlessly integrates with the core network by using existing Iu interfaces of the core network to communicatively couple each of the service regions to the core network. Accordingly, the network controller of some embodiments uses standardized messaging and protocols to communicate with the core network while utilizing HNB-AN messaging and protocols to communicate with each of the service regions. In this manner, the network controller of some embodiments reduces deployment costs of the HNB-AN within the UMTS core network. Specifically, deployment of the network controller of some embodiments requires no change to the UMTS core network while still providing HNB wireless service that combines the mobility of licensed wireless networks with the quality and speed of landline/broadband services. In some embodiments, the network controllers take on some of the functionality of a traditional Radio Network Controller (RNC).

Additionally, the access points of some embodiments seamlessly integrate with existing user equipment (UE) of the licensed wireless radio access networks of the second communication system. In this manner, the access points reduce deployment costs of the HNB-AN, as users are able to utilize existing UE in order to wirelessly communicate through either the first communication system or the second communication system where the first communication system combines the wireless mobility afforded by the licensed wireless radio access network of the second communication system with the speed and quality of service afforded by landline/broadband services. In some embodiments, the access points are functionally equivalent to a Node-B of the UTRAN while having the flexibility and lower deployment costs associated with an ad-hoc and user hosted service region. In some embodiments, the access points take on some the functionality of a traditional Radio Network Controller (RNC).

Some embodiments define multi-layered protocol stacks for implementing management functionality within the access points and the network controller of the first communication system. In some embodiments, the protocol stacks include a management layer that performs functionality of the HNB Application Part (HNBAP) protocol. The protocol stacks of some embodiments implement management functionality that includes a registration procedure for registering a particular access point with the network controller. Specifically, the protocol stacks enable a registration procedure that allows a service region associated with a particular access point to access services of the core network through the network controller. Additional management functionality implemented by the protocol stacks of some embodiments include discovery procedures for identifying a network controller with which the particular access point is to register.

Some embodiments define multi-layered protocol stacks for implementing control plane functionality within the access points and the network controller of the first communication system. In some embodiments, the protocol stacks include a Radio Access Network Application Part (RANAP) user adaptation (RUA) layer that enables a method for transparently passing RANAP messages between the access points and the network controller over a reliable transport connection. The method receives a RANAP message and encapsulates the message with a RUA header. The method then passes the encapsulated message to a receiving endpoint within the first communication system. In this manner, the RANAP message is passed from a first endpoint of the first communication system to a second endpoint of the first communication system. Additionally, in some embodiments, the network controller decodes and processes only the RUA header before relaying the RANAP message to the core network operating within a service region of the first communication system. In some embodiments, an access point performs the RANAP encapsulation and the receiving endpoint is a network controller. In some embodiments, the network controller performs the RANAP encapsulation and the receiving endpoint is an access point. The receiving endpoint need only decode and process the RUA header. Note that RANAP is only used to communicate with core network. The communication with UE (e.g. by the HNB) uses the RRC protocol as per 3GPP 25.331 specifications, "Radio Resource Control (RRC) Protocol Specification", the contents of which are herein incorporated by reference, hereinafter referred to as TS 25.331. The HNB on the receiving end processes the RUA as well as the entire RANAP message. The content of the RANAP messages are extracted by the HNB and converted to appropriate RRC messages.

Some embodiments define messaging formats to be used in conjunction with the various protocol stacks. Some embodiments provide a message that when sent from a particular access point to the network controller explicitly indicates the start of a communication session between the particular access point and the network controller. In some embodiments, the contents of the message are used to route the establishment of a signaling connection from the network controller to a core network node within a core network domain identified by the message.

Some embodiments provide a computer readable storage medium of an access point that stores a computer program. The computer program includes instructions that are executable by one or more processors. In some embodiments, the computer program includes a set of instruction for generating a message to send to the network controller to explicitly indicate start of a communication session with the network controller. The message includes a Radio Access Network Application Part (RANAP) message for establishing a signaling connection with the network controller. The computer program also includes a set of instructions for passing a set of RANAP messages to the core network through the network controller after establishing the signaling connection. The set of RANAP messages facilitates communications between the particular access point and the core network.

Some embodiments provide a computer readable storage medium of a particular access point that stores a computer program. The computer program includes instructions that are executable by one or more processors. In some embodiments, the computer program includes a set of instruction for receiving a message to explicitly indicate start of a communication session with a particular access point. The message includes a Radio Access Network Application Part (RANAP) message that is encapsulated with a header of the second network. The message is used for establishing a signaling connection with the particular access point. The computer program also includes a set of instructions for analyzing the message header to identify a destination in the core network to receive the message. The computer program further includes a set of instructions for forwarding the message without the header to the destination in the core network to establish the signaling connection Some embodiments further provide messages for directly transferring data downstream from the core network through the first communication system to a UE operating within a particular service region. Some embodiments provide messages for directly transferring data upstream from a UE in a particular service region through the first communication system to the core network. Directly transferring data involves routing a RANAP message through the network controller and an access point where the contents of the RANAP message are not processed by the network controller. In some embodiments, the network controller may process and modify the content of some of the RANAP message (for example, transport network switching that is converting ATM transport from/to the core network into the appropriate IP transport over the HNB-AN).

Some embodiments provide a computer-readable medium that is encoded with a data storage structure. The data storage structure for passing a Radio Access Network Application Part (RANAP) message within a first communication system that includes several user hosted access points for establishing service regions of the first communication system by using short range licensed wireless frequencies and a network controller that can communicatively couple user equipment operating in the service regions to a core network of a second communication system that also includes a licensed wireless radio access network. The data storage structure has a header that includes a core network domain identity to identify at least one of a core network domain from which the RANAP message originated and a core network domain for which the RANAP message is to be sent. The header also includes a context identifier to uniquely identify a particular user equipment operating within a particular service region of the second communication system. The data storage structure also includes payload data that include the RANAP message.

The registration procedure of some embodiments specifies a method for registering UEs with the first communication system. The method, from an access point coupled to a UE sends a registration request message to the network controller on behalf of the UE. The method receives a registration accept message when the UE is authorized to access services of the first communication system through the particular access point. As part of the registration accept message, some embodiments include a uniquely assigned context identifier that identifies the UE while the UE is connected for service at the particular access point. All subsequent messages will include the assigned context identifier to identify the UE.

The registration procedure of some embodiments also specifies a method for registering an access point with the network controller. The method includes the access point sending its identification information and location information to the network controller. The network controller determines whether the access point identified by the identification information at the specified location is permitted to access services of the first communication system through the network controller. When permitted, the access point receives a registration accept message from the network controller. Otherwise, the method rejects the access point or redirects the access point to another network controller.

Some embodiments provide emergency responders the ability to locate a position of an emergency caller when the caller places the emergency request through a service area of the first communication system. More specifically, some embodiments provide a method whereby unauthorized UEs are still permitted limited service to the first communication system in order to establish an emergency call when in a service region of the first communication system. The method includes receiving, at a particular access point, a service request from a UE indicating that the UE is requesting emergency services. The particular access point then performs a registration procedure with the network controller that indicates that the purpose of the registration is to request emergency services for the UE. The method includes receiving a registration accept message with a context identifier to be used by the UE in order to access limited services of the first communication system, specifically, emergency services.

Some embodiments provide a method that at the network controller, establishes a bearer connection between a particular access point and the core network. The establishing the bearer connection includes initiating signaling to establish an asynchronous transfer mode (ATM) based bearer connection between the network controller and the core network. The establishing the bearer connection also includes establishing an Internet Protocol (IP) based bearer connection between the network controller and the particular service region. The method also includes receiving a message from the particular access point for establishing a user plane between the particular access point and the core network. The method also includes establishing the user plane by using the IP based bearer connection between the particular access point and the network controller and the ATM based bearer connection between the network controller and the core network. The network controller routes user plane data received from the particular access point over the IP based bearer connection to the core network through the ATM based bearer connection by the network controller.

Some embodiments provide a method for user equipment (UE) registration with a closed subscriber group (CSG) system. The method receives a UE registration request at the network controller from an access point. The request includes an initial NAS message from the UE and a CSG identification associated with the access point. The method relays the registration request that includes the initial NAS message and the CSG identification to the core network. The method receives a permanent identity of the UE from the core network based on the registration request. The method uses the permanent identity of the UE to complete the UE registration.

BRIEF DESCRIPTION OF THE DRAWINGS

The novel features of the invention are set forth in the appended claims. However, for purpose of explanation, several embodiments of the invention are set forth in the following figures.

FIG. 7 illustrates INITIAL DIRECT TRANSFER message content in some embodiments.

FIG. 8 illustrates UPLINK DIRECT TRANSFER message content in some embodiments.

FIG. 9 illustrates DOWNLINK DIRECT TRANSFER message content in some embodiments.

FIG. 22 illustrates the fields of an Iuh RANAP Header in some embodiments.

FIG. 23 illustrates a RANAP-H PDU in some embodiments.

FIG. 24 illustrates a Context Create Request (CCREQ) message in some embodiments.

FIG. 25 illustrates an Iuh RANAP header, in some embodiments.

FIG. 26 illustrates the structure of a PDU used for transferring an HNBAP message in some embodiments.

FIG. 27 illustrates a Create UE Context Request going from the HNB to the HNB-GW in some embodiments.

FIG. 28 illustrates a Create UE Context Accept message going from the HNB-GW to the HNB in some embodiments.

FIG. 29 illustrates a Release UE Context message going from either the HNB-GW to the HNB or the HNB to the HNB-GW in some embodiments.

FIG. 30 illustrates a Release UE Context Complete message going from either the HNB-GW to the HNB or the HNB to the HNB-GW in some embodiments.

DETAILED DESCRIPTION OF THE INVENTION

Figure 1:
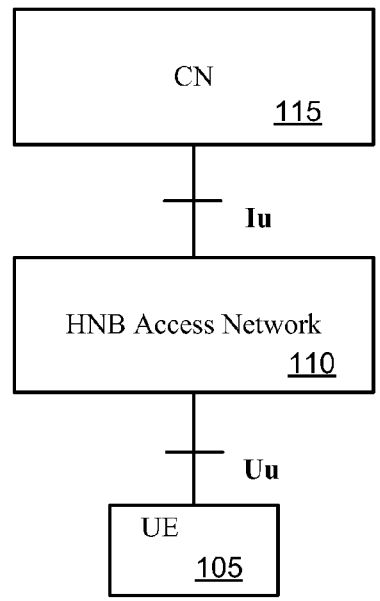
FIG. 1 illustrates a system architecture for 3 G HNB deployments in accordance with some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Throughout the following description, acronyms commonly used in the telecommunications industry for wireless services are utilized along with acronyms specific to the present invention. A table of acronyms used in this application is included in Section XIII.

Some embodiments provide methods and systems for integrating a first communication system with a core network of a second communication system that has a licensed wireless radio access network. In some embodiments, the first communication system includes one or more user hosted access points that operate using short range licensed wireless frequencies in order to establish service regions of the first communication system and a network controller for communicatively coupling the service regions associated with the access points to the core network.

The first communication system of some embodiments includes a Home Node-B (HNB) Access Network (HNB-AN) where the access points are Home Node-Bs and the network controller is a HNB Gateway (HNB-GW). The licensed wireless radio access network of the second communication system of some embodiments includes a Universal Mobile Telecommunications System (UMTS) Terrestrial Radio Access Network (UTRAN) and the core network of the second communication system includes a core network of the UMTS.

The network controller of some embodiments seamlessly integrates each of the short range licensed wireless service regions with the core network. In some such embodiments, the network controller seamlessly integrates with the core network by using existing Iu interfaces of the core network to communicatively couple each of the service regions to the core network. Accordingly, the network controller of some embodiments uses standardized messaging and protocols to communicate with the core network while utilizing HNB-AN messaging and protocols to communicate with each of the service regions. In this manner, the network controller of some embodiments reduces deployment costs of the HNB-AN within the UMTS core network. Specifically, deployment of the network controller of some embodiments requires no change to the UMTS core network while still providing HNB wireless service that combines the mobility of licensed wireless networks with the quality and speed of landline/broadband services. In some embodiments, the network controllers take on some of the functionality of a traditional Radio Network Controller (RNC).

Additionally, the access points of some embodiments seamlessly integrate with existing user equipment (UE) of the licensed wireless radio access networks of the second communication system. In this manner, the access points reduce deployment costs of the HNB-AN, as users are able to utilize existing UE in order to wirelessly communicate through either the first communication system or the second communication system where the first communication system combines the wireless mobility afforded by the licensed wireless radio access network of the second communication system with the speed and quality of service afforded by landline/broadband services. In some embodiments, the access points are functionally equivalent to a Node-B of the UTRAN while having the flexibility and lower deployment costs associated with an ad-hoc and user hosted service region. In some embodiments, the access points take on some the functionality of a traditional Radio Network Controller (RNC).

Some embodiments define multi-layered protocol stacks for implementing management functionality within the access points and the network controller of the first communication system. In some embodiments, the protocol stacks include a management layer that performs functionality of the HNB Application Part (HNBAP) protocol. The protocol stacks of some embodiments implement management functionality that includes a registration procedure for registering a particular access point with the network controller. Specifically, the protocol stacks enable a registration procedure that allows a service region associated with a particular access point to access services of the core network through the network controller. Additional management functionality implemented by the protocol stacks of some embodiments include discovery procedures for identifying a network controller with which the particular access point is to register.

Some embodiments define multi-layered protocol stacks for implementing control plane functionality within the access points and the network controller of the first communication system. In some embodiments, the protocol stacks include a Radio Access Network Application Part (RANAP) user adaptation (RUA) layer that enables a method for transparently passing RANAP messages between the access points and the network controller over a reliable transport connection. The method receives a RANAP message and encapsulates the message with a RUA header. The method then passes the encapsulated message to a receiving endpoint within the first communication system. In this manner, the RANAP message is passed from a first endpoint of the first communication system to a second endpoint of the first communication system. Additionally, in some embodiments, the network controller decodes and processes only the RUA header before relaying the RANAP message to the core network operating within a service region of the first communication system. In some embodiments, an access point performs the RANAP encapsulation and the receiving endpoint is a network controller. In some embodiments, the network controller performs the RANAP encapsulation and the receiving endpoint is an access point. The receiving endpoint need only decode and process the RUA header. Note that RANAP is only used to communicate with core network. The communication with UE (e.g. by the HNB) uses the RRC protocol as per 3GPP 25.331 specifications. The HNB on the receiving end processes the RUA as well as the entire RANAP message. The content of the RANAP messages are extracted by the HNB and converted to appropriate RRC messages.

Some embodiments define messaging formats to be used in conjunction with the various protocol stacks. Some embodiments provide a message that when sent from a particular access point to the network controller explicitly indicates the start of a communication session between the particular access point and the network controller. In some embodiments, the contents of the message are used to route the establishment of a signaling connection from the network controller to a core network node within a core network domain identified by the message.

Some embodiments provide a computer readable storage medium of an access point that stores a computer program. The computer program includes instructions that are executable by one or more processors. In some embodiments, the computer program includes a set of instruction for generating a message to send to the network controller to explicitly indicate start of a communication session with the network controller. The message includes a Radio Access Network Application Part (RANAP) message for establishing a signaling connection with the network controller. The computer program also includes a set of instructions for passing a set of RANAP messages to the core network through the network controller after establishing the signaling connection. The set of RANAP messages facilitates communications between the particular access point and the core network.

Some embodiments provide a computer readable storage medium of a particular access point that stores a computer program. The computer program includes instructions that are executable by one or more processors. In some embodiments, the computer program includes a set of instruction for receiving a message to explicitly indicate start of a communication session with a particular access point. The message includes a Radio Access Network Application Part (RANAP) message that is encapsulated with a header of the second network. The message is used for establishing a signaling connection with the particular access point. The computer program also includes a set of instructions for analyzing the message header to identify a destination in the core network to receive the message. The computer program further includes a set of instructions for forwarding the message without the header to the destination in the core network to establish the signaling connection Some embodiments further provide messages for directly transferring data downstream from the core network through the first communication system to a UE operating within a particular service region. Some embodiments provide messages for directly transferring data upstream from a UE in a particular service region through the first communication system to the core network. Directly transferring data involves routing a RANAP message through the network controller and an access point where the contents of the RANAP message are not processed by the network controller. In some embodiments, the network controller may process and modify the content of some of the RANAP message (for example, transport network switching that is converting ATM transport from/to the core network into the appropriate IP transport over the HNB-AN).

Some embodiments provide a computer-readable medium that is encoded with a data storage structure. The data storage structure for passing a Radio Access Network Application Part (RANAP) message within a first communication system that includes several user hosted access points for establishing service regions of the first communication system by using short range licensed wireless frequencies and a network controller that can communicatively couple user equipment operating in the service regions to a core network of a second communication system that also includes a licensed wireless radio access network. The data storage structure has a header that includes a core network domain identity to identify at least one of a core network domain from which the RANAP message originated and a core network domain for which the RANAP message is to be sent. The header also includes a context identifier to uniquely identify a particular user equipment operating within a particular service region of the second communication system. The data storage structure also includes payload data that include the RANAP message.

The registration procedure of some embodiments specifies a method for registering UEs with the first communication system. The method, from an access point coupled to a UE sends a registration request message to the network controller on behalf of the UE. The method receives a registration accept message when the UE is authorized to access services of the first communication system through the particular access point. As part of the registration accept message, some embodiments include a uniquely assigned context identifier that identifies the UE while the UE is connected for service at the particular access point. All subsequent messages will include the assigned context identifier to identify the UE.

The registration procedure of some embodiments also specifies a method for registering an access point with the network controller. The method includes the access point sending its identification information and location information to the network controller. The network controller determines whether the access point identified by the identification information at the specified location is permitted to access services of the first communication system through the network controller. When permitted, the access point receives a registration accept message from the network controller. Otherwise, the method rejects the access point or redirects the access point to another network controller.

Some embodiments provide emergency responders the ability to locate a position of an emergency caller when the caller places the emergency request through a service area of the first communication system. More specifically, some embodiments provide a method whereby unauthorized UEs are still permitted limited service to the first communication system in order to establish an emergency call when in a service region of the first communication system. The method includes receiving, at a particular access point, a service request from a UE indicating that the UE is requesting emergency services. The particular access point then performs a registration procedure with the network controller that indicates that the purpose of the registration is to request emergency services for the UE. The method includes receiving a registration accept message with a context identifier to be used by the UE in order to access limited services of the first communication system, specifically, emergency services.

Some embodiments provide a method that at the network controller, establishes a bearer connection between a particular access point and the core network. The establishing the bearer connection includes initiating signaling to establish an asynchronous transfer mode (ATM) based bearer connection between the network controller and the core network. The establishing the bearer connection also includes establishing an Internet Protocol (IP) based bearer connection between the network controller and the particular service region. The method also includes receiving a message from the particular access point for establishing a user plane between the particular access point and the core network. The method also includes establishing the user plane by using the IP based bearer connection between the particular access point and the network controller and the ATM based bearer connection between the network controller and the core network. The network controller routes user plane data received from the particular access point over the IP based bearer connection to the core network through the ATM based bearer connection by the network controller.

Some embodiments provide a method for user equipment (UE) registration with a closed subscriber group (CSG) system. The method receives a UE registration request at the network controller from an access point. The request includes an initial NAS message from the UE and a CSG identification associated with the access point. The method relays the registration request that includes the initial NAS message and the CSG identification to the core network. The method receives a permanent identity of the UE from the core network based on the registration request. The method uses the permanent identity of the UE to complete the UE registration.

Several more detailed embodiments of the invention are described in sections below. Specifically, Section I discusses the HNB system architecture. Section II describes various protocol architectures of the HNB system, including protocol architectures for the Home Node-B Application Part (HN-BAP) and the Radio Access Network Application Part (RANAP) User Adaption (RUA) layer. Section III discusses mobility management within the HNB system, including mobility management scenarios and relocation.

Section IV describes call management and some call management scenarios. Section V discusses packet services. Section VI discusses short message services and scenarios. Section VII describes emergency services, including service area based routing and location based routing. Section VIII discusses Lawfully Authorized Electronic Surveillance (LAES) Service.

Section IX discusses HNB security, including authentication, encryption, a profile of IKEv2, a profile of IPSec ESP, security mode control, and core network authentication. Section X describes HNB service access control (HNB SAC), including HNB-GW and service area selection, and service access control use case examples. Section XI analyzes the impacts of various access control policies. Section XII provides a description of a computer system with which some embodiments of the invention are implemented. Lastly, Section XIII lists the abbreviations and provides definitions for terms found herein.

I. HNB SYSTEM ARCHITECTURE

FIG. 1 illustrates a system architecture for 3 G HNB deployments in accordance with some embodiments of the invention. As shown, the system includes a HNB access network (or HNB system) 110. The key features of the 3 G HNB system architecture include (a) support for a standard User Equipment (UE) 105 as defined in the 3GPP technical specification TS 23.101 entitled "General UMTS architecture" which is incorporated herein by reference and (b) co-existence with the UMTS Terrestrial Radio Access Network (UTRAN) and interconnection with the existing Core Network (CN) 115 via the standardized interfaces defined for UTRAN.

In some embodiments, the standardized interfaces include (a) the Iu-cs interface for circuit switched services as overviewed in the 3GPP technical specification (TS) 25.410 entitled "UTRAN Iu Interface: general aspects and principles" which is incorporated herein by reference, (b) the Iu-ps interface for packet switched services as overviewed in the 3GPP TS 25.410, (c) the Iu-pc interface for supporting location services as described in the 3GPP TS 25.450 entitled "UTRAN Iupc interface general aspects and principles" which is incorporated herein by reference, and (d) the Iu-bc interface for supporting cell broadcast services as described in the 3GPP TS 25.419 entitled "UTRAN Iu-BC interface: Service Area Broadcast Protocol (SABP)" which is incorporated herein by reference. However, it should be apparent to one of ordinary skill in the art that other interfaces may be implemented by the HNB-AN such as the A/Gb interfaces of standard Global System for Mobile (GSM) communications systems.

To address specific 3 G HNB applications, some embodiments utilize existing Iu and Uu interfaces within the HNB-AN 110. The HNB-AN 110 addresses some of the key issues in the deployment of 3 G HNB applications, such as the ad-hoc and large scale deployment of 3 G HNBs using public infrastructure such as the Internet.

Figure 2:
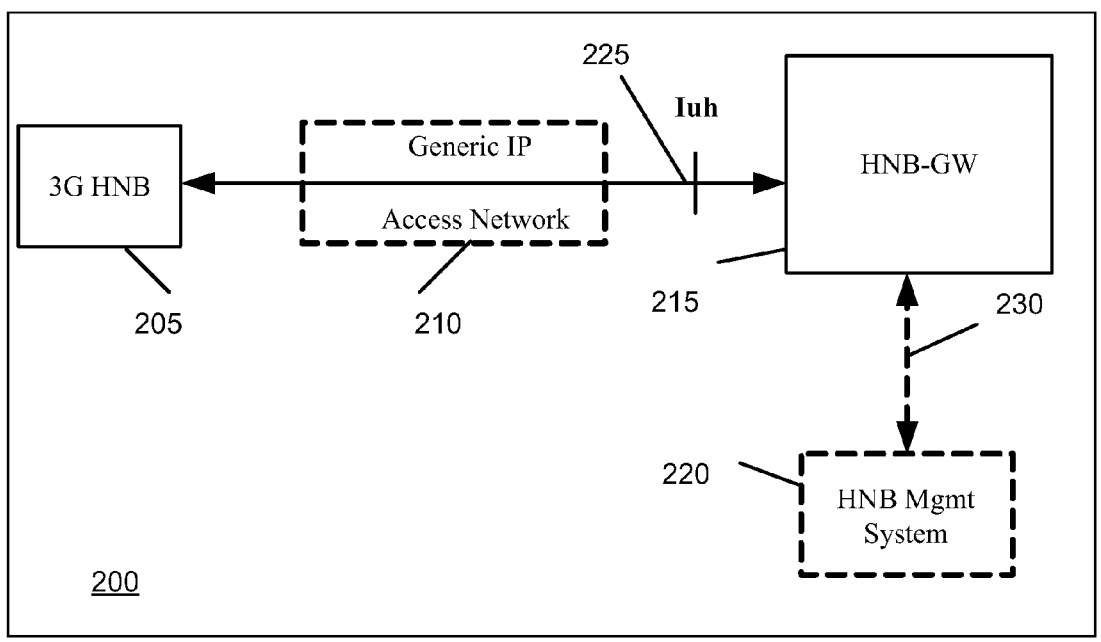
FIG. 2 illustrates elements of the HNB Access Network (HNB-AN) sub-system architecture in accordance with some embodiments.

FIG. 2 illustrates elements of the HNB Access Network (HNB-AN) 200 architecture in accordance with some embodiments. This figure includes (3 G) HNB 205, Generic IP Access Network 210, HNB-GW 215, HNB Management System 220, Iuh interface 225 that is established between the Generic IP Access Network 210 and the HNB-GW 215, and an interface 230 between the HNB-GW 215 and the HNB Management System 220. In some embodiments, the interface 230 is based on the 3GPP TR-069 family of standards. In some other embodiments, the interface 230 is the Iuhm interface. These elements are described in further detail below with reference to FIG. 3.

FIG. 2 and other figures below illustrate a single access point (e.g., HNB 205) communicatively coupled to a network controller (e.g., HNB-GW 215). However, it should be apparent to one of ordinary skill in the art that the network controller (e.g., HNB-GW 215) of some embodiments is communicatively coupled to several HNBs and the network controller communicatively couples all such HNBs to the core network. Also, the HNB of some embodiments is communicatively coupled to several UEs. The figures merely illustrate a single HNB communicatively coupled to the HNB-GW for purposes of simplifying the discussion to interactions between a single access point and a single network controller. However, the same network controller may have several of the same interactions with several different access points.

Figure 3:
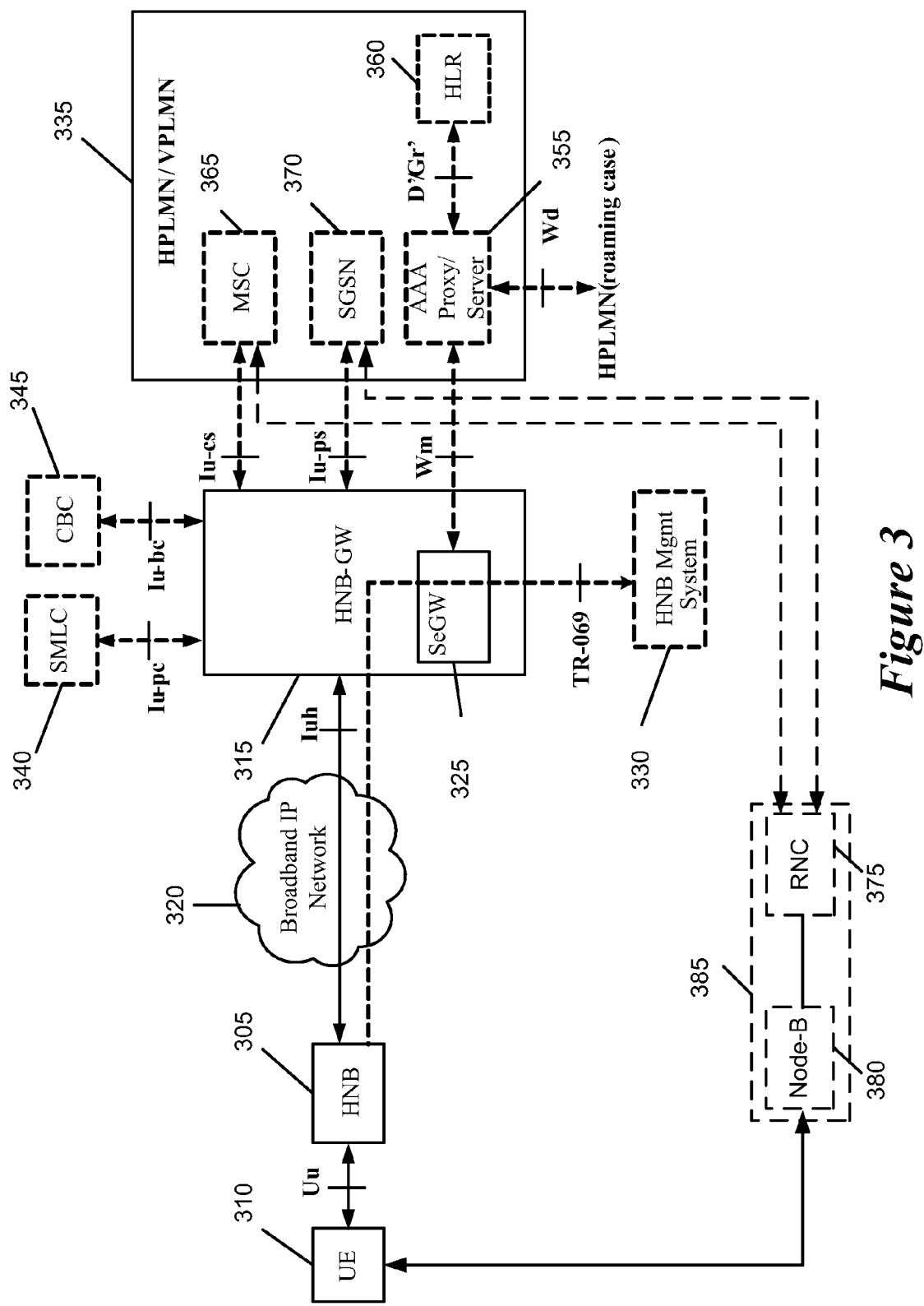
FIG. 3 illustrates the Home Node-B (HNB) system architecture including the HNB-AN of some embodiments integrated with a core network of a second communication system that includes a licensed wireless radio access network.

FIG. 3 illustrates the HNB-AN system architecture of some embodiments integrated with a core network of a second communication system that includes a licensed wireless radio access network. The HNB system includes (1) Home Node-B (HNB) 305, (2) Home Node-B Gateway (HNB-GW) 315, (3) Broadband IP Network 320, (4) Security Gateway (SeGW) 325, and (6) HNB Management System 330. The licensed wireless radio access network of the second communication system includes UTRAN 385 which is comprised of a Node-B 380 and a Radio Network Controller 375 of a UMTS. The core network of the second communication system includes Mobile Switching Center (MSC) 365, Serving GPRS Support Node (SGSN) 370, Authorization, Authentication, and Accounting server 355, and Home Location Register 360. Additionally, Service Mobile Location Center (SMLC) 340 and Cell Broadcast Center (CBC) 345 may be components of the core network.

A. User Equipment (UE)

In some embodiments, UE 310 is used to access services of the HNB-AN and also access services of the licensed wireless radio access network 385 of a cellular provider. In some such embodiments, the UE seamlessly transitions from the HNB-AN to the cellular provider and vice versa without loss of connectivity. In some embodiments, the UE 310 is thus a standard device operating over licensed spectrum of a licensed wireless system provider. Accordingly, the UE 310 wirelessly connects to the HNB 305 using the same signaling and messaging interfaces as it would when connecting to a base station, such as a base transceiver station (BTS) in GSM, or the Node-B 380 of a Universal Mobile Telecommunications System (UMTS).

Figure 4:
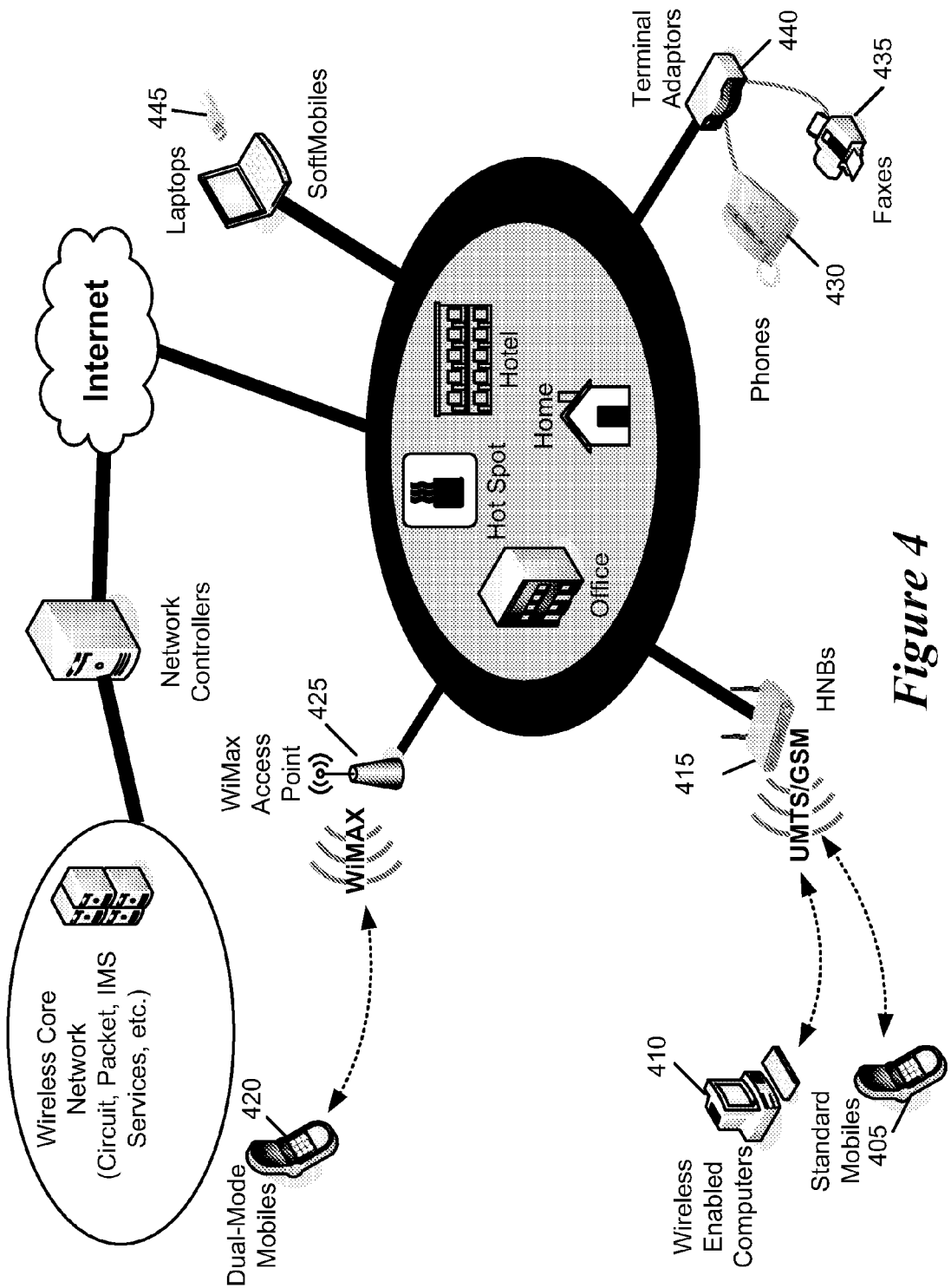
FIG. 4 illustrates some of the various devices that may be used in some embodiments in order to access services of the HNB-AN or HNB system.

FIG. 4 illustrates some of the various devices that may be used in some embodiments in order to access services of the HNB-AN or HNB system. In some embodiments, the devices include (1) standard licensed wireless handsets 405 and wireless enabled computers 410 that connect through an HNB 415, (2) dual mode handsets with WiMAX capabilities 420 that connect through WiMAX access points 425, (3) devices such as wired telephones 430 and faxes 435 that connect through terminal adapters 440, and (4) softmobile enabled devices 445.

1. Licensed Wireless Handsets

In some embodiments, the UE 310 includes cellular telephones 405, smartphones, PDAs, and modem like devices some of which are shown in FIG. 4. These devices include any device that wirelessly communicates with a licensed wireless service provider using existing licensed wireless technologies, such as Global System for Mobile (GSM) communications, UMTS, etc.

2. Terminal Adaptors

In some embodiments, the UE 310 includes a terminal adaptor device (such as 440 of FIG. 4) that allows incorporating fixed-terminal devices such as telephones, faxes, and other equipments that are not wirelessly enabled within the HNB-AN. As far as the subscriber is concerned, the service behaves as a standard analog fixed telephone line. The service is delivered in a manner similar to other fixed line VoIP services, where a UE is connected to the subscriber's existing broadband (e.g., Internet) service.

3. WiMAX

In some embodiments, the UE 310 includes a dual mode cellular/WiMAX UE (such as 420 of FIG. 4) that enables a subscriber to seamlessly transition between a cellular network and a WiMAX network through a WiMAX access point (such as 425 of FIG. 4).

4. SoftMobiles

Connecting laptops to broadband access at hotels and Wi-Fi hot spots has become popular, particularly for international business travelers. In addition, many travelers are beginning to utilize their laptops and broadband connections for the purpose of voice communications. Rather than using mobile phones to make calls and pay significant roaming fees, they utilize SoftMobiles (or SoftPhones) such as 445 of FIG. 4 and VoIP services when making long distance calls. Accordingly, the UE 310 of some embodiments includes SoftMobile like devices.

To use a SoftMobile service, a subscriber would place a USB memory stick with an embedded SIM into a USB port of their laptop. A SoftMobile client would automatically launch and connect over IP to the mobile service provider. From that point on, the subscriber would be able to make and receive mobile calls as if she was in her home calling area.

B. HNB

The Home Node-B (HNB) 305 is an access point that offers a standard radio interface (Uu) for user equipment (UE) connectivity using short range licensed wireless frequencies. The HNB 305 provides the radio access network connectivity to the UE using the Iuh interface towards the HNB-GW 315.

The HNB 305 differs from the UMTS Node-B in that the range of wireless connectivity supported by the HNB 305 (e.g., tens of meters) is much less than the range supported by the UMTS Node-B (e.g., hundreds or thousands of meters). This is because the HNB 305 is a low power and a short range device similar to wireless access points found within a user's home. The low power and short range requirement ensures that the HNB 305 does not interfere with the service regions of the licensed wireless system providers (e.g., cellular networks) that are established using the wireless frequencies that the licensed wireless system providers licensed from the government at great expense. Moreover, the low power requirement enables the HNB 305 to operate using standard electrical outlets of a user's home or office. In some embodiments, the low power and short range requirement further facilitates the small scale of the HNB device relative to the radio access network Node-B devices. Unlike the Node-B, which often is a tower with multiple antennae with the tower reaching several meters in height, the HNB is a much smaller device often the size of 802.11 wireless routers commonly found within a user's home.

Conversely, the Node-B is network equipment of a UMTS Terrestrial Radio Access Network (UTRAN). The Node-B is managed and operated by a licensed wireless system provider. The Node-B of the licensed wireless system has to provide service to many more users than the HNB 305 and must do so without loss of connectivity over vast regions (e.g., states and countries). Accordingly, the licensed wireless service provider deploys several Node-Bs that are adjacent to one another in order to create an uninterrupted region of coverage. Conversely, an HNB service region established by a first HNB does not need to be adjacent to any other HNB service region and need not offer uninterrupted service between HNB service regions.

In some embodiments, the HNB 305 is user hosted as opposed to the Node-B that is hosted by the licensed wireless system. A user hosted HNB allows a user to specify the location of the HNB, provide the connectivity between HNB and the HNB network or HNB-GW (e.g., the broadband connection), control operation of the HNB, for example, by providing power to the HNB, or manage the HNB by modifying configuration parameters of the HNB. All such control over the Node-B is tightly managed by the licensed wireless system provider. In other words, the HNB is customer premise equipment (CPE) that a user is able to purchase from an electronics store or from the HNB-AN provider, whereas the Node-B is network equipment that is impractical for a single user to purchase, operate, and maintain.

Additionally, a key characteristic of the HNB architecture of some embodiments is that there are no permanent pre-configured peer adjacencies between HNB and HNB-GW. Instead, there are ad-hoc adjacencies that are initiated from the HNB (as it is usually behind a NAT/firewall, and does not have a permanent IP address in the carrier network). The HNB system therefore offers flexibility in deploying service. The HNBs of an HNB system may be deployed on an ad hoc basis as opposed to the regimented deployment structure of the licensed wireless system.

Accordingly, in some embodiments, the HNB 305 supports enhancements for operating in an ad-hoc environment and the Node-B does not. The ad hoc system allows for individual users to establish HNB service regions based on each user's needs. In some embodiments, each user purchases an HNB and each of the HNBs may be purchased from different vendors with different HNB implementations. In this manner, the ad hoc HNB system creates several individual local coverage areas based on user deployment of each HNB whereas the licensed wireless system deploys its Node-Bs in an effort to provide regional coverage area that is uninterrupted across large areas (e.g., hundreds of miles).

It should be apparent to one of ordinary skill in the art that in some embodiments the HNB system provider deploys the HNBs rather than the users. In some such embodiments, the system remains ad hoc by virtue of the discontinuous nature of the separate and local HNB service regions. Additionally, in some such embodiments, the HNBs remain user hosted since power and broadband connectivity is provided by the user even though the system provider more closely regulates the HNB equipment that is deployed.

The ad hoc nature of the HNB system also allows the system to grow and shrink as its user base grows and shrinks. For example, whenever a new user desires to utilize the HNB service, the user purchases and hosts a HNB at a home or office location. The user hosted HNB provides the user with a HNB-AN service region from which the user access HNB system services. Conversely, the licensed wireless system provider must first deploy several Node-Bs in order to provide extensive large scale regional coverage. Once the service regions are established at great expense to the licensed wireless system provider, users then activate service with the licensed wireless system provider. Accordingly, the HNB system is an unplanned system whereas the licensed wireless system is a planned system. In other words, the HNB system does not need an existing access point infrastructure in order to operate. Rather, the infrastructure is unplanned whereby the infrastructure is built upon with every new user that is added to the system. This is opposite to the planned licensed wireless system. The licensed wireless system requires that there be an existing infrastructure before new users can be added. The infrastructure of the licensed wireless system is planned in the sense that the infrastructure is built first in a particular region and then the service is marketed to that region after the infrastructure is built.

The HNB 305 also differs from generic access points used in UMA systems. Specifically, in a UMA system the access points act as transparent base stations. In other words, the user equipment and the network controller directly communicate. In the HNB system, however, the HNB 305 includes various Radio Network Controller (RNC) functionality. In some such embodiments, the HNB 305 initiates various messaging procedures and maintains state information regarding user equipment operating within the service region associated with the HNB 305. The HNB 305 is equipped with either a standard 3 G Universal Subscriber Identity Module (USIM) or a 2 G SIM. The (U)SIM provides the HNB 305 with a unique subscriber identity and allows the HNB 305 to utilize the existing subscriber management infrastructure of an operator. It should be apparent to one of ordinary skill in the art that some embodiments of the HNB system utilize a different identification mechanism for the HNB than the (U)SIM. For example, the HNB identity of some embodiments is based on Media Access Control (MAC) address of the HNB or any other globally unique identifier such as the combination of vendor identity and serial number from that vendor.

The access points of some embodiments include circuits for receiving, transmitting, generating, and processing the various messages that cause various physical transformations within the HNB-AN, core network, and licensed wireless radio access network. In some embodiments, the circuits of the access points include a processor, memory, receiver, and transceiver. In some embodiments, the receiver and/or the transceiver are wireless interfaces that operate using short range licensed wireless frequencies. In some other embodiments, the receiver and/or the transceiver are wired interfaces (e.g., DSL, cable, etc.). These circuits perform various physical transformations on the access point as well as other elements within the HNB-AN, licensed wireless radio access network, and core network. For example, the processor in conjunction with the memory generate a paging message that when sent to a UE using the transceiver causes the UE to prompt the user of an incoming call. As another example, the access point registers a UE by generating a registration message that is sent to the network controller using the transceiver when the access point detects that the UE has camped on the service region of the access point based on a location update message received by the access point on its receiver. These and other physical components of the access points of some embodiments are described with further detail in FIG. 64 below.

It should be apparent to one of ordinary skill in the art that the HNB is one implementation of an access point that operates using short range licensed wireless frequencies. Some embodiments allow for any access point that operates using short range licensed wireless frequencies to be used in place of or in conjunction with the HNBs. For example, a Femtocell access point is a different implementation of an access point that provides short range licensed wireless frequencies in order to establish a service region of a Femtocell system that is similar to the HNB system described in relation to some embodiments of the invention.

C. Broadband IP Network

The HNB 305 provides radio access network connectivity for the UE 310. The HNB 305 then communicatively couples the UE to the HNB-GW 315 using the Iuh interface that exists between the HNB 305 and the HNB-GW 315. As shown in FIG. 3, the Iuh interface is established over a broadband Internet Protocol (IP) network 320 where, in some embodiments, a customer's broadband connection is utilized. The broadband IP Network 320 represents all the elements that collectively, support IP connectivity between the HNB-GW 315 and the HNB 305. The IP network 320 is assumed to be an untrusted public IP network without any Asynchronous Transfer Mode (ATM) or Signaling System 7 (SS7) infrastructure.

In some embodiments, the broadband IP network 320 includes (1) other Customer premise equipment (e.g., Digital Subscriber Line (DSL)/cable modem, Wireless Local Area Network (WLAN) switch, residential gateways/routers, switches, hubs, WLAN access points), (2) network systems specific to the broadband access technology (e.g., DSL Access Multiplexer (DSLAM) or Cable Modem Termination System (CMTS)), (3) Internet Service Provider (ISP) IP network systems (edge routers, core routers, firewalls), (4) wireless service provider (WSP) IP network systems (edge routers, core routers, firewalls) and Network address translation (NAT) functions, either standalone or integrated into one or more of the above systems.

D. HNB-GW

The HNB-GW 315 is a network controller that provides network connectivity of the HNB 305 to the existing core network (CN) 335. The HNB-GW 315 entity appears as a legacy RNC to the existing CN 335. Specifically, the HNB-GW 315 uses existing Iu interfaces (e.g., Iu-cs and Iu-ps) for CN connectivity. In this manner, the HNB system may be integrated into the existing CN 335 with no change to the CN 335. This allows licensed wireless system providers the ability to provide HNB system functionality to their users with no change to their existing network.

As noted above, the HNB-GW 315 connects to the HNB 305 using the Iuh interface. Additional interfaces of the HNB-GW 315 include the Iu-pc interface to the Service Mobile Location Center (SMLC) 340, the Iu-bc interface to the Cell Broadcast Center (CBC) 345, the Wm interface to the Authorization, Authentication, and Accounting (AAA) server 355, and an interface that is based on the 3GPP TR-069 family of standards, as specified by the DSL Forum technical specifications, to the HNB management system 330. In some embodiments, the interface to the HNB management system 330 is the Iuhm interface. In some such embodiments, the Iuhm interface carries information related to customer premise equipment (CPE) device management functionality between the HNB and HNB Mgmt System. It should be apparent to one of ordinary skill in the art that other interfaces may be used instead of or in addition to the above enumerated interfaces.

In some embodiments, the HNB-GW 315 connects to several different HNBs and services each of the corresponding service regions of each of the several HNBs. In this manner, a single HNB-GW, such as the HNB-GW 315, communicatively couples multiple HNB service regions to the CN 335. Accordingly, the HNB-GW 315 provides call management functionality, mobility management functionality, security functionality, etc. as will be described in greater detail below. The HNB-GW 315 also performs key functionalities, such as the management of the legacy UTRAN identifiers (Location Area Identifiers (LAI), Service Area Identifiers (SAI), RND-Id, etc.) towards the CN 335, and Iuh interface management.

In some embodiments, the HNB-GW 315 includes various software module sub-components and/or various hardware module sub-components that perform some of the above mentioned functionality. For example, the Security Gateway (SeGW) 325 is a logical entity within the HNB-GW 315. The SeGW 325 provides the security functions including termination of secure access tunnels from the HNB 305, mutual authentication, encryption and data integrity for signaling, voice and data traffic.

The HNB Management System 330 provides centralized Customer Premise Equipment (CPE) device management for the HNB 305 and communicates with the HNB 305 via the security gateway logical entity. This system is used to manage a large number of HNBs including configuration, failure management, diagnostics, monitoring and software upgrades. In some embodiments, the HNB Management System 330 utilizes existing CPE device management techniques such as those described in the DSL Forum technical specifications TR-069.

The network controller of some embodiments includes circuits for receiving, transmitting, generating, and processing the various messages that cause various physical transformations within the HNB-AN, core network, and licensed wireless radio access network. In some embodiments, the circuits of the network controller include a processor, memory, receiver, and transceiver. These circuits perform various physical transformations on the network controller as well as other elements within the HNB-AN, licensed wireless radio access network, and core network. For example, the processor in conjunction with the memory generates context identifiers that when sent to a UE using the transceiver provide the UE with a unique identifier when operating within the HNB-AN. These and other physical components of the network controller of some embodiments are described with further detail in FIG. 64 below.

E. Core Network (CN) and Other Network Elements

As mentioned above, the HNB-GW 315 provides network connectivity of the HNB 305 to the existing CN 335. The CN 335 includes one or more HLRs 360 and AAA servers 355 for subscriber authentication and authorization. Once authorized, the UE may access the voice and data services of the CN 335 through the HNB system. To provide such services, the CN 335 includes a Mobile Switching Center (MSC) 365 to provide circuit switched services (i.e., voice). The CN also includes a Serving GPRS Support Node (SGSN) 370 to provide packet switched services. Though not shown in FIG. 3, the SGSN operates in a conjunction with a Gateway GPRS Support Node (GGSN) in order to provide the packet switched services.

The SGSN 370 is typically responsible for delivering data packets from and to the GGSN and the UE within the geographical service area of the SGSN 370. Additionally, the SGSN 370 may perform functionality such as mobility management, storing user profiles, and storing location information. However, the actual interface from the CN 335 to various external data packet services networks (e.g., public Internet) is facilitated by the GGSN. As the data packets originating from the UE typically are not structured in the format with which to access the external data networks, it is the role of the GGSN to act as the gateway into such packet services networks. In this manner, the GGSN provides addressing for data packets passing to and from the UE and the external packet services networks (not shown). Moreover, as the user equipment of a licensed wireless network traverses multiple service regions and thus multiple SGSNs, it is the role of the GGSN to provide a static gateway into the external data networks.

Location services are provided by the SMLC 340. The CBC 345 provides support for cell broadcast services.

These and other elements of the CN 335 are primarily intended for use with the licensed wireless systems. In the description below, the licensed wireless system will be described with reference to the UTRAN of a UMTS. However, it should be apparent to one of ordinary skill in the art that any licensed wireless system, such as a GSM/EDGE Radio Access Network (GERAN) may be used to reference the licensed wireless system.

Elements common to a UTRAN based cellular network include multiple base stations referred to as Node-Bs that facilitate wireless communication services for various UE via respective licensed radio links (e.g., radio links employing radio frequencies within a licensed bandwidth). The licensed wireless channel may comprise any licensed wireless service having a defined UTRAN or GERAN interface protocol (e.g., Iu-cs and Iu-ps interfaces for UTRAN or A and Gb interfaces for GERAN) for a voice/data network. The UTRAN 385 typically includes at least one Node-B 380 and a Radio Network Controller (RNC) 375 for managing the set of Node-Bs. Typically, the multiple Node-Bs are configured in a cellular configuration (one per each cell) that covers a wide service area. A licensed wireless cell is sometimes referred to as a macro cell which is a logical term used to reference, e.g., the UMTS radio cell (i.e., 3 G cell) under Node-B/RNC which is used to provide coverage typically in the range of tens of kilometers. Also, the UTRAN or GERAN is sometimes referred to as a macro network.

Each RNC communicates with components of the core network through the above described standard radio network controller interface such as the Iu-cs and Iu-ps interfaces. For example, a RNC communicates with MSC via the UTRAN Iu-cs interface for circuit switched services. Additionally, the RNC communicates with SGSN via the UTRAN Iu-ps interface for packet switched services through GGSN. It is through the use of these standardized network interfaces that the HNB system, more particularly the HNB-GW, may be seamlessly integrated to leverage services of the CN and emulate functionality of a legacy RNC of the licensed wireless system.

II. PROTOCOL ARCHITECTURES OF THE HNB SYSTEM

Functionality provided by each of the HNB and the HNB-GW are defined within various protocol stacks. In some embodiments, the protocol stacks include software layers that are stored to the memory of the HNB and HNB-GW and that are executed by a processing unit of the HNB and HNB-GW. In some embodiments, the protocol stacks are implemented as hardware modules within the HNB and HNB-GW. Additional hardware components of the HNB and HNB-GW are described below in Section XII, "Computer System".

In some embodiments, the HNB system separates management functions from control plane functions into two separate protocol stacks. The HNB Application Part (HNBAP) protocol architecture implements the management functions for the HNB system and the RANAP User Adaptation (RUA) protocol architecture implements the control functions for the HNB system. As will be described below, additional protocol architectures are specified for providing other functionality such as user plane functionality. However, it should be apparent to one of ordinary skill in the art that other protocol architectures may be integrated into the components of the HNB system and that the functionality of each of the protocol architectures is scalable to provide more or less functionality than described below.

A. Protocol Architecture Over the Iuh Interface

1. HNB Application Part (HNBAP) Protocol Architecture

Figure 5:
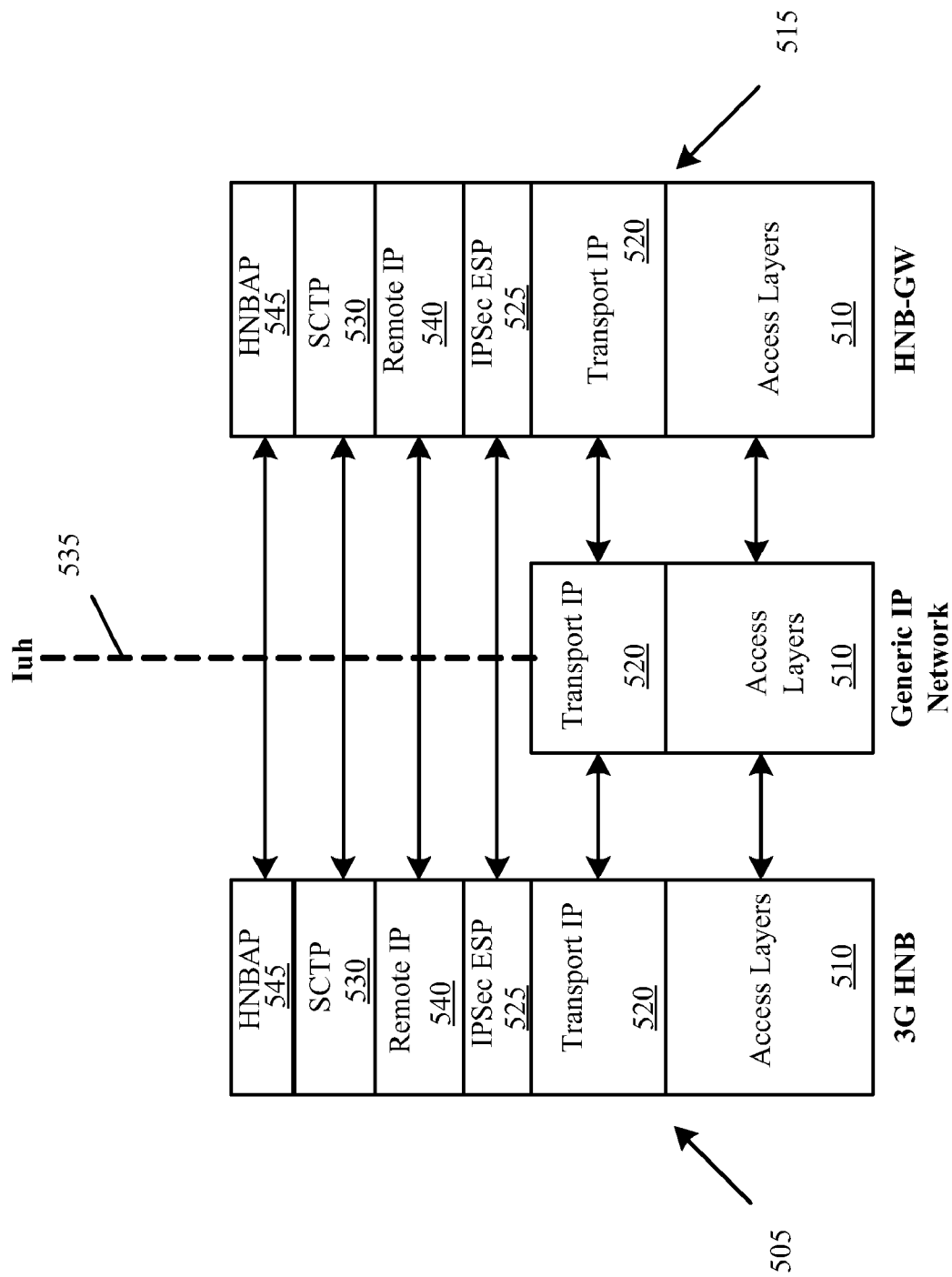
FIG. 5 illustrates the protocol architecture supporting the HNB Application Part (HNBAP) over the Iuh interface, in some embodiments.

As noted above, the HNBAP protocol architecture supports management functions between the HNB and HNB-GW including, but not limited to, the management of the underlying transport (i.e., the SCTP connection), HNB-GW discovery, and HNB and UE registration procedures. FIG. 5 illustrates the HNBAP protocol architecture in accordance with some embodiments. This figure illustrates (1) HNB 505, (2) HNB-GW 515, and (3) HNBAP protocol stacks of each of the HNB 505 and the HNB-GW 515. The HNBAP protocol stacks include (1) access layers 510, (2) transport IP layer 520, (3) IP Security (IPSec) ESP layer 525, (4) remote IP layer 540, (5) Stream Control Transmission Protocol layer (SCTP) 530, and (6) a HNBAP protocol layer 545.

The underlying Access Layers 510 and "Transport IP" layer 520 (i.e., the "outer" IP layer associated with IPSec tunnel mode) provide the generic connectivity between the HNB 505 and the HNB-GW 515. The IPSec layer 525 operates in tunnel mode and provides encryption and data integrity for communications and data that are passed using the upper layers (530, 540, and 545).

SCTP 530 provides reliable transport between the HNB 505 and the HNB-GW 515. SCTP 530 is transported using the "Remote IP" layer 540 (i.e., the "inner" IP layer associated with IPSec tunnel mode). In some embodiments, the SCTP 530 establishes a single SCTP association between the HNB 505 and HNB-GW 515. The same SCTP association is used for the transport of both the HNBAP messages as well as the RANAP messages (using RUA protocol), described in further detail below, over the Iuh interface 535. The SCTP Payload Protocol Identifier (PPI) value is used to identify the protocol being transported in the SCTP data chunk (e.g., HNBAP or RUA). The PPI value used for HNBAP transport is coordinated between the HNB 505 and the HNB-GW 515 (e.g., the HNBAP PPI value should be registered with the Internet Assigned Numbers Authority (IANA)). Each SCTP association contains a number of "streams" which are used to support multiple flows across the Iuh interface. In some embodiments, a dedicated SCTP stream (i.e., stream id 0 of the underlying SCTP transport association) is used for the transport of HNBAP messages across the Iuh interface.

It should be apparent to one of ordinary skill in the art that other reliable transport protocol layers may be used instead of SCTP 530 to facilitate reliable transport of communications and data between the HNB 505 and the HNB-GW 515. For example, some embodiments use the Transmission Control Protocol (TCP) for reliably transporting messages between the HNB 505 and the HNB-GW 515.

In some embodiments, the HNBAP protocol 545 provides a resource management layer or equivalent functional layer capable of discovery of the serving HNB-GW, registration of the HNB and UE with the HNB-GW, registration updates with the HNB-GW, and support for the identification of the HNB being used for HNB access. It should be apparent to one of ordinary skill in the art that the HNBAP protocol layer of some embodiments implements additional resource management functionality and that the above enumerated list is an exemplary set of such functionality. In some embodiments, the HNBAP protocol 545 utilizes different message formats and utilizes a different set of procedures than the resource management layers of the 3GPP and UMA systems in order to implement the resource management layer of the HNB system.

2. HNB Control Plane Architecture (RUA)

Figure 6:
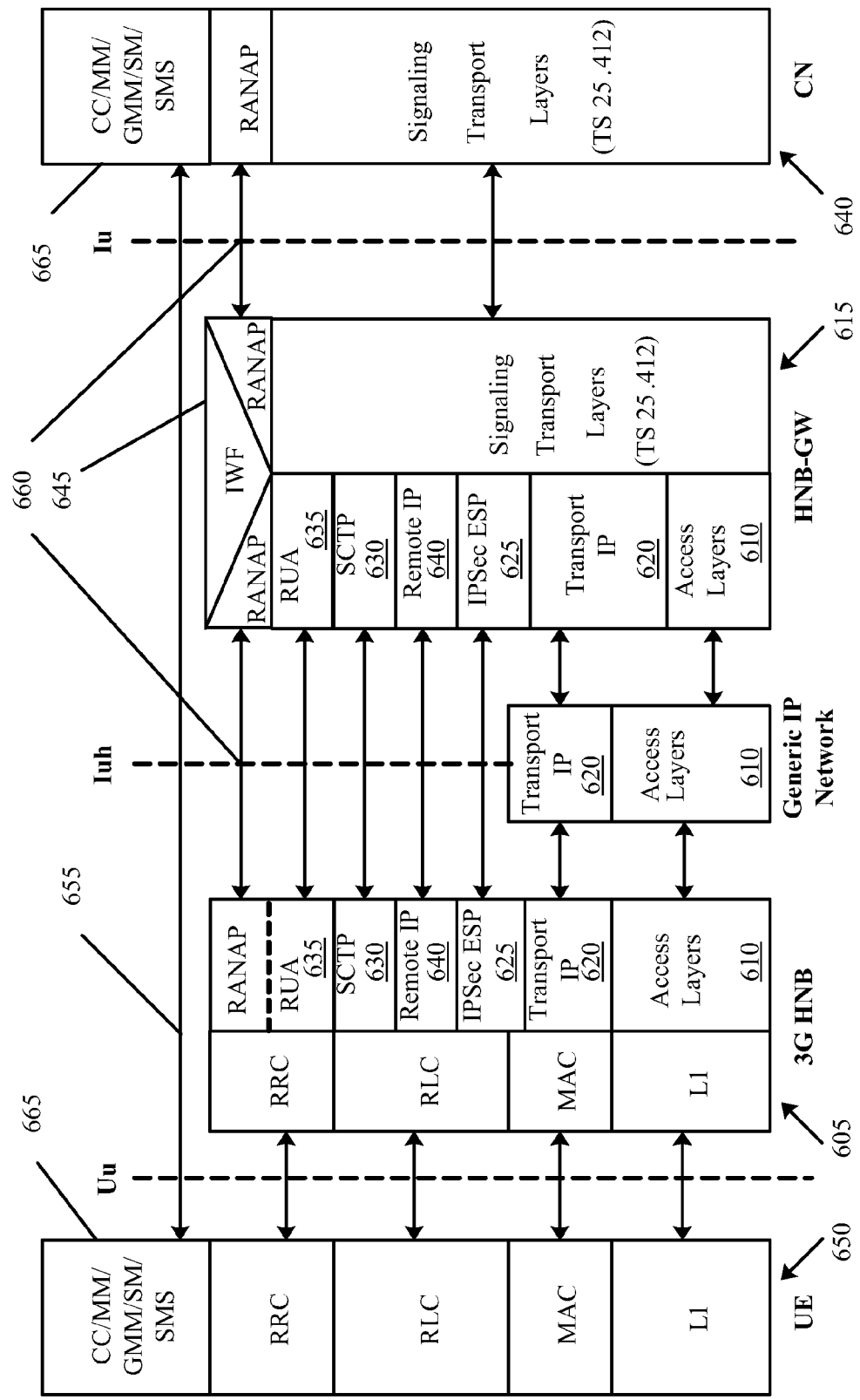
FIG. 6 illustrates the protocol architecture in support of the HNB control plane (i.e., for both the CS and PS domain), in some embodiments.

After performing the management functions defined by the HNBAP protocol, the HNB and HNB-GW utilize a different protocol architecture that specifies the control plane in the HNB system. FIG. 6 illustrates the protocol architecture in support of the HNB control plane (i.e., for both the CS and PS domain) in accordance with some embodiments.

FIG. 6 includes (1) HNB 605, (2) HNB-GW 615, (3) CN 640, (4) UE 650, and (5) control plane protocol stacks of each of the HNB 605, the HNB-GW 615, the CN 640, and the UE 650. The control plane protocol stacks of the HNB 605 and the HNB-GW 615 include (1) access layers 610, (2) transport IP layer 620, (3) IPSec layer 625, (4) remote IP layer 640, (5) SCTP 630, (6) RANAP user adaptation (RUA) layer 635, and (7) interworking functionality (IWF) 645. The control plane protocol stack of the CN 640 includes signaling transport layers defined according to the 3GPP technical specification TS 25.412, "UTRAN Iu Interface Signaling Transport", herein incorporated by reference, a RANAP layer, and a Non Access Stratum (NAS) layer 665 that performs various call management, mobility management, General Packet Radio Service (GPRS) mobility management and session management, and short message services (SMS). The control plane protocol stack of the UE 650 includes a layer 1 signaling transport layer, a Media Access Control (MAC) layer, a Radio Link Control (RLC) layer, a Radio Resource Control (RRC) layer, and the NAS layer 665.

As described above, the underlying Access Layers 610 and "Transport IP" layer 620 provide the generic connectivity between the HNB 605 and the HNB-GW 615. The IPSec layer 625 provides encryption and data integrity for communications and data that are passed using the upper layers. SCTP 630 provides reliable transport for the RANAP User Adaptation (RUA) layer 635 between the HNB 605 and the HNB-GW 615.

The RANAP protocol is used for CS/PS signaling between the HNB 605 and the CN 640. RANAP, as is well known in the art, is an established protocol used for UMTS signaling between the CN and the UTRAN of a licensed wireless radio access network. Accordingly, the use of RANAP messages within the control plane of the HNB system, allows for the HNB system to support many of the UTRAN functions in the HNB system. These functions include: Radio Access Bearer (RAB) management, Radio Resource Management (RRM), Iu link management, Iu U-plane (RNL) management, mobility management, security, service and network access, and Iu coordination.

The HNB-GW 615 relays the RANAP messages between the HNB 605 and the CN 640. In some embodiments, the HNB-GW 615 terminates and re-originates some RANAP messages. For example, the HNB-GW 615 terminates and re-originates connection-less RANAP messages.

To perform the transparent transfer of RANAP messages, the HNB control plane protocol stacks of the HNB 605 and the HNB-GW 615 include the RUA layer 635. The RUA layer 635 provides a lightweight mechanism to transport RANAP messages 660 and control functions between the HNB 605 and the HNB-GW 615. Specifically, the RUA layer 635 encapsulates the RANAP messages 660 in an RUA layer header for transport between the HNB 605 and the HNB-GW

615. Therefore, through the use of the RUA 635 layer, no changes are made to the RANAP message definitions. Rather, all necessary changes are contained in the RUA header.

It should be apparent to one of ordinary skill in the art to reference the RUA layer with other terminologies such as RANAP Adaptation Layer (RAL) or RANAP Transport Adaptation (RTA), etc. However, the key function of this adaptation layer is to provide the functionality, over the Iuh interface, of transferring RANAP messages as defined in the 3GPP technical specification TS 25.413 entitled "UTRAN Iu interface Radio Access Network Application Part (RANAP) signaling" which is incorporated herein by reference, and will be referred to as TS 25.413.

Through the RUA header and the encapsulation of the RANAP message, the RUA adaptation layer of some embodiments enables: (1) transport of RANAP messages using SCTP over the Iuh interface between the HNB and HNB-GW, (2) support for associating and identifying UE specific logical connections (i.e., identifying the RANAP messages belonging to a specific UE via the concept of UE context identifiers), (3) support for routing the establishment of a signaling connection to a CN node within a CN domain (i.e., support for Iu-flex at the HNB-GW), (4) support for indicating the cause for establishing the UE specific logical connection (e.g., for emergency session establishment, etc.), (5) providing a mechanism to transparently relay the RANAP messages from the HNB to CN without the need to decode the encapsulated RANAP message, and (6) support for the indication of service domain (CS or PS) for the RANAP messaging.

The RUA layer 635 minimizes the decoding and processing of RANAP messages 660 at the HNB-GW 615. Specifically, the HNB-GW 615, in many instances, no longer must decode and process the RANAP message 660. Instead, the HNB-GW 615 processes information within the RUA header information in order to determine a destination within the core network to receive a RANAP message 660 sent from a UE operating from a HNB service region communicatively coupled by the HNB-GW 615. The RUA layer 635 also eliminates the need for the HNB-GW 615 to process and decode the NAS layer 665.

In some embodiments, the RUA layer 635 does not duplicate existing RANAP procedures. Accordingly, RUA procedures are minimized. As will be described in further detail below, the HNB control plane protocol architecture of some embodiments simplifies context-ID allocation and associated functional overhead.

The RUA 635 utilizes the same underlying transport (i.e., SCTP connection) as HNBAP. It should be apparent to one of ordinary skill in the art that it is also possible to use TCP as a reliable transport layer instead of SCTP. The SCTP PPI value used for RUA transport is coordinated between the HNB 605 and the HNB-GW 615 (e.g., the RUA PPI value should be registered with IANA).

In some embodiments, a dedicated SCTP stream (e.g., stream id 0 of the underlying SCTP transport association) is used for the transport of connectionless RANAP messages 660 between the HNB 605 and the HNB-GW 615. For the connection oriented messages, the number of SCTP streams to be established at SCTP connection setup and the mapping of UE transactions to the specific SCTP streams is an implementation choice. The use of UE Context-Id allows multiple UE transactions to be multiplexed over the same SCTP stream.

The Inter-working Functionality (IWF) 645 in the HNB-GW 615 switches the RANAP messages 660 between the Iuh interface and the corresponding domain specific (CS/PS) Iu interface. It should be noted that the IWF 645 is a logical entity in the RUA protocol stack. As mentioned above, some RANAP messages 660 are terminated and re-originated in the HNB-GW 615 (e.g., connection-less RANAP messages) and some are modified in the HNB-GW 615 to adapt to the underlying transport towards the CN 640 (e.g., when using ATM interfaces towards the CN 640). Additionally, NAS protocol messages 655 (e.g., CC/MM/SMS, etc) are carried transparently between the UE 650 and the CN 640.

In some embodiments, the relay of RANAP messages 660 between the HNB 605 and the CN by the HNB-GW 615 is achieved using a direct transfer mechanism over the Iuh interface. This direct transfer mechanism involves encapsulation of the RANAP messages 660 in a DIRECT TRANSFER message exchanged between the HNB 605 and HNB-GW 615 over the Iuh interface. In some embodiments, this message is referred to as a RUA DIRECT TRANSFER message. In some embodiments, this message is referred to as a HNBAP DIRECT TRANSFER message. In some embodiments, the direct transfer mechanism is used to relay messages from CBC (Iu-bc) (not shown) and SMLC (Iu-pc) (not shown) to HNB 605 and vice-versa via the HNB-GW 615.

The architecture of FIG. 6 also supports transfer of the RANAP "Initial UE Message" and support for Iu-flex. Iu-flex functionality is defined in 3GPP TS 23.236, "Intra-Domain Connection of Radio Access Network (RAN) nodes to multiple Core Network (CN) nodes", hereinafter, TS 23.236, with additional functionality such as messaging, etc., described in TS 25.331. Specifically, Iu-flex covers details for the Intra Domain Connection of RAN Nodes to Multiple CN Nodes for GSM and UMTS systems. The first RANAP message (i.e., the RANAP "Initial UE Message") is carried from the HNB 605 in the INITIAL DIRECT TRANSFER message over the Iuh interface as is described below with reference to FIG. 7. The INITIAL DIRECT TRANSFER message also carries information used to route the establishment of a signaling connection from HNB-GW 615 to a CN node within a CN domain (i.e. support for Iu-flex).

Many of the common or connection-less RANAP messages are terminated and processed in the HNB-GW 615. When there is a need to relay specific connectionless message (e.g. Paging), then the DIRECT TRANSFER message is used to relay the specific connection-less message.

In some embodiments, the direct transfer mechanism for relaying RANAP messages provides a single protocol over the Iuh interface (i.e., clean architecture) whereby a single interface between HNB and HNB-GW functional entity is used. The direct transfer mechanism of some embodiments eliminates changes to the RANAP specifications for use over the Iuh interface. If RANAP were to be used directly over the Iuh interface, then all the specifications which reference RANAP would need to be updated to describe the applicability of existing RANAP messages between the two new nodes (e.g., HNB and the HNB-GW). In some embodiments, the direct transfer mechanism eliminates the need for "RNC-ID" and "Iu signaling connection identifier" attributes on a per HNB basis, carried in the RANAP messages. The "RNC-ID" and "Iu-signaling connection identifier" carried in the downlink RANAP messages are processed by the HNB-GW and can be ignored by the HNB. Similarly, in the uplink RANAP messages, the usage of the RNC-ID and Iu signaling connection identifier attributes can be implementation specific with no impact on the Iuh interface. Additionally, by carrying the RANAP messages in a container, the overhead (management and runtime) of the underlying transport layers of RANAP such as SCCP/M3UA are eliminated as well.

a. INITIAL DIRECT TRANSFER Message

In some embodiments, the HNB sends a message to the HNB-GW to transfer the RANAP "Initial UE Message" from the HNB to the indicated core network domain. Specifically, the message explicitly indicates the start of a communication session and the message contains parameters used to route the establishment of a signaling connection from the HNB-GW to a CN node within a CN domain when no signaling connection exists In some embodiments, this message is an INITIAL DIRECT TRANSFER message. FIG. 7 illustrates INITIAL DIRECT TRANSFER message content, in some embodiments. The INITIAL DIRECT TRANSFER message includes the following information elements (IEs): length indicator, protocol discriminator, message identity, CN Domain Identity, Intra Domain Non Access Stratum (NAS) Node Selector (IDNNS), and an encapsulated RANAP message. The CN Domain Identity information element indicates the CN domain with which to establish the signaling connection. The IDNNS information element is used by the HNB-GW to route the establishment of a signaling connection to a core network node within the indicated core network domain. By using this explicit message, the HNB-GW is explicitly notified of impending signaling connection without having to process the contents of the message.

In FIGS. 7-9, the presence field indicates whether the information element is (1) mandatory (M) where the message is erroneous if the mandatory information element is missing, (2) conditional (C) where the presence of the information element depends on a value of a different information element, or (3) optional (O) where the presence of the information element is the choice of the sender. Additionally, the format field indicates how the message is formatted. Type only (T) or Type and value (TV) indicates that the information element is of fixed length and an information element identifier is included. Value only (V) indicates that the information element is of fixed length but no information element identifier is included. Length and value (LV) indicates that the information element is of variable length, an information element identifier is not included, and a length indicator is included. Type, length, and value (TLV) indicates that the information element is of variable length and that an information element identifier and a length indicator are included.

b. UPLINK DIRECT TRANSFER Message

In some embodiments, the HNB sends a message to the HNB-GW to transfer a subsequent (i.e., other than the initial RANAP message) RANAP message from the HNB to the indicated core network domain. In some embodiments, this message is an UPLINK DIRECT TRANSFER message. FIG. 8 illustrates an UPLINK DIRECT TRANSFER message content, in some embodiments. As shown, the UPLINK DIRECT TRANSFER message includes a length indicator, protocol discriminator, message identity, CN Domain Identity, and RANAP message information elements.

c. DOWNLINK DIRECT TRANSFER Message

In some embodiments, the HNB-GW sends a message to the HNB to transfer a RANAP message from the indicated core network domain to the HNB. In some embodiments, this message is a DOWNLINK DIRECT TRANSFER message. FIG. 9 illustrates a DOWNLINK DIRECT TRANSFER message content, in some embodiments. As shown, the DOWNLINK DIRECT TRANSFER message includes a length indicator, protocol discriminator, message identity, CN Domain Identity, and RANAP message information elements.

In some embodiments, functionalities of the DOWNLINK DIRECT TRANSFER message and the UPLINK DIRECT TRANSFER message are carried by one message. In some embodiments, this message is referred to as a DIRECT TRANSFER message.

It should be apparent to one of ordinary skill in the art that any nomenclature may be used to represent the messages implemented by some embodiments and described above with reference to FIGS. 7-9. For example, in some embodiments, the INITIAL DIRECT TRANSFER message is referred to as a CONNECT message.

d. Adaptation Layer

As noted above, the transfer mechanism(s) involves encapsulation of the RANAP messages with additional header information. This additional header provides sufficient information to the HNB and HNB-GW for distinguishing and associating specific UE messages. The additional header also provides information used to route the establishment of a signaling connection from HNB-GW to a CN node within a CN domain (i.e. support for Iu-flex).

Figure 10:
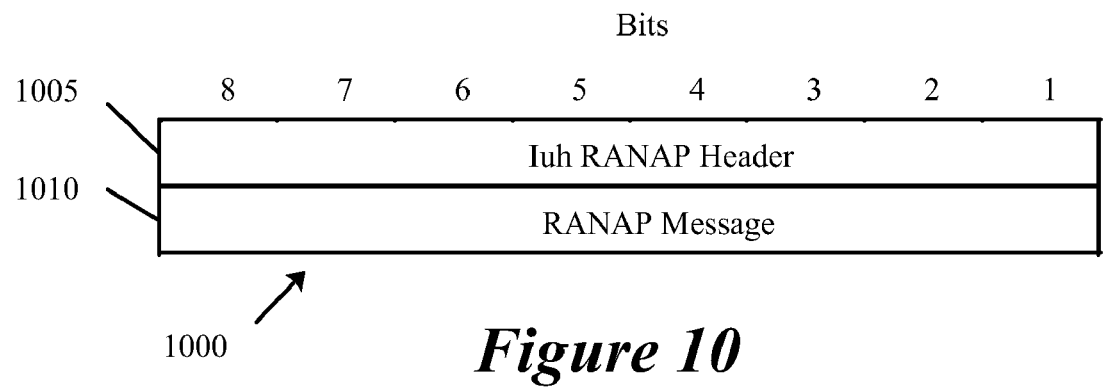
FIG. 10 illustrates an applicable Protocol Data Unit (PDU) structure for the transport of RANAP in some embodiments.

FIG. 10 illustrates an applicable Protocol Data Unit (PDU) structure for the transport of RANAP, in some embodiments. As shown, the PDU 1000 includes an Iuh RANAP Header 1005 (i.e. the adaptation layer) and the RANAP Message 1010 (the latter ASN.1 formatted per TS 25.413). The PDU formats described are not indicative of particular byte ordering (which may vary based on the underlying transport (e.g., word-aligned for SCTP based transport)), but rather indicate the information included for those particular PDUs. The details for the adaptation layer (i.e., Iuh RANAP header 1005) can have various implementations based on the mechanism utilized to negotiate the header information.

Figure 11:
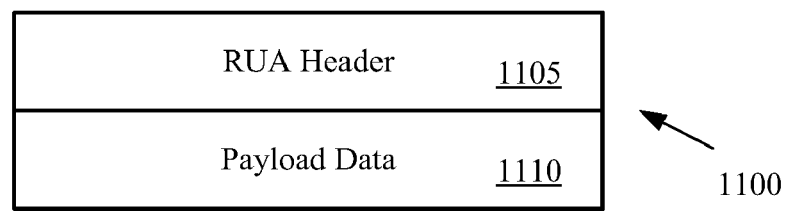
FIG. 11 illustrates an alternative PDU/RUA Adaptation Layer Structure of some embodiments.

FIG. 11 illustrates an alternative PDU/RUA Adaptation Layer Structure of some embodiments. As shown, the PDU 1100 includes the RUA Header 1105 and the Payload Data 1110 where the latter includes either the RANAP Message to be transferred or an error indication message.

The RUA header 1105 provides sufficient information for the HNB and HNB-GW to distinguish and associate messages to a specific UE. The RUA header 1105 also provides information used to route the establishment of a signaling connection from the HNB-GW to a CN node within a CN domain (i.e. support for Iu-flex). The HNB-GW performs the NAS Node Selection Function (NNSF) as described in the 3GPP technical specification TS 23.236 entitled "Intra-domain connection of Radio Access Network (RAN) nodes to multiple Core Network (CN) nodes", hereinafter incorporated by reference and referred to as TS 23.236, and utilizes the Intra Domain NAS Node Selector (IDNNS) information provided in the adaptation layer. The adaptation layer also provides a means for the HNB or HNB-GW to indicate abnormal conditions during message exchange.

Some embodiments transport RANAP messages over the Iuh interface via: (1) RANAP over SCCP; (2) RANAP over SCTP with UEs identified by use of PPI; and, (3) RANAP over SCTP with an adaptation layer. However, it should be apparent to one of ordinary skill in the art that various other mechanisms may be used by some embodiments to transport RANAP messages over the Iuh interface.

i. RUA Header Structure

Figure 12:
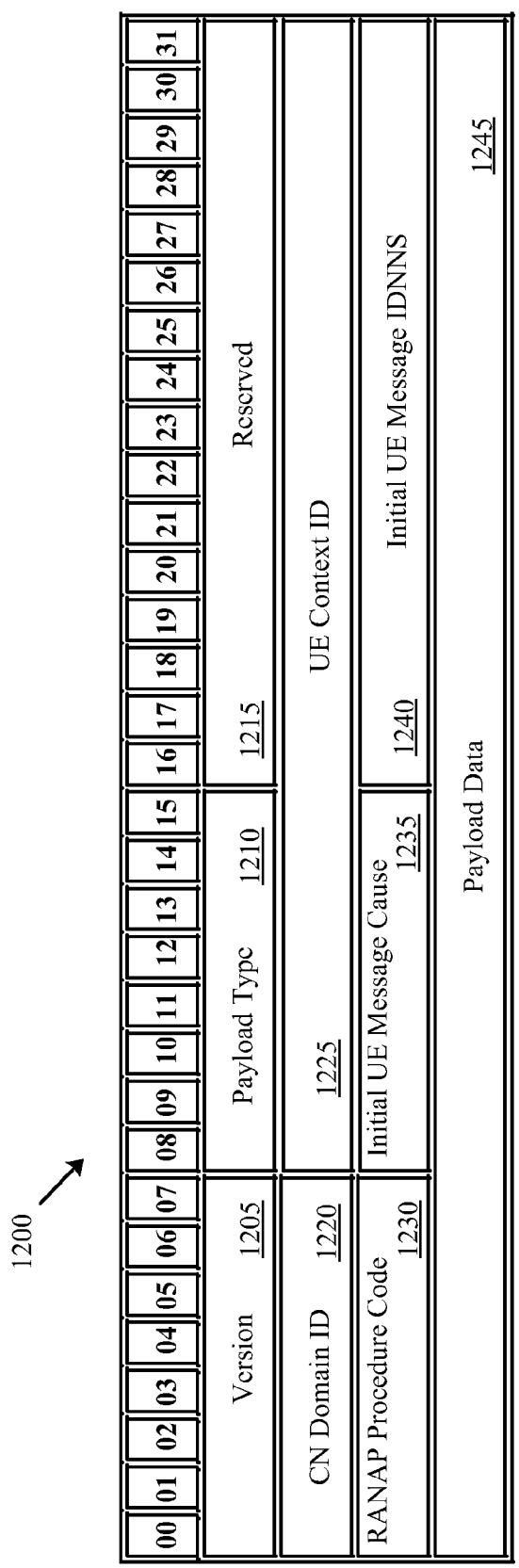
FIG. 12 illustrates the details of the RUA Header structure in some embodiments.

FIG. 12 illustrates the details of the RUA Header structure, in some embodiments. This figure includes the PDU 1200 with the following fields (1) Version 1205, (2) Payload Type 1210, (3) Reserved 1215, (4) CN Domain ID 1220, (5) UE Context ID 1225, (6) RANAP Procedure Code 1230, (7)

Initial UE Message Cause 1235, (8) Initial UE Message IDNNS 1240, and (9) Payload Data 1245.

Version 1205 is 8 bits in some embodiments and identifies the version of the RUA header. Payload Type 1210 is 8 bits in some embodiments, (with values that can range from 0-255) and identifies the type of information contained in the Payload Data 1245. The following table gives sample values and corresponding descriptions in some embodiments.

TABLE 1

Sample Payload Type Values and Corresponding Descriptions

Figure 13:
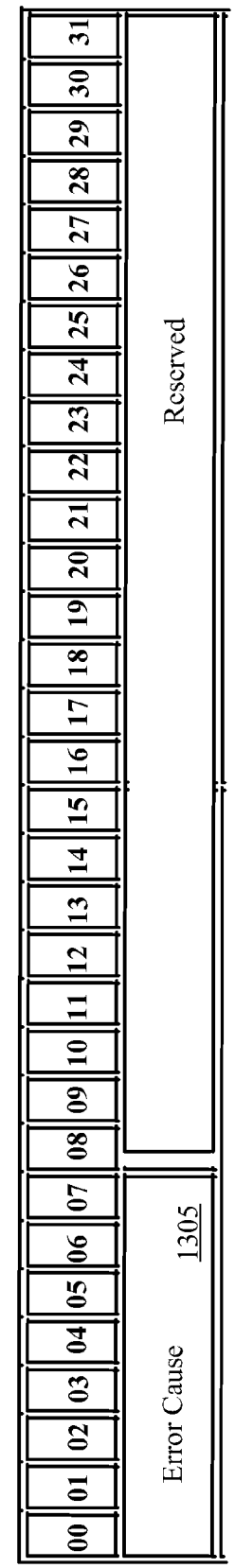
FIG. 13 illustrates a PDU Error Indication message in some embodiments.

| Payload Type | Description | References |
|---|---|---|
| 0 | RANAP, RANAP message | TS 25.413 |
| 1 | Error Indication | Shown in FIG. 13 |
| 2-255 | Reserved | |

Reserved field 1215 is 16 bits in some embodiments, and is used as a placeholder here. UE Context ID 1225 is 24 bits in some embodiments, and indicates the locally unique identifier allocated by the HNB-GW for a particular UE. CN Domain ID 1220 is 8 bits in some embodiments and indicates "CS Domain" or "PS Domain". RANAP Procedure Code 1230 is 8 bits in some embodiments, and is conditionally present if the Payload Type 1210 is set to RANAP and contains the Procedure Code value from TS 25.413. Initial UE Message IDNNS 1240 is 16 bits in some embodiments, and is conditionally present if the Payload Type 1210 is set to RANAP. Initial UE Message Cause 1235 is 8 bits in some embodiments, and is conditionally present if the Payload Type 1210 is set to RANAP. Payload Data 1245 is of a variable length in some embodiments, and indicates the actual information to be transferred in the PDU 1200. The usage and format of this field is dependent on the Payload Type 1210. If the Payload Type 1210 is RANAP, then the Payload Data 1245 contains a RANAP message which is ASN.1 formatted per TS 25.413.

FIG. 13 illustrates a PDU Error Indication message, in some embodiments. This Error Indication message 1300 may be used by either HNB or HNB-GW to indicate abnormal conditions during message exchanges. Error Cause 1305 is 8 bits in some embodiments, and identifies the cause for the error indication message. In some embodiments, the following values could be defined: 1=Unknown UE Context Identifier; 2=SCCP Connection Establishment Failed; other values could be assigned later.

Figure 14:
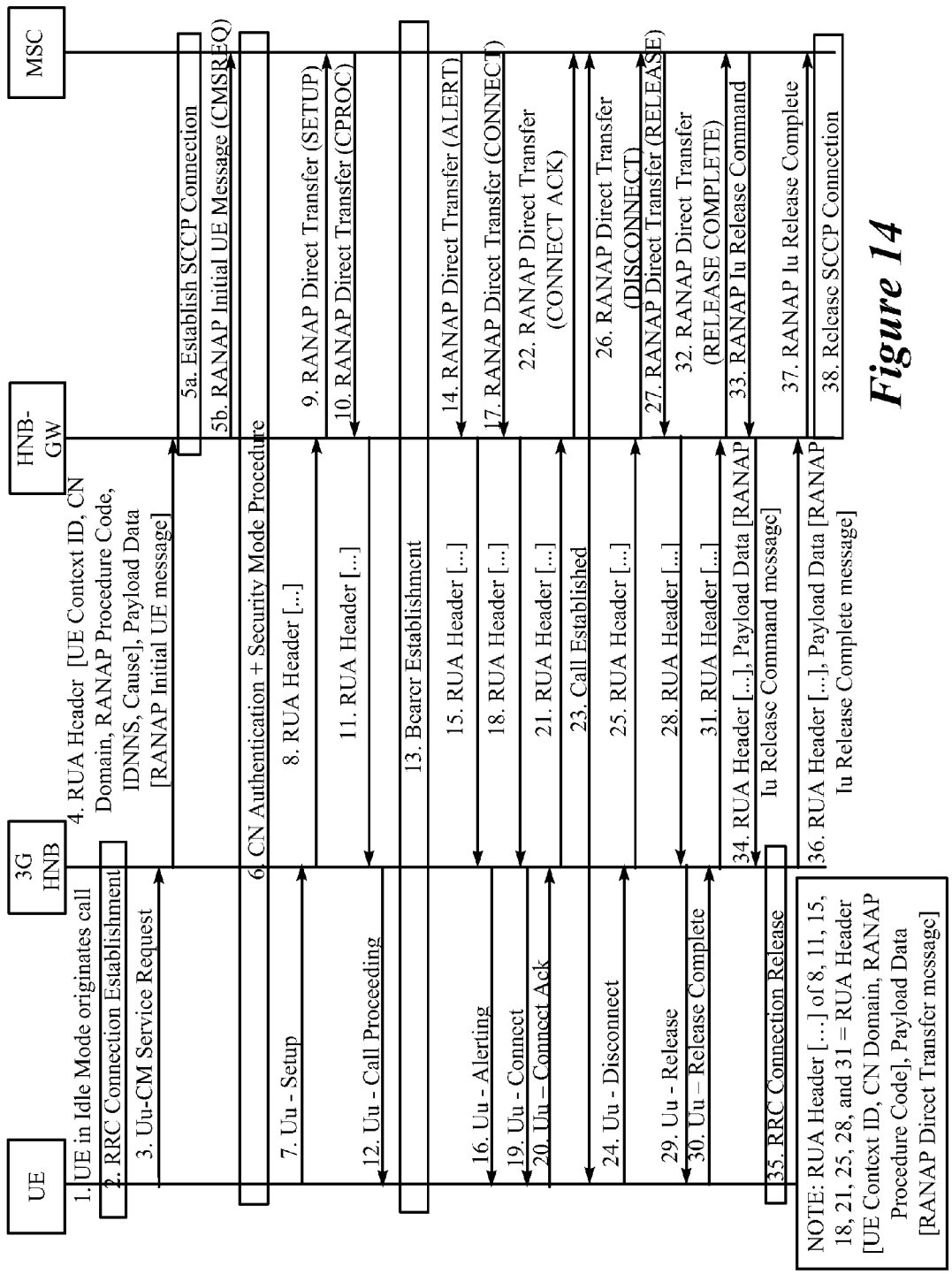
FIG. 14 illustrates a RANAP message transfer using adaptation layer in some embodiments.

FIG. 14 illustrates a RANAP message transfer using adaptation layer, in some embodiments. As shown, all message exchanges between the HNB and the HNB-GW contain the RUA header where the RUA header includes various parameters in addition to an encapsulated RANAP message that is either received from the UE or from the MSC of the CN.

Figure 15:
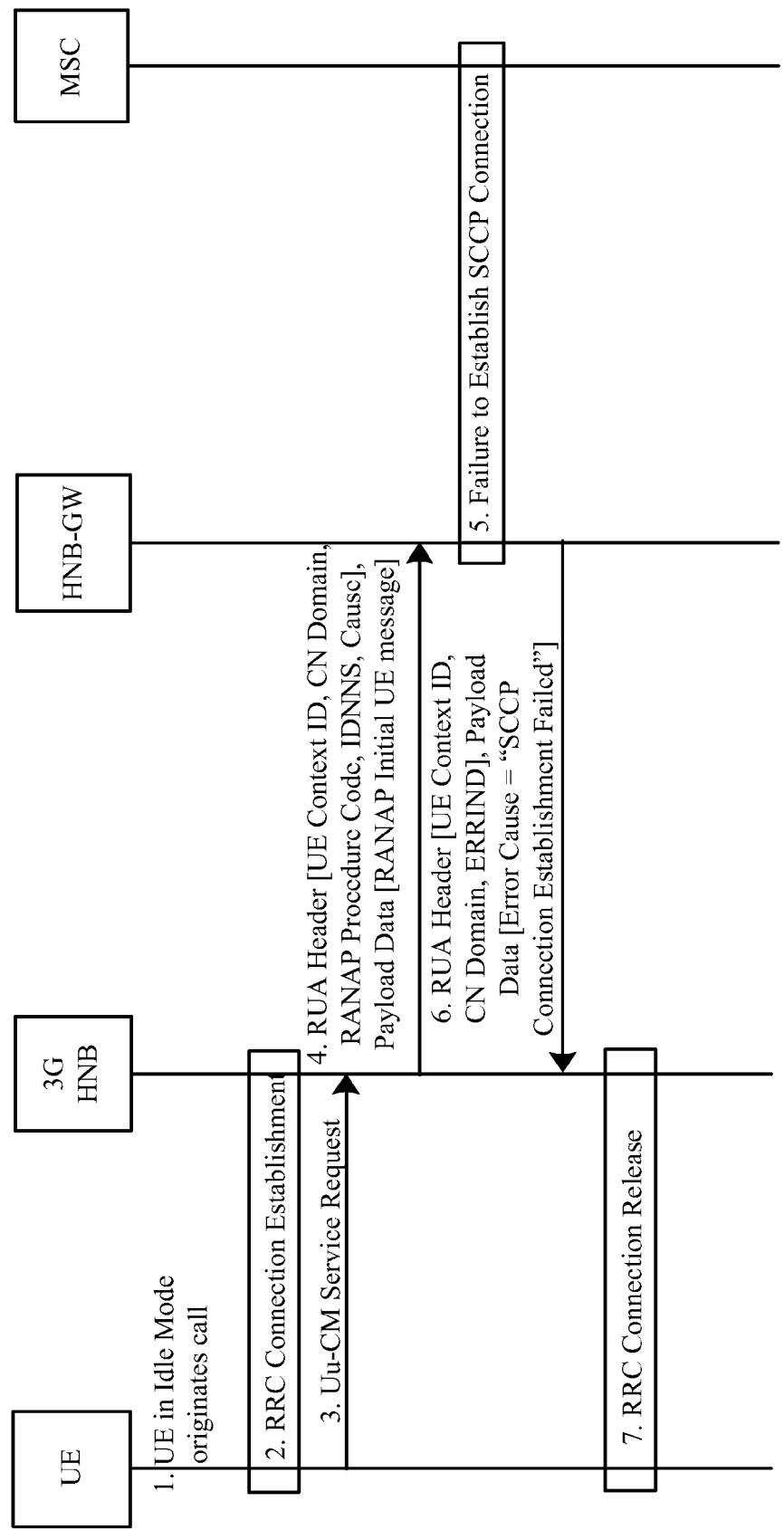
FIG. 15 illustrates handling of abnormal conditions over the Iuh interface in some embodiments.

FIG. 15 illustrates handling of abnormal conditions over the Iuh interface, in some embodiments. In this figure, the RUA header is used by the HNB-GW to notify (at step 6) the HNB of a failure to establish a SCCP connection. As a result, the RRC connection between the HNB and the UE is released (at step 7).

ii. Mechanisms for Signaling the Adaptation Layer Information

In some embodiments, UE Context Identifiers (Ids) are allocated so as to uniquely identify the UE over the Iuh interface within the HNB and HNB-GW. When the HNB receives the UE Context Id (as allocated by the HNB-GW) it stores it for the duration of the UE-associated logical Iuh connection for this UE. Once known to the HNB and HNB-GW, this information is included in all the UE associated signaling (for uplink as well as downlink direction). In some embodiments, the UE context identifiers are provided in the Iuh header (i.e. adaptation layer). However, there can be various mechanisms for indicating this information within the Iuh header.

Some embodiments utilize the HNBAP procedures for explicit setup and release of the UE context identifiers while some other embodiments utilize the RANAP procedures for setup and release of the UE context identifiers utilizing either (a) an implicit mechanism using existing RANAP procedures with additional header information, or (b) an explicit mechanism using new RANAP procedures. Some embodiments use an adaptation layer protocol (such as. RANAP-H) for transporting RANAP over the Iuh interface via explicit mechanisms for setup and release. An implicit mechanism using existing RANAP procedures with additional header information is utilized under normal conditions. For abnormal conditions (such as errors in the HNB or HNB-GW), an explicit release of UE context identifiers can be indicated via the use of HNBAP or RANAP or RANAP-H protocols.

3. Iu-cs Transport Network Control Plane Architecture

Figure 16:
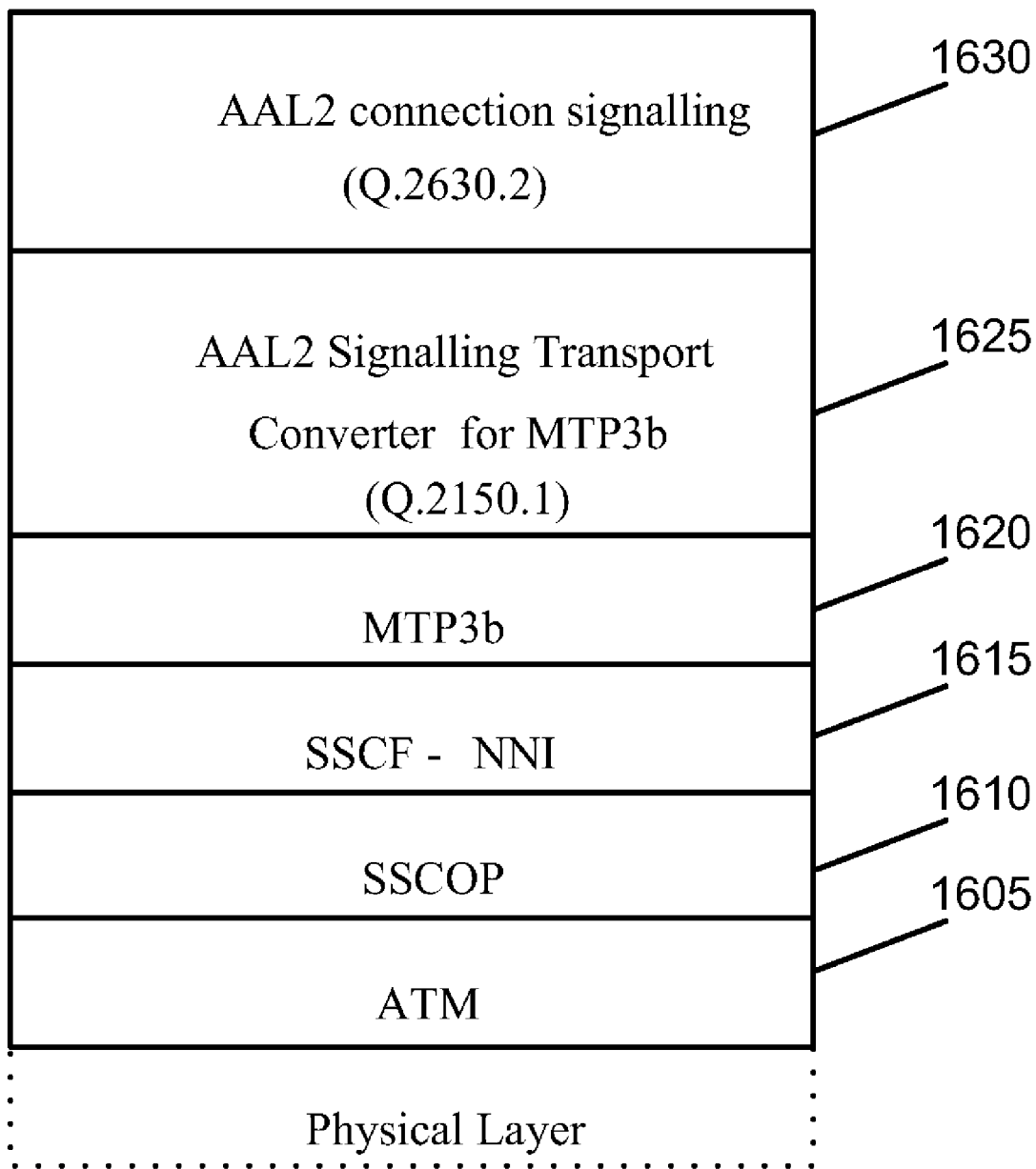
FIG. 16 illustrates the CS domain transport network control signaling (using ALCAP) over the ATM-based Iu-cs interface in some embodiments.

Some embodiments communicatively couple the HNB-GW to the CN over an ATM based Iu-cs interface. Separate transport network control signaling is used in some such embodiments. FIG. 16 illustrates the CS domain transport network control signaling (using Access Link Control Application Part (ALCAP)) over the ATM-based Iu-cs interface in accordance with some embodiments of the invention. Atop the physical layer is the ATM layer 1605. The Service Specific Connection Oriented Protocol (SSCOP) layer 1610 is responsible for providing mechanisms for the establishment, release and monitoring of signaling information exchanged between peer signaling entities. The service-specific coordination function Network to Node Interface (SSCF-NNI) layer 1615 receives the SS7 signaling of a Layer 3 and maps it to the SSCOP, and vice versa. The SSCF-NNI performs coordination between the higher and the lower layers. Within UTRAN, Message Transfer Part Level 3 for Broadband (MTP3b) layer 1620 has the higher Layer 3, which requires service from the SSCOP-NNI. The control signaling further includes ATM Adaption Layer 2 (AAL2) signaling transport 1625 conversion functionality and connection signaling layers 1630. These protocol layers formulate ALCAP signaling protocol messages that are exchanged between the HNB-GW and MSC. Additional details on transport network control signaling may be found in 3GPP technical specification TS 25.414, "UTRAN Iu Interface Data Transport and Transport Signaling", section 5.2.2, which is incorporated herein by reference.

4. HNB Circuit Switched (CS) Domain—User Plane Architecture

Figure 17:
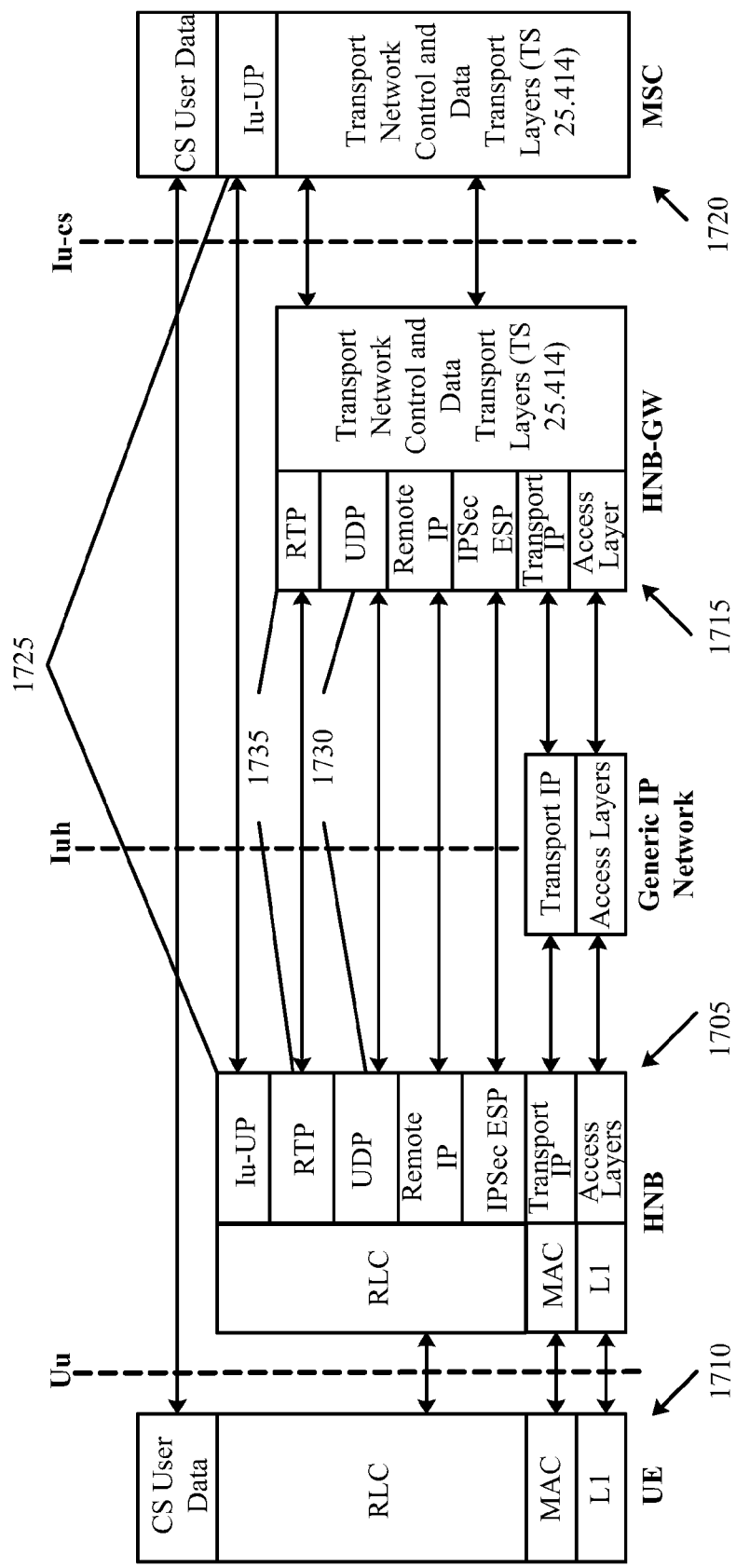
FIG. 17 illustrates the protocol architecture in support of the CS domain user plane over the Iuh interface in some embodiments.

FIG. 17 illustrates the protocol architecture in support of the CS domain user plane over the Iuh interface in accordance with some embodiments of the invention. This figure includes (1) HNB 1705, (2) UE 1710, (3) HNB-GW 1715, (4) MSC 1720, and (5) CS user plane protocol stacks for each of the devices.

The user plane of the HNB 1705 and HNB-GW 1715 includes the access, transport IP, IPSec, and remote IP layers described above with reference to FIG. 5. The protocol stacks include the User Datagram Protocol (UDP) layer 1730 to perform connectionless transfer of Real-Time Protocol (RTP) layer 1735 messages. The HNB 1705 also includes an Iu-UP protocol layer 1725 that operates directly with the MSC 1720 of the CN.

The Iu-UP 1725 protocol transports CS user data across the Iuh and Iu-cs interfaces. The HNB-GW 1715 provides either a transport layer conversion between IP (towards the HNB 1705) and ATM (towards the MSC 1720) or transport layer routing when IP transport is used on Iuh as well as the Iu-cs interfaces. In this manner, CS user data is carried transparently between the UE 1710 and the MSC 1720. In some embodiments, for example when IP transport is used on Iu-cs interface, the RTP 1735 and the UDP layers 1730 operate directly between the HNB and the MSC (not shown).

5. HNB Packet Switched (PS) Domain—User Plane Architecture

Figure 18:
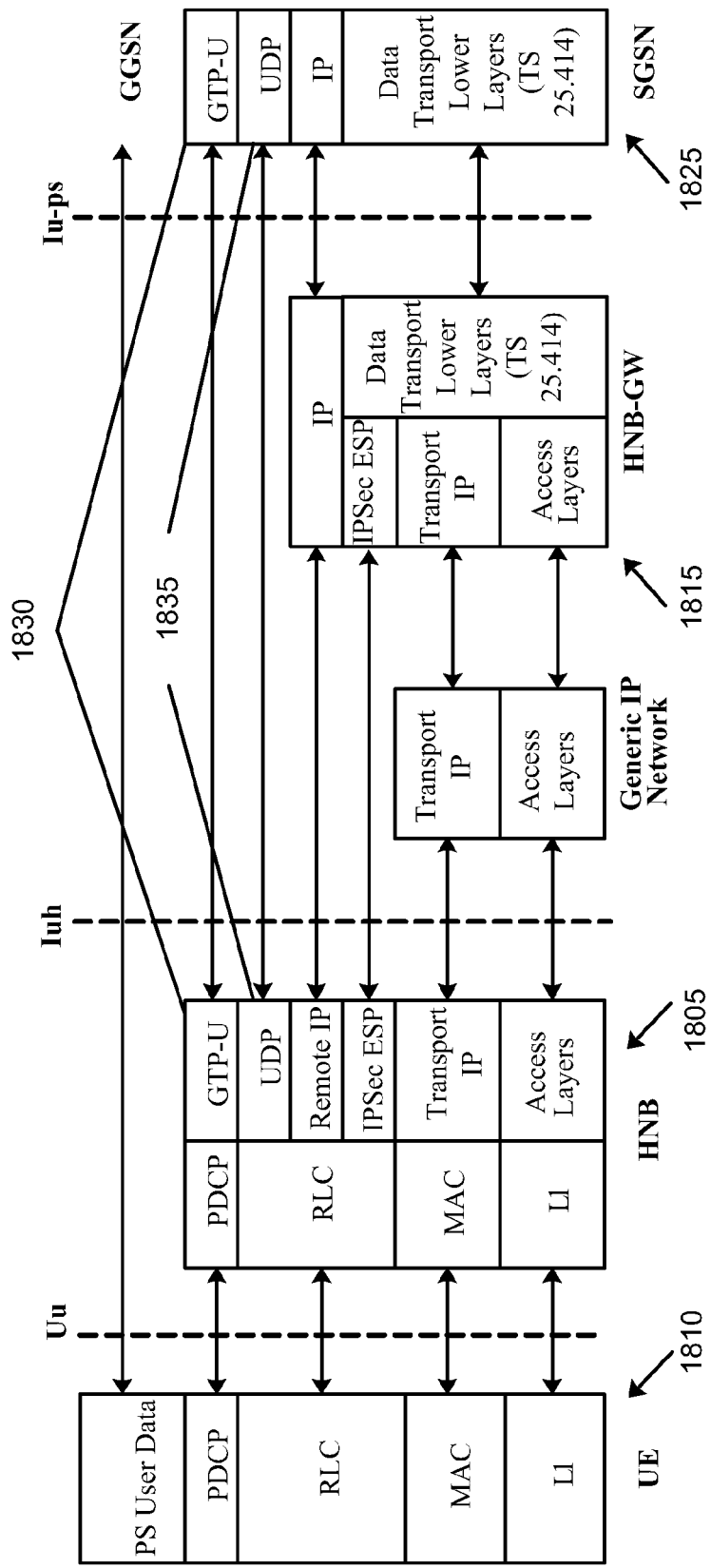
FIG. 18 illustrates the PS Domain User Plane Protocol Architecture in some embodiments.

FIG. 18 illustrates the PS Domain User Plane Protocol Architecture in accordance with some embodiments. This figure includes (1) HNB 1805, (2) UE 1810, (3) HNB-GW 1815, (4) SGSN 1825, and (5) PS user plane protocol stacks for each of the devices.

The user plane of the HNB 1805 and HNB-GW 1815 includes the access transport IP, IPSec, and remote IP layers described above with reference to FIG. 5. The protocol stack of the HNB 1805 also includes the User Datagram Protocol (UDP) layer 1835 to perform connectionless transfer of GPRS Tunneling Protocol (GTP) User (GTP-U) data messages.

The GTP-U protocol 1830 operates between the HNB 1805 and the SGSN 1825, transporting the PS user data across the Iuh and Iu-ps interfaces. The HNB-GW 1815 provides either a transport layer conversion between IP (towards the HNB 1805) and ATM (towards the CN) or transport layer routing when IP transport is used on Iuh as well as the Iu-ps interfaces. PS user data is carried transparently between the UE 1810 and CN (SGSN 1825/GGSN). In an alternate embodiment (not shown in the FIG. 18), the GTP-U protocol from the HNB and the SGSN terminates in the HNB-GW and the HNB-GW provides interworking of GTP-U protocol between the Iuh and Iu-cs interface.

B. System Selection and Initialization

1. System Selection

A key feature of the HNB system is the seamless integration of the HNB functionality to existing core networks used by licensed wireless networks and also the co-existence of the HNB system with the legacy core network (e.g., UMTS and GSM) within the same or different Public Land Mobile Network (PLMN).

As noted above, the HNB-GW seamlessly integrates with the core network by emulating RNC like functions and interfaces. Similarly, the HNB seamlessly integrates with the UEs that operate across the various licensed wireless networks by emulating the Node-B like functions. Standard UMTS UEs will thus be able to utilize both access options (Node-Bs of the licensed wireless network or HNBs of the HNB system) whichever is more optimal in the specific scenario. No change is required to the PLMN selection procedures in the NAS layers (MM and above) in the UE or to the standard cell selection mechanism of the UE. Accordingly, the HNB system supports UE rove-in for a UE that roves into a HNB service region from a licensed wireless network service region and UE rove-out for a UE that roves out of a HNB service region into a licensed wireless network service region.

To provide such rove-in and rove-out functionality, the HNB Management System of some embodiments provides the HNB with radio parameters during the service activation or provisioning update. These radio parameters include the operating UARFCN (UMTS Absolute Radio Frequency Channel Number) and a list of primary scrambling codes for the HNB. In some embodiments, the provisioning parameters also include the list of UARFCNs/scrambling codes (SCs) associated with the neighboring macro cells of the licensed wireless network.

The HNB then performs a neighborhood scan for the existence of macro coverage using the macro UARFCN information. If multiple macro network cells are detected in the HNB scan, the HNB selects the best suitable macro cell for the purpose of reporting it to the Serving HNB-GW during HNB registration. The HNB also stores the macro cell list to be provided as a neighbor list for the camping UEs. The HNB scans the neighborhood for the existence of other HNBs within the same PLMN. The HNB then selects an unused {UARFCN, SC} pair from the provisioned list of available pairs such that the selected {UARFCN, SC} does not conflict with any neighboring HNB's {UARFCN, SC} combination.

In some embodiments, the HNB attempts to register with the Serving HNB-GW and includes information about the selected macro cell and other neighboring HNBs. The Serving HNB-GW uses information provided during registration to assign network operating parameters for the registering HNB such as the LAI, 3 G cell-id, service area, etc.

In some embodiments, the Serving HNB-GW returns the network operating parameters to the registering HNB using the register accept message. In an alternate embodiment, some of the operating parameters are provided by the HNB management system using the TR-069 mechanisms. The HNB uses a combination of information obtained through the initial provisioning and registration and broadcasts appropriate system information to UEs to be able to select HNB service and camp on the HNB.

The macro network RNCs are provisioned with the list of {UARFCN, SC} associated with HNB neighbors. Since the HNB network has to be able to scale to millions of HNBs and the deployment location cannot be controlled, the macro network RNCs are provisioned with a list of 5-10 {UARFCN, SC} combinations corresponding to the neighboring HNBs. As a result of the limitations associated with the neighbor list provisioning on the macro RNC, the HNB of some embodiments selects one of the 5-10 provisioned {UARFC, SC} pairs for its operation such that no two neighboring HNBs (determined via HNBs' scan) re-use the same pair for its operation. The macro RNC provides the HNB neighbor list information to the UEs camped on the macro network and using the specific RNC. This results in the UEs making periodic measurements on the HNB neighbor list.

As the UE comes within the coverage area of the HNB and its signal level becomes stronger, the UE selects the HNB. In some embodiments, the UE cell-reselection (i.e., rove-in to HNB cell) can be enhanced via three possible mechanisms: (a) the HNB cell can be in a different HPLMN (equivalent PLMN list) and be selected via preferred equivalent PLMN selection. This assumes that the UE's current camped macro cell is not in the equivalent PLMN list, (b) the HNB will broadcast system information (such as Qqualmin and Qrxlevmin) so that UE prefers the HNB cell in the presence of other macro cell coverage, and (c) forced cell reselection using Hierarchical Cell Selection (HCS). Upon cell reselection and camping on the HNB cell, the UE initiates a location update since the HNB LAI is different than the LAI of the previously camped macro cell.

2. System Initialization Overview

Figure 19:
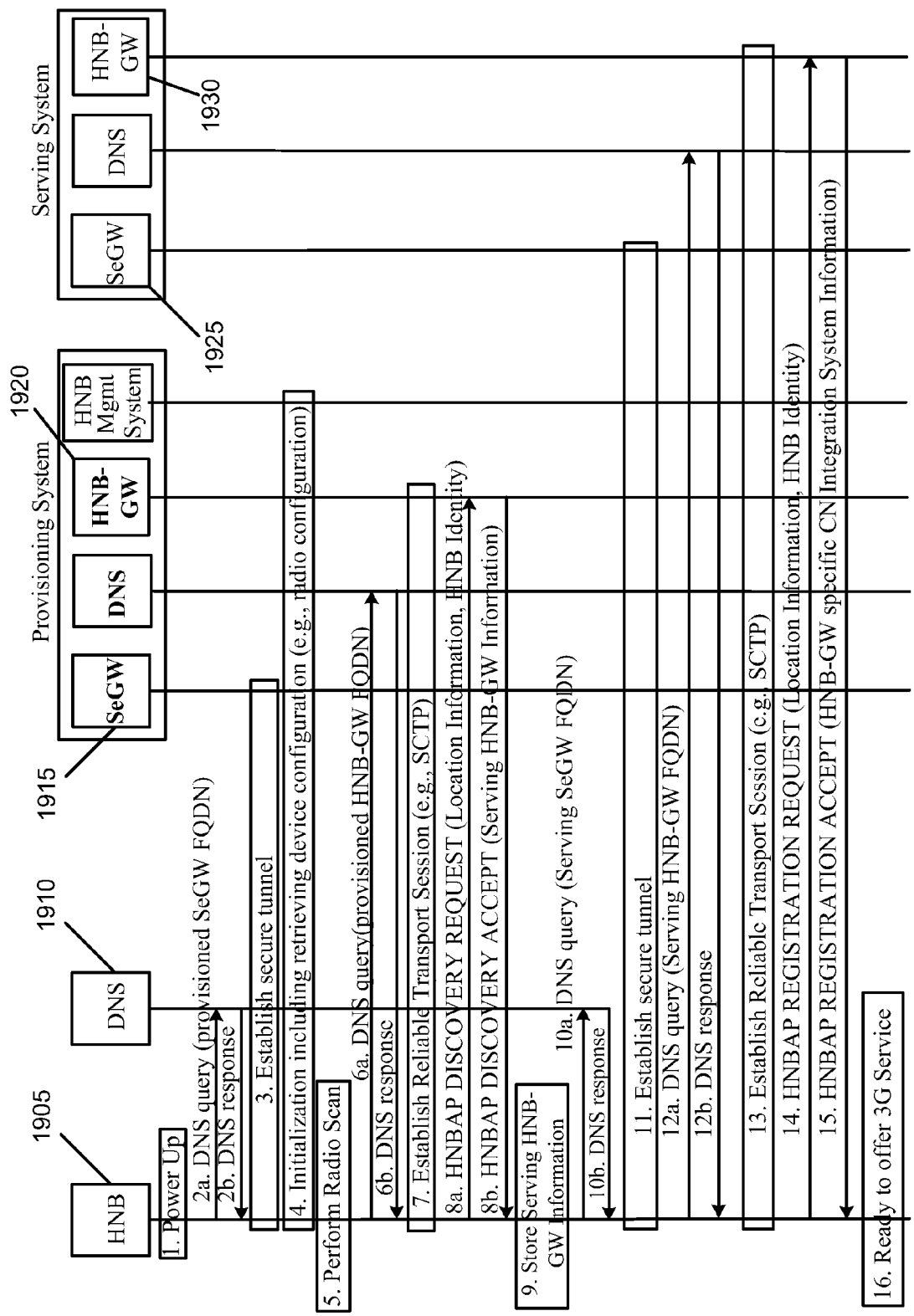
FIG. 19 illustrates an overview of HNB initialization, discovery and registration in some embodiments.

FIG. 19 illustrates an overview of HNB initialization, discovery, and registration in accordance with some embodiments of the invention. The details for the specific procedures such as discovery and registration are described in subsequent sections.

This message exchange for system initialization occurs when a HNB 1905 is initially powered on (at step 1). The HNB 1905 then attempts to identify a serving HNB-GW with which to connect. To do so, the HNB 1905 first attempts to connect to a provisioning Security Gateway (SeGW) 1915. In some embodiments, the provisioning SeGW is a default gateway. The HNB 1905 submits (at step 2a) a Domain Name System (DNS) query containing a Fully Qualified Domain Name (FQDN) of the provisioning SeGW 1915. The DNS 1910 responds (at step 2b) with the identification information for the provisioning SeGW 1915. In some embodiments, the DNS 1910 responds with the IP address of the provisioning SeGW 1915.

The HNB 1905 connects to the provisioning SeGW 1915 by first establishing (at step 3) a secure tunnel with the provisioning SeGW 1915. The HNB 1905 then performs (at step 4) an initialization procedure that includes retrieving device configuration (e.g., radio configuration). The HNB 1905 also performs (at step 5) a radio scan of neighboring HNBs and macro cell coverage areas.

The HNB 1905 performs (at step 6a) a second DNS query containing a FQDN of the provisioning HNB-GW 1920. The DNS response (at step 6b) identifies the IP address of the provisioning HNB-GW 1920. The HNB 1905 then establishes (at step 7) a reliable transport session, such as a SCTP session, with the provisioning HNB-GW 1920. Once established, the HNB 1905 performs (at step 8) a discovery procedure to identify the HNB serving system that is associated with the HNB 1905. Specifically, the HNB 1905 sends (at step 8a) a discovery request message to the provisioning HNB-GW 1920. The discovery request message includes location information of the HNB 1905 and an identity of the HNB 1905. From the supplied location information and identification information, the provisioning HNB-GW 1920 identifies the serving system for the HNB 1905. The HNB 1905 then receives (at step 8b) from the provisioning HNB-GW 1920 a discovery access message containing the serving HNB-GW information. The HNB 1905 stores (at step 9) the received serving HNB-GW information. In some embodiments, the function of discovery is done using the HNB management system.

In some embodiments, the received serving HNB-GW information includes a FQDN of the serving SeGW 1925. Accordingly, the HNB 1905 performs (at step 10) a DNS query with the serving SeGW FQDN information. The HNB 1905 then receives (at step 11) an IP address of the serving SeGW 1925 in the DNS response.

The HNB 1905 establishes a secure tunnel (at step 11) with the serving SeGW 1925 and submits (at step 12) a DNS query with the FQDN of the serving HNB-GW 1930. In the DNS response, the HNB 1905 receives the IP address of the serving HNB-GW 1930. At this stage, the HNB 1905 has identified the HNB-GW that is to communicatively couple the serving region of the HNB 1905 to the core network. Some embodiments perform the discovery procedure to locate the HNB-GW that is closest to the location of the HNB 1905 whereby there is less latency in the message exchanges between the HNB 1905 and the HNB-GW. Some embodiments perform the discovery procedure in order to perform load balancing on the HNB-GWs of the HNB system such that no single HNB-GW is overwhelmed by requests from the several HNBs that are communicatively coupled to that particular HNB-GW.

The HNB 1905 establishes (at step 13) a reliable transport session with the serving HNB-GW 1930. The HNB 1905 performs (at step 14) a registration procedure in order to gain access to the services of the HNB system through the serving HNB-GW 1930. When registration is successfully accomplished, the HNB 1905 is ready to offer service to any UEs that operate within the service region of the HNB 1905.

C. Resource Management

1. States of the HNBAP Sub-Layer

Figure 20:
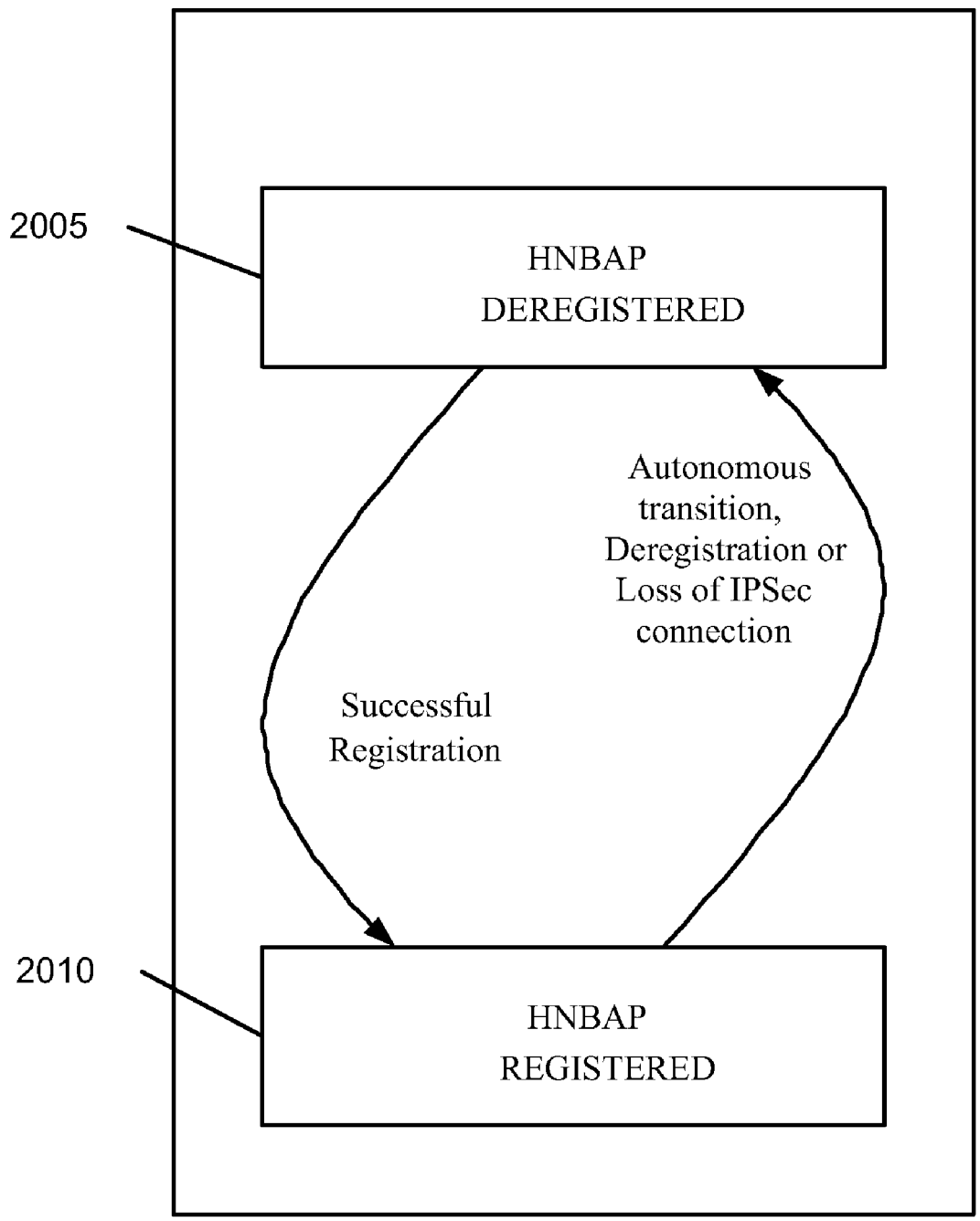
FIG. 20 illustrates the possible states for the HNBAP sublayer in the HNB in some embodiments.

FIG. 20 illustrates the possible states for the HNBAP sub-layer in the HNB of some embodiments. The HNBAP sub-layer in the HNB can be in one of two states. In some embodiments, the HNBAP-DEREGISTERED 2005 state identifies a device that has deregistered, lost its IPSec connection, or has roved out of the service region of the HNB. The HNBAP-REGISTERED 2010 state identifies a device that has successfully registered with the HNB system. The HNB contains a HNBAP sub-layer for each device it registers. Based on the type of device, the functionality of the HNBAP sub-layer can vary.

a. HNBAP Sub-Layer for Device Type HNB

For the HNB device type, the HNBAP sub-layer is in the HNBAP-DEREGISTERED state upon power-up of the HNB. In this state, the HNB has not registered successfully with the HNB-GW. The HNB may initiate the Registration procedure when in the HNBAP-DEREGISTERED state. In some embodiments, the HNB returns to HNBAP-DEREGISTERED state on loss of SCTP or IPSec connection or on execution of the De-registration procedure. Upon transition to HNBAP-DEREGISTERED state, the HNB must trigger an implicit deregistration for all the UEs currently camped on the HNB and cease transmitting.

In the HNBAP-REGISTERED state, the HNB is registered with the Serving HNB-GW. The HNB has an IPSec tunnel and an SCTP connection established to the Serving HNB-GW through which the HNB may exchange HNBAP signaling messages with the HNB-GW. While the HNB remains in the HNBAP-REGISTERED state, it performs application level keep-alive with the HNB-GW.

b. HNBAP Sub-Layer for Device Type UE

For the UE device type, the HNBAP sub-layer in the HNB (for each UE) is in the HNBAP-DEREGISTERED state upon UE rove-in. In this state, the UE has not been registered successfully (by the HNB) with the HNB-GW. The HNB initiates the Registration procedure when UE specific HNBAP sub-layer is in the HNBAP-DEREGISTERED state. The HNBAP sub-layer returns to the HNBAP-DEREGISTERED state on loss of SCTP or IPSec connection or on execution of the de-registration procedure. Upon loss of SCTP connection, HNB may attempt to re-establish the corresponding SCTP session and perform the synchronization procedure. A failure to successfully re-establish the SCTP session will result in the HNBAP layer transitioning to HNBAP-DEREGISTERED state. The HNBAP sub-layer for the UE can also transition to the HNBAP-DEREGISTERED state if the corresponding HNBAP sub-layer for the HNB device is in HNBAP-DEREGSITERED state.

In the HNBAP-REGISTERED state, the UE has been registered successfully (by the HNB) with the Serving HNB-GW. The HNB has a shared IPSec tunnel and an SCTP connection established to the Serving HNB-GW through which the HNB exchanges HNBAP and/or RANAP signaling messages (for each registered UE) with the HNB-GW.

In the HNBAP-REGISTERED state, the UE is camped on the HNB and may be idle, or the UE may be active in the HNB (e.g., a UTRAN RRC connection may be established).

2. RUA (RANAP User Adaption) Layer

The RANAP protocol as described above with reference to FIG. 6 is used by the HNB for CS and PS services resource management. In some embodiments, an adaptation layer is used to allow RANAP messages to be transported over the Iuh interface using SCTP. In some embodiments, the transport of RANAP using the adaptation layer utilizes a UE context identifier, UE-associated signaling, UE-associated logical Iuh connection, and/or RANAP procedure code.

In some embodiments, the HNB-GW allocates the UE context identifier to each particular UE during registration of the particular UE (using HNBAP). The UE context identifier uniquely identifies the UE over the Iuh interface within the HNB-GW for a particular domain. This implies that for a particular UE, the same context identifier can be used across two different service domains (i.e. CS and PS). When the HNB receives the UE context identifier from the HNB-GW, the HNB stores it for the duration of the UE registration. Once known to the HNB, this information is included in all the UE associated signaling (for uplink as well as downlink directions). Additionally, the UE context identifier is also utilized by the HNB and HNB-GW as the "Iu Signaling Connection Identifier" attributes value for use in the RANAP messages.

Figure 21:
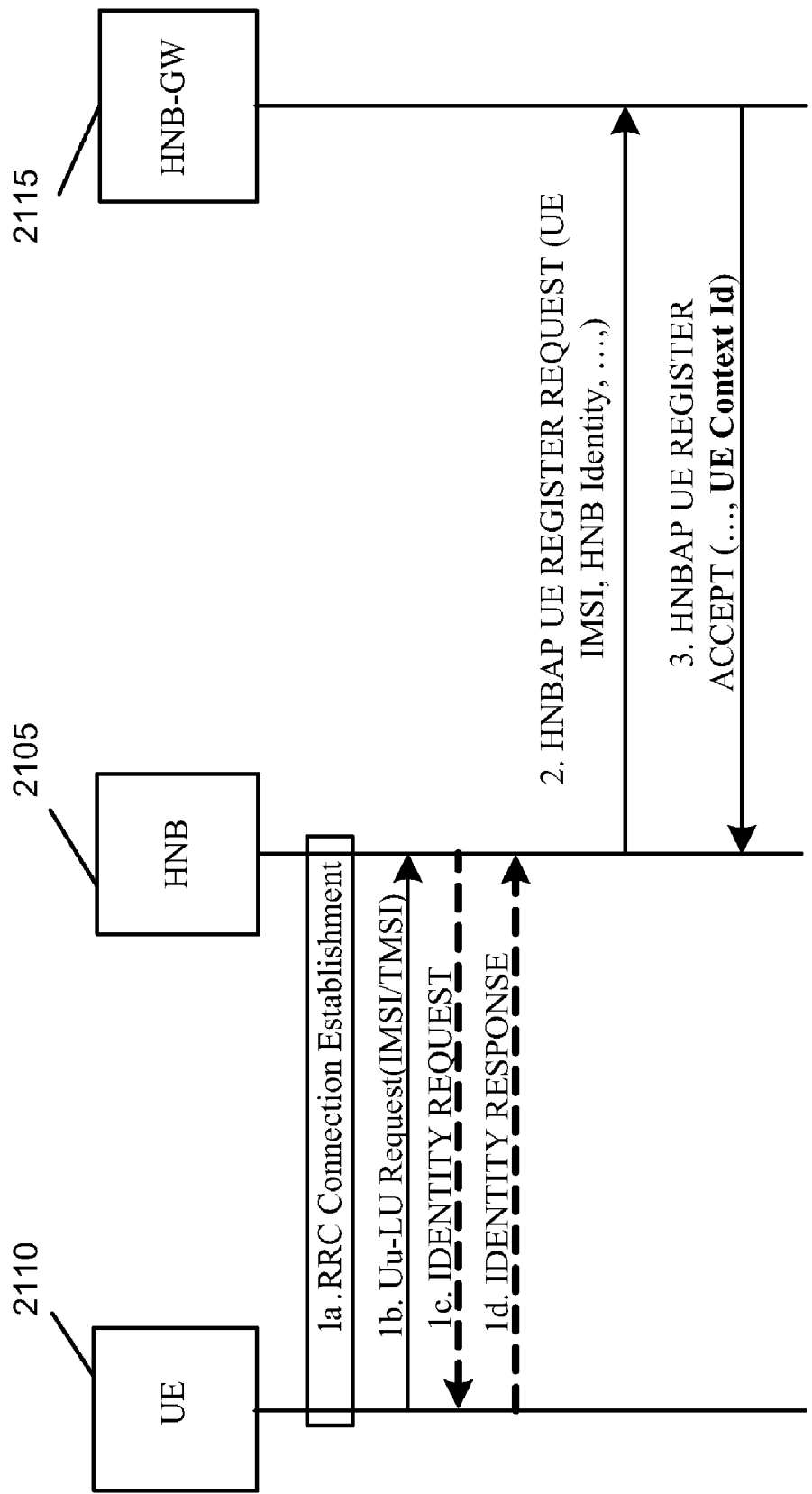
FIG. 21 illustrates the setup of UE context identifiers via UE registration in some embodiments.

In addition to performing functions such as network-based access control and paging filtering, the UE registration is also utilized to exchange the context identifier for a given UE as shown in FIG. 21. Specifically, FIG. 21 illustrates a message exchange of some embodiments for setting up UE context identifiers via UE registration.

In some embodiments, the HNB-GW 2115 allocates a unique UE context identifier to each UE during the UE registration procedure. In some embodiments, the UE registration procedure illustrated in FIG. 21 is triggered by the HNB 2105 upon detecting camping of a given UE 2110 on that particular HNB 2105. In some embodiments, the UE registration procedure is triggered upon an initial NAS transaction (e.g., LAU or paging response). In the Example of FIG. 21, this occurs when the UE 2110 establishes (at step 1*a*) a RRC connection with the HNB 2105 and sends (at step 1*b*) for example, a location update request NAS message that includes the UE identity. In some embodiments, the UE identity is an International Mobile Subscriber Identity (IMSI) of the UE 2110. In some other embodiments, the UE identity is a Temporary Mobile Subscriber Identity (TMSI) that was assigned for temporarily identifying the UE 2110. In still some other embodiments, the UE identity is a Packet-Temporary Mobile Subscriber Identity (P-TMSI or PTMSI). It should be apparent to one of ordinary skill in the art that these terms (e.g., IMSI, TMSI, and P-TMSI) may be used interchangeably throughout this document to refer to an identity of a particular UE. Therefore, in many instances the term IMSI is used. However, the terms TMSI or P-TMSI may similarly be used in such instances.

In some embodiments, the HNB 2105 requests (at step 1*c*) additional identification information from the UE 2110 that is provided by the UE 2110 at step 1*d*. The HNB 2105 then initiates the UE registration procedure by sending (at step 2) a register request message to the HNB-GW 2115 with the UE IMSI. In some embodiments, the register request message also includes the HNB identity. When UE registration is successful, the HNB-GW 2115 responds (at step 3) with a register accept message that includes the uniquely assigned UE context identifier. The context identifier provides a unique handle allocated and authorized by the HNB-GW 2115 to identify transactions of the UE 2105. The context identifier is then used for all UE-specific transactions (such as relay of UE associated RANAP messages). The lifetime of the UE context identifiers is the entire duration of the UE registration and the UE context identifier is released only at the time of the corresponding UE deregistration. The UE Context Id value is also used as the "Iu Signaling Connection Identifier" attribute value for use in the RANAP messages (for example, in the "Initial UE Message" RANAP message). In some embodiments, the context associated with a UE includes states and other information that the HNB-GW keeps for each UE which is successfully registered.

In some embodiments, UE-associated signaling occurs when RANAP messages associated with a given UE are identified via a UE-associated logical Iuh connection between HNB and HNB-GW. In some embodiments, the UE-associated logical Iuh connection uses the UE context identifier. For a received UE associated RANAP message, both the HNB-GW and HNB identify the associated UE based on the UE context identifier.

In some embodiments, the RANAP procedure code is used within the adaptation layer. The RANAP procedure code in the adaptation layer provides a mechanism for the HNB-GW to relay the RANAP messages transparently towards the CN without needing to decode the encapsulated RANAP message. In an alternate embodiment, RANAP procedure code may be used directly from the encapsulated RANAP message, without needing to decode the entire RANAP message since the procedure code is at a fixed location of every encapsulated RANAP message.

D. Alternative Embodiments Using RANAP Procedures for Setup and Release of the UE Context Identifiers In some embodiments, the PDU structure for carrying the RANAP messages is the same as the description above for adaptation layers (i.e., the message is comprised of Iuh RANAP Header and RANAP messages). FIG. 22 illustrates the fields of an Iuh RANAP Header, in some embodiments. As shown, the Iuh RANAP Header includes the following fields: (1) length 2205, (2) Iuh RANAP Header Version 2210, (3) RANAP Procedure Code 2215 containing the Procedure Code value from TS 25.413, (4) HNB Context Id 2220, (5) HNB-GW Context Id 2225, (6) CN Domain ID 2230, (7) Initial UE Message Cause 2235, and (8) Initial UE Message IDNNS 2240, including if RANAP Procedure Code 2215 indicates Initial UE Message. In some embodiments, the length field 2205 indicates the length of the Iuh RANAP Header and the length of the RANAP Message, but excludes the length field. In some embodiments, the CN Domain ID 2230 indicates 'CS Domain', 'PS Domain', 'Both CS Domain and PS Domain' or 'Not Domain Specific'. In some embodiments, the Initial UE Message Cause 2235 is included when the RANAP Procedure Code indicates Initial UE Message and/or if Initial UE Message is for 'Emergency Call' purposes (or other cause values).

This mechanism relies on existing RANAP procedures for exchanging the UE context identifiers between the HNB and HNB-GW. The HNB indicates the locally allocated UE context Id (via the Iuh header) to the HNB-GW in the first RANAP message for a given UE (i.e., RANAP Initial UE Message). The HNB-GW indicates the locally allocated UE context Id to the HNB in the first downlink RANAP message for that particular UE from the HNB-GW to the HNB. Subsequent RANAP messages (in the uplink and downlink direction) carry both the UE context identifiers of the HNB and HNB-GW.

In some embodiments, the release of these UE context identifiers (and associated resources) is triggered by the final RANAP message for a particular UE. For example, the Iu Release Complete message from the HNB is an indication for the HNB and the HNB-GW to release the associated UE context identifiers.

1. Explicit Mechanism Using New RANAP Procedures

This mechanism is similar to the mechanism as described in subsection "Mechanisms for Signaling the Adaptation Layer Information". However, some embodiments utilize new RANAP procedures instead of HNBAP for the setup and release of UE context identifiers.

E. Use of an Adaptation Layer Protocol (such as RANAP-H)

Figures 23, 24:
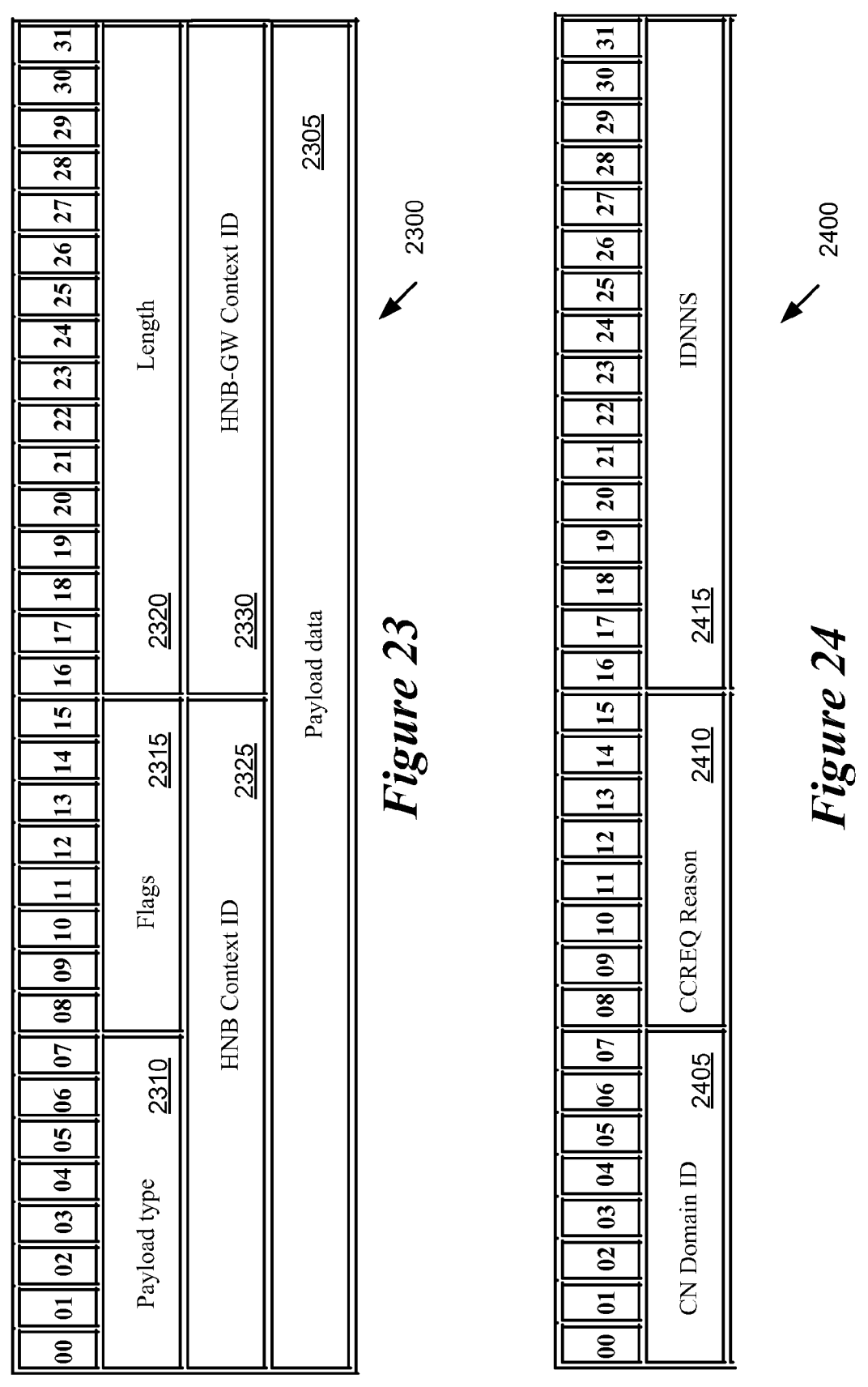

In some embodiments, a new protocol (RANAP-H) is defined for the transport of RANAP over the Iuh interface. The RANAP-H protocol is used to transport the RANAP message along with UE context identifiers. A RANAP-H PDU may have a variable length in some embodiments. FIG. 23 illustrates a RANAP-H PDU in some embodiments. As shown, the RANAP-H PDU 2300, includes (1) Payload Type 2310, (2) Flags 2315, (3) Length 2320, (4) HNB Context ID 2325, (5) HNB-GW Context ID 2330, and (6) Payload Data 2305.

In some embodiments, the Payload Type 2310 may be 8 bits (with values ranging from 0-255) and identifies the type of information contained in the Payload data 2305. The value of 255 is reserved for future use as an extension field, in some embodiments. The total length of a chunk must be a multiple of 4 bytes. If the length of the chunk is not a multiple of 4 bytes, the sender pads the chunk with all zero bytes and this padding is not included in the chunk length field. The sender should never pad with more than 3 bytes. The receiver ignores the padding bytes.

The following table describes some of the types of information (Payload Types 2310) that can be sent through a RANAP-H PDU 2300:

TABLE 2

Payload Types and Descriptions

| Payload type | Description | References |
| --- | --- | --- |
| 0 | RANAP, RANAP message. | TS 25.413 |
| 1 | CCREQ, Context Create Request. | FIG. 24 |
| 2 | CCACK, Context Create Acknowledgement. | |
| 3 | CRCMD, Context Release Command. | |
| 4 | CRCMP, Context Release Complete. | |
| 5 | ERROR, Operation Error. | |
| 6-255 | Reserved | |

Flags 2315 are 8 bits in some embodiments. The usage of these bits depends on the payload type as given by the Payload type 2310. Unless otherwise specified, they are set to zero on transmit and are ignored on receipt. Length 2320 is 16 bits in some embodiments, and is the size of the PDU 2300 in bytes including the Payload Type 2310, Flags 2315, Length 2320, and Payload Data 2305 fields. Therefore, if the Payload Data field 2305 is zero-length, the Length field 2320 will be set to 8. The HNB Context ID 2325 is 16 bits in some embodiments and indicates the locally unique identifier allocated by the HNB for a particular UE. The HNB-GW Context ID 2330 is 16 bits in some embodiments and indicates the locally unique identifier allocated by the HNB-GW for a particular UE. The Payload Data 2305 is a variable length in some embodiments, and is the actual information to be transferred in the PDU 2300. The usage and format of this field is dependent on the Payload type 2310.

FIG. 24 illustrates a Context Create Request (CCREQ) message, in some embodiments. As shown, the CCREQ 2400 is made up of the CN Domain ID 2405, the CCREQ Reason 2410, and the IDNNS 2415. In some embodiments, the Context Create Acknowledge (CCACK), Context Release Command (CRCMD), and Context Release Complete (CRCMP) messages do not have any payload data.

F. Use of HNBAP Procedures for Explicit Setup and Release of the UE Context Identifiers Alternative embodiments utilize the HNBAP protocol for exchanging the Iuh header information. FIG. 25 illustrates an Iuh RANAP header, in some embodiments. As shown, the Iuh RANAP Header includes the following fields: length 2505, RANAP Procedure Code 2510, HNB Context Id 2515; and HNB-GW Context Id 2520. In some embodiments, the length field 2505 indicates the length of the Iuh RANAP Header in addition to the length of the RANAP Message, but excluding the length field. The RANAP Procedure Code 2510 contains the Procedure Code value from TS 25.413.

FIG. 26 illustrates the structure of a PDU used for transferring an HNBAP message, in some embodiments. As shown, the PDU has the following fields: length 2605, Message Type 2610, and a list of information elements 2615. In some embodiments, the length 2605 indicates the length of the HNBAP Header plus the length of the HNBAP Message Body, but excludes the length field. In some embodiments, the HNBAP Message Type 2610 contains the HNBAP Message Type value.

1. Create UE Context Request

In some embodiments, the HNBAP Create UE Context Request message is used to indicate the HNB UE Context Id to the HNB-GW and also to provide information to the HNB-GW for support of the Iu-flex functionality. FIG. 27 illustrates a Create UE Context Request going from the HNB to the HNB-GW, in some embodiments. As shown, the message includes the following IEs: (1) the HNB Context ID 2705, (2) the CN Domain ID 2710, indicating 'CS Domain', 'PS Domain', 'Both CS Domain and PS Domain' or 'Not Domain Specific', (3) the Context Request Cause 2715, indicating if request is for "Emergency Call" purposes (or other cause values), and (4) the IDNNS 2720.

2. Create UE Context Accept

The HNBAP Create UE Context Accept message is used by the HNB-GW to indicate successful allocation of the corresponding UE context Id by the HNB-GW. FIG. 28 illustrates a Create UE Context Accept message going from the HNB-GW to the HNB, in some embodiments. As shown, the message includes the following IEs: the HNB UE Context ID 2805; and the HNB-GW Context ID 2810. Accordingly, the Create UE Context Accept message contains the allocated UE Context ID values. Additionally, the message contains the HNB-GW Context ID 2810. In some embodiments, the HNB-GW Context ID 2810 is allocated so as to uniquely identify the UE over the Iuh interface within the HNB-GW.

3. Release UE Context

The HNBAP Release UE Context Command message is used by either the HNB or HNB-GW to release context identifiers for a particular UE. FIG. 29 illustrates a Release UE Context message going from either the HNB-GW to the HNB or the HNB to the HNB-GW, in some embodiments. As shown, the message includes the following IEs: the HNB Context ID 2905 and the HNB-GW Context ID 2910.

4. Release UE Context Complete

The HNBAP Release UE Context Complete message is used to acknowledge successful release of the associated UE context identifiers. FIG. 30 illustrates a Release UE Context Complete message going from either the HNB-GW to the HNB or the HNB to the HNB-GW, in some embodiments. As shown, the message includes the following IEs: the HNB Context ID 3005 and the HNB-GW Context ID 3010.

III. MOBILITY MANAGEMENT

A. UE Addressing

The IMSI associated with the (U)SIM in the UE identifier is provided by the HNB to the HNB-GW when it registers a specific UE attempting to camp on the HNB. The HNB-GW maintains a record for each registered UE. For example, IMSI is used by the HNB-GW to find the appropriate UE record when the HNB-GW receives a RANAP PAGING message.

B. HNB Addressing

In some embodiments, the HNB is addressed within the HNB system by one or more of the following addressing parameters: the IMSI associated with the (U)SIM in the HNB, the Public IP Address of the HNB, and the Private IP Address of the HNB, and/or the vendor specific unique serial number (such as MAC address).

The IMSI associated with the (U)SIM in the HNB is provided by the HNB to the HNB-GW when the HNB registers for service. The HNB-GW maintains a record for each registered HNB. If the HNB is not equipped with a (U)SIM, then an alternate identifier must be allocated to the HNB and provided to the HNB-GW during registration of the HNB. Any alternate identifier must ensure global uniqueness for the HNB identity, since this identity is also used by the HNB-GW to validate the closed user groups of UEs allowed to access a particular HNB. In some embodiments, the HNB identity may include a TMSI that is assigned to the HNB or a P-TMSI that is assigned to the HNB.

The Public IP address of the HNB is the address used by the HNB when it establishes an IPSec tunnel to the HNB-GW Security Gateway. This identifier is provided by the HNB-GW Security Gateway to the AAA server. In some embodiments, the HNB-GW uses this identifier to support location services (including emergency calls) and fraud detection. In some embodiments, service providers use this identifier to support Quality of Service (QoS) for IP flows in managed IP networks.

The Private IP address of the HNB (also referred to as the "remote IP address") is used by the HNB inside the IPSec tunnel. The private IP address of the HNB is utilized by the HNB-GW to associate or bind a particular HNB to a specific transport address for the purpose of network initiated messages.

The vendor specific unique serial may be used by the HNB for identification purposes. The combination of vendor identity and the serial number within each vendor identity ensure a globally unique HNB identity over the Iuh interface.

C. HNB Identification

The following points describe the HNB Identification strategy.

1. Location Area (LA), Routing Area (RA), and Service Area Identification

In order to facilitate the Mobility Management functions in UMTS, the coverage area is split into logical registration areas called Location Areas (for CS domain) and Routing Areas (for PS domain). UEs are required to register with the core network (CN) each time the serving location area (or routing area) changes. One or more location areas identifiers (LAIs) may be associated with each MSC/VLR in a carrier's network. Likewise, one or more routing area identifiers (RAIs) may be controlled by a single SGSN.

The LA and the RA are used in particular when the UE is in idle mode and the UE does not have any active RRC connection. The CN would utilize the last known LA (for CS domain) and RA (for PS domain) for paging of the mobile when active radio connection is not available.

The Service Area Identifier (SAI) identifies an area including one or more cells belonging to the same Location Area. The SAI is a subset of location area and can be used for indicating the location of a UE to the CN. SAI can also be used for emergency call routing and billing purposes.

The Service Area Code (SAC) which is 16 bits, together with the PLMN-Id and the LAC constitute the Service Area Identifier.

SAI=PLMN-Id||LAC||SAC.

In some embodiments, it is necessary to assign a distinct LAI (distinct from its neighboring macro cells or other neighboring HNBs) to each HNB for the following reasons: (1) the UE's mobility from the macro network to a HNB cell must be detected by the HNB and the network. The UE can camp on a HNB via its internal cell selection logic. However, if the UE is in idle mode, there are no messages exchanged between the UE and the HNB, thus making it difficult for the HNB to detect the presence of the UE. In order to trigger an initial message from the UE, upon its camping on a specific HNB, the HNB is assigned distinct location areas different than the neighboring macro cells. This results in the UE's MM layer triggering a Location Update message to the CN via the camped cell (i.e., the HNB); (2) the UE's mobility from one HNB to another HNB must also be detected. The UE's cell selection selects a neighboring HNB and it will camp on the neighboring HNB without any explicit messaging. The neighboring HNB's Service Access Control (SAC) may not allow the camping of that specific UE, but without an initial explicit messaging there would not be a way for the neighboring HNB to detect and subsequently to reject the UE.

When the MCC and MNC components of the LAI remain fixed for each operator, LAI uniqueness is ensured by allocating a distinct Location Area Code (LAC) to each HNB, such that the LAC assigned to the HNB is different from the neighboring macro network cells and other neighboring HNBs. However, the LAC space is limited to theoretical maximum of 64K (due to the limitation of a 16 bit LAC attribute as specified in "Numbering, addressing and identification", 3GPP TS 23.003, hereinafter "TS 23.003". As a result, the LAC allocation scheme must provide a mechanism for the re-use of LAC for scalable solution, and at the same time minimize the operational impact on existing CN elements (MSC/SGSN).

In some embodiments, the following solution is utilized to meet the above requirements. The LAC allocation is split into two separate categories: (1) a pool of LACs managed by the HNB/HNB Management System and (2) a small set of LACs (one per "Iu" interface) managed by the HNB-GW. The first set of LACs (Broadcast LACs) is used by the HNB/HNB Management System to assign a unique LAC to each HNB such that it meets the following requirements (at the minimum): (1) uniqueness with respect to the neighboring macro as well as other HNBs (this will ensure an initial message from the UE upon HNB selection and rove-in) and (2) resolution of conflicts with shared LACs where multiple HNBs sharing the same LAC are not neighbors but can be accessed by the same UE (this is to allow the use of "LA not allowed" rejection code for UE rejection).

The second set of LACs (a much smaller set) is managed within each HNB-GW as follows, with the following key requirements: they must (1) minimize the impact on the existing CN elements (such as minimal configuration and operational impact), (2) seamlessly integrate the existing functionality for routing of emergency call routing to appropriate PSAPs, and (3) seamlessly integrate existing functionality for the generation of appropriate CDR for billing purposes.

To meet the above requirements for the second set of LACs each HNB-GW represents a Super LAC for a given Iu interface (i.e., MSC and SGSN interface). This implies the MSC/SGSN can be configured with a single set of Super LAI/Super RAI information for that HNB-GW. It should be apparent to one of ordinary skill in the art that this does not limit the operator from configuring multiple Super LAI/Super RAI sets if necessary, for example, to further subdivide the region served by a single HNB-GW into multiple geographic areas.

In addition, the HNB-GW utilizes the following mapping functionality for assignment of a Super LA: (1) when macro coverage is reported by the HNB, HNB-GW supports mapping of the reported macro coverage to a Super LAC, Super RAC, and Service Area Code (SAC). The number of SACs utilized will be dependent on the granularity which the operator chooses for regional distribution (e.g., for emergency call routing, billing, etc.); (2) When no macro coverage is reported by the HNB, the HNB-GW has the following logic for the Super LAC/RAC/SAC assignment: (a) query the subscriber database for information on the "provisioned macro coverage" for the given HNB IMSI (or identity). When the database query reports macro coverage, the HNB-GW uses the provisioned macro coverage information to map Super LAC/RAC/SAC as above; (b) when there is no information about the macro coverage from the subscriber database query, HNB-GW maps the HNB to default Super LAC/RAC/SAC.

However, such a mapping may result in the HNB-GW routing traffic to the CN in a sub-optimal mechanism. Therefore, to prevent this sub-optimal routing of UE traffic to default MSC/SGSN, one or more of the following additional enhancements on the HNB of some embodiments may be utilized: (i) upon a UE rove-in to this "no coverage" HNB, the HNB gathers information from the UE's initial LU request (since the UE will report last camped LAI), (ii) the HNB collects information from multiple UEs and constructs a "derived" macro coverage information (the number of UEs utilized to derive macro coverage could be algorithmic), (iii) using this derived macro coverage information, the HNB sends a HNBAP Register Update Uplink message to the HNB-GW, and (iv) the HNB-GW utilizes the macro coverage information reported via the HNBAP Register Update Uplink message to map the HNB to an appropriate Super LAC/RAC/SAC as above.

A distinct LAI for each HNB also implies a distinct RAI since the RAI is composed of the LAI and Routing Area Code (RAC). The LAI, RAI and the Service area code (SAC) are sent to the HNB upon successful registration of HNB.

In some embodiments, the HNB provides Super LAC/RAC replacement in the NAS messages from the network to the UE (e.g., LU Accept or RAU accept). In some such embodiments, the HNB replaces the "Super LAC/RAC" contained in the relevant NAS messages from the network, with the appropriate locally assigned LAC/RAC information in messages sent to the UEs camped on the HNB. The HNB also includes the SAI provided by the HNB-GW in the corresponding UE specific RANAP messages.

2. 3 G Cell Identification

A 3 G Cell Id identifies a cell unambiguously within a PLMN. A 3 G cell identifier is typically composed as follows: 3 G Cell Id=28 bits=RNC-Id (12 bits)+cell Id (16 bits). In an alternate embodiment, the 3 G Cell Id may also be composed as follows: 3 G Cell Id=28 bits=RNC-Id (16 bits)+cell Id (12 bits).

The 3 G Cell Ids in UMTS are managed within the UTRAN and are not exposed to the CN. As a result, the cell assignment logic can be localized to the UTRAN as long as it can ensure uniqueness within a given PLMN. The 3 G Cell Id assigned to each HNB must be distinct from its neighboring HNB primarily to avoid advertisement of the same cell id in system information broadcast by two adjacent HNBs, considering that in some embodiments the physical deployment of the HNBs are ad-hoc and not controlled by the operator.

Accordingly, in some embodiments, each HNB-GW is statically provisioned with a unique RNC-Id and the RNC-Id will be conveyed to the HNB during registration. The HNB will be responsible for the assignment of the 16 bit cell-id locally and construct the 3 G cell using the combination of HNB-GW supplied RNC-Id and locally assigned cell-id. In some embodiments, the HNB may use the entire 28 bits for cell Id (and not include the RNC Id) for broadcasting over the air interface. In this alternate embodiment, mapping between these 28 bits cells ids to RNC Id(s) is maintained either in the HNB or the HNB-GW.

3. Impact on Core Network

The LAC/RAC information sent to the UE is different (locally assigned by the HNB) than that sent to the CN (Super LAC/RAC assigned by the HNB-GW). As a result of this split allocation, the UE stores (upon successful LU/RAU), the local or broadcast LAC/RAC on the UE's (U)SIM. Upon rove-out to the licensed wireless network, the UE triggers location update and routing area update using these local values for LAC and RAC. The CN does not have any information about this local LAC/RAC value since the MSC/SGSN is aware of the Super LAC/RAC for that UE.

Therefore, in the PS domain, for UEs in idle mode, if there are existing PDP sessions, PS service may be affected. The new SGSN will not be aware of the "RAI" contained in the Routing Area Update message. As a result, the new SGSN may be unable to retrieve subscriber context (i.e., existing PDP information) from the old SGSN. This could result in the PDP sessions having to be re-established by the UE. Re-establishing the PDP sessions results in the exchange of additional signaling messages and possible impacts to service such as delayed PS applications. For billing purposes, it is desirable that the PDP session in idle mode be terminated and restarted with the correct billing indicators (e.g., SAI, etc.). For such scenarios, the above limitation is a non-issue. If the routing area update is performed using a P-TMSI, the new SGSN will not have the associated P-TMSI and will trigger an "Identity request" NAS message to the UE thus resulting in the exchange of additional signaling messages.

In the CS domain, if the location update done is performed using the TMSI, this could trigger an "Identity Request" NAS message from the MSC to the UE thus resulting in the exchange of additional signaling messages. Also, there may be additional impact on the HLR, if the "new VLR" and the "old VLR" for the given subscriber IMSI are the same. The VLR may not be able to make the determination of the old VLR due to an unknown LAI and may send a message to the HLR. This could result in the VLR requesting complete subscriber information from the HLR thus resulting in additional signaling messages in the CN. In some embodiments, the CN elements (SGSN/MSC) are enhanced to recognize the Super LAC/RAC from the Broadcast LAC. If it is able to distinguish the Super LAC and Broadcast LAC, then the subscriber information (such as ongoing PDP and other information) can be consolidated (for example, using the IMSI), thus mitigating any impacts due to the above limitations.

D. HNB Operating Configurations

In the HNB system of some embodiments, two HNB operating configurations include a common core configuration and a separate core configuration. For the common core configuration of some embodiments, the HNB Super LAI and the umbrella UTRAN's LAI (e.g., the "umbrella" UTRAN that serves the subscriber's neighborhood) are different. Also, the network is engineered such that the same core network entities (i.e., MSC and SGSN) serve both the HNBs and the umbrella UMTS cells. The primary advantage of this configuration is that subscriber movement between the HNB coverage area and the UMTS coverage area does not result in inter-system (i.e., MAP) signaling (e.g., location updates and handovers are intra-MSC). In some embodiments, the common core configuration requires coordinated HNB and UMTS traffic engineering (e.g., for the purpose of MSC and SGSN capacity planning).

For the separate core configuration, the HNB Super LAI and umbrella UTRAN's LAI are different. Also, the network is engineered such that different core network entities serve the HNBs and the umbrella UMTS cells. The advantage of this configuration is that engineering of the HNB and UMTS networks can be more independent than in the common core configuration. In some embodiments, the separate core configuration requires that subscriber movement between the HNB coverage area and the UMTS coverage area results in inter-system (i.e., MAP) signaling.

E. Discovery and Registration

In some embodiments, the HNB is plug-and-play upon connection to the operator core network. The HNB does not require any manual "per unit" configuration by the operator or by the subscriber to be activated. In some embodiments, HNBs from multiple vendors will connect to each HNB-GW (i.e., many to one relationship). As a result, a standardized and inter-operable mechanism of connecting these multiple vendor HNBs to HNB-GW is highly desirable. The discovery and registration procedures provide a standardized and inter-operable mechanism for HNB to connect and receive services from the most appropriate HNB-GW.

1. HNB Discovery

In some embodiments, the HNB-GW discovery process does not involve any signaling to the PLMN infrastructure and is wholly contained within the HNB system (i.e., between the HNB, HNB-GW). Upon initial power-up (e.g., when the HNB has not stored information about its serving HNB-GW), the HNB initiates the discovery procedure towards the HNB-GW.

The discovery procedure services provide an automated way for the HNB to determine the most appropriate serving HNB-GW in the HPLMN of the HNB, taking into account parameters such as the HNB identity and location. Additionally, the discovery procedure services provide an inter-operable mechanism for the HNB from multiple vendors to find the appropriate HNB-GW which can serve the specific HNB. The logic reflecting operator policy for assigning HNB to the appropriate HNB-GW is implemented in one place and is the same for every HNB product or vendor. In some embodiments, all HNBs, from every HNB vendor, are provisioned with exactly the same initial information. In some embodiments, this initial information includes the address (e.g., FQDN) of the network-wide Provisioning HNB-GW. In alternate embodiments, the discovery of serving HNB-GW is performed via the HNB management system.

2. HNB and UE Registration

In some embodiments, the HNB registration process does not involve any signaling to the PLMN infrastructure and is wholly contained within the HNB system (i.e., between the HNB, HNB-GW). The registration process includes HNB registration and UE registration.

In some embodiments, HNB registration occurs upon HNB power-up. When powered-up, the HNB registers with the HNB-GW. HNB registration serves to (a) inform the HNB-GW that a HNB is now connected and is available at a particular IP address, (b) provide the HNB with the network operating parameters associated with the HNB service at the current location which must be coordinated between the HNB and HNB-GW (information that need not be locally coordinated can be obtained through the HNB Management System prior to HNB-GW Discovery/Registration), (c) allow the HNB-GW to perform network based access control (e.g., HNB restriction and location verification), and (d) provide a mechanism to redirect the HNB to a different serving HNB-GW (e.g., based on incoming location, current load on the HNB-GW, and availability/load status of the Iu-CS/Iu-PS interface, etc).

In some embodiments, UE registration occurs upon HNB selection and cell camping. When the UE selects a HNB and camps on the corresponding cell, the UE initiates an initial NAS (Non-access stratum) message (for example a Location Update (LU) message) towards the CN via the HNB. The HNB utilizes this message to detect the presence of the UE on that specific HNB. The HNB then initiates a registration message towards the HNB-GW for the camped UE. UE registration by the HNB informs the HNB-GW that a UE is now connected through a particular HNB and is available at a particular IP address. The HNB-GW keeps track of this information (e.g. for the purposes of "directed paging" in the case of a mobile-terminated call). UE registration by the HNB also allows the HNB-GW to provide network based service access control (SAC) functionality. The HNB-GW provides authorization and enforcement based on the operator's service access control polices. Network based SAC can be used to insure that a particular UE is indeed authorized for service over a particular HNB. Additionally, UE registration by the HNB allows the HNB-GW to provide UE specific service parameters to the HNB (e.g., differentiated billing for home users versus guest users). In some embodiments, UE registration by the HNB provides a mechanism for indicating emergency services only. With this explicit indication, the HNB-GW can override the normal service access controls for this UE but the HNB-GW may still restrict the UE to only emergency services for fraud prevention. In addition, this emergency services indicator allows the HNB-GW to support emergency call-backs by targeting the correct HNB over which the emergency call had originated. This assumes that the HNB allows an unauthorized UE (i.e., a UE not allowed service over that particular HNB) to camp for limited service.

F. Mobility Management Scenarios

1. HNB Power On

In some embodiments, the HNB is initially provisioned with information (i.e., an IP address or a FQDN) about the Provisioning HNB-GW and the corresponding Provisioning SeGW related to that HNB-GW. If the HNB does not have any information about the Serving HNB-GW and the associated SeGW stored, then the HNB completes the Discovery procedure towards the Provisioning HNB-GW via the associated SeGW. If the HNB has stored information about the Serving HNB-GW on which it registered successfully the last time, the HNB skips the discovery procedure and attempts registration with the Serving HNB-GW as described below.

2. HNB Discovery Procedure

Figure 31:
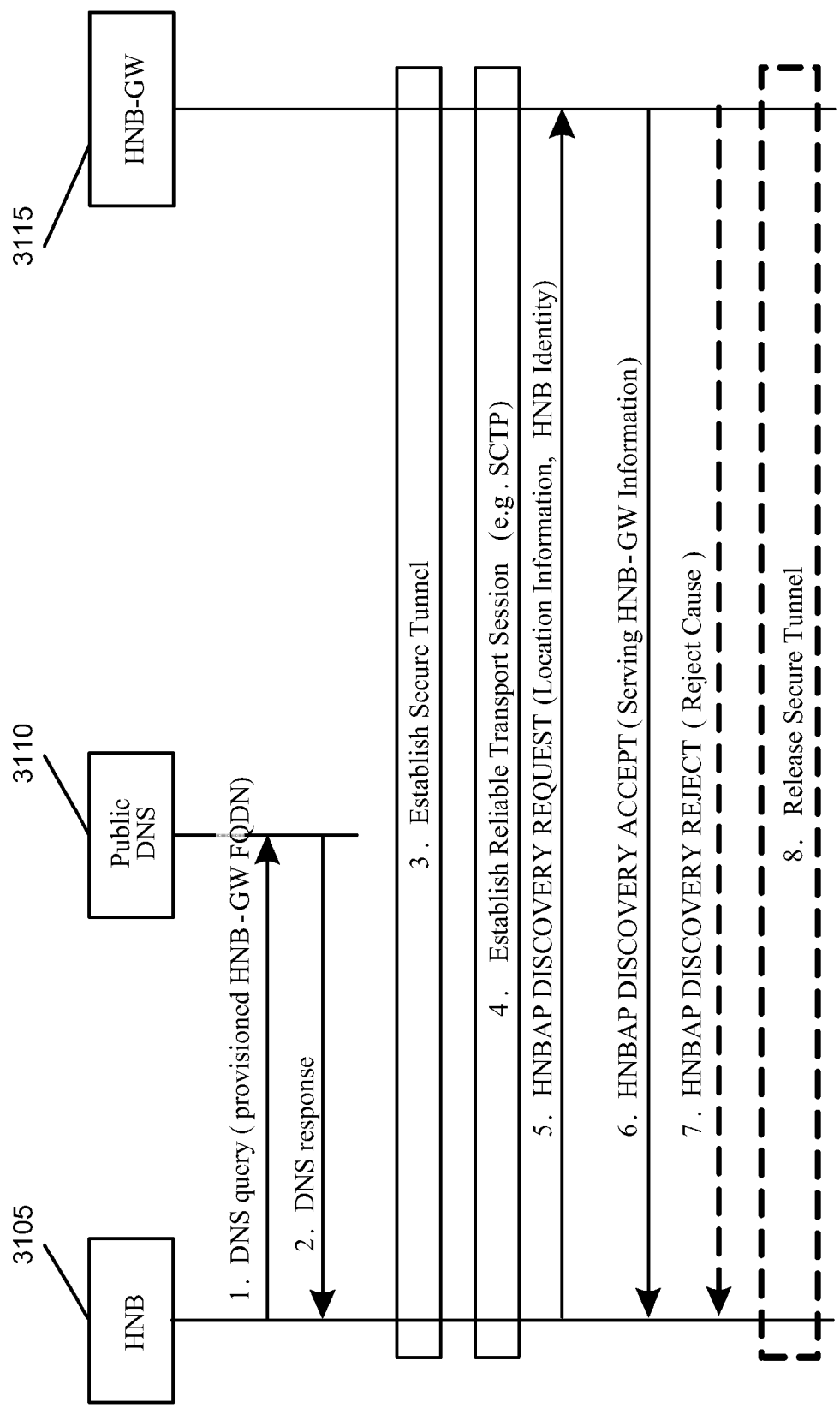
FIG. 31 illustrates the case when the HNB powers on and does not have stored information on the Serving HNB-GW, and then performs a discovery procedure with the provisioning HNB-GW and SeGW in some embodiments.

FIG. 31 illustrates the case when the HNB powers on and does not have stored information on the Serving HNB-GW, and then performs a discovery procedure with the provisioning HNB-GW and SeGW, in some embodiments.

As shown, when the HNB 3105 has a provisioned FQDN of the HNB-GW Discovery service, it performs (at step 1) a DNS query (via the generic IP access network interface) to resolve the FQDN to an IP address. When the HNB 3105 already has the IP address for the HNB-GW Discovery service, the DNS step is omitted. The DNS Server 3110 returns (at step 2) a response including the IP Address of a HNB-GW that provides HNB-GW Discovery service. The HNB 3105 establishes (at step 3) a secure tunnel to the HNB-GW 3115. In some embodiments, the SeGW is any logical entity within the HNB-GW 3115. The HNB 3105 sets up (at step 4) a reliable transport session to a well-defined port on the HNB-GW 3115.

The HNB 3105 then queries (at step 5) the HNB-GW 3115 for the address of the serving HNB-GW, using the HNBAP DISCOVERY REQUEST message. The message contains both HNB location information and HNB identity. The HNB 3105 provides location information via use of one or more of the following mechanisms: (1) detected macro coverage information (e.g., GERAN or UTRAN cell information), (2) geographical co-ordinates (e.g., via use of GPS, etc.), or (3) Internet connectivity information (e.g., IP address or DSL Line Identifier). It is possible that none of the above information is available. In such instances where the information is not available, the discovery mechanism of some embodiments supports HNB assignment to a default HNB-GW for such use with the understanding that service via such default assignment may be non-optimal. Alternately, some embodiments deny discovery of a serving HNB-GW until valid location information is provided. The HNB 3105 is assumed to have a globally unique identity. In some embodiments, the specific identity may be the IMSI if a (U)SIM is associated with the HNB.

The HNB-GW 3115 returns (at step 6) the HNBAP DISCOVERY ACCEPT message, using the information provided by the HNB 3105 to determine the address of the most appropriate serving HNB-GW. The DISCOVERY ACCEPT message may also indicate whether the serving HNB-GW address information is stored by the HNB 3105 for future access (i.e., versus performing HNB-GW discovery each time the HNB 3105 is power-cycled).

When the HNB-GW 3115 cannot accept (at step 7) the HNBAP DISCOVERY REQUEST message, it returns a HNBAP DISCOVERY REJECT message indicating the reject cause. The secure tunnel to the HNB-GW 3115 is released (at step 8).

3. HNB Registration Procedure

Figure 32:
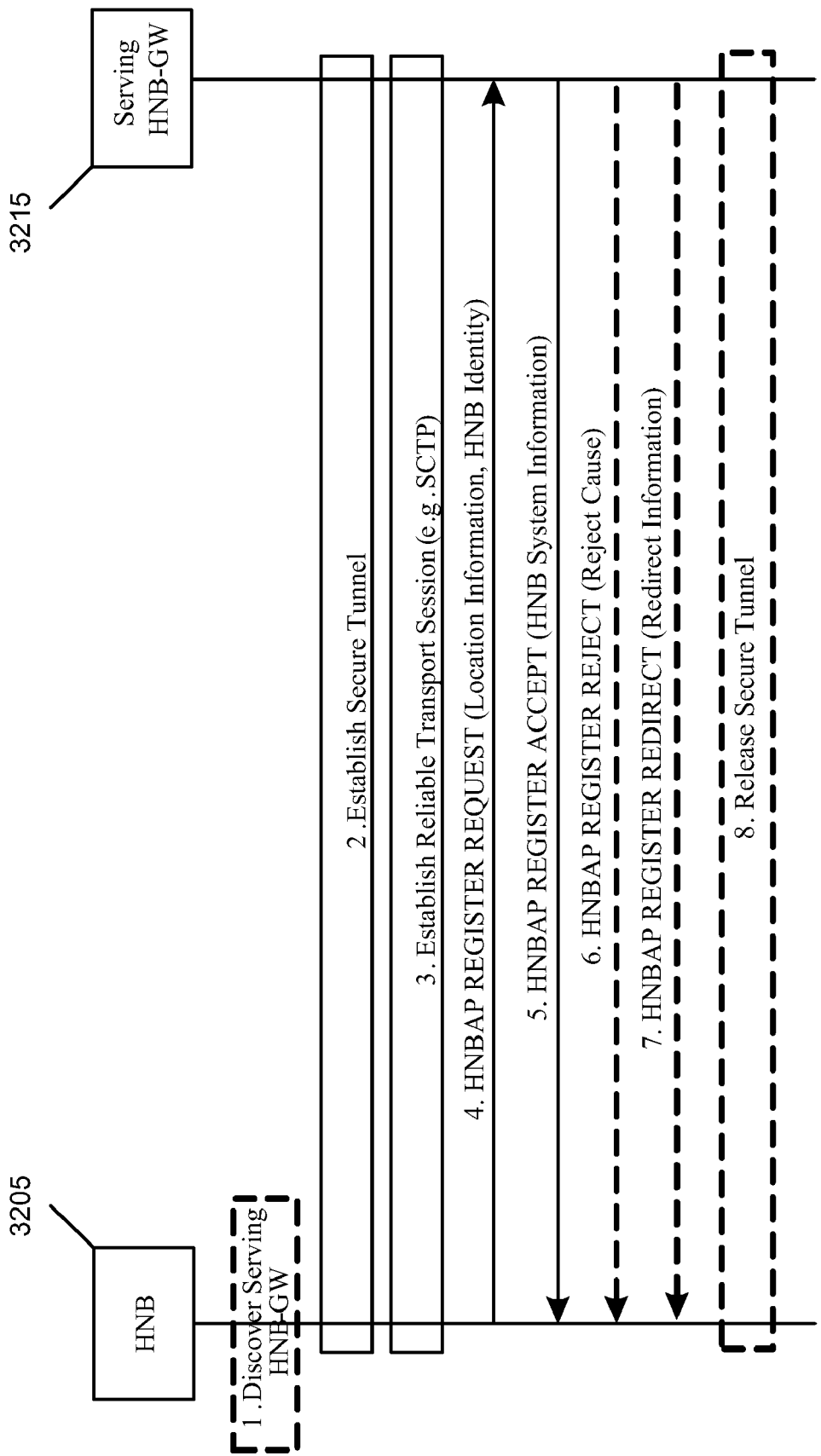
FIG. 32 illustrates the HNB Power on registration procedure in some embodiments.

Following the discovery of a serving HNB-GW, the HNB establishes a secure tunnel with the Security Gateway of the Serving HNB-GW and attempts to register with the HNB-GW. This HNB-GW may become the Serving HNB-GW for that connection by accepting the registration, or this HNB-GW may redirect the HNB to a different Serving HNB-GW. HNB-GW redirection may be based on information provided by the HNB during the Registration procedure, operator chosen policy or network load balancing. FIG. 32 illustrates the HNB Power on registration procedure of some embodiments.

As shown, if the HNB 3205 does not have stored information on the serving HNB-GW 3215, the HNB 3205 performs (at step 1) the HNB-GW Discovery procedure. The HNB 3205 establishes (at step 2) a secure tunnel to the serving HNB-GW 3215. This step may be omitted if a secure tunnel is being reused from an earlier discovery or registration procedure. The HNB 3205 sets up (at step 3) a reliable transport session to a well-defined port on the serving HNB-GW 3215.

The HNB 3205 then attempts (at step 4) to register with the serving HNB-GW 3215 using a HNBAP REGISTRATION REQUEST message. The message contains the HNB identity (per SA1 requirement, the HNB 3205 has a globally unique identity; for example, it may be the IMSI if a (U)SIM is associated with the HNB), and HNB location information. The location information can be in the following forms: (1) detected macro coverage information (e.g., GERAN or UTRAN cell information), (2) geographical coordinates (e.g., via use of GPS, etc.), or (3) Internet connectivity information (e.g., IP address or DSL Line Identifier). When none of the above information is available at the HNB 3205, the registration mechanism of some embodiments supports either a registration with default network operating parameters or a registration rejection to prevent HNB operation in unknown locations. The determination for exact logic should be based on configured policy of the HNB-GW (here, 3215).

The serving HNB-GW 3215 may use the information from the HNBAP REGISTER REQUEST message to perform access control of the HNB 3205 (e.g., whether a particular HNB is allowed to operate in a given location, etc). If the serving HNB-GW 3215 accepts the registration attempt it responds (at step 5) with a HNBAP REGISTER ACCEPT message. In some embodiments, the HNBAP REGISTER ACCEPT message includes the necessary system information for the HNB functionality which needs to be coordinated with the serving HNB-GW 3215. In this case, the reliable transport session and the secure tunnel are not released and are maintained as long as the HNB 3205 is registered with the serving HNB-GW 3215.

Alternatively, the serving HNB-GW 3215 may reject (at step 6) the request (e.g., due to network congestion or overload, blacklisted HNB, unauthorized location, etc.). In this case, the HNB-GW 3215 responds with a HNBAP REGISTER REJECT message indicating the reject cause. Additionally, in cases of network congestion or overload, the HNB-GW may also indicate a back-off time to prevent the HNB from attempting an immediate registration retry. When the serving HNB-GW 3215 wishes to redirect (at step 7) the HNB 3205 to (another) serving HNB-GW (not shown), the HNB-GW 3215 responds with a HNBAP REGISTER REDIRECT message providing information about the target HNB-GW. In some embodiments, the functionality of redirection maybe performed via the HNB receiving a HNBAP REGISTER REJECT message from the HNB-GW and attempting to connect to a second HNB-GW using information for the second HNB-GW provided by the HNB management system. The HNB 3205 releases (at step 8) the transport session as well as the secure tunnel if it does not receive a HNBAP REGISTER ACCEPT message in response.

a. Abnormal Cases

When the Serving HNB-GW rejects a Registration Request and is unable to provide redirection to a suitable Serving HNB-GW, the HNB may re-attempt the discovery procedure (including in the message a cause indicating the failed registration attempt and the serving HNB-GW provided in the last discovery procedure). The HNB may also delete all stored information about the rejected serving HNB-GW.

Some of the possible reject causes for HNB registration attempts are: network congestion or overload, location not allowed, geo-location not known, HNB Identity (e.g., IMSI) not allowed, resource unavailable, and/or "unspecified".

4. UE Registration

After an HNB is registered with a HNB-GW, the HNB establishes a short range licensed wireless service region of the HNB system. When UEs enter the service region, the HNB performs a registration procedure to authenticate and authorize the UE for HNB service for the service region of a particular HNB. UE registration first determines whether the HNB is permitted to access services of the HNB system through the particular service region associated with the HNB on which the UE is camped. UE registration also serves to determine what services the UE is authorized to access from that particular service region. Similar to the HNB registration, UE registration is performed through the HNB-GW.

Figure 33:
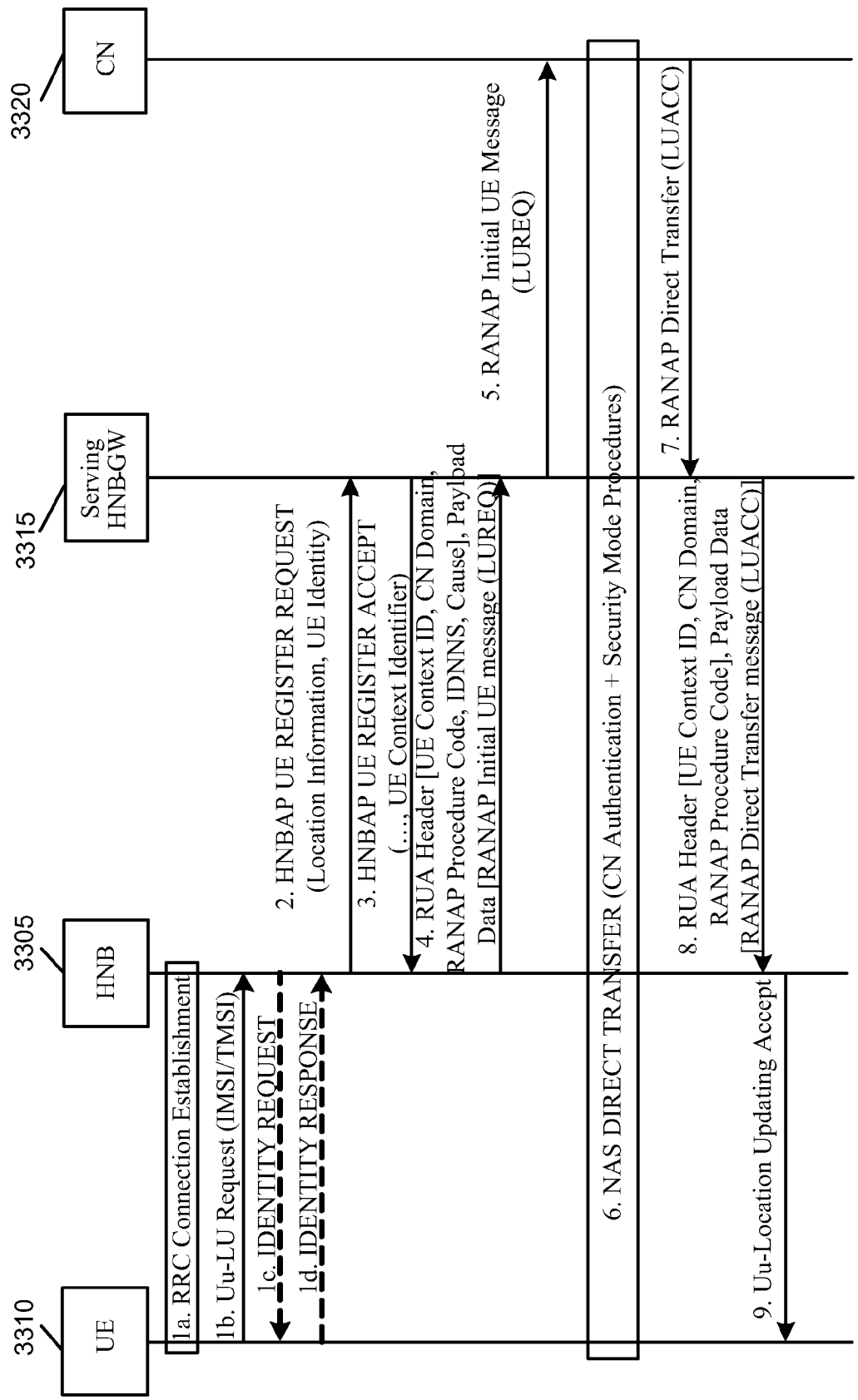
FIG. 33 illustrates UE registration with the HNB in some embodiments.

Based on the service policy of the HNB system provider, UEs may be restricted to service through certain HNBs i.e. the HNBs may have a closed subscriber group (CSG) for allowing access through the particular HNB. In some embodiments, the UE is allowed service through an HNB that is associated with the user's home location. In some embodiments, the UE is allowed HNB service through certain HNB hotspots. By providing registration through the HNB-GW, some embodiments provide a central location whereby access to the HNB services can be controlled FIG. 33 illustrates UE registration with the HNB, in some embodiments. Here, the HNB 3305 registers a specific UE 3310 with the HNB-GW 3315. The registration is triggered when the UE 3310 attempts to access the HNB 3305 for the first time via an initial NAS message (e.g. Location Updating Request).

In the example of FIG. 33, upon camping on the HNB 3305, the UE 3310 initiates (at step 1a) a Location Update procedure by establishing an RRC connection with the HNB 3305 (it can be assumed that the HNB 3305 has a location area that is distinct from its neighboring HNB and macro cells to trigger an initial message upon camping on the HNB 3305). The UE 3310 then transmits (at step 1b) a NAS message carrying the Location Updating Request message with some form of identity (IMSI/TMSI). If the (P)TMSI of the UE 3310 (provided during RRC Connection Establishment) is unknown at the HNB being accessed (e.g., first access attempt by this specific UE using the (P)TMSI, the HNB requests (at step 1c) the IMSI of the UE and the UE replies at step Id. In some embodiments where the networks support network mode 1, the UE could trigger a combined Routing Area and Location Area update request instead of the initial LU request. The HNB may also optionally perform local access control for faster rejection of those UEs not authorized to access the particular HNB. If the HNB performs the local access control, then unauthorized UEs are not attempted to be registered with the HNB-GW.

The HNB 3305 attempts (at step 2) to register the UE 3310 on the HNB-GW 3315 over the UE specific transport session by transmitting the HNBAP UE REGISTER REQUEST. The message contains location information and the UE identity such as the IMSI of the (U)SIM associated with the UE. The HNB identity over which the UE is attempting access can be inferred or derived by the HNB-GW based on HNB registration and the associated transport session (e.g. SCTP session) since the UE registration is also attempted (by the HNB) using the same transport session.

The HNB-GW 3315 performs access control for the particular UE 3310 attempting to utilize the specific HNB 3305. If the HNB-GW 3315 accepts the registration attempt, it responds (at step 3) with a HNBAP REGISTER ACCEPT message back to the HNB 3305. In some embodiments, the HNB-GW 3315 also assigns information specific to the UE 3310 such as SAI specific to the registered UE, UE Context Id (for use in the RUA layer), etc. The UE Context Id provides a unique identifier for each UE within a particular HNB-GW. The UE Context Id is used to identify a logical Iuh signaling connection for a given UE. Additionally, since the UE Context Id is unique within the HNB-GW, it is also used (e.g. by the HNB) as the "Iu signaling connection identifier" in corresponding RANAP messages for that particular UE.

The HNB 3305 performs (at step 4) a NAS relay of the Location Updating Request message from the UE 3310 to the HNB-GW 3315 via the use of RANAP Initial UE Message. The RANAP Initial UE Message is encapsulated in the RUA message header with additional necessary information which enables the HNB-GW 3315 to relay RANAP message towards the appropriate CN entity.

The HNB-GW 3315 establishes (at step 5) an SCCP connection to the CN 3320 and forwards the Location Update request (or the combined RA/LA update request) NAS PDU to the CN 3320 using the RANAP Initial UE Message. Subsequent NAS messages between the UE 3310 and core network 3320 will be sent between the HNB 3305/HNB-GW 3315 and the CN 3320 using the RANAP Direct Transfer message encapsulated in the RUA header.

The CN 3320 authenticates (at step 6) the UE 3310 using standard authentication procedures. The CN 3320 also initiates the Security Mode Control procedure. The NAS messages are relayed transparently by the HNB-GW 3315 and the HNB 3305 between the UE 3310 and the CN 3320. The CN 3320 indicates (at step 7) it has received the location update and it will accept the location update using the Location Update Accept message to the HNB-GW 3315. The HNB-GW 3315 relays (at step 8) the LU Accept NAS message to the HNB 3305 via the use of RANAP Direct Transfer message encapsulated in the RUA header. The HNB 3305 relays (at step 9) the LU Accept over the air interface to the UE 3310 and the procedure is completed.

In some embodiments, the HNB has a location area that is distinct from its neighboring HNB and macro cells in order to trigger an initial message from a UE upon the UE camping on the HNB. The uniqueness of location is with respect to neighbors of a given HNB, which includes other surrounding HNBs and macro cells. It is neither required nor feasible to have a system-wide (i.e., across PLMN) unique location area for each HNB. Multiple HNBs are able to re-use the location area with the above consideration (i.e., non-conflicting with other neighbors). This unique location area is required to trigger an initial UE message and serves to perform access control and rejection of unauthorized UEs upon initial cell reselection and camping on the HNB; and, to track authorized UEs, in order to minimize the impact of paging at the HNB-GW as well as the HNB (via UE registration).

Once the UE has successfully registered with the HNB-GW and performed a successful location update, the HNB may expect a periodic LU for that UE (the enabling and the periodicity of the LU is controlled by the HNB via System Information broadcast from the HNB to the UE). This exchange will serve as a keep-alive between the HNB and the UE and will help the HNB detect idle UEs moving away from the camped HNB without explicit disconnect from the network.

a. Abnormal Cases

When the unauthorized UE is not allowed to camp on the HNB, the HNB-GW responds to the UE registration with a HNBAP REGISTRATION REJECT message to the HNB. The HNB is then expected to reject the corresponding UE using appropriate reject mechanisms. For example, some rejection mechanisms include RRC rejection or redirection to another cell or reject the LU with cause such as "Location Area not allowed", etc.

When the unauthorized UE is allowed to camp in idle mode only, the HNB-GW responds to the UE registration with a HNBAP REGISTRATION ACCEPT message to the HNB and also includes a cause code indicating the limited camping of the UE (i.e., idle mode only). The HNB continues with the Location Update NAS message processing. At the completion of a successful location update procedure, if this unauthorized UE now attempts a subsequent L3 transaction (e.g., a mobile originated service request), the HNB will use the appropriate mechanisms (e.g., RRC redirection or relocation) to redirect the UE to another macro cell for the active call.

b. Iuh Registration and Paging Optimization for CSG UEs

A HNB can be deployed in multiple access modes. When the HNBs are deployed in closed access mode (meaning only a certain group of users are allowed access), a mechanism for access control is implemented via enforcement in the network (either the radio access network or the core network). As a result, the network must reject un-authorized UEs (i.e. UEs not subscribing to a particular HNB). The allowed CSG list stored on the UE or in the subscriber database record (such as in the HLR or HSS) is also known as the white-list.

The CSG capable HNB broadcasts a CSG-Id over the air interface. In some embodiments, the CSG-Id refers to a single cell, and in other embodiments, the CSG-Id may be shared by multiple CSG cells. Additionally, the HNB may also include an indication on whether the cell belongs to a closed subscriber group. The CN elements (MSC/VLR/SGSN) are assumed to be CSG capable i.e. they are able to access the allowed CSG list (i.e. white-list) of a particular UE (i.e. subscriber) and to enforce access control for each subscriber.

Subscribers can be equipped with either a legacy UE or a CSG capable UE. The legacy UE's decision to select a particular HNB may be based on macro NCL (e.g. if moving from macro coverage into HNB coverage area in idle mode) or based on full scan of all available cells for a particular operator PLMN (e.g. if there is no macro coverage in idle mode). CSG capable UEs do not need the macro NCL assistance and are capable of selecting the HNB autonomously based on the White-List on the (U)SIM or manual selection using the CSG-Id/"HNB Display Identity" broadcast by the HNB. However, if macro NCL includes HNB neighbors, then a CSG capable UE may use that information for initial scanning of the HNB but the eventual decision to select the particular HNB is based on the white-list or manual selection decision.

The following sub-sections describe CSG UE registration over the Iuh interface as well as the various mechanisms which would allow Page messages from the CN to be filtered at the HNB-GW (i.e. send the Page message to the specific HNB where the UE is camped) without any dependency or need for specific co-relation between the CSG-Id and Location area of the HNBs (or with the macro LA).

i. UE Registration

Use of UE registration for CSG UEs over Iuh interface requires the HNB to trigger UE registration upon HNB cell selection. The HNB can rely upon an initial L3 transaction (e.g. LAU or Paging Response) to perform UE registration (similar to UE registration supported for legacy i.e. pre-CSG systems). For the CSG systems case, since the access control is performed in the CN, the HNB must also monitor for successful confirmation of the initial L3 transaction (e.g. LAU Accept). If the HNB detects failure in the L3 procedure, the HNB must trigger deregistration of the CSG UE. The UE registration procedure as defined for legacy systems requires the HNB to know the permanent identity (IMSI) of the UE and the IMSI is obtained via identity request procedure which is considered a breach of the current user confidentiality assumptions in macro networks. The following describes a solution, in some embodiments, which avoids the need for issuing an identity request (over the air interface) for CSG UEs Registration procedure.

1. Resolving Identity Issues for UE Registration

The UE permanent identity is required in legacy (i.e. pre-CSG) environments to perform access control and to perform paging filtering (in the HNB-GW) using the IMSI. In the CSG environment, the access control is performed by the CN using CSG-id and the white-list on the UE. This leaves the problem of paging filtering. The paging filtering using UE registration, in the legacy system (i.e. pre-CSG UE/HNB), is triggered by HNB using the IMSI as the identity. Some embodiments modify the UE registration to allow UE registration using the {TMSI/P-TMSI, LAC} as temporary UE identity (Note: LAC is required since TMSI is unique within given LAC only and 2 simultaneous UE registration must be handled). The NAS message triggering UE registration (LAU or CSG Update) will result in the RANAP Common-Id procedure being sent by the CN towards the HNB-GW and will include the IMSI. This allows the HNB-GW to associate the UE context (created at UE registration using a temporary identity, such as (P)TMSI, with the particular IMSI. Subsequent paging can be filtered at the HNB-GW using the IMSI stored in the UE context.

Figure 34:
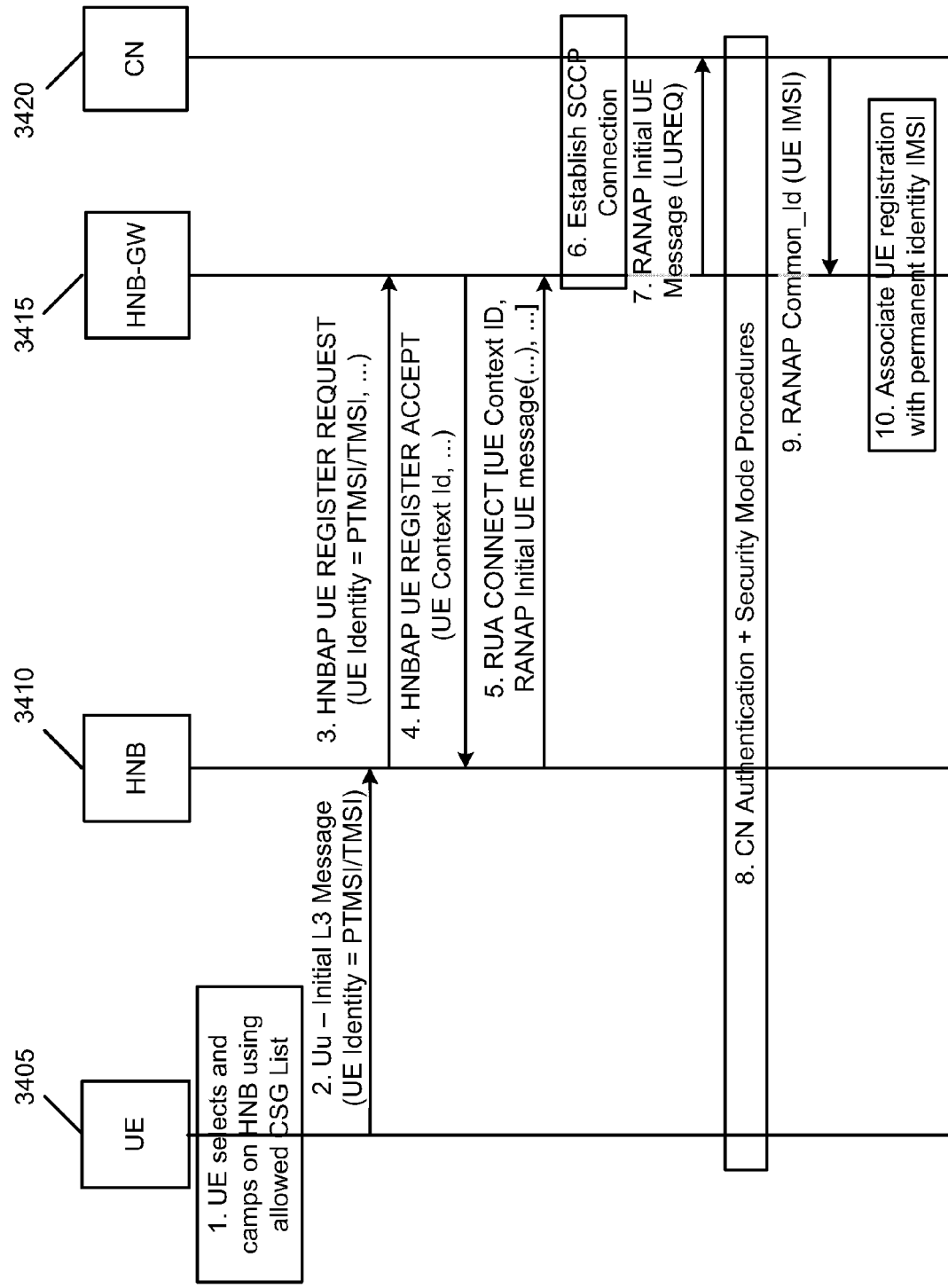
FIG. 34 illustrates a procedure for the HNB-GW to allow UE registration using temporary identity in some embodiments.

FIG. 34 illustrates a procedure for the HNB-GW to allow UE registration using temporary identity (e.g. TMSI or PTMSI) in some embodiments. The HNB-GW subsequently receives the permanent identity from the core network (CN) and associates the above said UE registration with the permanent identity i.e. IMSI of the UE.

As shown, UE 3405 selects (at step 1) and camps on the HNB 3410 using its white-list (or allowed CSG list) and CSG information broadcast by the HNB 3410. The UE 3405 then sends (at step 2) an initial NAS (L3) message towards the HNB 3410 (e.g. LAU request or Page response) containing only a temporary UE identity such as the TMSI (CS domain) or PTMSI (PS domain). The HNB 3410 initiates (at step 3) a UE registration towards the HNB-GW 3415 with this temporary UE identity without any further identity request from the UE 3405 over the air interface. The HNB-GW 3415 accepts (at step 4) the UE registration using the temporary identity and includes a unique context id in the UE registration accept message. The initial NAS message is forwarded (at steps 5-8) towards the CN 3420 followed by authentication and other normative procedures. The CN 3420 then sends (at step 9) the RANAP Common Id message containing the UE's permanent identity i.e. IMSI. The HNB-GW 3415 then associates (at step 10) the existing UE registration and context Id with the IMSI obtained in this manner.

It should be noted that if the RRC "cell update" (or equivalent) procedure is used instead of NAS level messaging for indication of HNB selection by the CSG UE, then IMSI cannot be obtained from the CN. This would then require that the HNB perform an identity request or require that the CSG UE include the IMSI in the RRC "cell update" (or equivalent) procedure.

2. Inclusion of CSG-id in the Page Message from CN

As described in Section III.F.4.b, the CN is able to access the allowed CSG list (i.e. white-list) of a particular UE (i.e. subscriber). By including target CSG-Id (i.e., the Allowed CSG list, white-list, CSG identity, etc.) in the Page message from the CN, the HNB-GW can send the page to the correct HNB, and IMSI becomes a non-issue. However, this mechanism does require modification to existing RANAP Page messages from the CN. Additionally, the CN may be required to include the CSG-Id conditionally towards the HNB-GW and never towards a macro RNC.

5. UE Rove Out

Figure 35:
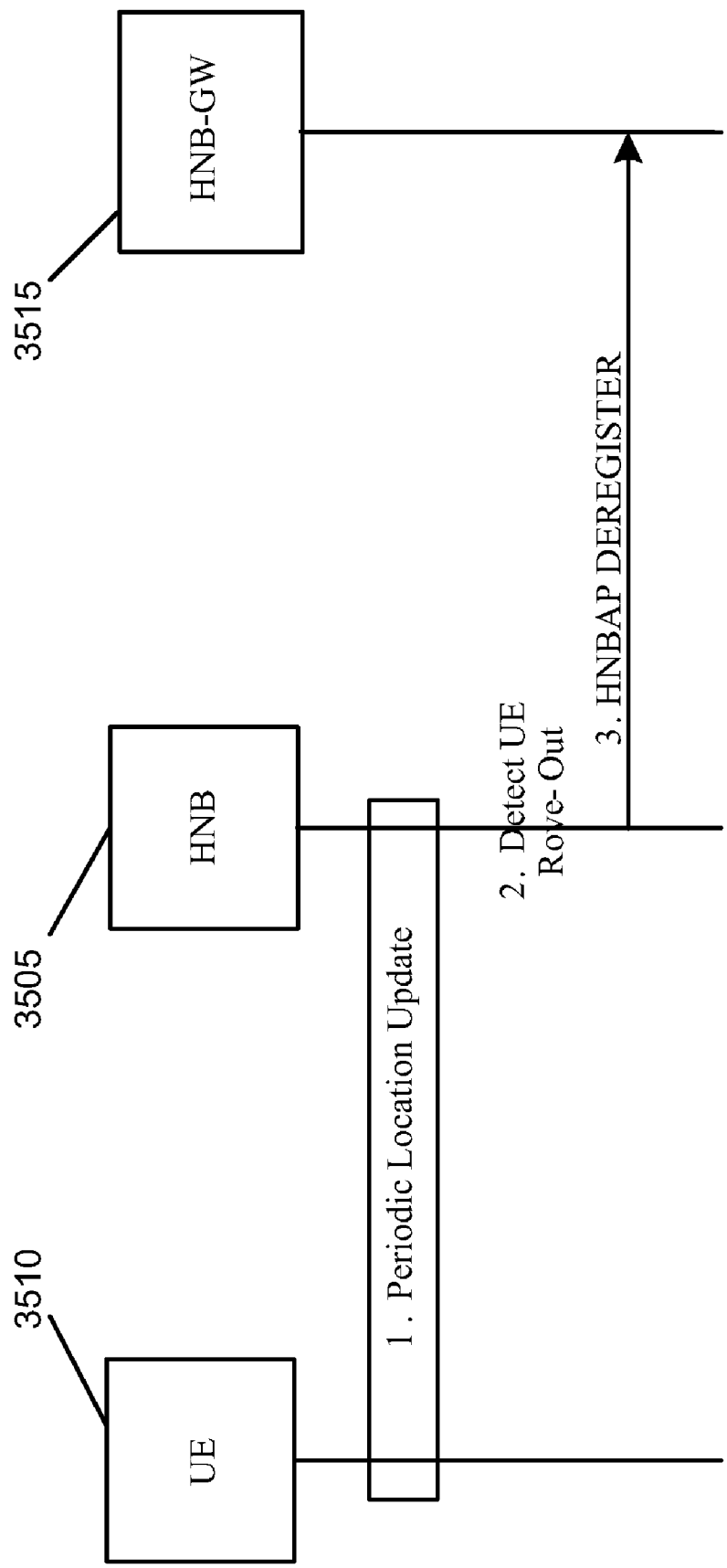
FIG. 35 illustrates the UE rove out procedure, where the UE leaves the HNB coverage area while idle in some embodiments.

FIG. 35 illustrates the UE rove out procedure, where the UE leaves the HNB coverage area while idle, in some embodiments. As shown, upon successful UE registration/LAU of the UE 3510, the HNB 3505 will monitor (at step 1) the UE 3510 via periodic location updates. The enabling and the periodicity of the LU are controlled by the HNB 3505 via System Information broadcast from the HNB 3505 to the UE 3510. This exchange will serve as a keep-alive between the HNB 3505 and the UE 3510. The HNB 3505 determines (at step 2) that the UE 3510 is no longer camped on the HNB 3505 (roved out), as a result of missing number of periodic location updates from the UE 3510. The HNB 3505 will inform (at step 3) the HNB-GW 3515 that the UE 3510 has moved out of the HNB coverage area by sending a HNBAP DEREGISTER message. The HNB-GW 3515 will remove any associated UE context upon receiving the deregister message for the UE 3510.

6. UE Power Down with IMSI Detach

Figure 36:
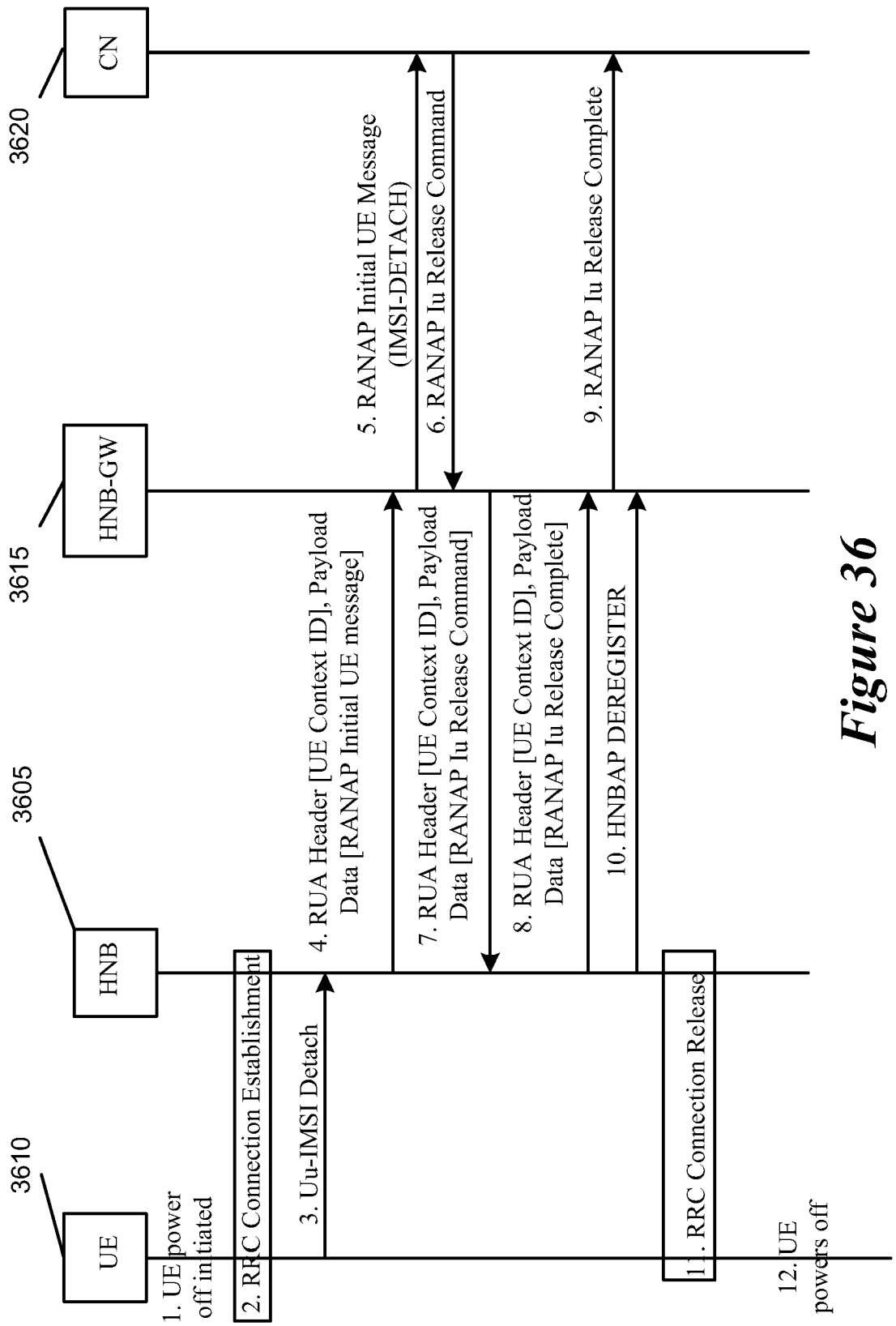
FIG. 36 illustrates the case when the UE powers down and performs an IMSI detach via the HNB access network in some embodiments.

FIG. 36 illustrates the case when the UE powers down and performs an IMSI detach via the HNB access network, in some embodiments. In some such embodiments, the UE 3610 in idle mode initiates (at step 1) the power off sequence. The UE 3610 establishes (at step 2) an RRC Connection with the HNB 3605. The UE 3610 sends (at step 3) an MM Layer IMSI-Detach message over the air interface to the HNB 3605. The HNB 3605 sends (at step 4) the RANAP encapsulated IMSI-Detach NAS PDU message along with the RUA header information to the HNB-GW 3615. The HNB-GW 3615 establishes (at step 5) an SCCP connection to the CN 3620 and forwards the IMSI-Detach NAS PDU to the CN 3620 using the RANAP Initial UE Message.

The CN 3620 initiates (at step 6) a normal resource cleanup via RANAP Iu Release Command to the HNB-GW 3615. The HNB-GW 3615 forwards (at step 7) the RANAP Iu Release Command message encapsulated in the RUA to the HNB 3605. The HNB 3605 acknowledges (at step 8) resource cleanup via RUA encapsulated RANAP Iu Release Complete message to the HNB-GW 3615. The HNB-GW 3615 forwards (at step 9) the RANAP Iu Release Complete message to the CN 3620.

The HNB 3605 triggers (at step 10) deregistration for the specific UE 3610 by sending a corresponding HNBAP DEREGISTER message to the HNB-GW 3615. The HNB 3605 detects that the UE 3610 has roved and triggers the UE deregistration. As an optimization, the HNB 3605 can also monitor the IMSI-Detach NAS message from the UE 3610 and trigger deregistration of the UE 3610. The HNB 3605 initiates (at step 11) RRC Connection release procedure towards the UE 3610 and the UE 3610 powers off (at step 12).

7. UE Power Down without IMSI Detach

The sequence of events is same as UE Roving out of HNB as described above in with reference to FIG. 36.

8. Loss of Iuh Interface IP Connectivity

Figure 37:
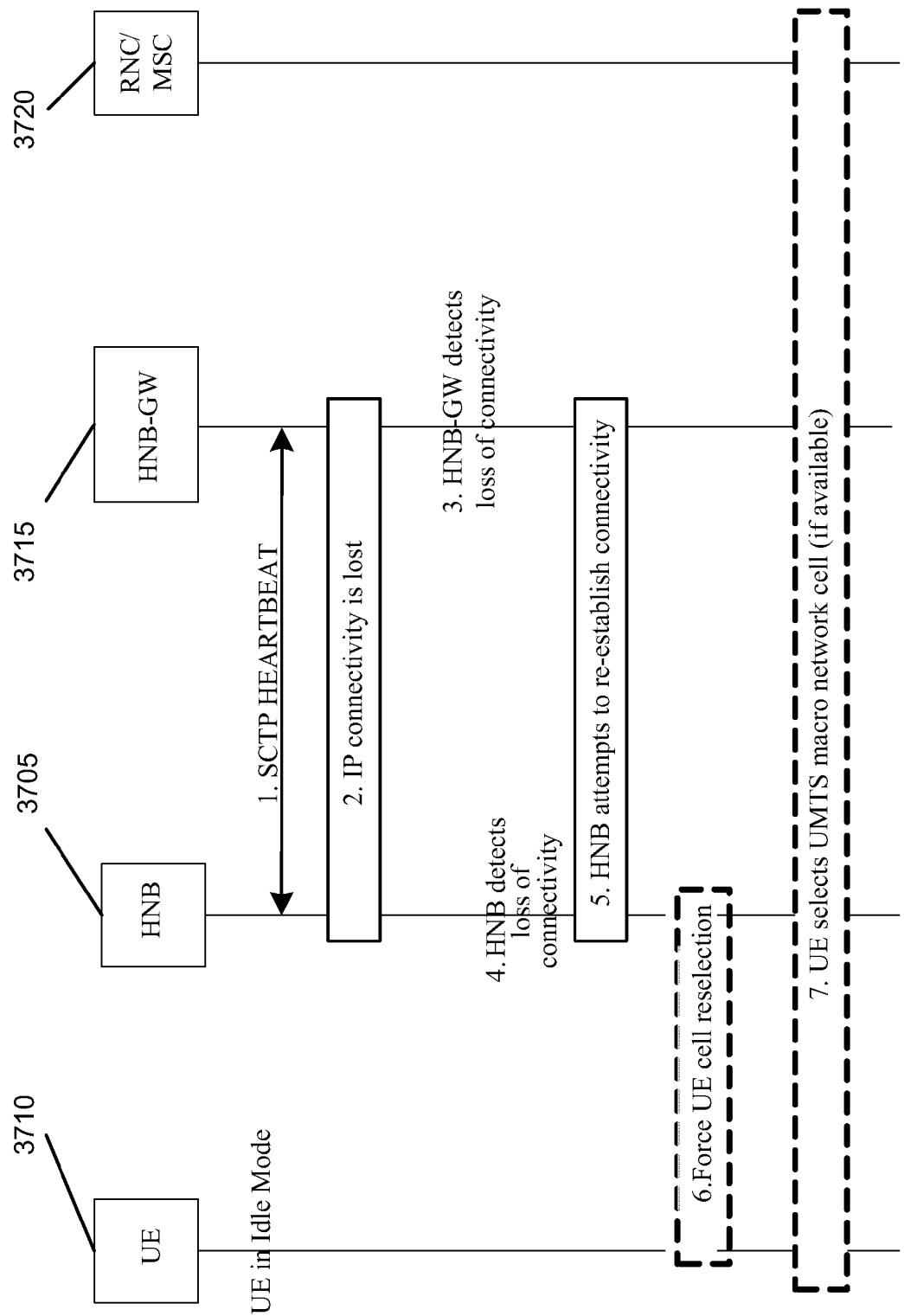
FIG. 37 illustrates the loss of Iuh interface capacity for the HNB in some embodiments.

FIG. 37 illustrates the loss of Iuh interface capacity for the HNB, in some embodiments. As shown, the SCTP instance on the HNB 3705 periodically sends (at step 1) a SCTP HEARTBEAT message to the HNB-GW 3715 to check that the SCTP connection exists. IP connectivity between the HNB 3705 and HNB-GW 3715 is lost (at step 2) (e.g., due to a broadband network problem). If the HNB-GW 3715 detects the loss of connectivity, it releases (at step 3) the resources assigned to the HNB 3705 (e.g., SCTP connection) and deletes the subscriber record (i.e., performs a local deregistration of the HNB 3705). Optionally, the HNB-GW implementation deletes UE specific sessions and contexts originating from that particular HNB.

If the HNB 3705 detects (at step 4) the loss of SCTP connectivity, it attempts (at step 5) to re-establish the SCTP connection and re-register with the HNB-GW 3715. Should the HNB 3705 re-establish connectivity and re-register before the HNB-GW 3715 detects the problem, the HNB-GW 3715 must recognize that the HNB 3705 is already registered and adjust accordingly (e.g., release the old SCTP connection resources).

If the HNB 3705 is unsuccessful in re-establishing connectivity to the HNB-GW 3715, the HNB 3705 will implicitly deregister (at step 6) all the UEs 3710 currently camped on the HNB 3705. Additionally, the HNB 3705 must force all the UEs 3710, currently camped on that HNB 3705, to do a cell-reselection and rove out of HNB coverage. The UE 3710, as a result of the cell re-selection, will switch (at step 7) to UMTS macro cell (if UMTS macro network coverage is available).

9. HNB-GW-Initiated Deregister

In some embodiments, the HNB-GW deregisters the HNB when (1) the HNB-GW receives an HNBAP REGISTER UPDATE UPLINK message, but the HNB is not registered, (2) the HNB-GW receives an HNBAP REGISTER UPDATE UPLINK message, but encounters a resource error and cannot process the message, or (3) the HNB-GW receives an HNBAP REGISTER UPDATE UPLINK message with new macro network cell information, and the macro cell is HNB-restricted. In some embodiments, the HNB-GW will deregister the UE if it receives an HNBAP SYNCHRONIZATION INFORMATION message for a UE that is not registered. In some embodiments, the updates from the HNB may be indicated by the HNB sending another HNBAP REGISTER REQUEST over the same SCTP transport where it is already registered.

10. HNB-Initiated Register Update

Figure 38:
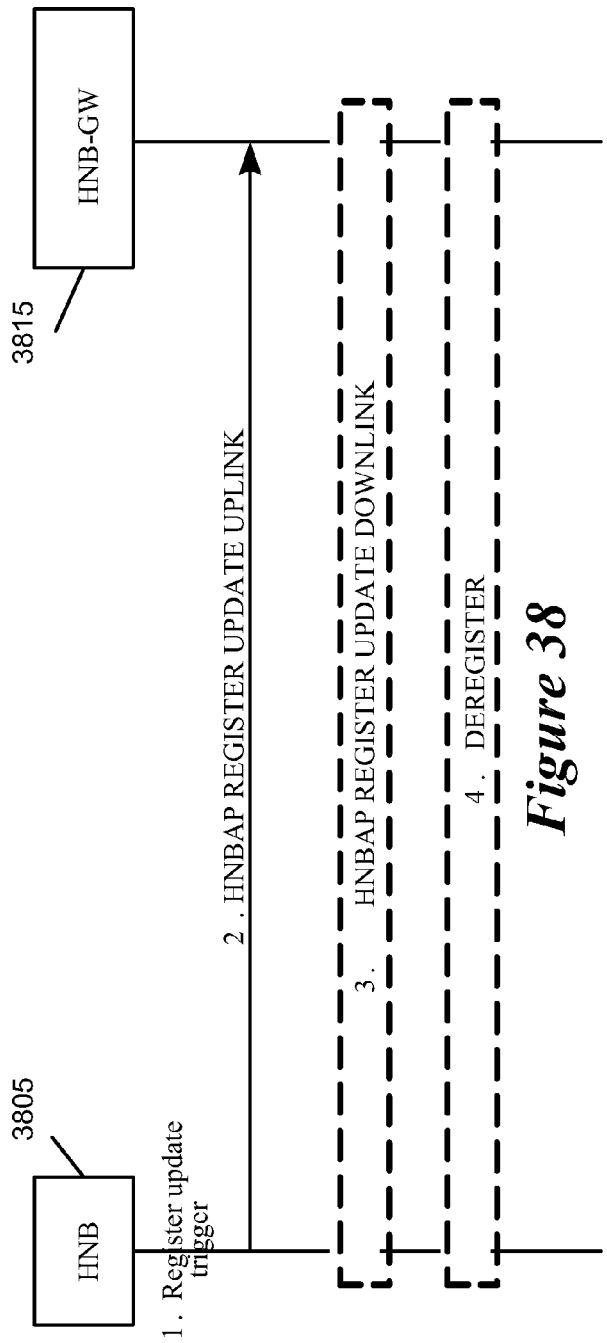
FIG. 38 illustrates an HNB-initiated register update between the HNB and HNB-GW in some embodiments.

FIG. 38 illustrates an HNB-initiated register update between the HNB and HNB-GW, in some embodiments. As shown, a register update is triggered (at step 1) in the HNB 3805 (e.g., change of macro network coverage). The HNB 3805 sends (at step 2) HNBAP REGISTER UPDATE UPLINK to the HNB-GW 3815. The HNB-GW 3815 may optionally send (at step 3) HNBAP REGISTER UPDATE DOWNLINK message if there is a change in system information for the HNB 3805 due to updated macro information (e.g., change in Iu interface parameters such as LAI, etc. due to updated macro information). Optionally, the HNB-GW 3815 may trigger (at step 4) the deregistration procedure as described in the subsection above. In some embodiments, the updates from the HNB may be indicated by the HNB sending another HNBAP REGISTER REQUEST over the same SCTP transport where it is already registered.

11. HNB-GW-Initiated Register Update

Figure 39:
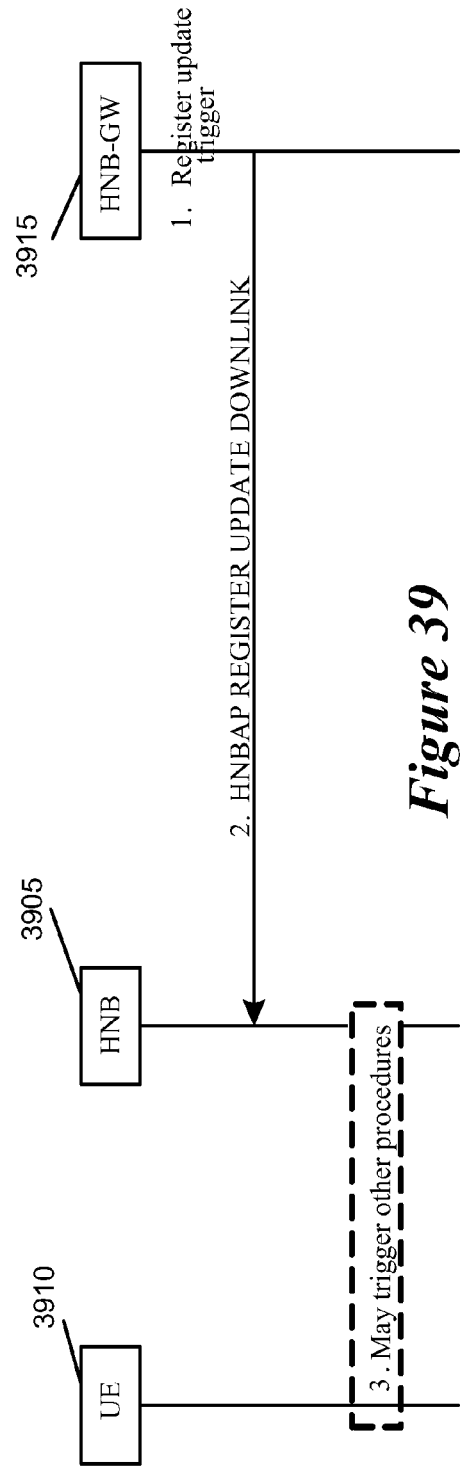
FIG. 39 illustrates the HNB-GW-initiated registration update between the HNB and HNB-GW in some embodiments.

FIG. 39 illustrates the HNB-GW-initiated registration update between the HNB and HNB-GW, in some embodiments. A register update is triggered (at step 1) in the HNB-GW 3915 (e.g., due to change in access control list or closed user group for the HNB, or change in System Information such as LAI, RNC-Id, etc). The HNB-GW 3915 sends (at step 2) HNBAP REGISTER UPDATE DOWNLINK to the HNB 3905. In some embodiments, the HNBAP REGISTER UPDATE DOWNLINK message triggers (at step 3) an additional procedure. For example, the HNB rejects UEs due to updated access control or a closed user group list received from the HNB-GW. In some embodiments, the updates from the HNB-GW may be forced by the HNB-GW by sending a HNBAP DEREGISTER message and subsequently re-registrating the HNB.

12. Relocation a. Relocation—CS Relocation from HNB to UTRAN Target

Figure 40:
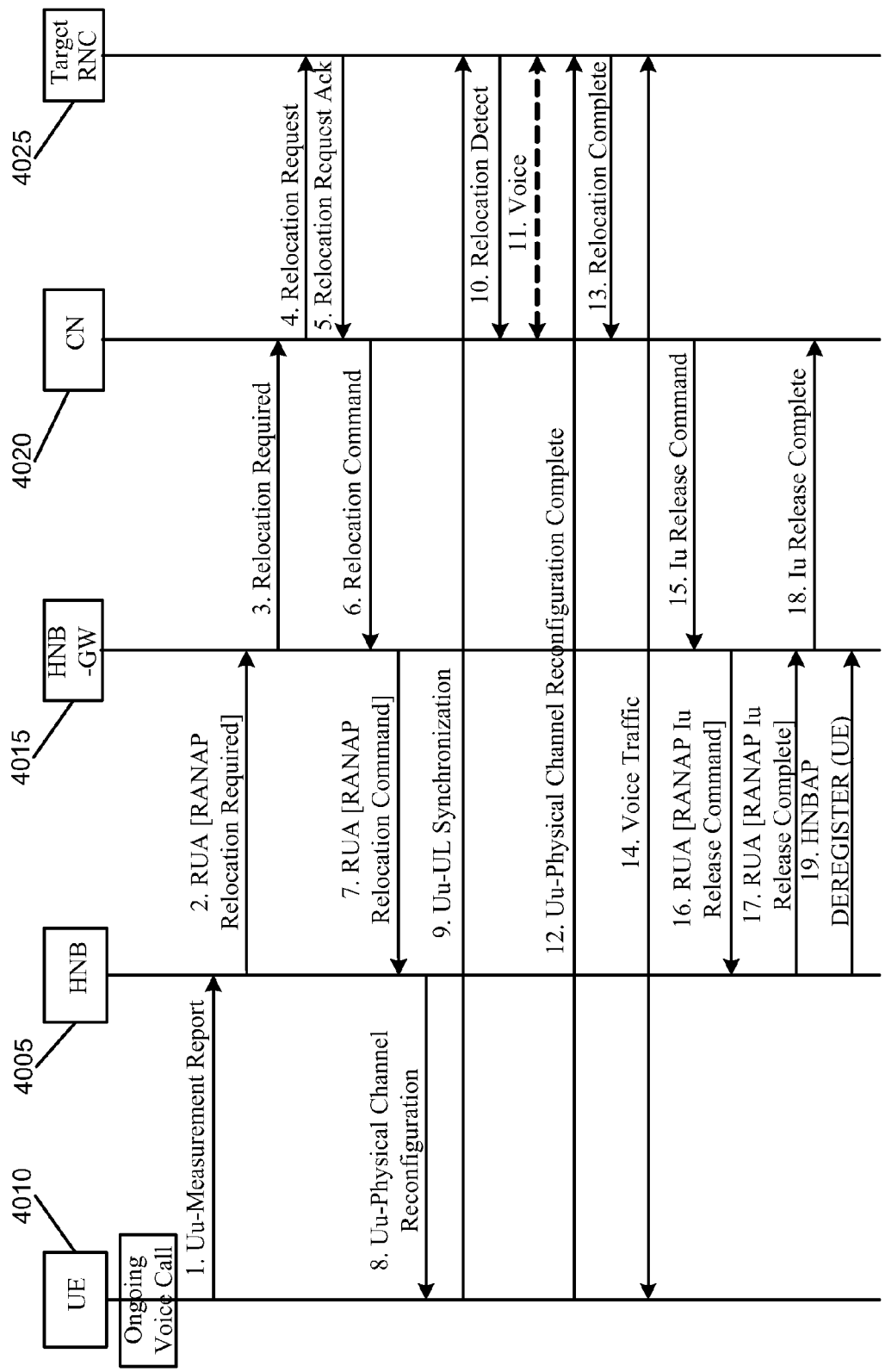
FIG. 40 illustrates the CS Handover from HNB to UTRAN in some embodiments.

FIG. 40 illustrates the CS Handover from HNB to a UTRAN cell, in some embodiments. This figure includes HNB 4005, UE 4010, HNB-GW 4015, CN 4020, and RNC 4025. In some embodiments, this procedure is performed when the UE 4010 is on an active call on the HNB 4005 and has been ordered (by the HNB 4005) to make measurements on neighboring macro UTRAN cells. In addition, it is assumed, the HNB 4005 is able to derive the neighbor list configuration (for example, by using a scan of its neighbor cells or be provisioned by the HNB management system) and the HNB 4005 is able to distinguish other neighboring HNBs from the macro cells. In some embodiments, the HNB 4005 is able to retrieve from the HNB-GW 4015 (using HNBAP registration procedures) the target RNC-Id information for each of the neighbor cells. In some other embodiments, the target RNC-Id mapping is obtained from the HNB Management system during HNB initialization.

As shown, the UE 4010 sends (at step 1) periodic Measurement Reports (Signal Measurements) to the HNB 4005. The handover may be triggered as a result of the UE Measurement Reports indicating better signal strength on a neighboring macro cell. The HNB 4005 makes a decision (at step 2) on handover (e.g., based on the Measurement Reports from the UE 4010 or any uplink quality indications received from the HNB-GW 4015) and selects a target UTRAN cell. The HNB 4005 then sends RANAP Relocation Required messages encapsulated in the RUA header to the HNB-GW 4015. This message would carry the necessary information such as the target cell id necessary to communicate with the CN 4020 and target UTRAN system (here, the RNC 4025). The HNB-GW 4015 relays (at step 3) the RANAP Relocation Required messages to the CN entity in the appropriate domain (using the domain indicator from the RUA header).

The CN 4020 starts (at step 4) the handover procedure towards the target RNC 4025 identified by the Target-Id in the Relocation Required message from the HNB-GW 4015. The CN 4020 requests that the target RNC 4025 allocate the necessary resources using a Relocation Request message. The target RNC 4025 builds (at step 5) a Physical Channel Reconfiguration message providing information on the allocated UTRAN resources and sends it to the CN 4020 through the Relocation Request Acknowledge message. The CN 4020 signals (at step 6) the HNB-GW 4015 to handover the UE 4010 to the UTRAN, using a Relocation Command message (which includes the Physical Channel Reconfiguration message), ending the handover preparation phase.

The HNB-GW 4015 relays (at step 7) the RANAP Relocation Command message to the HNB 4005 with the appropriate RUA header information. The HNB 4005 extracts (at step 8) the Physical Channel Reconfiguration message and sends it to the UE 4010 over the Uu interface. The UE 4010 performs (at step 9) a handover into the new cell via uplink synchronization to the target RNS on the Uu interface. The target RNC 4025 confirms (at step 10) the detection of the handover to the CN 4020, using the Relocation Detect message. The CN 4020 may at this point switch (at step 11) the user plane to the target RNS.

Upon completion of synchronization with the target RNS, the UE 4010 signals (at step 12) completion of handover using the Physical Channel Reconfiguration Complete message. The target RNC 4025 confirms (at step 13) handover completion by sending the Relocation Complete message to the CN 4020. Bi-directional voice traffic is now flowing (at step 14) between the UE 4010 and CN 4020, via the UTRAN.

On receiving the confirmation of the completion of the handover, the CN 4020 indicates (at step 15) to the HNB-GW 4015 to release any resources allocated to the UE 4005, via the Iu Release Command. The HNB-GW 4015 relays (at step 16) the RANAP Iu Release Command message to the HNB 4005. The HNB 4005 confirms (at step 17) UE specific resource release using the RUA encapsulated RANAP Iu Release Complete message to the HNB-GW 4015. The HNB-GW 4015 confirms (at step 18) resource release to the CN 4020 using the Iu Release Complete message. Additionally, the HNB-GW 4015 may also release any local resources for the specific UE (e.g., ATM resources reserved for the voice bearer, etc). The HNB 4005 deregisters (at step 19) the UE 4010 from the HNB-GW 4015, using an explicit HNBAP DEREGISTER message.

b. Relocation—CS Relocation from HNB to GERAN Target

Figure 41:
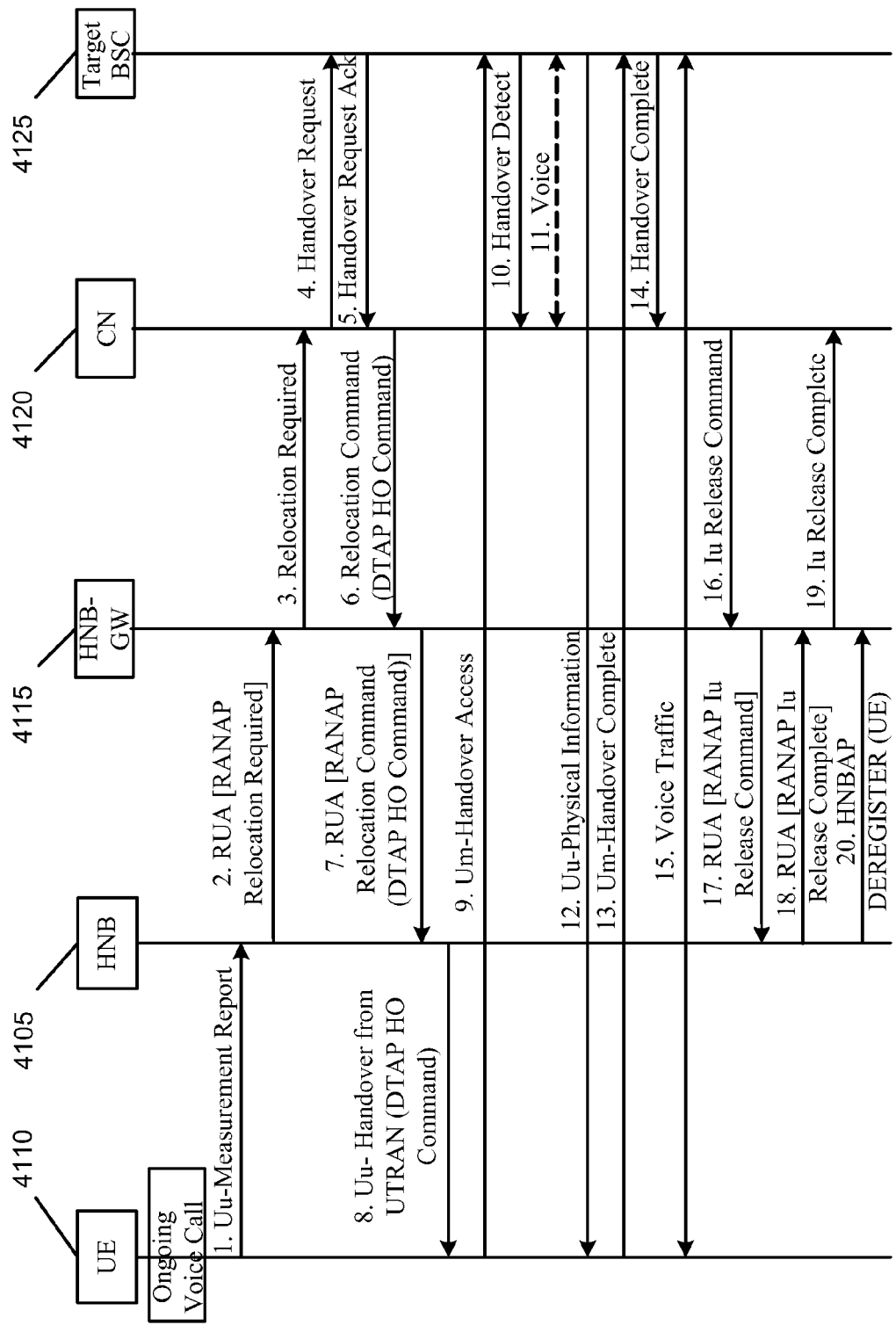
FIG. 41 illustrates the CS handover from HNB to GERAN procedure in some embodiments.

FIG. 41 illustrates the CS handover from HNB to GERAN procedure, in some embodiments. This figure includes HNB 4105, UE 4110, HNB-GW 4115, CN 4120, and the (target) BSC 4125. The description of the procedures in this clause assume the UE 4110 is on an active call on the HNB 4105 and has been ordered (by the HNB 4105) to make inter RAT measurements on neighboring GSM cells. It is also assumed the HNB 4105 is able to derive the neighbor list configuration (using a scan of its neighbor cells). In some embodiments, the HNB 4105 is able to distinguish other neighboring HNBs from the macro cells.

As shown, the UE 4110 sends (at step 1) a periodic Measurement Report (Signal Measurement) to the HNB 4105. The handover is triggered as a result of the UE Measurement Reports indicating better signal strength on neighboring macro GSM cell.

The HNB 4105 makes a decision on handover (e.g., based on the Measurement Reports from the UE 4110 or any uplink quality indications received from the HNB-GW 4115) and selects a target GERAN cell. The HNB 4105 then sends (at step 2) a RANAP Relocation Required messages encapsulated in the RUA header to the HNB-GW 4115. This message would carry the necessary information such as the target CGI necessary to communicate with the CN 4120 and target GERAN system (here the BSC 4125). The HNB-GW 4115 relays (at step 3) the RANAP Relocation Required messages to the CN entity in the appropriate domain (using the domain indicator from the RUA header).

The CN 4120 starts (at step 4) the handover procedure towards the target GERAN (again, here the BSC 4125) identified by the Target-Id (i.e., CGI) in the Relocation Required message from the HNB-GW 4115. The CN 4120 requests the BSC 4125 to allocate the necessary resources using Handover Request. The BSC 4125 builds (at step 5) a Handover Command message providing information on the channel allocated and sends it to the CN 4120 through the Handover Request Acknowledge message. The CN 4120 signals (at step 6) the HNB-GW 4115 to handover the UE 4110 to the BSC 4125, using Relocation Command message (which includes the DTAP Handover Command message), ending the handover preparation phase.

The HNB-GW 4115 relays (at step 7) the RANAP Relocation Command message to the HNB 4105 with the appropriate RUA header information. The HNB 4105 extracts (at step 8) the DTAP Handover Command message and sends it to the UE 4110 using the Uu: Handover from UTRAN message. The UE 4110 transmits (at step 9) the Um: Handover Access containing the handover reference element to allow the BSC 4125 to correlate this handover access with the Handover Command message transmitted earlier to the CN 4120 in response to the Handover Request.

The BSC 4125 confirms (at step 10) the detection of the handover to the CN 4120, using the Handover Detect message. The CN 4120 may at this point switch (at step 11) the user plane to the target BSS (not shown). The BSC 4125 provides (at step 12) Physical Information to the UE 4110 (i.e., Timing Advance), to allow the UE 4110 to synchronize with the BSC 4125. The UE 4110 signals (at step 13) to the BSC 4125 that the handover is completed, using Handover Complete. The BSC 4125 confirms (at step 14) to the CN 4120 the completion of the handover, via Handover Complete message. In some embodiments, the CN 4120 uses the target CGI used in the Handover procedure for charging purposes. Bi-directional voice traffic is now flowing (at step 15) between the UE 4110 and CN 4120, via the GERAN.

On receiving the confirmation of the completion of the handover, the CN 4120 indicates (at step 16) to the HNB-GW 4115 to release any resources allocated to the UE 4110, via the Iu Release Command. The HNB-GW 4115 relays (at step 17) the RANAP Iu Release Command message to the HNB 4105. The HNB 4105 confirms (at step 18) UE specific resource release using the RUA encapsulated RANAP Iu Release Complete message to the HNB-GW 4115. The HNB-GW 4115 relays (at step 19) the RANAP Iu Release Complete message to the CN 4120. The HNB 4105 deregisters (at step 20) the UE 4110 from the HNB-GW 4115, using an explicit HNBAP DEREGISTER message.

c. Relocation—PS Relocation from HNB to UTRAN Target

Figure 42:
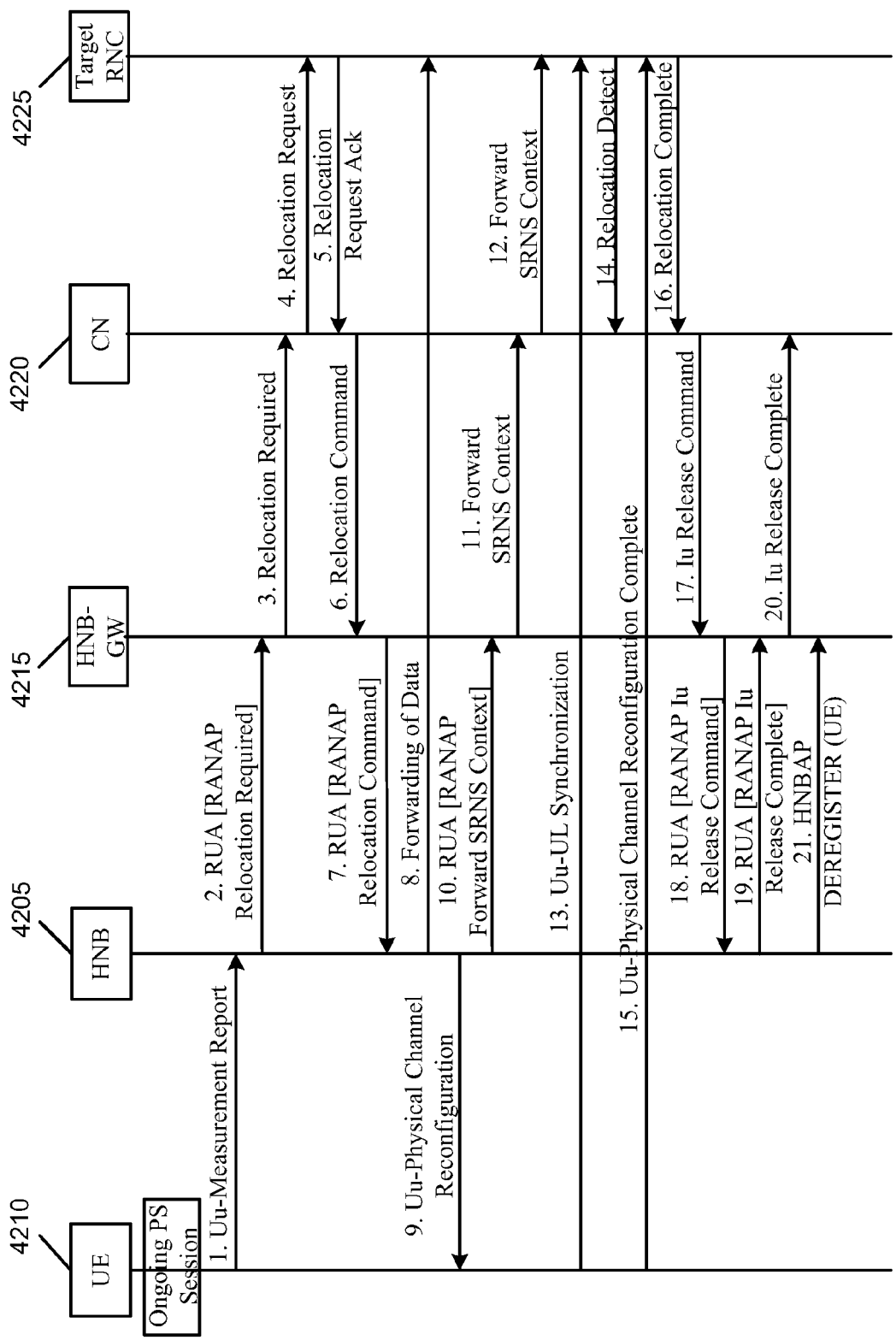
FIG. 42 illustrates the PS Handover from HNB to UTRAN in some embodiments.

FIG. 42 illustrates the PS Handover from HNB to UTRAN, in some embodiments. This figure includes HNB 4205, UE 4210, HNB-GW 4215, CN 4220, and the (target) RNC 4225. In some embodiments, the UE 4210 is on an active call on the HNB 4205 and the UE 4210 has been ordered (by the HNB 4205) to make measurements on neighboring macro UTRAN cells. In addition, the HNB 4205 is able to derive the neighbor list configuration (using a scan of its neighbor cells) and the HNB 4205 is able to distinguish other neighboring HNBs from the macro cells. In some embodiments, the HNB 4205 is able to retrieve from the HNB-GW 4215 (using HNBAP registration procedures) the target RNC-Id information for each of the neighbor cells. In some other embodiments, the target RNC-Id mapping can also be obtained from the HNB Management system during HNB initialization.

As shown, the UE 4210 sends (at step 1) a periodic Measurement Report (Signal Measurement) to the HNB 4205. The handover is triggered as a result of the UE Measurement Reports indicating better signal strength on a neighboring macro cell. The HNB 4205 makes a decision to handover based on the Measurement Reports from the UE 4210 and selects a target UTRAN cell (here, the RNC 4225). The HNB 4205 then sends (at step 2) a RANAP Relocation Required messages encapsulated in the RUA header to the HNB-GW 4215. This message would carry the necessary information such as the target cell id necessary to communicate with the CN 4220 and the RNC 4225. The HNB-GW 4215 relays (at step 3) the RANAP Relocation Required messages to the CN entity in the appropriate domain (using the domain indicator from the RUA header).

The CN 4220 starts (at step 4) the handover procedure towards the RNC 4225 identified by the Target-Id in the Relocation Required message from the HNB-GW 4215. The CN 4220 requests from the RNC 4225 to allocate the necessary resources using Relocation Request. The RNC 4225 builds (at step 5) a Physical Channel Reconfiguration message providing information on the allocated UTRAN resources and sends it to the CN 4220 through the Relocation Request Acknowledge message. The CN 4220 signals (at step 6) the HNB-GW 4215 to handover the UE 4205 to the RNC 4225, using a Relocation Command message (which includes the Physical Channel Reconfiguration message), ending the handover preparation phase. The HNB-GW 4215 relays (at step 7) the RANAP Relocation Command message to the HNB 4205 with the appropriate RUA header information. The order of steps from Step 8 onwards doesn't necessarily indicate the order of events. For example, steps 8 to 10 may be performed by the HNB 4205 almost simultaneously. The HNB 4205 may begin (at step 8) forwarding the data for the radio access bearers (RABs) which are subject to data forwarding. For each radio bearer which uses lossless PDCP, the GTP-PDUs related to transmitted but not yet acknowledged PDCP-PDUs are duplicated and routed at an IP layer towards the target RNC 4225 together with their related downlink PDCP sequence numbers. The HNB 4205 continues transmitting duplicates of downlink data and receiving uplink data.

The HNB 4205 extracts (at step 9) the Physical Channel Reconfiguration message and sends it to the UE 4210 over the Uu interface. The HNB 4205 sends (at step 10) a RANAP Forward SRNS Context message to the HNB-GW 4215 to transfer the SRNS contexts to the RNC 4225 via HNB-GW 4215. The HNB-GW 4215 relays (at step 11) the corresponding Forward SRNS Context message to the associated CN node.

The CN 4220 relays (at step 12) the SRNS Context information to the RNC 4225. The UE 4210 performs (at step 13) a handover into the new cell via uplink synchronization to the target RNS on the Uu interface. The RNC 4225 confirms (at step 14) the detection of the handover to the CN 4220, using the Relocation Detect message. Upon completion of synchronization with the target RNS (not shown), the UE 4210 signals (at step 15) completion of handover using the Physical Channel Reconfiguration Complete message.

The RNC 4225 confirms (at step 16) handover completion by sending the Relocation Complete message to the CN 4220. On receiving the confirmation of the completion of the handover, the CN 4220 indicates (at step 17) to the HNB-GW 4215 to release any resources allocated to the UE 4210, via the Iu Release Command. At this point, the CN 4220 will also switch the PS user plane from the HNB-GW 4215 to the target RNS. The HNB-GW 4215 relays (at step 18) the RANAP Iu Release Command message to the HNB 4205. The HNB 4205 confirms (at step 19) UE specific resource release using the RUA encapsulated RANAP Iu Release Complete message to the HNB-GW 4215. The HNB-GW 4215 confirms (at step 20) resource release to the CN 4220 using the Iu Release Complete message. The HNB 4205 deregisters (at step 21) the UE 4210 from the HNB-GW 4215, using an explicit HNBAP DEREGISTER message.

d. Relocation—PS Relocation from HNB to GERAN Target

Figure 43:
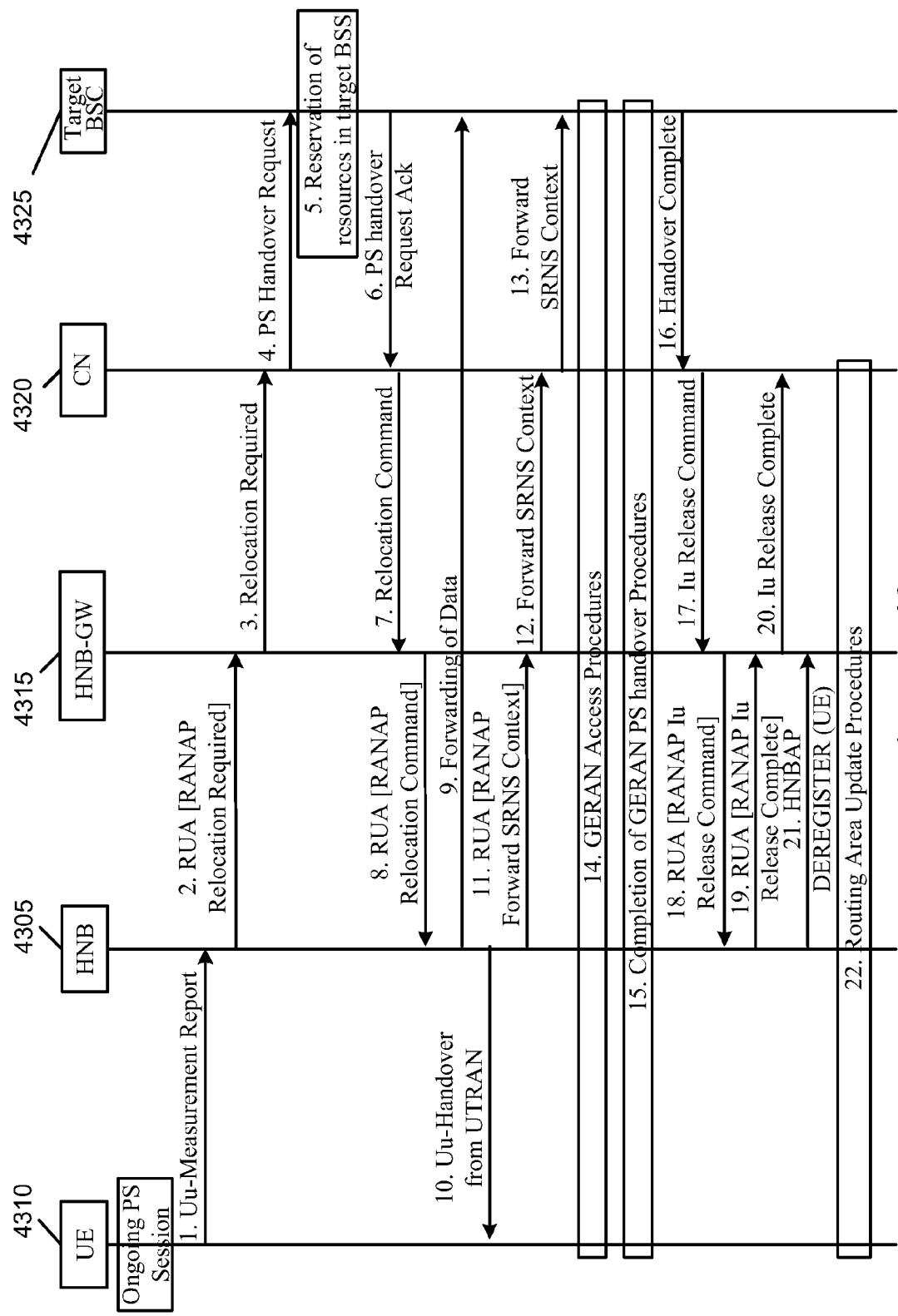
FIG. 43 illustrates the PS handover from HNB to GERAN procedure in some embodiments.

FIG. 43 illustrates the PS handover from HNB to GERAN procedure, in some embodiments. This figure includes HNB 4305, UE 4310, HNB-GW 4315, CN 4320, and BSC 4325. In some embodiments, the UE 4310 is on an active call on the HNB 4305 and has been ordered (by the HNB 4305) to make inter RAT measurements on neighboring GSM cells. Additionally, the HNB 4305 is able to derive the neighbor list configuration (using a scan of its neighbor cells). In some embodiments, the HNB 4305 is able to distinguish other neighboring HNBs from the macro cells.

As shown, the UE 4310 sends (at step 1) a periodic Measurement Report (Signal Measurement) to the HNB 4305. The handover is triggered as a result of the UE Measurement Reports indicating better signal strength on a neighboring GSM cell. The HNB 4305 makes a decision (at step 2) to handover based on the Measurement Reports from the UE 4310 and selects a target GERAN cell (here, the BSC 4325). The HNB 4305 then sends RANAP Relocation Required messages encapsulated in the RUA header to the HNB-GW 4315. This message would carry the necessary information such as the target cell id necessary to communicate with the CN 4320 and target GERAN system. The HNB-GW 4315 relays (at step 3) the RANAP Relocation Required messages to the CN 4320 in the appropriate domain (using the domain indicator from the RUA header).

The CN 4320 (i.e., SGSN) and Target BSS complete (at steps 4-6) the UTRAN to GERAN PS handover preparation as described in 3GPP Technical Specification 43.129 entitled "Packet-switched handover for GERAN A/Gb mode; Stage 2" the contents of which are herein incorporated by reference. The CN 4320 signals (at step 7) the HNB-GW 4315 to handover the UE 4310 to the BSC 4325, using a RANAP Relocation Command message. The HNB-GW 4315 relays (at step 8) the RANAP Relocation Command message to the HNB 4305 with the appropriate RUA header information.

The HNB 4305 may begin forwarding (at step 9) the data for the Radio Access Bearers (RABs) which are subject to data forwarding per the description in 3GPP TS 43.129. The HNB 4305 sends (at step 10) the Handover from UTRAN message and sends it to the UE 4305 over the Uu interface. The HNB 4305 sends (at step 11) a RUA encapsulated RANAP Forward SRNS Context message to the HNB-GW 4315 to transfer the SRNS contexts to the BSC 4325. The HNB-GW 4315 relays (at step 12) the corresponding Forward SRNS Context message to the associated CN node. The CN 4320 relays (at step 13) the SRNS Context information to the BSC 4325. The UE 4310 executes (at step 14) the GERAN A/Gb PS handover access procedures as described in 3GPP TS 43.129.

After successfully accessing the GERAN cell, the UE 4310 and BSC 4325 complete (at step 15) the GERAN PS handover procedures as described in 3GPP TS 43.129. The BSC 4325 confirms (at step 16) handover completion by sending the Handover Complete message to the CN 4320. On receiving the confirmation of the completion of the handover, the CN 4320 indicates (at step 17) to the HNB-GW 4315 to release any resources allocated to the UE 4310, via the Iu Release Command. The HNB-GW 4315 relays (at step 18) the RANAP Iu Release Command message to the HNB 4305.

When the HNB data forwarding timer has expired, the HNB 4305 confirms (step 19) UE-specific resource release using the RUA encapsulated RANAP Iu Release Complete message to the HNB-GW 4315. The HNB-GW 4315 confirms (at step 20) resource release to the CN 4320 using the Iu Release Complete message. The HNB 4305 deregisters (at step 21) the UE 4310 from the HNB-GW 4315, using an explicit HNBAP DEREGISTER message. The UE 4310 performs (at step 22) the Routing Area Update procedures through the BSC 4325.

IV. CALL MANAGEMENT

A. Overview

1. CS User Plane Establishment (ATM Transport)

Figure 44:
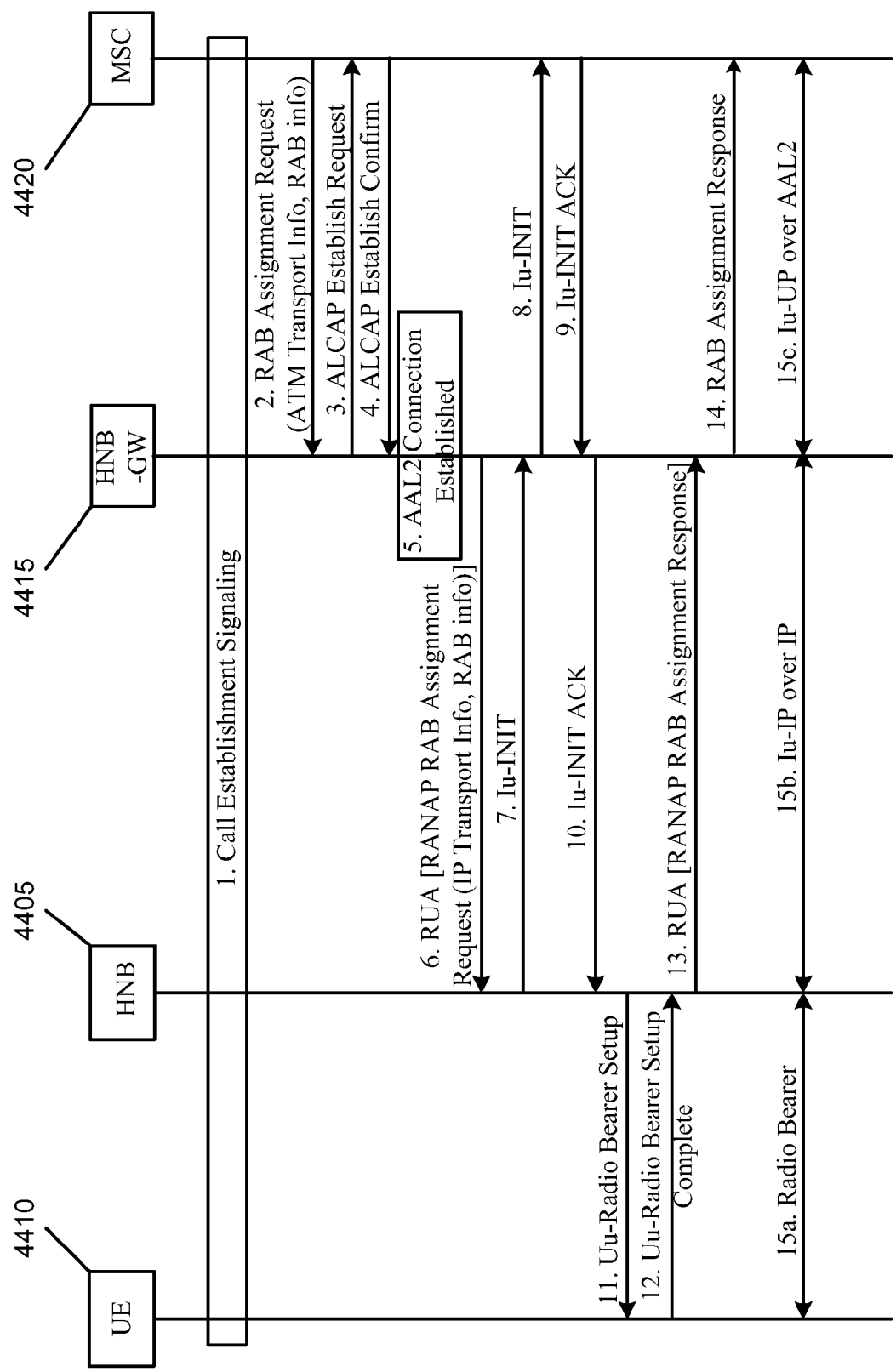
FIG. 44 illustrates CS bearer establishment (ATM transport) procedures (for MO/MT calls, using Iu-UP over AAL2) in some embodiments.

FIG. 44 illustrates CS bearer establishment (ATM transport) procedures (for MO/MT calls, using Iu-UP over AAL2), in some embodiments. In some such embodiments, an ATM interface exists between the HNB-GW 4415 and the MSC 4420.

As shown, signaling for a call origination or termination is in progress (at step 1). The MSC 4420 sends (at step 2) a RAB Assignment Request message to the HNB-GW 4415. The assignment request contains the address for ALCAP signaling (an ATM E.164 or NSAP address) and also the binding-id. The HNB-GW 4415 will initiate (at step 3) ALCAP signaling towards the MSC 4420 using the ATM address and the binding-id. The MSC 4420 acknowledges (at step 4) the AAL2 connection request using the ALCAP Establish confirm message.

At this point an AAL2 connection with appropriate QoS exists (at step 5) between the HNB-GW 4415 and the MSC 4420. The HNB-GW 4415 forwards (at step 6) the RUA encapsulated RANAP RAB Assignment Request message to the HNB 4405 to prepare a bearer connection between the endpoints. The HNB-GW 4415 assigns an IP address and a RTP port for this specific bearer towards the HNB 4405. The HNB-GW 4415 modifies the RANAP RAB Assignment Request message to remove ATM specific transport information and replaces it with the necessary information (e.g., RTP port and IP address of the HNB-GW 4415) for setup of Iu-UP over IP between the HNB 4405 and HNB-GW 4415. The HNB 4405 upon receiving the RANAP RAB Assignment Request message triggers the setup of Iu-UP by sending (at step 7) an Iu-UP Init user plane control message over the specified IP transport to the HNB-GW 4415. The HNB-GW 4415 switches (at step 8) the transport layer and relays the Iu-UP Init message towards the CN (not shown) over the corresponding AAL2 connection which was setup in step 5.

The MSC 4420 responds (at step 9) back to the HNB-GW 4415 with Iu-UP Init Ack message over the corresponding AAL2 connection. The HNB-GW 4415 relays (at step 10) the Iu-UP Init Ack message the HNB 4405 over the corresponding RTP transport. The HNB 4405 will initiate (at step 11) appropriate RRC layer Radio Bearer Setup message towards the UE 4410. The UE 4410 confirms (at step 12) the setup via Radio Bearer Setup Complete message to the HNB 4405.

The HNB 4405 then sends (at step 13) a RUA encapsulated RANAP RAB Assignment Response message to the HNB-GW 4415, including the local IP address and port to be used for the Iu-UP over the Iuh interface. The HNB-GW 4415 replaces (at step 14) the IP transport information with ATM specific transport information and forwards the RANAP RAB Assignment Response message to the CN signaling the completion of RAB assignment. At this point, there is (at steps 15 a-c) CS bearer between the UE 4410 and the MSC 4420 via the HNB 4405 and the HNB-GW MGW. The rest of the call establishment continues.

2. CS User Plane Establishment (IP Transport)

Figure 45:
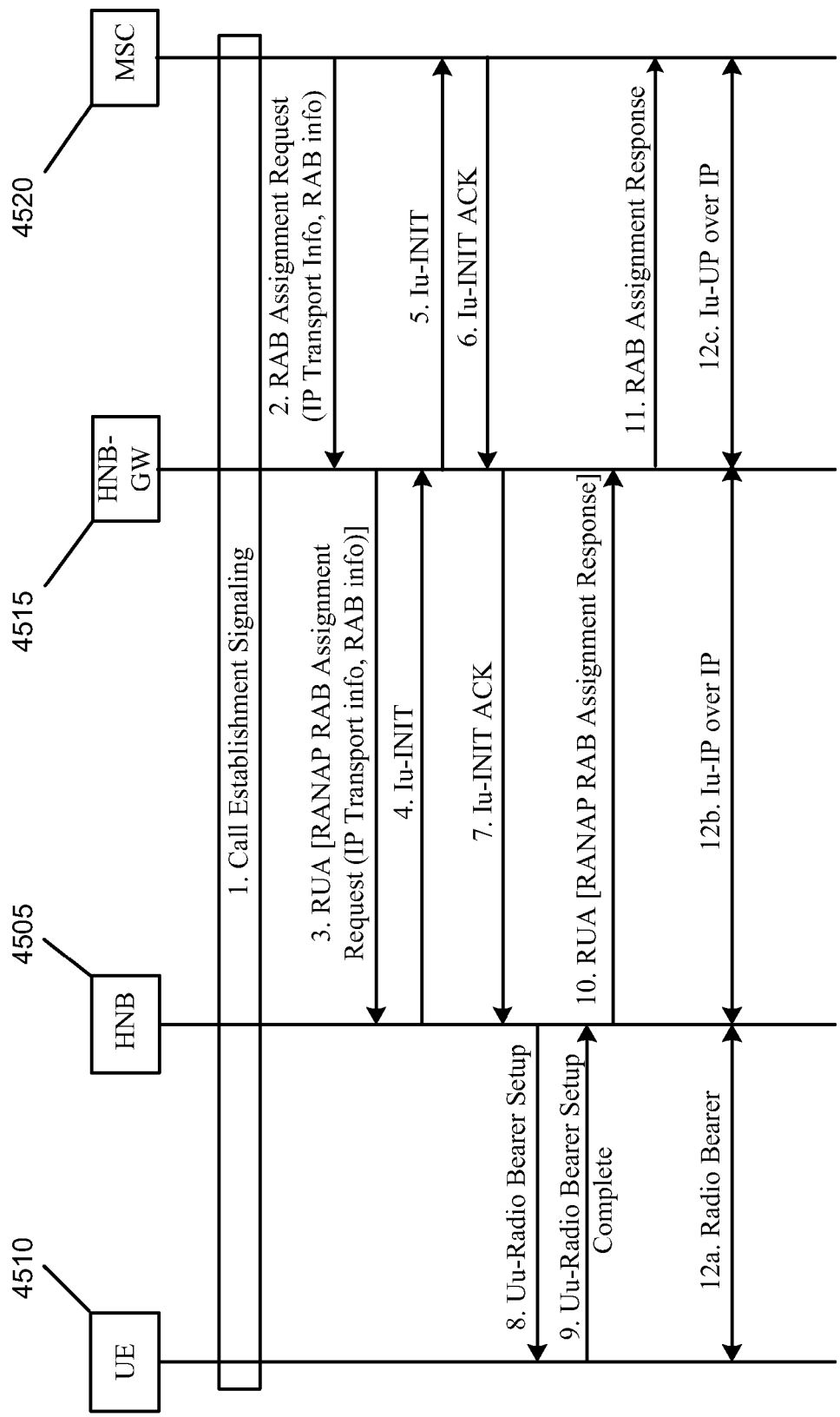
FIG. 45 illustrates CS bearer establishment (IP transport) procedures (for MO/MT calls, using Iu-UP over AAL2) in some embodiments.

FIG. 45 illustrates CS bearer establishment (IP transport) procedures (for MO/MT calls, using Iu-UP over AAL2), in some embodiments. In some such embodiments, an IP interface exists between the HNB-GW 4515 and the MSC 4520.

As shown, signaling for a call origination or termination is in progress (at step 1). The MSC 4520 sends (at step 2) a RAB Assignment Request message to the HNB-GW 4515. The assignment request contains the necessary information for IP based transport setup of the CS bearer. The HNB-GW 4515 forwards (at step 3) the RUA encapsulated RANAP RAB Assignment Request message to the HNB 4505 for preparing a bearer connection between the endpoints. In some embodiments, the HNB-GW 4515 assigns a local IP address of the HNB-GW 4515 and a RTP port for this specific bearer towards the HNB 4505 and modifies the RANAP RAB Assignment Request message to replace the necessary information (e.g., RTP port and IP address of the HNB-GW 4515) for setup of Iu-UP over IP between the HNB 4505 and HNB-GW 4515.

The HNB 4505, upon receiving the RANAP RAB Assignment Request message, triggers (at step 4) the setup of Iu-UP by sending an Iu-UP Init user plane control message over the specified IP transport to the HNB-GW 4515. The HNB-GW 4515 relays (at step 5) the Iu-UP Init message towards the CN (here, MSC 4520) over the corresponding CN IP transport. The MSC 4520 responds (at step 6) back to the HNB-GW 4515 with Iu-UP Init Ack message. The HNB-GW 4515 relays (at step 7) the Iu-UP Init Ack message to the HNB 4505 over the corresponding IP transport. The HNB 4505 will initiate (at step 8) an appropriate RRC layer Radio Bearer Setup message towards the UE 4510. The UE 4510 confirms (at step 9) the setup via a Radio Bearer Setup Complete message to the HNB 4505.

The HNB 4505 then sends (at step 10) a RUA encapsulated RANAP RAB Assignment Response message to the HNB-GW 4515, including the local IP address and port to be used for the Iu-UP over the Iuh interface. The HNB-GW 4515 replaces (at step 11) the IP transport information with local HNB-GW specific transport information and forwards the RANAP RAB Assignment Response message to the CN. The RANAP RAB Assignment Response message signals the completion of RAB assignment. At this point, there is (at steps 12*a-c*) a CS bearer between the UE 4510 and MSC 4520 via the HNB 4505 and the HNB-GW MGW (here, part of 4515). The rest of the call establishment continues.

B. Call Management Services

1. Mobile Originated Call

Figure 46:
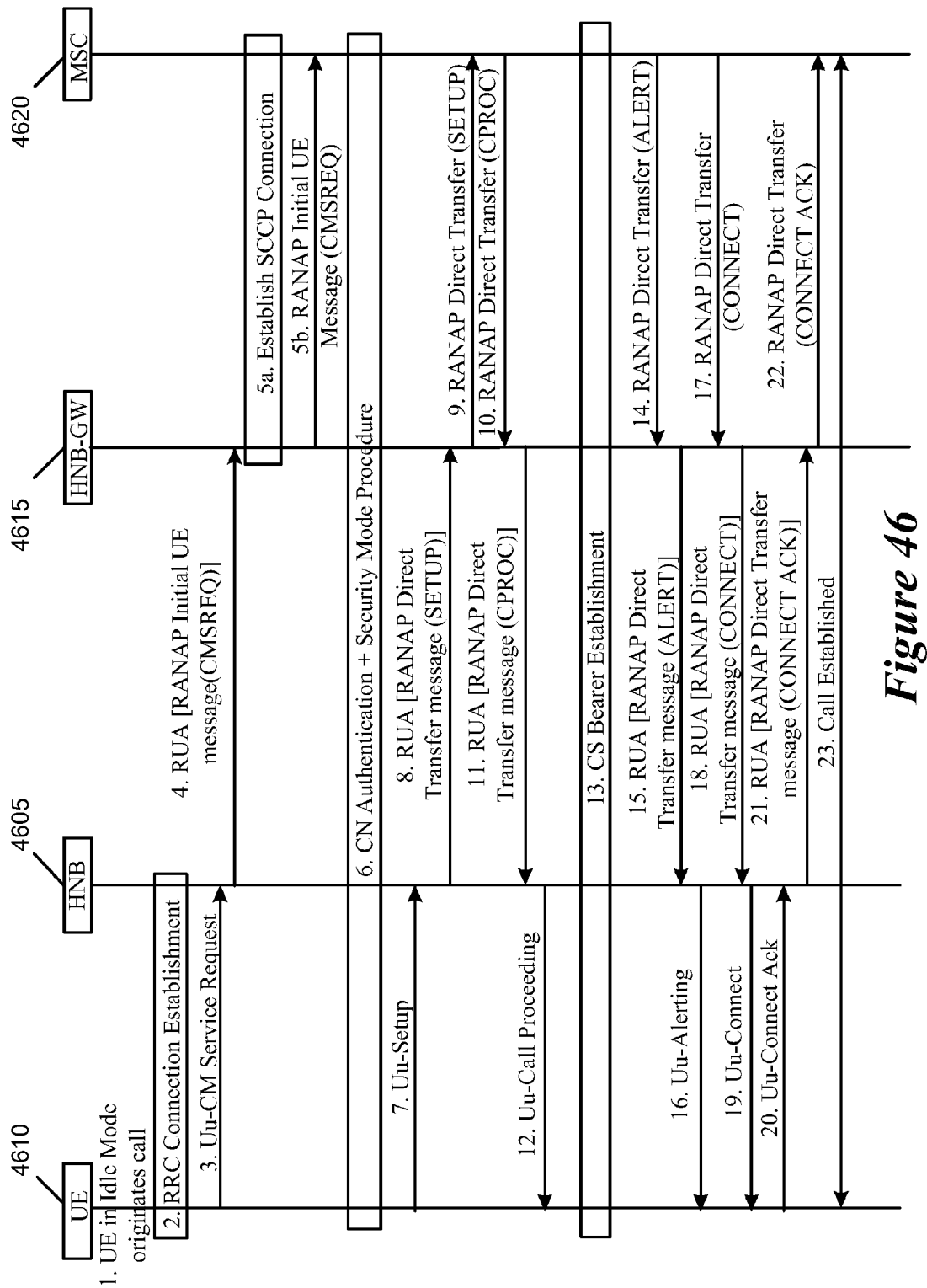
FIG. 46 illustrates a mobile originated call over HNB procedure in some embodiments.

FIG. 46 illustrates a mobile originated call over HNB procedure, in some embodiments. As shown, the UE 4610 in idle mode originates (at step 1) a call. The UE 4610 establishes (at step 2) a RRC connection with the HNB 4605. Upon request from the upper layers, the UE 4610 sends (at step 3) the CM Service Request to the HNB 4605. The HNB 4605 sends (at step 4) a RUA encapsulated RANAP Initial UE Message towards the HNB-GW 4615. In some embodiments, this RUA message can be the RUA Connect message thus indicating to the HNB-GW the initial message for that particular UE signaling.

The HNB-GW 4615 establishes (at steps 5*a-b*) an SCCP connection to the MSC 4620 and forwards the RANAP Initial UE Message to the MSC 4620 over the corresponding SCCP connection. The MSC 4620 authenticates (at step 6) the HNB 4605 using standard UTRAN authentication procedures. The MSC 4620 also initiates the Security Mode Control procedure described in previous sections. The UE 4610 sends (at step 7) the Setup message to the HNB 4605 providing details on the call to the MSC 4620 and its bearer capability and supported codecs. The HNB 4605 forwards (at step 8) this Setup message within the RUA encapsulated RANAP Direct Transfer message to the HNB-GW 4615. The HNB-GW 4615 relays (at step 9) the RANAP Direct Transfer (Setup) message to the MSC 4620.

The MSC 4620 indicates (at step 10) it has received the call setup and it will accept no additional call-establishment information using the Call Proceeding message to the HNB-GW 4615. The HNB-GW 4615 forwards (at step 11) the RUA encapsulated RANAP Direct Transfer (Call Proceeding) message to the HNB 4605. The HNB 4605 relays (at step 12) the Call Proceeding message to the UE 4610 over the air interface. An end to end bearer path is established (at step 13) between the MSC 4620 and UE 4610 using one of the procedures shown in previous sections.

The MSC 4620 signals (at step 14) to the UE 4610, with the Alerting message, that the B-Party is ringing. The message is transferred to the HNB-GW 4615. The HNB-GW 4615 forwards (at step 15) the RUA encapsulated RANAP Direct Transfer (Alerting) message to the HNB 4605. The HNB 4605 relays (at step 16) the Alerting message to the UE 4610 and if the UE 4610 has not connected the audio path to the user, it generates ring back to the calling party. Otherwise, the network-generated ring back will be returned to the calling party. The MSC 4620 signals (at step 17) that the called party has answered, via the Connect message. The message is transferred to the HNB-GW 4615.

HNB-GW 4615 forwards (at step 18) the RUA encapsulated RANAP Direct Transfer (Connect) message to the HNB 4605. The HNB 4605 relays (at step 19) the Connect message to the UE 4610 and the UE 4610 connects the user to the audio path. If the UE 4610 is generating ring back, it stops and connects the user to the audio path. The UE 4610 sends (at step 20) the Connect Ack in response, and the two parties are connected for the voice call. The HNB 4605 forwards (at step 21) this Connect Ack message within the RUA encapsulated RANAP Direct Transfer message to the HNB-GW 4615. The HNB-GW 4615 forwards (at step 22) the Connect Ack message to the MSC 4620. The end-to-end two way path is now in place and bi-directional voice traffic flows (at step 23) between the UE 4610 and MSC 4620 through the HNB 4605 and the HNB-GW 4615.

2. Mobile Terminated Call

Figure 47:
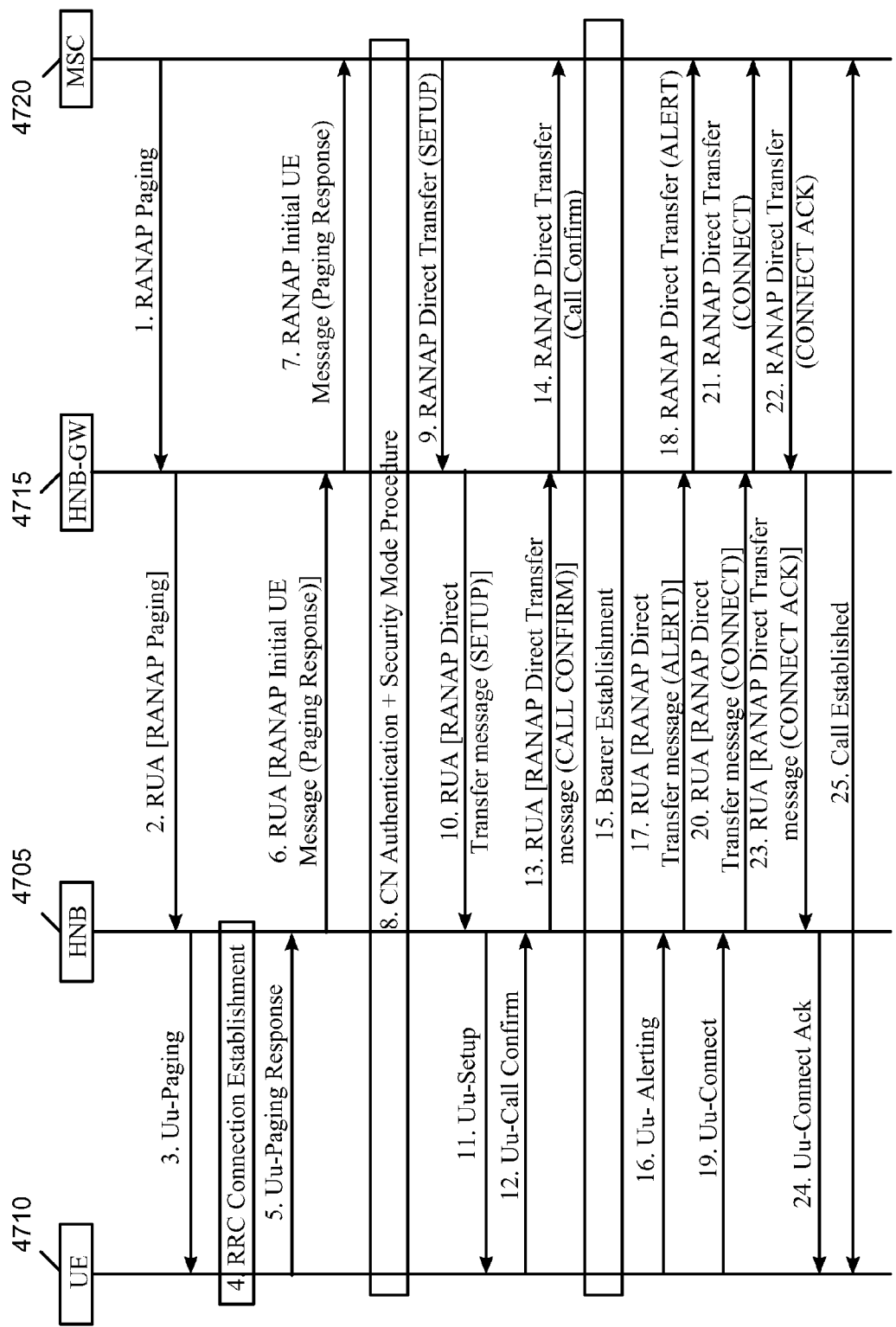
FIG. 47 illustrates a mobile terminated PSTN-to-mobile call procedure in some embodiments.

FIG. 47 illustrates a mobile terminated PSTN-to-mobile call procedure, in some embodiments. The MSC 4720 sends (at step 1) a RANAP Paging message to the HNB-GW 4715 identified through the last Location Update received by it and includes the TMSI if available. The IMSI of the mobile being paged is always included in the request. The HNB-GW 4715 identifies (at step 2) the UE registration context and the HNB 4705 using the IMSI provided by the MSC 4720. The HNB-GW 4715 then forwards the RANAP Paging message to the corresponding HNB 4705 with the RANAP Paging message encapsulated by the RUA header. The HNB 4705 relays (at step 3) the Paging request to the UE 4710. In some embodiments, the HNB 4705 uses Paging Type I or II based on the RRC state of the UE 4710 as described in 3GPP technical specification TS 25.331 entitled "Radio Resource Control (RRC) protocol specification", incorporated herein by reference, and referred to herein as TS 25.331.

The UE 4710 establishes (at step 4) an RRC connection with the HNB 4705 if one doesn't exist. This step is omitted if there is an already existing RRC connection (e.g., an RRC connection may have been established for PS domain). The UE 4710 processes (at step 5) the paging request and sends the Paging response to the HNB 4705. The HNB 4705 sends (at step 6) a RUA encapsulated RANAP Initial UE Message carrying the paging response from the UE 4710 towards the HNB-GW 4715. In some embodiments, this RUA message can be the RUA Connect message thus indicating to the HNB-GW the initial message for that particular UE signaling. The HNB-GW 4715 establishes (at step 7) an SCCP connection to the MSC 4720. The HNB-GW 4715 then forwards the paging response to the MSC 4720 using the RANAP Initial UE Message.

The MSC 4720 authenticates (at step 8) the HNB 4705 using standard UTRAN authentication procedures. The MSC 4720 also initiates the Security Mode Control procedures. The MSC 4720 initiates (at step 9) call setup using the Setup message sent to the HNB 4705 via the HNB-GW 4710. The HNB-GW 4710 forwards (at step 10) the RUA encapsulated RANAP Direct Transfer (Setup) message to the HNB 4705. The HNB 4705 relays (at step 11) the Setup message to the UE 4710.

The UE 4710 responds (at step 12) with Call Confirmed after checking it's compatibility with the bearer service requested in the Setup and modifying the bearer service as needed. If the Setup included the signal information element, the UE 4710 alerts the user using the indicated signal, otherwise the UE 4710 alerts the user after the successful configuration of the user plane.

The HNB 4705 relays (at step 13) the Call Confirmed to the HNB-GW 4715 using the RUA encapsulated RANAP Direct Transfer. The HNB-GW 4715 forwards (at step 14) the Call Confirmed message to the MSC 4720 using RANAP Direct Transfer message. An end to end bearer path is established (at step 15) between the MSC 4720 and UE 4710 using one of the procedures shown in previous sections.

The UE 4710 signals (at step 16) that it is alerting the user, via the Alerting message to the HNB 4705. The HNB 4705 relays (at step 17) the Alerting message to the HNB-GW 4715 using the RUA encapsulated RANAP Direct Transfer message. The HNB-GW 4715 forwards (at step 18) the Alerting message to the MSC 4720. The UE 4710 signals (at step 19) that the called party has answered, via the Connect message. The HNB 4705 relays (at step 20) the Connect message to the HNB-GW 4715 using the RUA encapsulated RANAP Direct Transfer message. The HNB-GW 4715 forwards (at step 21) the Connect message to the MSC 4720. The MSC 4720 acknowledges (at step 22) via the Connect Ack message to the HNB-GW 4715.

The HNB-GW 4715 forwards (at step 23) the RUA encapsulated RANAP Direct Transfer (Connect Ack) message to the HNB 4705. The HNB 4705 relays (at step 24) the Connect Ack to the UE 4710. The two parties on the call are connected on the audio path. The end-to-end two way path is now in place and bi-directional voice traffic flows (at step 25) between the UE 4710 and MSC 4720 through the HNB 4705 and the HNB-GW 4715.

C. Call Release

Figure 48:
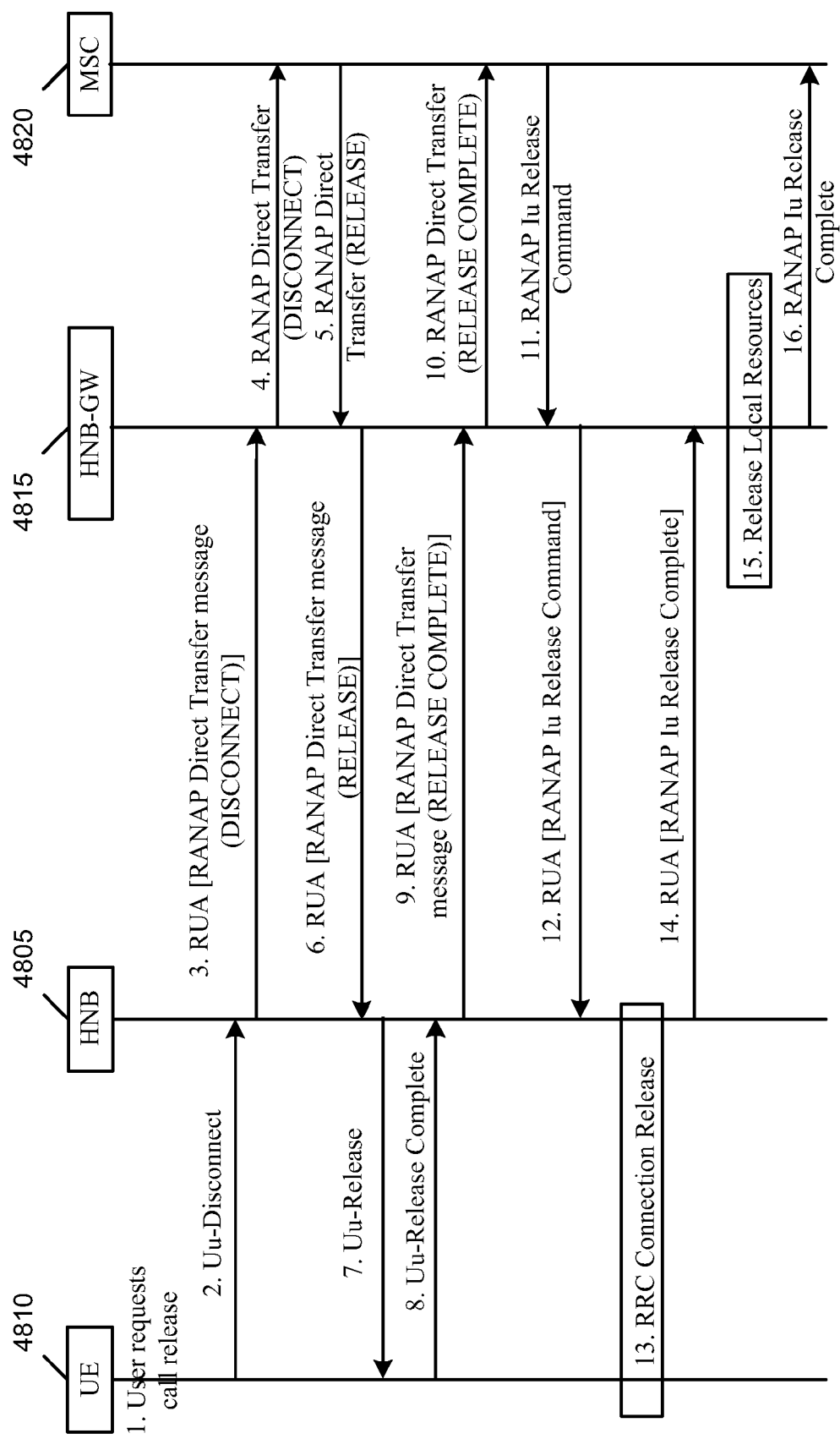
FIG. 48 illustrates a call release by an HNB subscriber procedure in some embodiments.

FIG. 48 illustrates a call release by an HNB subscriber procedure, in some embodiments. The HNB subscriber requests (at step 1) call release (e.g., by pressing the END button). Upon request from the upper layers, the UE 4810 sends (at step 2) the Disconnect NAS message to the HNB 4805. The HNB 4805 relays (at step 3) the Disconnect message to the HNB-GW 4815 using the RUA encapsulated RANAP Direct Transfer message. The HNB-GW 4815 relays (at step 4) the Disconnect message to the MSC 4820 via RANAP Direct Transfer message.

The MSC 4820 sends (at step 5) a Release to the HNB-GW 4820 using a RANAP Direct Transfer message. The HNB-GW 4815 forwards (at step 6) the RUA encapsulated RANAP Direct Transfer (Release) message to the HNB 4805. The HNB 4805 sends (at step 7) the Release message to the UE 4810 over the air interface. The UE 4810 confirms (at step 8) the Release via the Release Complete message to the HNB 4805. The HNB 4805 relays (at step 9) the Release Complete message to the HNB-GW 4815 using the RUA encapsulated RANAP Direct Transfer message. The HNB-GW 4815 forwards (at step 10) the message to the MSC 4820 using a RANAP Direct Transfer message. At this point, the MSC 4820 considers the connection released.

The MSC 4820 sends (at step 11) an Iu Release Command to the HNB-GW 4815 indicating a request to release the call resources. The SCCP Connection Identifier is used to determine the corresponding call. The HNB-GW 4815 forwards (at step 12) the RUA encapsulated RANAP Iu Release Command message to the HNB 4805. The HNB 4805 in turn releases any radio resource associated for the specific call. In some embodiments, when there is an active PS session for the UE 4810, the RRC connection may not be released by the HNB 4805, and only the corresponding CS radio bearers are released.

The HNB 4805 acknowledges (at step 14) the radio resource to the HNB-GW 4815 using the RUA encapsulated RANAP Iu Release Complete message. In some embodiments, this RUA message can be the RUA Disconnect message thus indicating to the HNB-GW the final message for that particular UE signaling. The HNB-GW 4815 releases (at step 15) any local resources (such as ATM transport or IP transport resources). The HNB-GW 4815 then forwards (at step 16) the resource release to the MSC using the Iu Release Complete message to the MSC. The SCCP connection associated with the call between the HNB-GW and the MSC is released as well.

D. Other Calling Scenarios

In some embodiments, the HNB solution supports additional calling scenarios. For example, the HNB solution supports calling line identification presentation (CLIP), calling line identification restriction (CLIR), connected line identification presentation (CoLP), connected line identification restriction (CoLR), call forwarding unconditional, call forwarding busy, call forwarding no reply, call forwarding not reachable, call waiting (CW), call hold (CH), multi-party (MPTY), closed user group (CUG), advice of charge (AoC), user user signaling (UUS), call barring (CB), explicit call transfer (ECT), name identification, and completion of calls to busy subscriber (CCBS).

These supplementary services involve procedures that operate end-to-end between the UE and the MSC. Beyond the basic DTAP messages already described for mobile originated and mobile terminated calls, the following DTAP messages are used for these additional supplementary service purposes: HOLD, HOLD-ACKNOWLEDGE, HOLD-REJECT, RETRIEVE, RETRIEVE-ACKNOWLEDGE, RETRIEVE-REJECT, FACILITY, USER-INFORMATION, CONGESTION-CONTROL, CM-SERVICE-PROMPT, START-CC, CC-ESTABLISHMENT, CC-ESTABLISHMENT-CONFIRMED, and RECALL.

Figure 49:
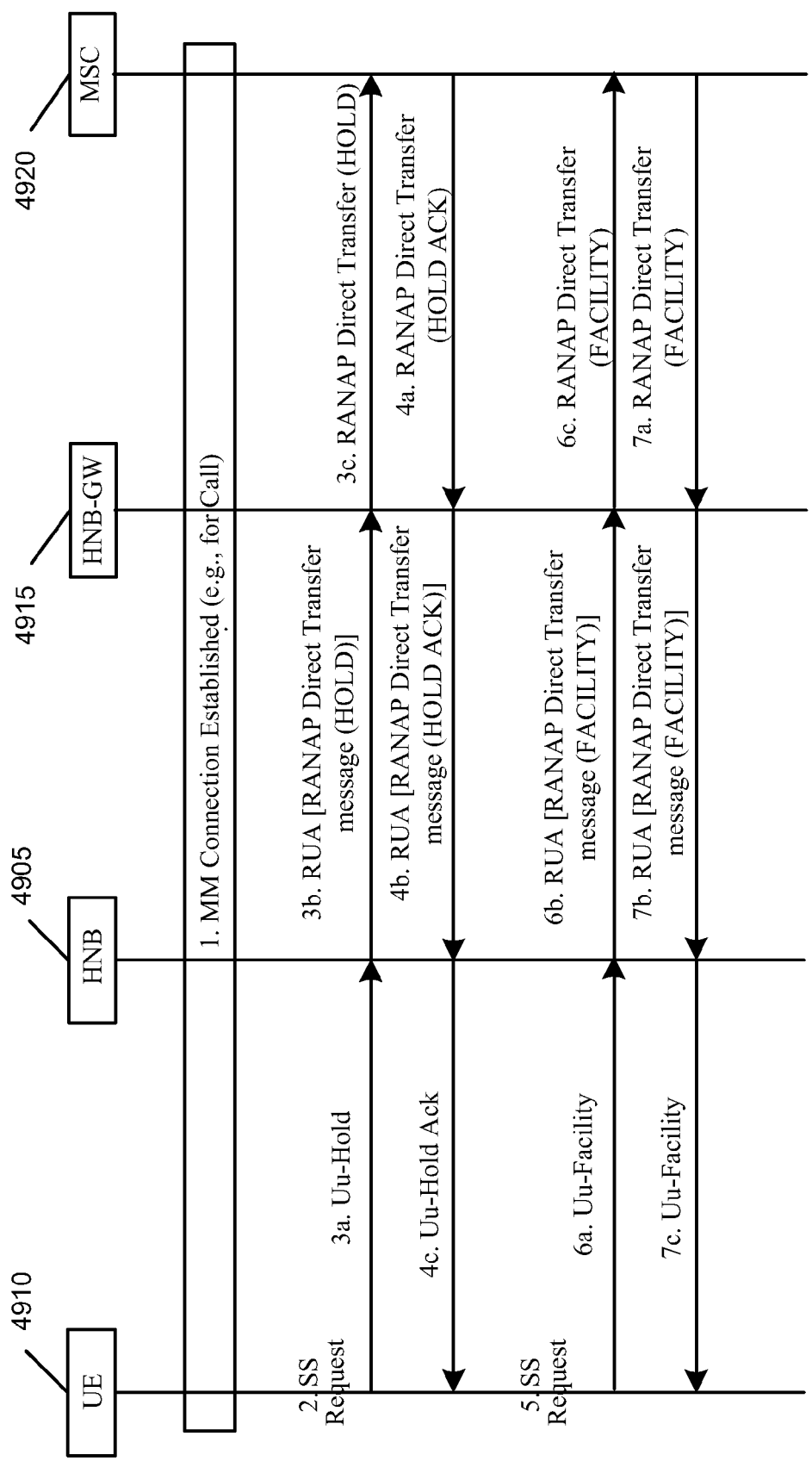
FIG. 49 illustrates an example relay of DTAP supplementary service messages in some embodiments.

These DTAP message are relayed between the UE and MSC by the HNB and HNB-GW in the same manner as in the other call control and mobility management scenarios described above. FIG. 49 illustrates an example relay of DTAP supplementary service messages, in some embodiments.

As shown, there is an existing MM connection established (at step 1) between the UE 4910 and the MSC 4920 for an ongoing call. The user requests (at step 2) a particular supplementary service operation (e.g., to put the call on hold).

The UE 4910 sends (at step 3) the HOLD message to the HNB 4905 over the air which in turn forwards the message to HNB-GW 4915, embedded in a RUA encapsulated RANAP Direct Transfer message. The HNB-GW 4915 relays the DTAP HOLD message to the MSC 4920 over the Iu-interface. The DTAP HOLD-ACK message is sent (at step 4) from MSC 4920 to UE 4910 in an analogous manner.

Later in the call, the user requests (at step 5) another supplementary service operation (e.g., to initiate a Multi-Party call). The UE 4910 sends (at step 6) the FACILITY message to the HNB 4905 over the air interface which in turn forwards the message to the HNB-GW 4915. The HNB-GW 4915 relays the DTAP FACILITY message to the MSC 4920 over the Iu-interface. The DTAP FACILITY message containing the response is sent (at step 7) from the MSC 4920 to the UE 4910 in an analogous manner.

V. PACKET SERVICES

A. PS Signaling Procedures

In some embodiments, a single SCTP connection to the HNB-GW per HNB is established for the transport of signaling messages from that HNB. This SCTP connection is used to transport CS and PS related signaling and SMS messages for all the UEs from the HNB.

1. UE Initiated PS Signaling Procedure

For UE initiated PS related signaling, the UE sends a PS signaling message to the CN, via the HNB-GW which forwards it to the CN over the Iu-PS interface as per standard UMTS (e.g., the signaling message may include GMM attach or SM PDP context activation message). The HNB-GW encapsulates the received signaling message within a RANAP Direct Transfer message that is forwarded to the SGSN over the Iu-PS interface.

Figure 50:
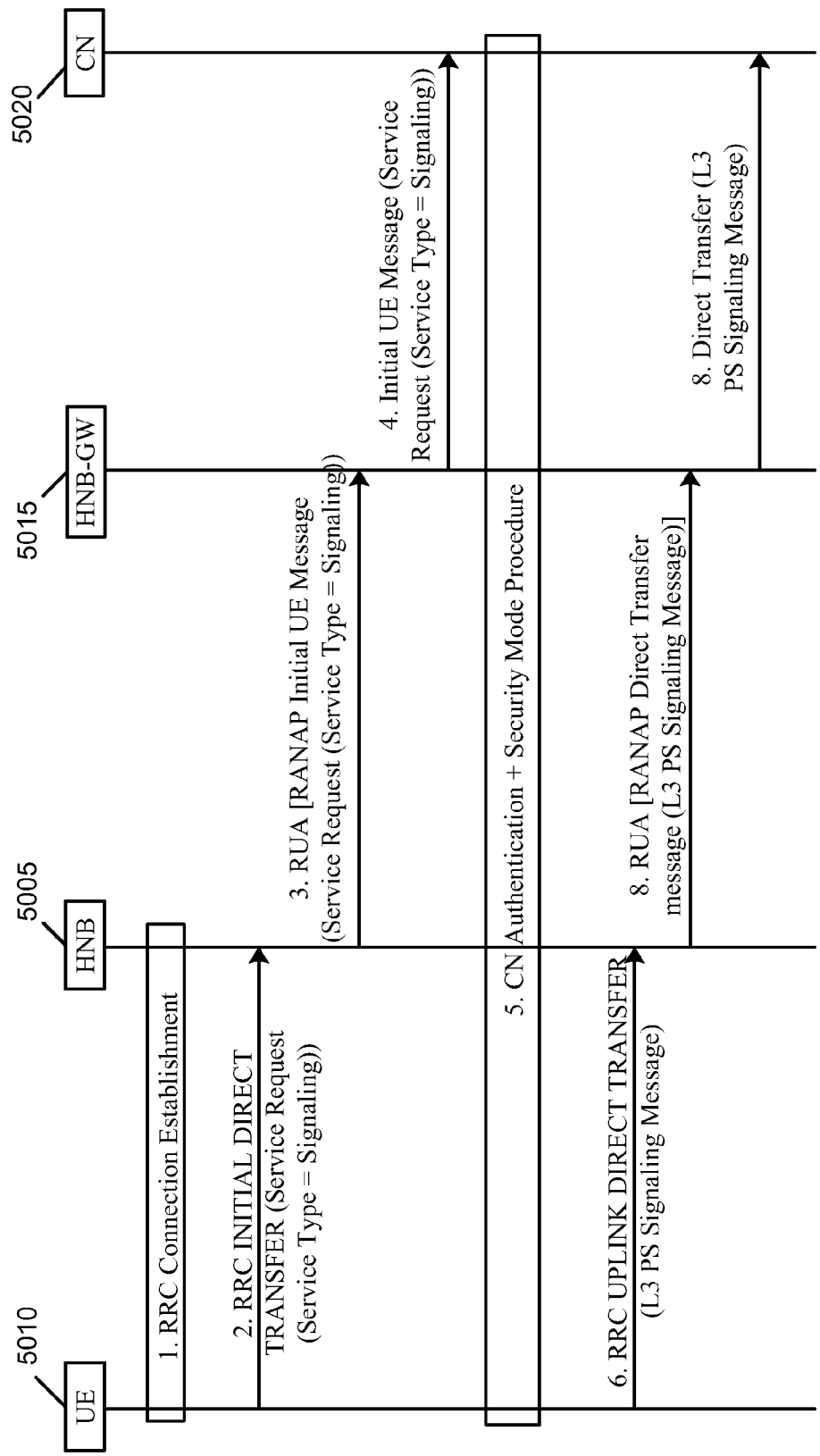
FIG. 50 illustrates an uplink control plane data transport procedure in some embodiments.

FIG. 50 illustrates an uplink control plane data transport procedure, in some embodiments. Initially, the UE 5010 is ready to send an uplink signaling message for PS services to the CN (SGSN) 5020. This could be any of the GMM or SM signaling messages.

As shown, when the RRC connection does not exist, the UE 5010 initiates (at step 1) a RRC Connection establishment procedure as per standard 3GPP procedure. Upon successful RRC Connection establishment, the UE 5010 forwards (at step 2) a Service Request message to the SGSN 5020 via the HNB 5005 indicating a PS Signaling message. The HNB 5005 sends (at step 3) the Service Request within the RUA encapsulated RANAP Initial UE message to the HNB-GW 5015.

In some embodiments, the RUA encapsulated RANAP Initial UE message sent at step 3 is an INITIAL DIRECT TRANSFER message of the HNB system. The INITIAL DIRECT TRANSFER is used to transfer the RANAP "Initial UE Message" that is encapsulated in the INITIAL DIRECT TRANSFER from the HNB to an indicated core network domain. Specifically, the INITIAL DIRECT TRANSFER message explicitly indicates the start of a communication session and the message contains parameters used to route the establishment of a signaling connection from the HNB-GW to a CN node within a CN domain, such as the SGSN, when no signaling connection exists. By using this explicit message, the HNB-GW is explicitly notified of impending signaling connection without having to process the contents of the message. In some embodiments, this RUA message can be the RUA Connect message thus indicating to the HNB-GW the initial message for that particular UE signaling.

The HNB-GW 5015 forwards (at step 4) the Service Request to the CN (specifically the SGSN) 5020 encapsulated within the Initial Iu message. In some embodiments, the CN (SGSN) 5020 may initiate (at step 5) a security function.

The UE 5010 sends (at step 6) the PS signaling message to the HNB 5005 using RRC Uplink Direct Transfer service. The HNB 5005 forwards (at step 7) the PS signaling message to the HNB-GW 5015 using a RUA encapsulated RANAP Direct Transfer message. The HNB-GW 5015 forwards (at step 8) the PS signaling message to the CN (SGSN) 5020 using RANAP Direct Transfer message.

2. Network Initiated PS Signaling Procedure

For Network initiated PS related signaling, the Core Network sends a PS signaling message to the HNB-GW via the Iu-PS interface as per standard UMTS (e.g., the signaling message may include GMM attach accept or SM PDP context activation accept message). The HNB-GW encapsulates the RANAP received signaling message within the RUA header and forwards it to the HNB via the existing SCTP signaling connection.

Figure 51:
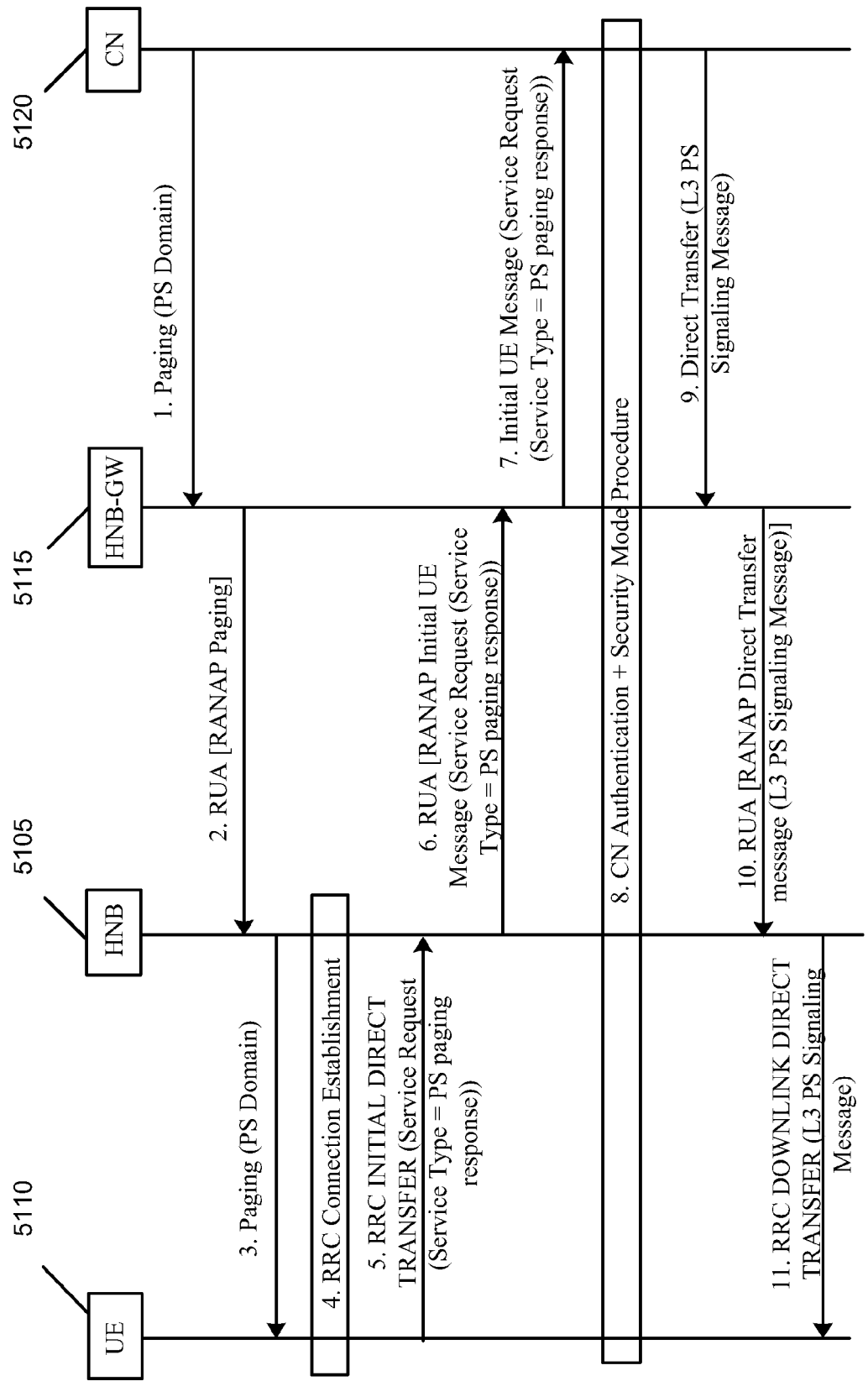
FIG. 51 illustrates a downlink control plane data transport procedure in some embodiments.

FIG. 51 illustrates a downlink control plane data transport procedure, in some embodiments. Initially, the CN (SGSN) 5120 is ready to send a downlink signaling message for PS services to the UE 5110. This could be any of the GMM or SM signaling messages. Given that the signaling procedure is network initiated and if the UE 5110 is in PMM-IDLE state, the SGSN 5120 will first page the UE 5110. If the UE 5110 is in PMM-CONNECTED state, the SGSN 5120 will send the downlink PS signaling message using RANAP Direct Transfer procedure starting with step 9.

However, if the UE 5120 is in PMM-IDLE state, the CN (SGSN) 5120 sends (at step 1) the RANAP Paging request to the UE 5110 via the HNB-GW 5115 to locate the user. The paging request indicates paging for PS Domain. Optionally, if the paging request was received, the HNB-GW 5115 identifies (at step 2) the target HNB 5105 and forwards the request using the RUA encapsulated RANAP Paging message to the HNB 5105. Optionally, if the paging message is received, the HNB 5105 forwards (at step 3) the PS page to the UE 5110 as per standard 3GPP procedure. Optionally, if the RRC connection does not exist for that UE 5110, it is established (at step 4) as per standard 3GPP procedures. Optionally, if the page for PS services was received, the UE 5110 responds (at step 5) to the SGSN 5120 via the HNB 5105 with a Service Request message indicating PS paging response. The Service Request message is encapsulated within the RRC INITIAL DIRECT TRANSFER message.

The HNB 5105 forwards (at step 6) the paging response via a RUA encapsulated RANAP Initial UE message to the HNB-GW 5115. In some embodiments, this RUA message can be the RUA Connect message, thus indicating to the HNB-GW the initial message for that particular UE signaling. The HNB-GW 5115 establishes SCCP connection towards the CN for the specified domain and forwards (at step 7) the Service Request message to the SGSN 5120 encapsulated in the RANAP Initial UE Message. Optionally, the CN (SGSN) 5120 initiates (at step 8) Security Function.

The CN (SGSN) 5120 forwards (at step 9) the PS signaling message to the HNB-GW 5115 using RANAP Direct Transfer procedure. The HNB-GW 5115 forwards (at step 10) the PS signaling message to the HNB 5105 via RUA encapsulated RANAP Direct Transfer message. The HNB 5105 sends (at step 11) the signaling message to the UE 5110 using RRC Downlink Direct Transfer service.

VI. SHORT MESSAGE SERVICES

A. Overview

In some embodiments, the HNB system provides support for both circuit mode (CS mode) and packet mode (PS mode) SMS services. In the CS/PS mode of operation, UEs may be able to send and receive short messages using either the MM sub-layer or the GMM sub-layer. In some embodiments, UEs using the PS mode of operation send and receive short messages using only GMM sub-layer. Inter-working with HNB related to SMS services is described in the following sections.

1. SMS Services

Figure 52:
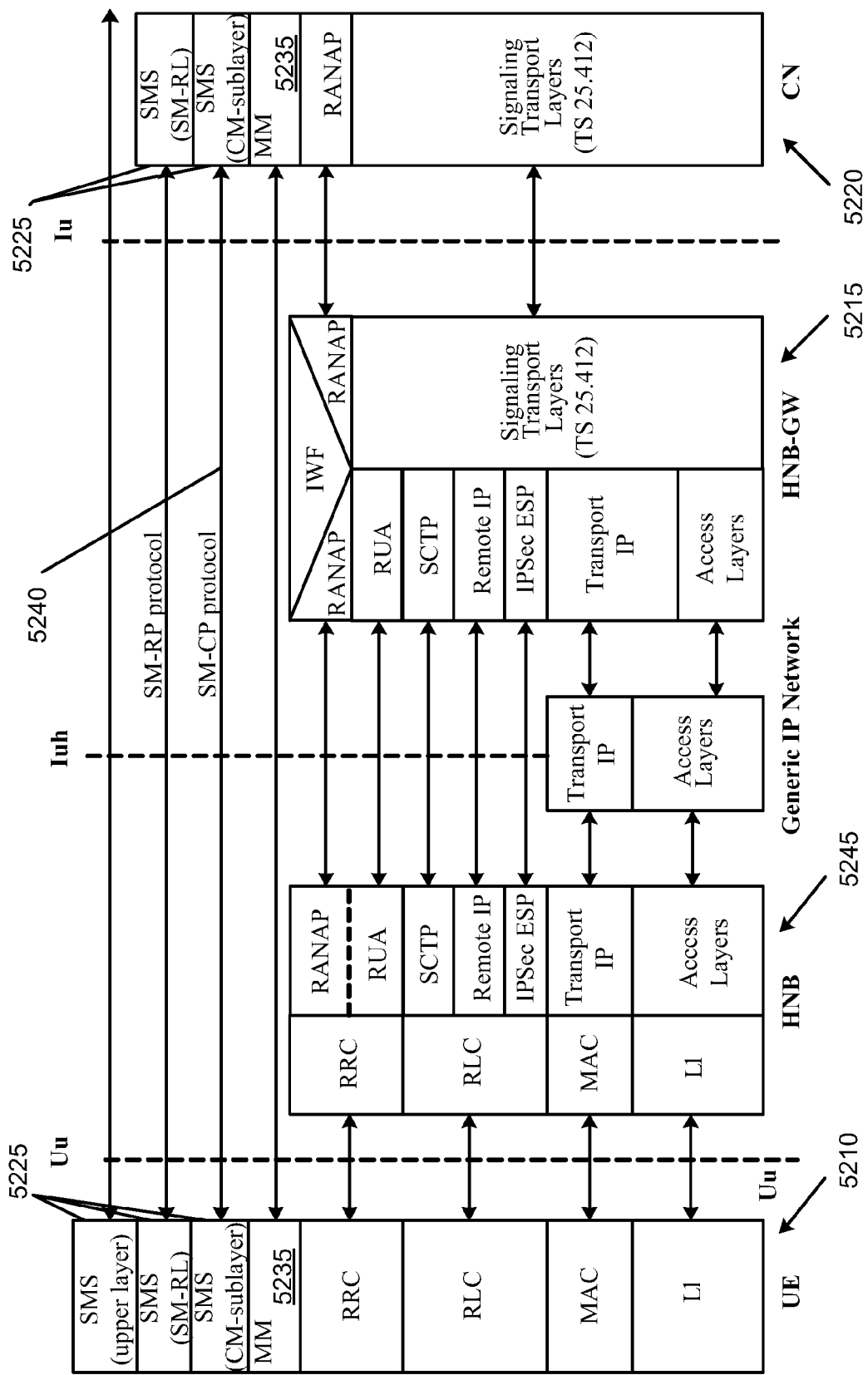
FIG. 52 illustrates the HNB protocol architecture related to CS and PS domain SMS support builds on the circuit and packet services signaling architecture in some embodiments.

FIG. 52 illustrates the HNB protocol architecture related to CS and PS domain SMS support in accordance with some embodiments. This protocol architecture builds on the circuit and packet services signaling architecture. This figure includes (1) UE 5210, (2) HNB-GW 5215, (3) CN/MSC 5220, (4) SMS layers 5225, (5) MM layer 5235, (6) SM-CP protocol 5240; and (7) HNB 5245.

The HNB SMS support is based on the same mechanism that is utilized for CS/PS mobility management and call control. On the UE side, the SMS layers (including the supporting CM sub-layer functions) utilize the services of the MM layer 5235 (CS domain) and GMM (PS domain) to transfer SMS messages per standard circuit/packet domain implementation. The SM-CP protocol 5240 is effectively tunneled between the UE 5210 and the MSC 5220 using the message relay functions in the RUA encapsulated RANAP messages. As with CS/PS mobility management and call control procedures, SMS uses the SCTP signaling connection between the HNB 5245 and the HNB-GW 5215, providing reliable SMS delivery over the Iuh interface.

B. SMS Scenarios

1. Circuit Mode Mobile-Originated SMS

Figure 53:
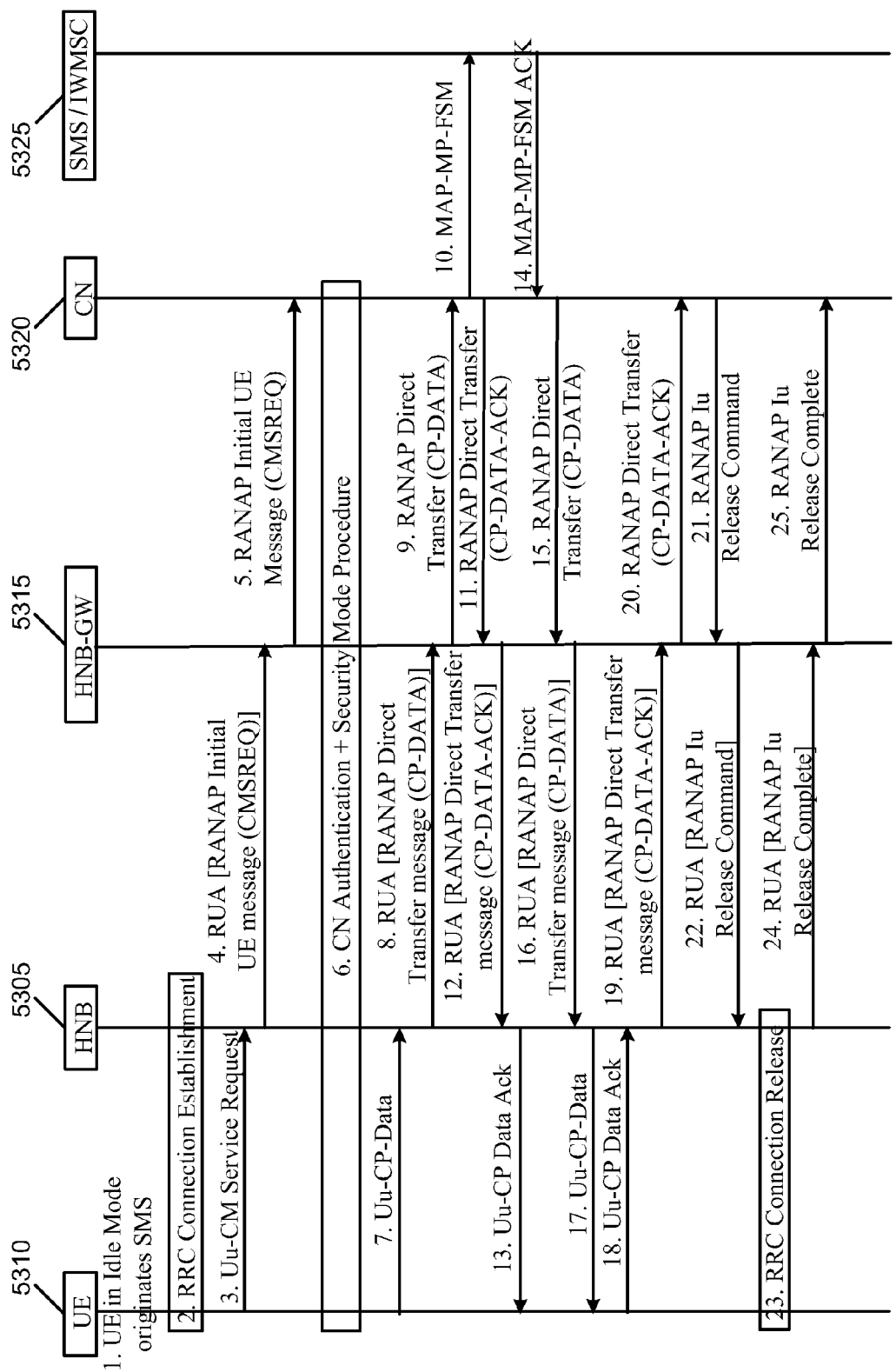
FIG. 53 illustrates a CS mode mobile-originated SMS over HNB scenario in some embodiments.

FIG. 53 illustrates a CS mode mobile-originated SMS over HNB scenario, in some embodiments. This figure includes (1) HNB 5305, (2) UE 5310, (3) HNB-GW 5315, (4) CN (MSC) 5320, and (5) SMS interworking MSC (IWMSC) 5325. The user enters (at step 1) a message and invokes the mobile-originated SMS function on the UE 5310 in idle mode. Steps 2-6 are the same as steps 2-7 in FIG. 46. The UE 5310 sends (at step 7) the SMS message encapsulated in a CP-DATA message to the HNB 5305 over the air interface. The HNB 5305 forwards (at step 8) this CP-DATA message within the RUA encapsulated RANAP Direct Transfer message to the HNB-GW 5315. The HNB-GW 5315 forwards (at step 9) the CP-DATA message to the MSC 5320 using RANAP Direct Transfer message. The MSC 5320 forwards (at step 10) the message to the SMSC (not shown) via the SMS interworking MSC (IWMSC) 5325 using the MAP-MO-FORWARD-SM Invoke message.

The MSC 5320 sends (at step 11) CP-DATA-ACK to acknowledge the receipt of the CP-DATA message. In some embodiments, the SM-CP is designed in a way that every CP-DATA block is acknowledged on each point-to-point connection between the UE and SMSC (SM Service Center) to ensure that the under-laying transport layer (in this case RANAP) works error free since there is no explicit acknowledgement to a RANAP Direct Transfer message. The HNB-GW 5315 relays (at step 12) the RUA encapsulated RANAP Direct Transfer (CP-DATA-ACK) message to the HNB 5305. The HNB 5305 forwards (at step 13) the CP-DATA-ACK to the UE 5310 over the air interface.

The SMSC sends (at step 14) an SMS message in response to the IWMSC 5325 and the IWMSC 5325 sends the response to the MSC 5320 in the MAP-MO-FORWARD-SM Return Result message. The MSC 5320 relays (at step 15) the response to the HNB-GW 5315 in the CP-DATA message. The HNB-GW 5315 relays (at step 16) the RUA encapsulated RANAP Direct Transfer (CP-DATA) message to the HNB 5305. The HNB 5305 forwards (at step 17) the response to the UE 5310 over the air interface using the existing RRC connections. As part of SM-CP ack process, the UE 5310 acknowledges (at step 18) the receipt of CP-DATA to the HNB 5305.

The HNB 5305 forwards (at step 19) this CP-DATA-ACK message within the RUA encapsulated RANAP Direct Transfer message to the HNB-GW 5315. The HNB-GW 5315 forwards (at step 20) the acknowledgement to the MSC 5320 using the RANAP Direct Transfer message. The MSC 5320 sends (at step 21) an Iu Release message to the HNB-GW 5315 indicating a request to release the session resources. The SCCP Connection Identifier is used to determine the corresponding session. The HNB-GW 5315 relays (at step 22) the RUA encapsulated RANAP Iu Release message to the HNB 5305. The HNB 5305 releases (at step 23) corresponding radio resources towards the UE 5310.

The HNB 5305 acknowledges (at step 24) the radio resource to the HNB-GW 5315 using the RUA encapsulated RANAP Iu Release Complete message. In some embodiments, this RUA message can be the RUA Disconnect message thus indicating to the HNB-GW the final message for that particular UE signaling. The HNB-GW 5315 then forwards (at step 25) the resource release to the MSC 5320 using the Iu Release Complete message. The SCCP connection associated with the call between the HNB-GW 5315 and the MSC 5320 is released as well.

VII. EMERGENCY SERVICES

Transparent support for emergency services is a key regulatory requirement. However, support for emergency services in the HNB system is complicated by virtue of the fact that the HNBs are deployed on an ad-hoc basis by many users. Additionally, these HNBs may be relocated at any time by the user without notice to the service provider. Therefore, some embodiments provide methods and systems for transparently supporting emergency services within the HNB system by dynamically determining a location for each of the HNBs. In this manner, some embodiments provide emergency responders the ability to locate a position of an emergency caller when the caller places the emergency request through a HNB service area. This is referred to below as Service Area Based Routing. Some embodiments provide methods and systems for transparently supporting emergency services within the HNB system based on location information (e.g. using information derived from the UE or through UE assisted location determination). This is referred to below as Location Based Routing.

The location information is routed through the core network to the appropriate responding node closest to the location of the caller. This is done by transparently integrating the HNB system information with the existing core network components (e.g., Public Safety Answering Point (PSAP)) that facilitate emergency services.

HNB emergency services support capabilities include support for flexible SAI assignment and HNB-GW assignment functionality. This allows the HNB to be assigned to an HNB-GW that is, in turn, connected to an MSC that can route calls to the PSAP in the HNB service area. This also allows the service provider to define HNB service areas that align with macro network service areas, to leverage the existing service area based PSAP routing approach. HNB emergency services support capabilities also include support for the retrieval and storage of HNB location information from an external database. In some embodiments, the HNB emergency services support capabilities also include support for the RANAP Location Report procedure, by which the HNB-GW (or HNB) returns the HNB/UE location information to the MSC during emergency call processing. Additional emergency services support include support emergency services for any UE with proper SIM card regardless of the access control policy of the HNB.

One of the functions of the HNB-GW is to assign a HNB service area for calls made by the UE using the HNB. The HNB, during registration, provides information on macro coverage (such as macro LAI, macro 3 G cell-id, etc.) which can be used to derive a HNB Service Area Identification (SAI). This HNB SAI can be used to support the ability to route emergency calls to the correct PSAP (i.e., based on SAI). However, to meet the requirement to route the emergency call to the correct PSAP, some embodiments utilize service area (i.e., SAI) based routing and some other embodiments utilize location based routing.

A. Service Area Based Routing

With Service Area Based Routing, the PSAP routing decision is based on either the Service Area Code (SAC) contained within the SAI or the LAI contained within the SAI or the entire SAI (i.e., LAI+SAC). Since the service area of a HNB spans only several meters, the location information meets regulatory requirements and provides an accurate location of the user.

1. Service Area Based Routing of UEs Camped Successfully on the HNB

Figure 54:
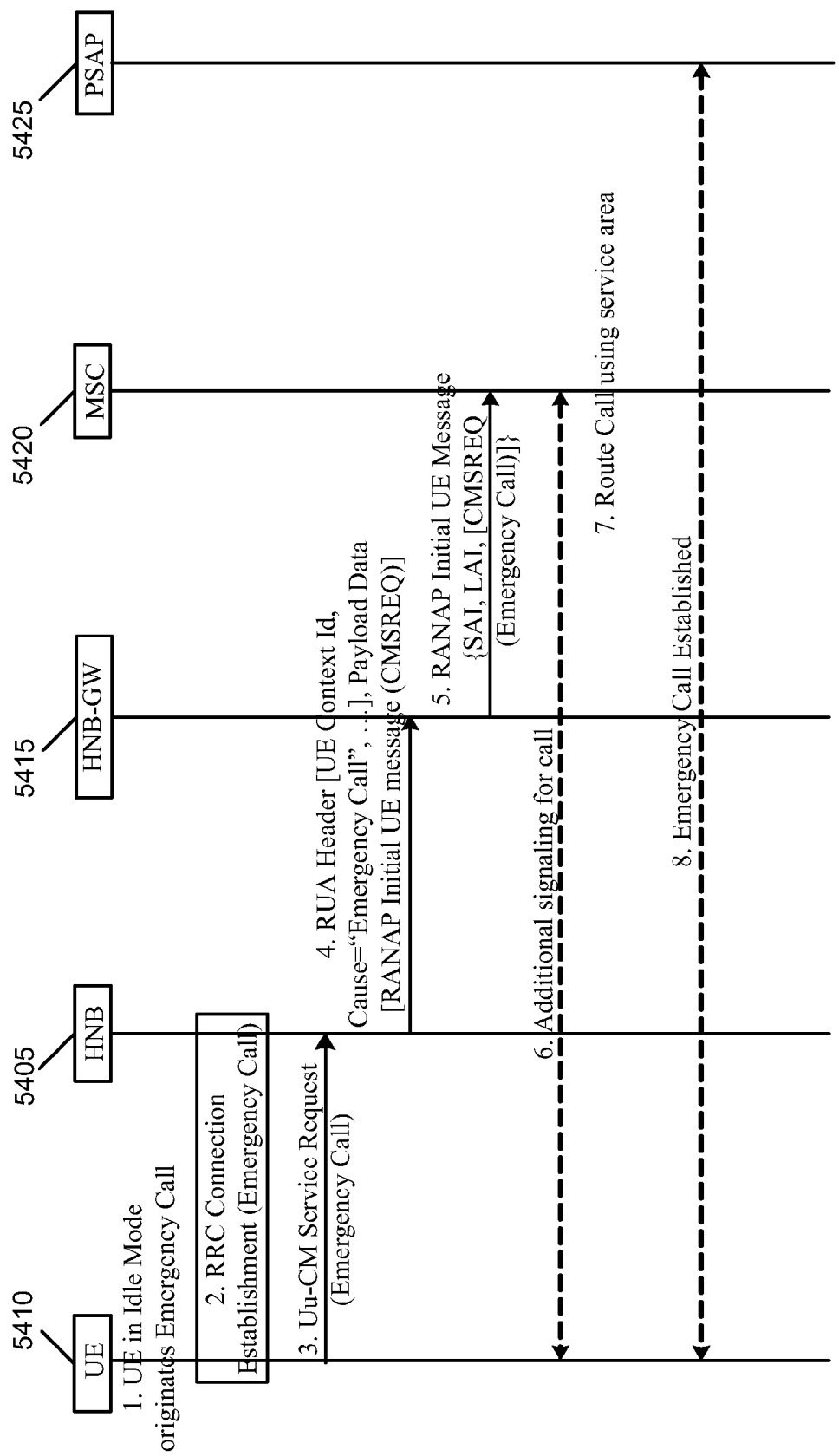
FIG. 54 illustrates an emergency call routing over HNB using service area procedure in some embodiments.

FIG. 54 illustrates an emergency call routing over HNB using a service area procedure in accordance with some embodiments. In some such embodiments, the UE originates the emergency call after successfully camping (and registering with the HNB-GW by the HNB) prior to the origination of the emergency call. This figure includes HNB 5405, UE 5410, HNB-GW 5415, MSC 5420, and PSAP 5425.

As shown, the user originates (at step 1) an emergency call using the UE 5410 camped on the HNB 5405. The UE 5410 establishes (at step 2) an RRC connection with the HNB 5405 with the establishment cause of emergency call. Upon request from the upper layers, the UE 5410 sends (at step 3) the CM Service Request (with CM Service Type set to "Emergency Call Establishment") to the HNB 5405. The establishment cause notifies the HNB 5405 that the call being placed by the UE 5410 is to request emergency services.

The HNB 5405 forwards (at step 4) the CM Service Request within a RUA encapsulated RANAP Initial UE message. In some embodiments, this RUA message can be the RUA Connect message thus indicating to the HNB-GW the initial message for that particular UE signaling. The RUA header also carries additional information such as the cause indicating an emergency call. The cause field in the RUA header allows the HNB-GW 5415 to allocate appropriate resources for emergency call setup without needing to decode the encapsulated RANAP message.

The HNB-GW 5415 establishes (at step 5) an SCCP connection to the MSC 5420 and forwards the CM Service Request to the MSC 5420 using the RANAP Initial UE Message. This initial message contains information about the location area (LAI) and service area (SAI) assigned to the specific HNB over which the emergency call was initiated. In some embodiments, the LAI and SAI information contained in the RANAP messages is provided to the HNB by the HNB-GW via HNBAP registration procedures. In some embodiments, the LAI and SAC information contained in the RANAP message is provided to the HNB by the HNB management system during the initial provisioning of the HNB.

The MSC 5420, HNB-GW 5415, HNB 5405 and UE 5410 continue (at step 6) call establishment signaling. The MSC 5420 determines the serving PSAP based on the service area of the calling UE and routes the emergency call to the appropriate PSAP. Additional signal messages are exchanged (at step 8) between the UE 5410 and the PSAP 5425 and the emergency call is established between the UE 5410 and the appropriate serving PSAP 5425.

2. Service Area Based Routing of Unauthorized UEs

As described in the sections above, a UE is required to register with the HNB system before the UE is provided access to services of the HNB system. When the UE is not authorized for HNB service over a particular HNB, the UE is handed over to the licensed wireless radio access network of a cellular provider or is simply prevented from accessing HNB services at the particular HNB through appropriate rejection mechanisms.

However, as part of the regulatory requirements for supporting emergency services, the HNB system is required to provide emergency services to the UE irrespective of whether the UE is permitted access to services of the HNB system when the UE operates within a service region of the HNB system. Accordingly, some embodiments provide methods and systems to provide emergency services to unauthorized UEs requesting emergency services through the HNB system.

Figure 55:
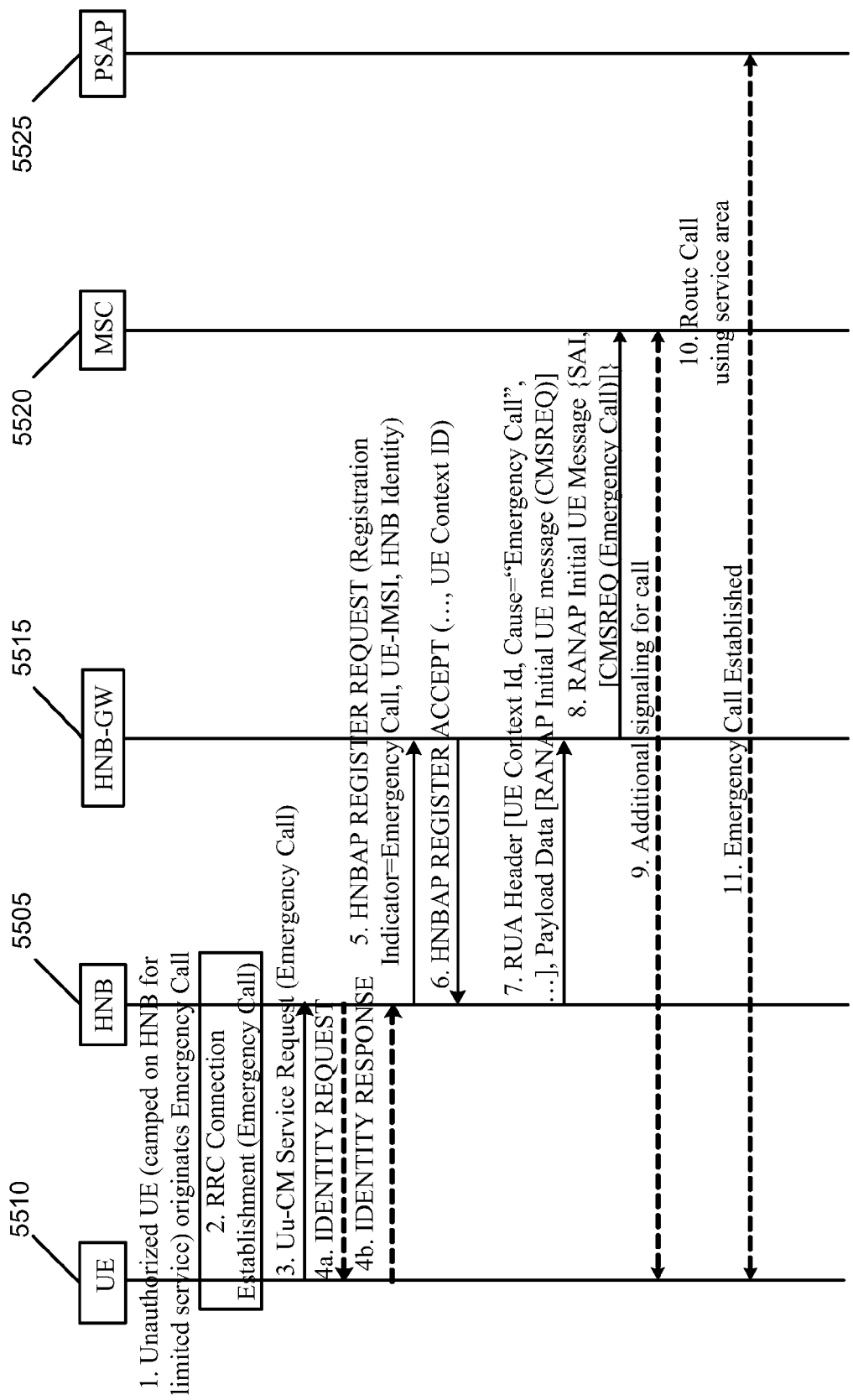
FIG. 55 illustrates an emergency call routing over HNB of an unauthorized UE using service area procedure in some embodiments.

The following scenario illustrates origination of an emergency call from a UE which has been rejected by the HNB (e.g., due to HNB's access control policy). This scenario also assumes that there is no other suitable cell available for the UE to camp on for normal service as defined in 3GPP technical specification TS 25.304 entitled "User Equipment (UE) procedures in idle mode and procedures for cell reselection in connected mode", herein incorporated by reference. Hence, the UE is camped on the HNB for limited services. FIG. 55 illustrates an emergency call routing over HNB of an unauthorized UE using service area procedure, in some embodiments. This figure includes HNB 5505; UE 5510; HNB-GW 5515; MSC 5520; and PSAP 5525.

The user originates (at step 1) an emergency call using the UE 5510 camped on the HNB 5505 for limited service only (e.g., due to rejection from the HNB 5505 based on access control policy). The UE 5510 establishes (at step 2) an RRC connection with the HNB 5505 indicating an establishment cause of emergency call. Upon request from the upper layers, the UE 5510 sends (at step 3) the CM Service Request (with CM Service Type set to "Emergency Call Establishment") to the HNB 5505.

When the CM Service Request is performed using the TMSI, the HNB 5505 retrieves (at steps 4*a-b*) the permanent identity of the UE 5510 using MM procedures. In some embodiments, the HNB 5505 performs local access control and consults the local policy for emergency calls before allowing an incoming request for emergency call from the unauthorized UE. In some embodiments, the HNB may be configured with policy to allow emergency calls without access control check and, as a result, the HNB may not retrieve the permanent identity of the UE 5510 using MM procedures as shown in steps 4*a-b*.

In order to provide emergency services to the unauthorized UE 5510, the HNB 5505 attempts (at step 5) a UE registration towards the HNB-GW 5515. The HNB 5505 includes the necessary attributes as specified in the subsection above entitled UE Registration. Additionally, the HNB 5505 signals an emergency call registration via the Registration Indicator IE. The purpose of the emergency indicator is to assist the network in performing network based access control for unauthorized UEs. Specifically, the Registration Indicator IE notifies the HNB-GW 5515 that the UE 5510 requires limited service (i.e., emergency service). The HNB-GW 5515 checks (at step 6) to see if an unauthorized UE is allowed HNB access for emergency calls using the specific HNB 5505. When the HNB-GW 5515 accepts the registration attempt, it responds with a HNBAP REGISTER ACCEPT including attributes such as the UE Context Id, etc.

The HNB 5505 forwards (at step 7) the CM Service Request within RUA encapsulated RANAP Initial UE message. In some embodiments, this RUA message can be the RUA Connect message thus indicating to the HNB-GW the initial message for that particular UE signaling. The RUA header also carries additional information such as the cause indicating an emergency call, which allows the HNB-GW 5515 to allocate appropriate resources for emergency call setup without needing to decode the encapsulated RANAP message.

The HNB-GW 5515 establishes (at step 8) an SCCP connection to the MSC 5520 and forwards the CM Service Request to the MSC 5520 using the RANAP Initial UE Message. This initial message contains information about the service area identity (SAI) assigned to the specific HNB 5505 over which the emergency call was initiated. The MSC 5520, HNB-GW 5515, HNB 5505 and UE 5510 continue (at step 9) call establishment signaling. The MSC 5520 determines (at step 10) the serving PSAP 5525 based on the service area of the calling UE and routes the emergency call to the appropriate PSAP. Additional signal messages are exchanged (at step 11) between the UE 5510 and the PSAP 5525 and the emergency call is established between the UE 5510 and the appropriate serving PSAP 5525.

Upon completion of the emergency call from the unauthorized UE, the HNB deregisters the UE from the HNB-GW. In some embodiments, the HNB or the HNB-GW may choose to implement timer based deregistration upon emergency call termination, to allow call-back to the unauthorized UE for emergency purposes.

B. Location Based Routing

In some embodiments, the HNB service area is not split into multiple service areas. Accordingly, some embodiments provide an alternative method for performing emergency calling. Routing by position is defined in the 3GPP technical specification TS 23.271 (v6.10.0) entitled "Location Services (LCS); Functional description; Stage 2" which is incorporated herein by reference. Routing by position is also known as "location based routing" or "X/Y routing."

With routing by position, rather than making the PSAP routing decision based on HNB service areas (which might span multiple PSAP serving areas), the MSC does an immediate position request to HNB-GW. The MSC then selects the PSAP based on the received location information (such as latitude/longitude). Location based routing is not HNB-specific. Location based routing is also an issue in UMTS where macro network service areas can span multiple PSAP serving areas. Since latitude/longitude can also be available in the HNB-GW (e.g., retrieved from the subscriber database during HNB registration), little delay is added by doing the position request and the position returned is as accurate as is available. Using routing by location eliminates the need to split HNB coverage areas into multiple HNB service areas based on PSAP routing requirements.

1. Location Based Emergency Call Routing

Figure 56:
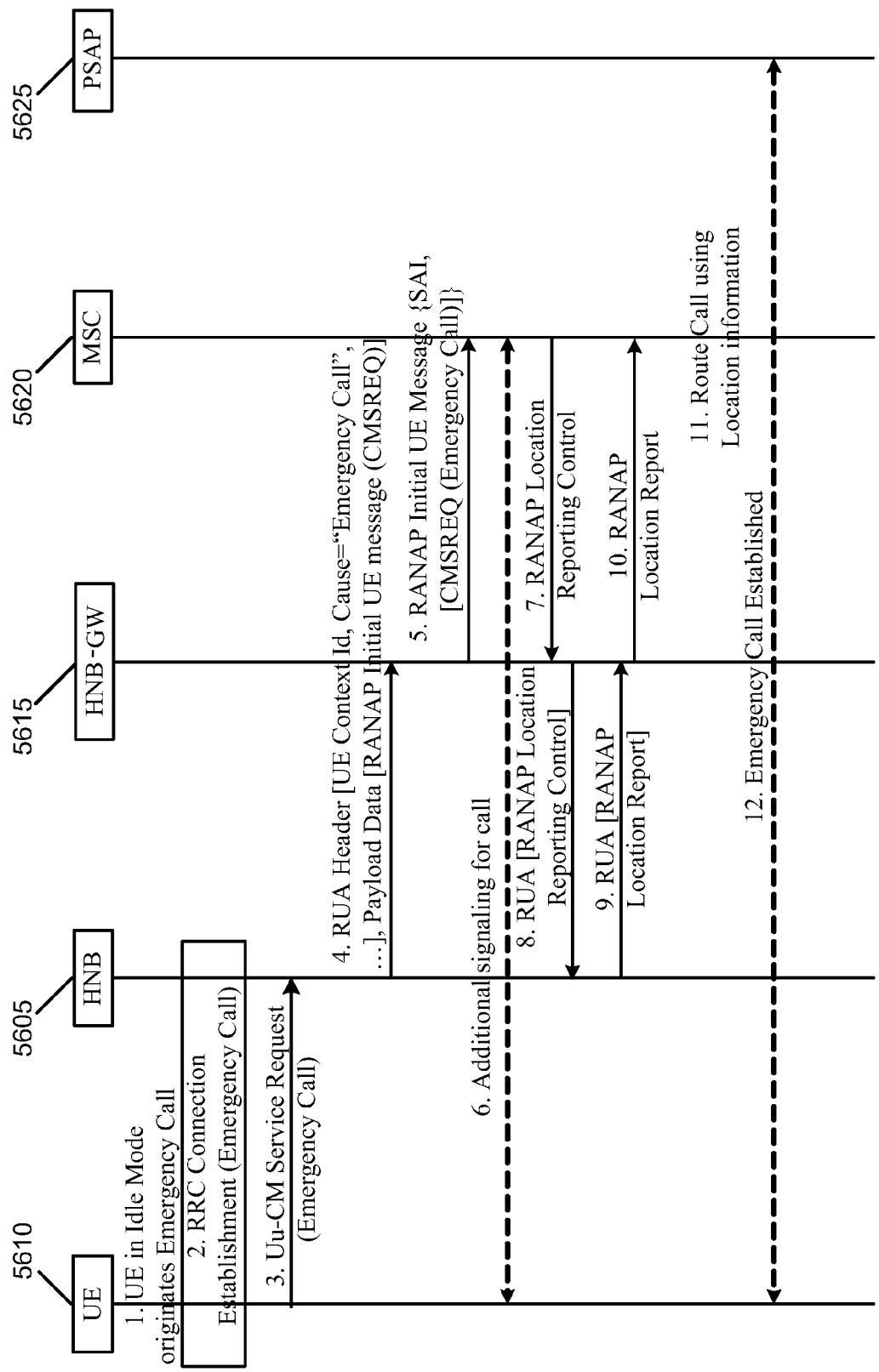
FIG. 56 illustrates a location based emergency call routing over HNB procedure in some embodiments.

FIG. 56 illustrates a location based emergency call routing over HNB procedure, in some embodiments. This figure includes HNB 5605, UE 5610, HNB-GW 5615, MSC 5620, and PSAP 5625.

As shown, steps 1-6 are the same as the service area based routing scenario as described with reference to FIG. 54 above. The MSC 5620 determines (at step 7) that the serving area of the UE 5610 serves an area that contains portions of multiple emergency services zones. Therefore, the MSC 5620 delays call setup and initiates procedures to obtain the UE's location for routing the emergency call to the PSAP 5625. The MSC 5620 issues a location request of the UE 5610 using the RANAP Location Reporting Control message to the HNB-GW 5615. This message includes the type of location information requested, the UE's location capabilities and a QoS with low delay and low horizontal accuracy.

The HNB-GW 5615 relays (at step 8) the RANAP Location Reporting Control message to the HNB 5605 encapsulated in the RUA header. The HNB 5605 sends (at step 9) back the UE location with RUA encapsulated RANAP Location Report message to the HNB-GW 5615. The HNB-GW 5615 forwards (at step 10) the RANAP Location Report message to the MSC 5620. Alternately, instead of step 8-10, the HNB-GW 5615 retrieves the UE Location information from the stored HNB information (using either information provided by the HNB 5605 during registration or retrieved from subscriber database) and responds with the latitude and longitude in the RANAP Location Report message back to the MSC 5620.

The MSC 5620 determines (at step 11) the serving PSAP (here, the PSAP 5625) based on the location information of the UE 5610 and routes the emergency call to the appropriate PSAP. In some embodiments, additional network elements such as GMLC, S/R may be involved in mapping the location information and routing the emergency call to the appropriate PSAP. Additional signal messages are exchanged (at step 12) between the UE 5610 and the PSAP 5625 and the emergency call is established between the UE 5610 and the PSAP 5625.

VIII. LAWFULLY AUTHORIZED ELECTRONIC SURVEILLANCE (LAES)

The J-STD-025 standard defines the means to access communications as an intercept access service for the purposes of lawfully authorized electronic surveillance (LAES). The services fall into three categories: (1) non-call associated services to provide information about intercept subjects that is not necessarily related to a call, (2) call associated services to provide call-identifying information about calls involving the intercept subjects, and (3) content surveillance services to provide access to an intercept subject's communications. Since LAES is provided by core network functions, neither the UTRAN nor the HNB are impacted; therefore, there are no HNB-specific LAES requirements on the HNB-GW and HNB.

IX. HNB SECURITY

Figure 57:
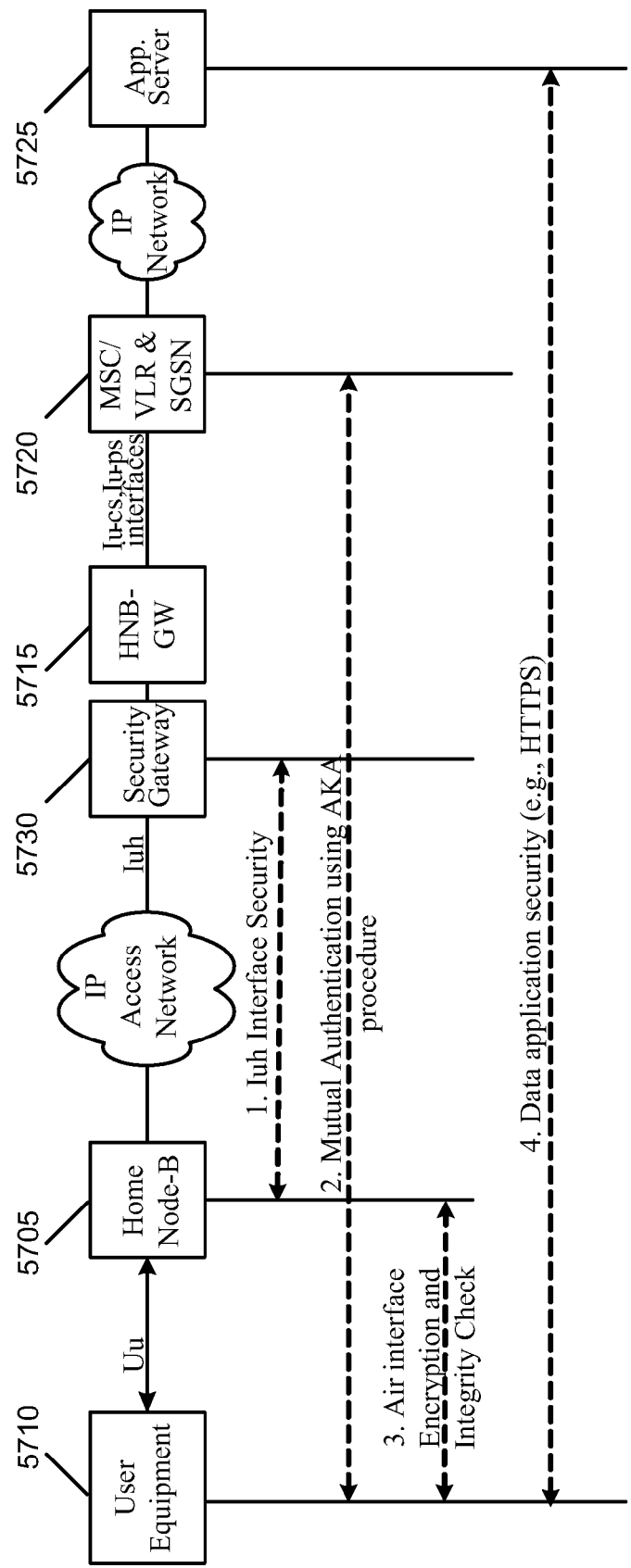
FIG. 57 illustrates HNB security mechanisms in some embodiments.

FIG. 57 illustrates HNB security mechanisms, in some embodiments. This figure includes HNB 5705, UE 5710, HNB-GW 5715, MSC/VLR or SGSN 5720, application server 5725, and security gateway (SeGW) 5730.

As shown, the security mechanisms are as follows: (1) the security mechanisms over the Iuh interface protect signaling, voice and data traffic flows between the HNB 5705 and the HNB-GW-SeGW 5715-5730 from unauthorized use, data manipulation, and eavesdropping (i.e., authentication, encryption, and data integrity mechanisms are supported), (2) authentication of the subscriber by the core network occurs between the MSC/VLR or SGSN 5720 and the UE 5710 and is transparent to the HNB-GW 5715, (3) the air interface between the UE 5710 and the HNB 5705 is protected via encryption (optional) and integrity checks, and (4) additional application level security mechanisms may be employed in the PS domain to secure the end-to-end communication between the UE 5710 and the application server 5725. For example, the UE 5710 runs the HTTP protocol over an SSL session for secure web access.

All signaling traffic and user-plane traffic sent between HNB and HNB-GW over the Iuh interface is protected by an IPSec tunnel between the HNB and HNB-GW-SEGW, that provides mutual authentication (for example, using (U)SIM credentials), encryption, and data integrity using similar mechanisms as specified in the 3GPP technical specification TS 33.234 entitled "3 G security; Wireless Local Area Network (WLAN) interworking security" which is incorporated herein by reference.

A. Security Mode Control

Figure 58:
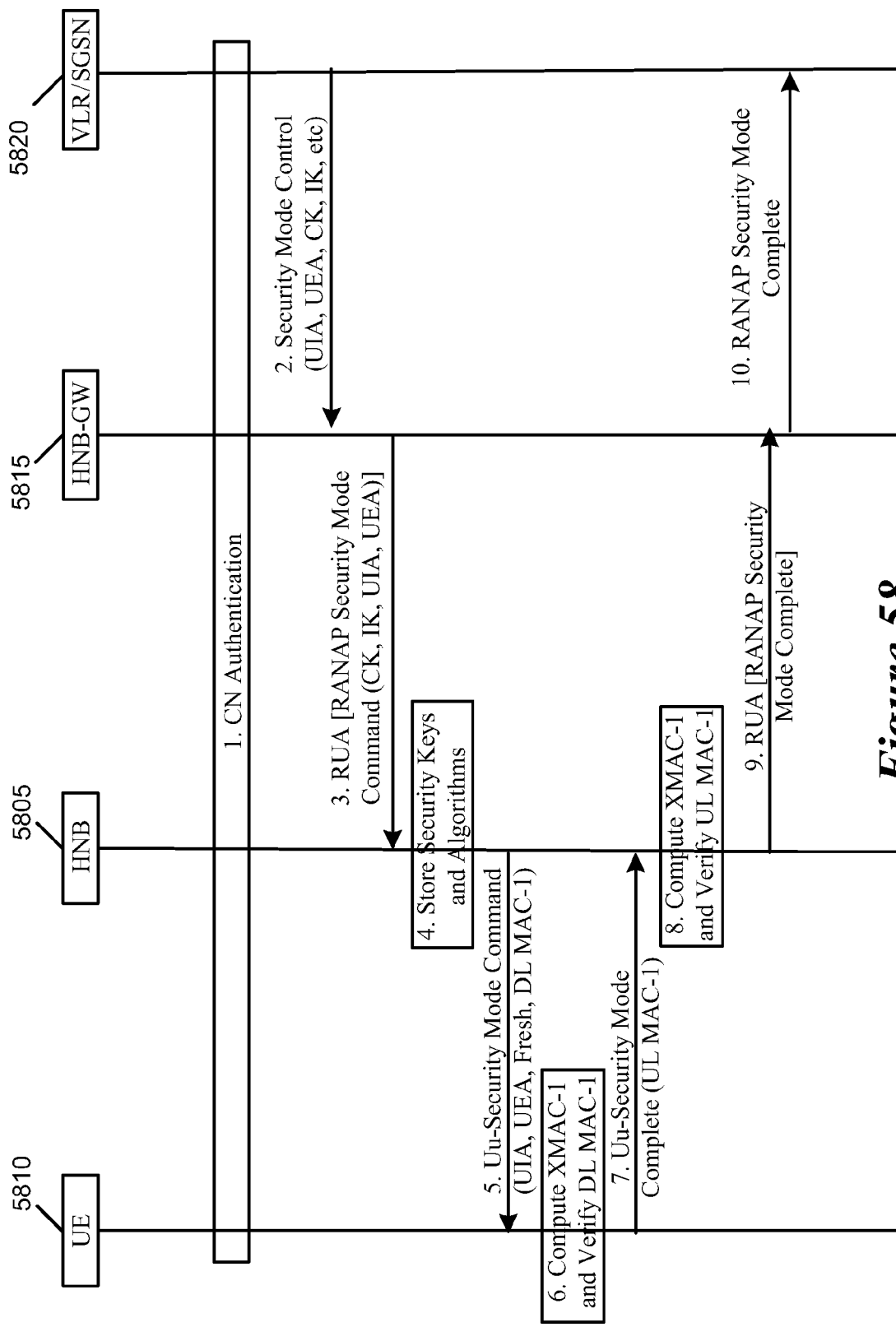
FIG. 58 illustrates message flow for security mode control over HNB in some embodiments.

FIG. 58 illustrates message flow for security mode control over HNB, in some embodiments. This figure includes HNB 5805, UE 5810, HNB-GW 5815, and VLR/SGSN (CN) 5820. As shown, the CN 5820 and the UE 5810 perform (at step 1) mutual authentication using AKA procedures. In some embodiments, the CN authentication is initiated by the CN 5820 as a result of the CN processing an initial L3 message from the UE 5810.

Upon successful authentication, the CN 5820 sends (at step 2) RANAP Security Mode Command message to the HNB-GW 5815. This message contains the encryption and the integrity keys, and also the encryption and integrity algorithms to be used for ciphering. The HNB-GW 5815 forwards (at step 3) the RUA encapsulated RANAP Security Mode Command message to the HNB 5805.

The HNB 5805 stores (at step 4) the ciphering keys and algorithm for the UE 5810. In some embodiments, the HNB 5805 should ensure that these keys are not accessible to $3^{rd}$ party applications or any other module on the HNB 5805. Additionally, these keys should not be stored on any persistent storage. The HNB 5805 generates (at step 5) a random number (FRESH) and computes the downlink MAC using the Ik and integrity algorithms and sends the Security Mode command to the UE 5810 along with the computed MAC-I and the FRESH. The UE 5810 computes (at step 6) the MAC locally (XMAC-I) and verifies that the received downlink MAC-I is same. The downlink integrity check is started from this message onwards.

Upon successful verification of the MAC, the UE 5810 responds (at step 7) back with the Security Mode Complete command and also sends the MAC-I for the uplink. The HNB 5805 computes (at step 8) XMAC-I for the uplink message and verifies the received MAC-I is same as that of computed XMAC-I. The uplink integrity check is started from this message onwards. Upon successful verification of the uplink MAC, the HNB 5805 sends (at step 9) the RUA encapsulated RANAP Security Mode Complete message to the HNB-GW 5815. The HNB-GW 5815 relays (at step 10) the Security Mode Complete command to the CN 5820 via corresponding RANAP message.

B. Core Network Authentication

The core network AKA based authentication provides mutual authentication between the user and the network. The AKA procedure is also used to generate the ciphering keys (encryption and integrity) which in turn provide confidentiality and integrity protection of signaling and user data. The basis of mutual authentication mechanism is the master key K (permanent secret with a length of 128 bits) that is shared between the USIM of the user and home network database. The ciphering keys Ck and Ik are derived from this master key K. This section describes the AKA procedure used for mutual authentication.

Figure 59:
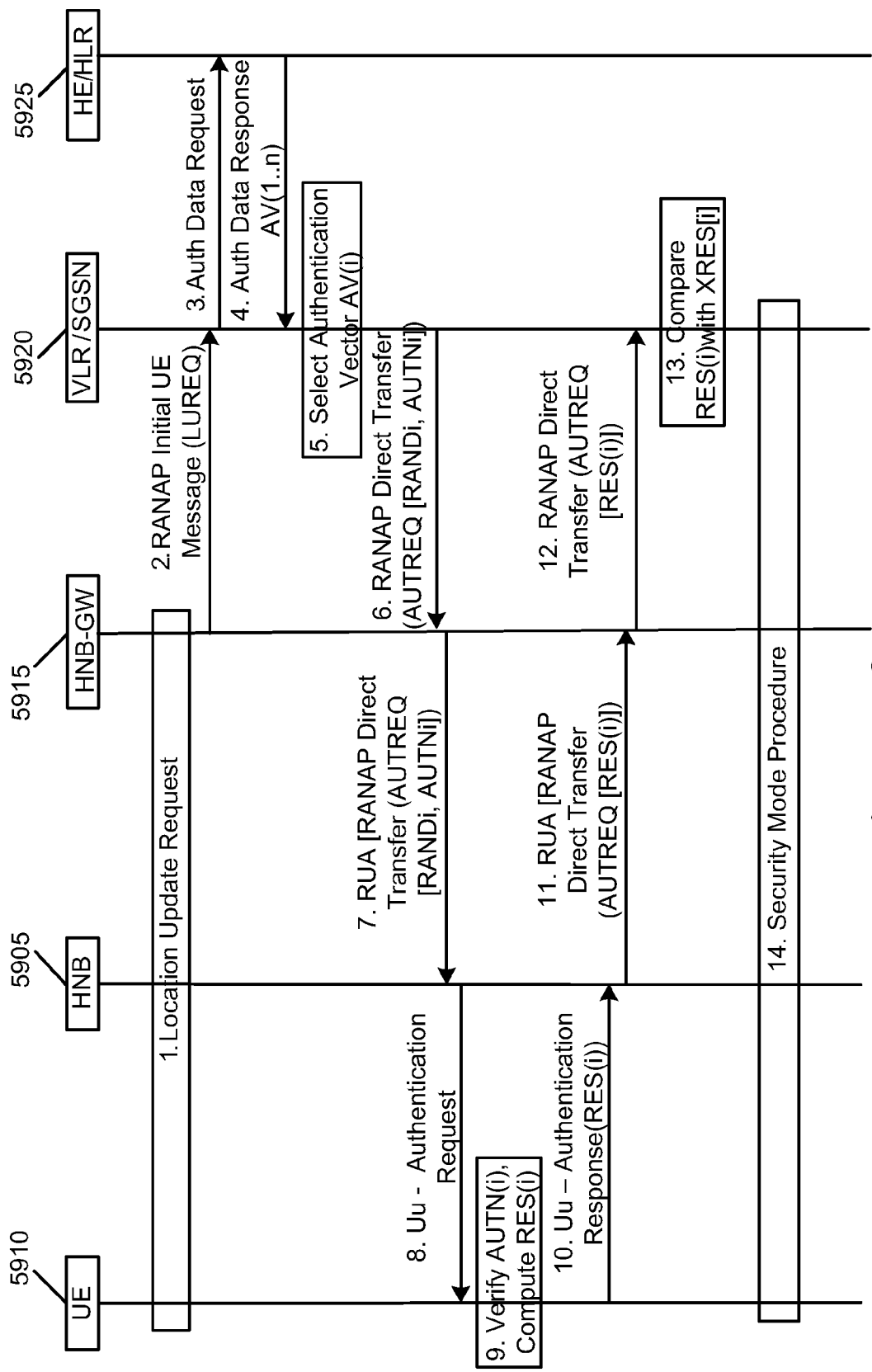
FIG. 59 illustrates a CN AKA authentication over HNB procedure in some embodiments.

FIG. 59 illustrates a CN AKA authentication over HNB procedure, in some embodiments. This figure includes HNB 5905, UE 5910, HNB-GW 5915, VLR/SGSN (CN) 5920, and Home Environment (HE)/HLR 5925.

As shown, when the UE 5905 camps on the HNB Access Point, it will initiate (at step 1) a Location Update Request towards the CN 5920. The HNB-GW 5915 will forward (at step 2) the Location Update request in a RANAP message to the VLR/SGSN 5920. This triggers (at step 3) the authentication procedure in the VLR/SGSN 5920 and it will send an authentication data request MAP message to the Authentication Center (AuC) in the Home Environment (HE) 5925. The AuC contains the master keys of the UEs and based on the IMSI, the AuC will generate (at step 4) the authentication vectors for the UE 5910. The vector list is sent back to the VLR/SGSN 5920 in the authentication data response MAP message.

The VLR/SGSN 5920 selects (at step 5) one authentication vector from the list (only 1 vector is needed for each run of the authentication procedure). The VLR/SGSN 5920 sends (at step 6) user authentication request (AUTREQ) message to the HNB-GW 5915. This message also contains two parameters RAND and AUTN (from the selected authentication vector). The HNB-GW 5915 relays (at step 7) the AUTREQ message to the HNB 5905 in a RUA encapsulated RANAP Direct Transfer message. The HNB 5905 forwards (at step 8) the AUTREQ to the UE 5910 over the air interface.

The USIM on the UE 5910 contains (at step 9) the master key K and using it with the parameters RAND and AUTN as inputs, the USIM carries out computation resembling generation of authentication vectors in the AuC. From the generated output, the USIM verifies if the AUTN was generated by the right AuC. The USIM computation also generates (at step 10) a RES which is sent towards the CN 5920 in an authentication response message to the CN 5920.

The HNB 5905 forwards (at step 11) the Authentication Response to the HNB-GW 5915 in a RUA encapsulated RANAP Direct Transfer message. The HNB-GW 5915 will relay (at step 12) the response along with the RES parameter in a RANAP message to the CN 5920. The VLR/SGSN 5920 verifies (at step 13) the UE response RES with the expected response XRES (which is part of authentication vector). If there is a match, authentication is successful. The CN 5920 may then initiate (at step 14) a Security Mode procedure to distribute the ciphering keys to the HNB-GW 5915.

X. HNB SERVICE ACCESS CONTROL (SAC)

The objective of HNB service access control is to provide operators with the tools to properly implement their HNB service plans based on real-time information from the subscriber and non real-time information provisioned within the operator's IT systems and service databases. Using service policies, the operator can implement a range of creative services and controls to be applied on a per individual subscriber basis, which results in the acceptance or rejection of any discrete HNB session registration request. Primarily, service policies are used to identify whether a subscriber's current request for access meets the conditions of the service plan to which they are subscribed.

For the purposes of this document, we consider that HNB SAC encompasses the discovery, registration and redirection functions as well as enhanced service access control functions, such as restricting HNB service access based on the reported neighboring macro network UTRAN/GERAN cell information. Note: a local access control may be performed by the HNB for performance reasons (example: HNB may use local service access control for faster rejection of UEs which are not allowed access to either HNB services or not allowed access to HNB services via the specific HNB).

A. HNB-GW and Service Area Selection

The HNB-GW selection processes include HNB-GW selection and HNB service area selection. HNB-GW Selection serves the following functions: (1) it allows an HNB-GW functioning as a "provisioning HNB-GW" to direct a mobile station to its designated "default HNB-GW", (2) it allows an HNB-GW functioning as a "default HNB-GW" to direct a mobile station to an appropriate "serving HNB-GW" (e.g., in case the HNB is outside its normal default HNB-GW coverage area), and (3) it allows the HNB-GW to determine if the UTRAN/GERAN coverage area is HNB-restricted and, if so, to deny service.

HNB Service Area Selection serves the following functions: it allows an HNB-GW functioning as a "default or serving HNB-GW" to assign the HNB service area associated with the HNB registration (and all the UEs camped on that specific HNB). The service area can then be utilized for emergency call routing as described above in the subsection entitled Service Area Based Routing.

B. Service Access Control Use Case Examples

The following example service access control use cases are described in this section: (1) New HNB connects to the HNB-GW; (2) the HNB connects to the HNB-GW network (redirected connection); (3) the HNB attempts to connect in a restricted UMTS coverage area; (4) Authorized UE roves into an authorized HNB for HNB service; and (5) Unauthorized UE roves into an authorized HNB for HNB service.

1. New HNB Connects to the HNB-GW

Figure 60:
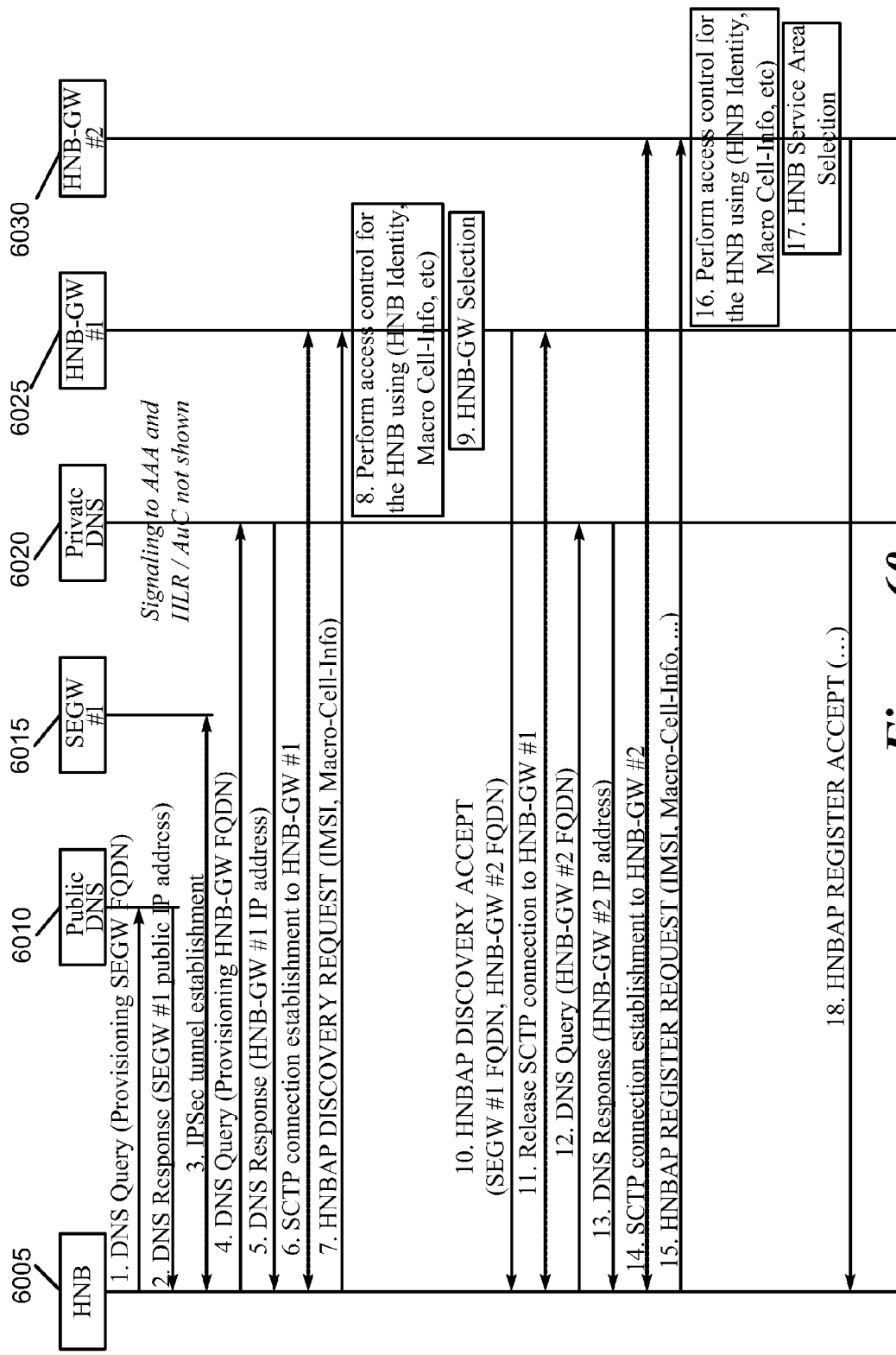
FIG. 60 illustrates the SAC for a new HNB connecting to the HNB network in some embodiments.

FIG. 60 illustrates the SAC for a new HNB connecting to the HNB network, in some embodiments. This figure includes HNB 6005, public DNS 6010, SeGW #1 (provisioning SeGW) 6015, private DNS 6020, (provisioning) HNB-GW #1 6025, and (default/serving) HNB-GW #2 6030.

As shown, if the HNB 6005 has a provisioned FQDN of the Provisioning SeGW 6015, it performs (at step 1) a DNS query (via the generic IP access network interface) to resolve the FQDN to an IP address. If the HNB 6005 has a provisioned IP address for the Provisioning SeGW 6015, the DNS step is omitted. The DNS Server 6010 returns (at step 2) a response including the IP Address of the Provisioning SeGW 6015. The HNB 6005 establishes (at step 3) a secure tunnel to the Provisioning SeGW 6015 using IKEv2 and EAP-AKA or EAP-SIM.

If the HNB 6005 has a provisioned FQDN of the Provisioning HNB-GW 6025, it performs (at step 4) a DNS query (via the secure tunnel) to resolve the FQDN to an IP address. If the HNB 6005 has a provisioned IP address for the Provisioning HNB-GW 6025, the DNS step will be omitted. The DNS Server 6020 returns (at step 5) a response including the IP Address of the Provisioning HNB-GW 6025. The HNB 6005 sets up (at step 6) a SCTP connection to a well-defined port on the Provisioning HNB-GW 6025. The HNB 6005 then queries (at step 7) the Provisioning HNB-GW 6025 for the Default/Serving HNB-GW 6030, using HNBAP DISCOVERY REQUEST. The provisioning HNB-GW 6025 optionally performs (at step 8) an access control for the HNB 6005 using information such as HNB Identity and reported macro coverage information.

If the access is allowed, then the provisioning HNB-GW 6025 determines (at step 9) the default/serving HNB-GW (here, HNB-GW #2 6030) using the HNB-GW selection function. This is done so the HNB is directed to a "local" Default HNB-GW in the HPLMN to optimize network performance. The Provisioning HNB-GW 6025 returns (at step 10) the default/serving HNB-GW 6030 information in the HNBAP DISCOVERY ACCEPT message. The DISCOVERY ACCEPT message also indicates whether the HNB-GW and SEGW address provided shall or shall not be stored by the HNB.

The HNB 6005 releases (at step 11) the SCTP connection and IPSec tunnel and proceeds to register on HNB-GW #2 6030. The HNB 6005 performs (at step 12) a private DNS query using the assigned Default HNB-GW FQDN. The private DNS server 6020 returns (at step 13) the IP address of HNB-GW #2 6030. The HNB 6005 establishes (at step 14) an SCTP connection to HNB-GW #2 6030. The HNB 6005 sends (at step 15) an HNBAP REGISTER REQUEST message to the default/serving HNB-GW 6030. The default/serving HNB-GW 6030 performs (at step 16) an access control for the HNB 6005 for example, using information such as HNB Identity and reported macro coverage information.

If access is allowed, then the default/serving HNB-GW 6030 determines (at step 17) that it is the correct serving HNB-GW for the mobile current location using the HNB-GW selection function. It also determines the HNB service area to associate with the HNB 6005 using the SAI selection functions. The default/serving HNB-GW 6030 returns a HNBAP REGISTER ACCEPT message to the HNB 6005.

2. The HNB Connects to the HNB-GW (Redirected Connection)

Figure 61:
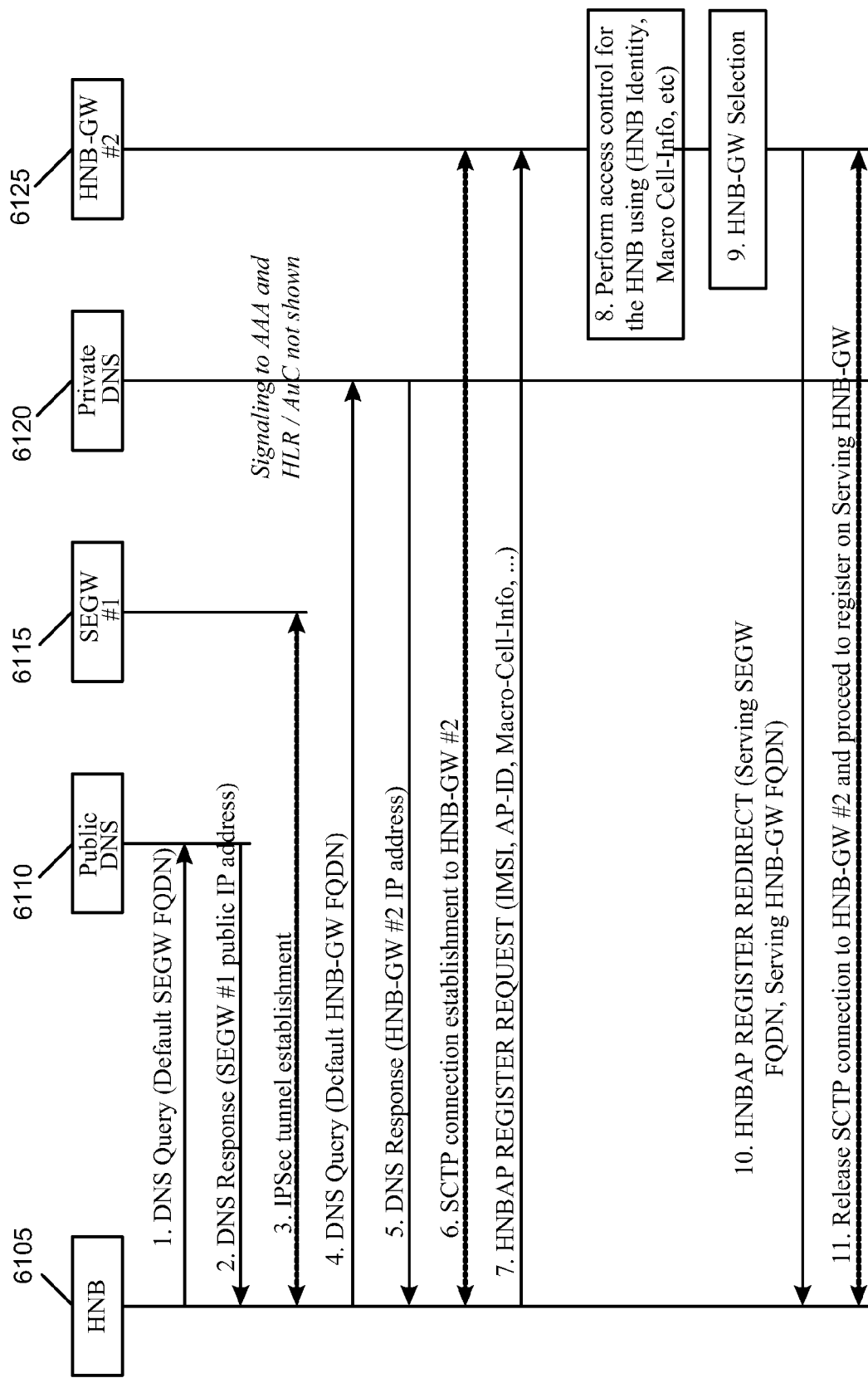
FIG. 61 illustrates the SAC for an HNB getting redirected in HNB network in some embodiments.

FIG. 61 illustrates the SAC for an HNB getting redirected in HNB network, in some embodiments. This figure includes HNB 6105, public DNS 6110, SeGW (#1) 6115, private DNS 6120, and HNB-GW (#2) 6125.

As shown, steps 1-8 are the same as described with reference to FIG. 60. The HNB-GW 6125 uses (at step 9) the HNB-GW selection function to determine that the HNB 6105 should be served by another HNB-GW. The HNB-GW 6125 sends (at step 10) the new serving SEGW and HNB-GW FQDNs to the HNB 6105 in the HNBAP REGISTER REDIRECT message. In some embodiments, the HNB-GW sends the HNBAP REGISTER REJECT message, which allows the HNB to select a different HNB-GW (using pre-provisioned information from the HNB management system) for registration thus providing equivalent redirection functionality. The HNB 6105 releases (at step 11) the SCTP connection and IPSec tunnel and proceeds to register with the designated HNB-GW 6125.

3. The HNB Attempts to Connect in a Restricted Macro Coverage Area

Figure 62:
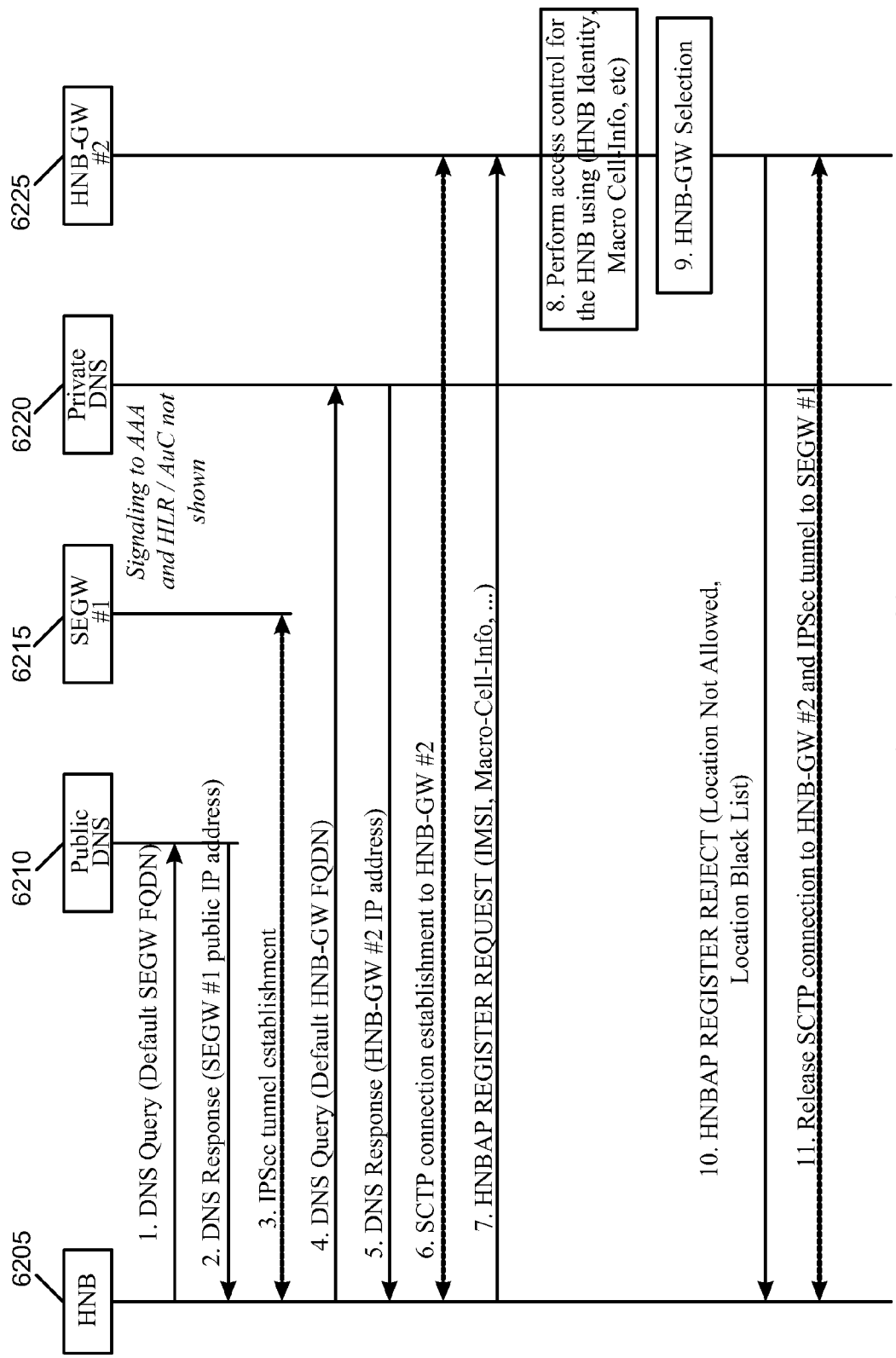
FIG. 62 illustrates the SAC for an HNB registering in a restricted UMTS coverage area in some embodiments.

FIG. 62 illustrates the SAC for an HNB registering in a restricted UMTS coverage area, in some embodiments. This figure includes HNB 6205, public DNS 6210, SeGW (#1) 6215, private DNS 6220, and HNB-GW (#2) 6225.

As shown, steps 1-8 are the same as described with reference to FIG. 60. The HNB-GW 6225 uses (at step 9) the HNB-GW selection function to determine that the HNB 6205 is in an UMTS area that is HNB restricted (i.e., HNB access is not allowed in the area). The HNB-GW 6225 sends (at step 10) a HNBAP REGISTER REJECT message to the HNB 6205, including a reject cause (for example, "Location not allowed"). The HNB 6205 releases (at step 11) the SCTP connection and IPSec tunnel and does not attempt to register again from the same macro coverage area until powered-off.

4. Authorized UE Roves into an Authorized HNB for HNB Service

The sequence of events is same as described with reference to the subsection entitled UE Registration.

5. Unauthorized UE Roves into an Authorized HNB for HNB Service

An unauthorized UE (unauthorized for HNB service over the specific HNB), upon camping on the HNB (via its internal cell selection mechanism), will send an initial NAS layer message (for example, the Location Update message) towards the CN via the HNB (the LU is triggered since the HNB broadcasts a distinct LAI than its neighboring macro cells and other neighboring HNBs). The HNB will intercept the Location Update message and attempt to register the UE with the HNB-GW as described below.

Figure 63:
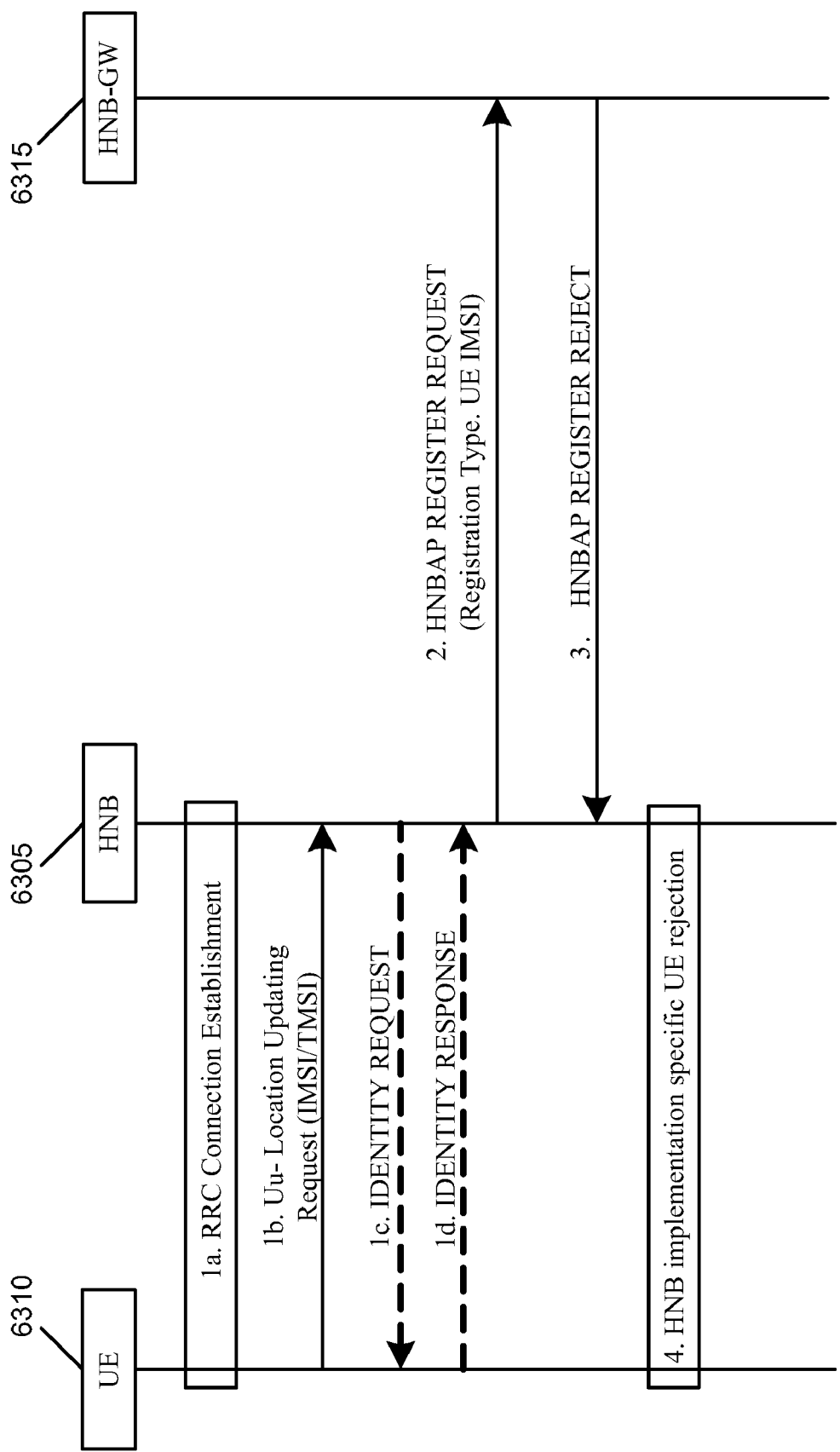
FIG. 63 illustrates the SAC for an unauthorized UE accessing an authorized HNB in some embodiments.

FIG. 63 illustrates the SAC for an unauthorized UE accessing an authorized HNB, in some embodiments. Here, the UE 6310 establishes (at step 1a) an RRC connection with the HNB 6305 on which it camps. The UE 6310 starts a Location Update procedure towards the CN (not shown). The HNB 6305 will intercept the Location Update request and attempts to register the UE 6310 with the associated Serving HNB-GW over the existing IPSEC tunnel. Optionally, the HNB 6305 may request (at step 1b) the IMSI of the UE 6310 if the Location Update is done using the TMSI, since the initial registration for the UE 6310 must be done using the permanent identity (i.e., the IMSI of the UE 6310). In some embodiments, the HNB 6305 optionally performs (at steps 1c-d) local access control for faster rejection of those UEs not authorized to access the particular HNB 6305 (the exact rejection mechanism is left as HNB implementation specific). As a result, if the HNB performs local access control, then unauthorized UEs may not be attempted to be registered with the HNB-GW 6315 and the following steps can be skipped.

When the UE 6310 is not rejected locally by the HNB 6305, the HNB 6305 attempts to register (at step 2) the UE 6310 on the HNB-GW 6315 by transmitting the HNBAP REGISTER REQUEST. The HNB 6305 uses the same SCTP connection for the UE 6310 as that used for HNB registration to a destination SCTP port on the HNB-GW 6315.

The access control logic on the HNB-GW 6315 would also check (at step 3) to see if the UE 6310 is allowed HNB access using the specific HNB 6305. The HNB-GW SAC logic indicates that the registering UE 6310 is not authorized to access HNB service over the specific HNB 6305. The HNB-GW 6315 responds with a HNBAP REGISTER REJECT message to the HNB 6305 indicating the reject cause.

The HNB 6305 in turn utilizes (at step 4) an implementation specific rejection mechanism to reject the UE 6310. For example, the HNB 6305 may send a Location Updating Reject to the UE 6310 with cause of "Location Area Not Allowed". This will prevent the UE 6310 from attempting to camp on the specific HNB 6305 again. In some embodiments, the use of "Location Area Not Allowed" is an example mechanism for rejection of an unauthorized UE. Other mechanisms may also be used and is left as HNB implementation specific.

XI. IMPACTS OF VARIOUS ACCESS CONTROL POLICIES

Access control (i.e., only certain pre-authorized users are allowed to access particular 3 G HNB) is one of the key functional requirements for the deployments of 3 G HNB. The requirements from SA1 state that "Mechanisms shall be specified for a HNB to control access (i.e., accept and reject connection requests) of pre-Release 8 UEs". This section attempts to analyze the fundamental questions on when to perform access control in the 3 G HNB Access Network.

With Release 8, CSG-enabled UEs, the UE will only attempt to select CSG cells which are listed in the UE's CSG cell white-list. The UE will not use CSG cells for either idle mode cell reselection or active mode relocation into the CSG cell. Since pre-Release 8 UEs are also expected to be supported by the HNB Access Network, the HNB Access Network should mirror the same end-user experience for pre-Release 8 UEs as for CSG-enabled UEs.

For pre-Release 8 UEs, it is not possible for the UE to autonomously recognize CSG cells and avoid using them. Pre-Release 8 UEs performs legacy cell reselection and relocation procedures whenever it detects a neighbor HNB cell. It is necessary for the 3 G HNB Access Network to either accept the UE or reject the UE using a legacy control procedure supported by the legacy UE. In some embodiments, the need to support active mode mobility from macro cell to 3 G HNB is for further study as are the access control policies for such a scenario.

The following options are envisioned regarding when an access control could be performed. (1) Access control by mobility management signaling, where the access control is performed when the UE re-selects a particular 3 G HNB cell. This approach does not allow the UE to camp normally without successful access control. (2) Access control by redirection and handover, where the access control is performed when the UE requests actual data transmission from a particular 3 G HNB. This approach allows the UE to camp normally on 3 G HNB without access control even if the UE is not authorized for that specific 3 G HNB.

The following section provides further analysis on the significant drawbacks of the $2^{nd}$ mechanism where the UE is allowed to camp normally without access control upon cell re-selection.

A. Increased Signaling Load on the Core Network During Idle Mode Mobility

It is possible, and likely the norm rather than a corner case, that mobility pattern of a particular UE will appear as "3 G HNB->Macro->3 G HNB (either same or different 3 G HNB)" or "Macro->3 G HNB". As a result of such mobility patterns, the signaling load on the core network will increase significantly due to the fact the location area updates from even unauthorized UEs must be relayed to the CN (assuming that the macro and 3 G HNB have different location areas).

B. Increased Signaling Load and Setup Times During Service Initiation from UE

Access control using the mechanisms of redirection and handover results in increased setup times or increased signaling (due to additional handover signaling).

C. Service Impact Via Erroneous HNB Coverage Indication

The UE upon cell re-selection of a particular 3 G HNB would display HNB coverage indicator. In cases where the UE is unauthorized to access a particular 3 G HNB, this would result in the following severely degraded service impacts to the subscriber.

In case of lacking overlapping macro coverage, it is not possible to employ the redirection and handover mechanism for data service initiation. As a result, any service initiation from unauthorized UEs must now be denied at the particular 3 G HNB and thus resulting in an undesirable user experience (i.e., indicating valid coverage but denying service).

In case of overlapping macro coverage, redirection and handover to macro cell upon service initiation, one would need to address the charging requirements. If macro is used as a basis, then this would again result in undesired user experience where HNB coverage is indicated to the user but charging is done on a macro basis.

In case of overlapping macro coverage, it is possible that redirection and handover to macro cell upon service initiation is not successful (due to various reasons at the target macro cell), thus resulting in failure of the service request. These failed data service requests would result in undesired user experience.

D. Ping-Pong Behavior and the Resulting Signaling Load

Due to redirection and handover to the macro cell for the actual data transmission service of unauthorized UEs from a particular 3 G HNB, the UE will likely select the macro cell for camping upon completion of that particular service (i.e., upon moving from connected to idle mode). This would also result in the UE performing an initial NAS message, such as a location area update message, via the macro network. Additionally, it is possible for the UE to again select the same 3 G HNB (from which it was redirected for data service) and trigger additional LU via that particular 3 G HNB. As a result of this ping-pong behavior between the macro and 3 G HNB for unauthorized UEs, significant signaling load would be generated towards the CN.

It can be concluded from the above scenarios that there are significant drawbacks in allowing unauthorized UEs to camp without access control and as a result it would be recommended to reject unauthorized UEs upon initial cell re-selection to the HNB.

XII. COMPUTER SYSTEM

Many of the above-described protocol stacks are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor (e.g., HNB and HNB-GW). Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant in its broadest sense. It can include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 64:
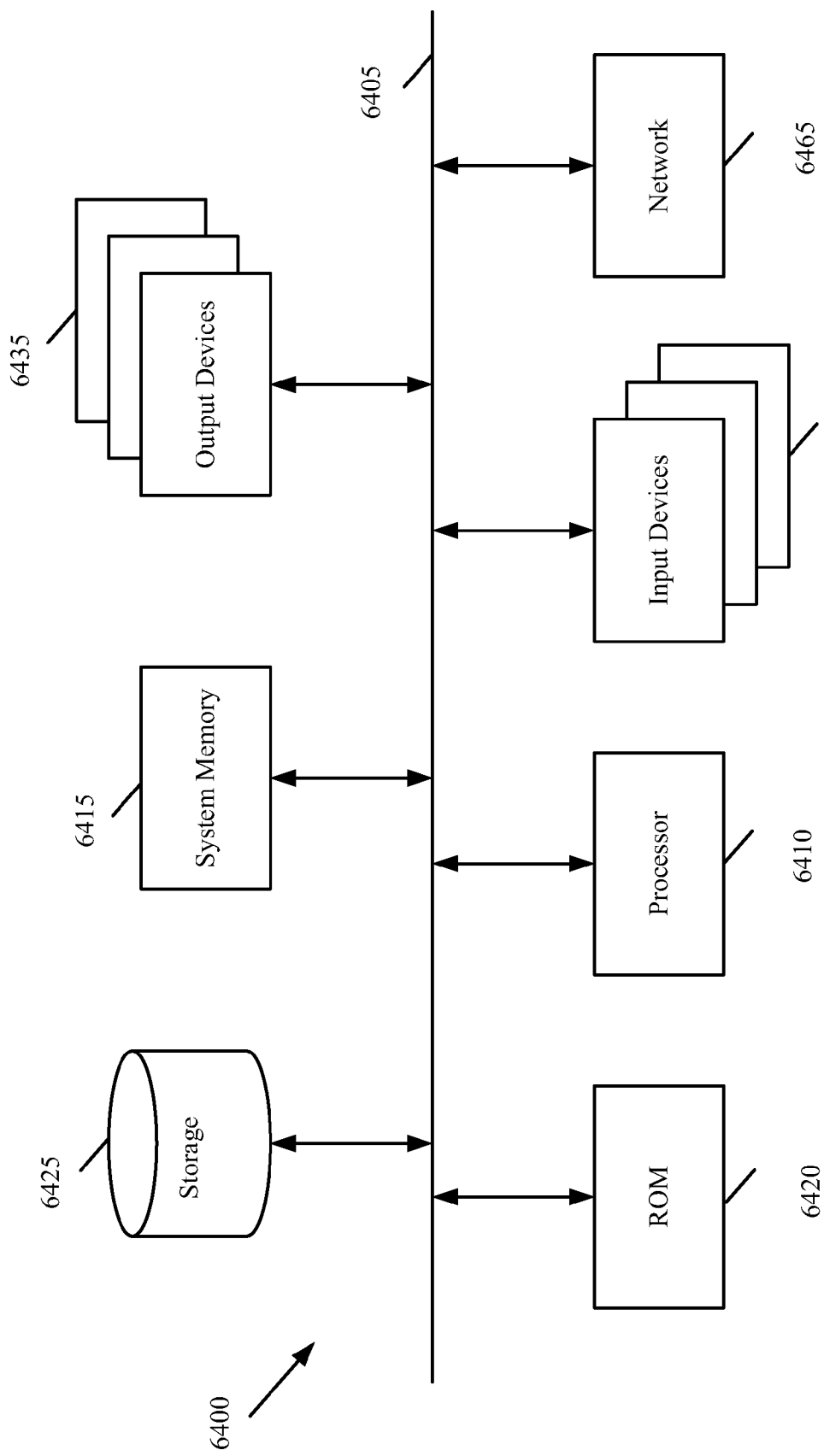
FIG. 64 conceptually illustrates a computer system with which some embodiments are implemented.

FIG. 64 conceptually illustrates a computer system with which some embodiments of the invention are implemented. The computer system 6400 includes a bus 6405, a processor 6410, a system memory 6415, a read-only memory 6420, a permanent storage device 6425, input devices 6430, and output devices 6435.

The bus 6405 collectively represents all system, peripheral, and chipset buses that support communication among internal devices of the computer system 6400. For instance, the bus 6405 communicatively connects the processor 6410 with the read-only memory 6420, the system memory 6415, and the permanent storage device 6425.

From these various memory units, the processor 6410 retrieves instructions to execute and data to process in order to execute the processes of the invention. In some embodiments the processor comprises a Field Programmable Gate Array (FPGA), an ASIC, or various other electronic components for executing instructions. The read-only-memory (ROM) 6420 stores static data and instructions that are needed by the processor 6410 and other modules of the computer system. The permanent storage device 6425, on the other hand, is a read-and-write memory device. This device is a non-volatile memory unit that stores instruction and data even when the computer system 6400 is off. Some embodiments of the invention use a mass-storage device (such as a magnetic or optical disk and its corresponding disk drive) as the permanent storage device 6425. Some embodiments use one or more removable storage devices (flash memory card or memory stick) as the permanent storage device.

Like the permanent storage device 6425, the system memory 6415 is a read-and-write memory device. However, unlike storage device 6425, the system memory is a volatile read-and-write memory, such as a random access memory. The system memory stores some of the instructions and data that the processor needs at runtime.

Instructions and/or data needed to perform processes of some embodiments are stored in the system memory 6415, the permanent storage device 6425, the read-only memory 6420, or any combination of the three. For example, the various memory units include instructions for processing multimedia items in accordance with some embodiments. From these various memory units, the processor 6410 retrieves instructions to execute and data to process in order to execute the processes of some embodiments.

The bus 6405 also connects to the input and output devices 6430 and 6435. The input devices enable the user to communicate information and select commands to the computer system. The input devices 6430 include alphanumeric keyboards and cursor-controllers. The output devices 6435 display images generated by the computer system. The output devices include printers and display devices, such as cathode ray tubes (CRT) or liquid crystal displays (LCD). Finally, as shown in FIG. 64, bus 6405 also couples computer 6400 to a network 6465 through a network adapter (not shown). In this manner, the computer can be a part of a network of computers (such as a local area network ("LAN"), a wide area network ("WAN"), or an Intranet) or a network of networks (such as the Internet).

Any or all of the components of computer system 6400 may be used in conjunction with the invention. For instance, some or all components of the computer system described with regards to FIG. 64 comprise some embodiments of the UE, HNB, HNB-GW, and SGSN described above. However, one of ordinary skill in the art will appreciate that any other system configuration may also be used in conjunction with the invention or components of the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Many of the above figures illustrate a single access point (e.g., HNB 205) communicatively coupled to a network controller (e.g., HNB-GW 215). However, it should be apparent to one of ordinary skill in the art that the network controller (e.g., HNB-GW 215) of some embodiments is communicatively coupled to several HNBs and the network controller communicatively couples all such HNBs to the core network. The figures merely illustrate a single HNB communicatively coupled to the HNB-GW for purposes of simplifying the discussion to interactions between a single access point and a single network controller. However, the same network controller of some embodiments may have several of the same interactions with several different access points.

Additionally, many of the above figures illustrate the access point to be a HNB and the network controller to be a HNB-GW. These terms are used to provide a specific implementation for the various procedures, messages, and protocols described within some of the embodiments described with reference to the figures. However, it should be apparent to one of ordinary skill in the art that the procedures, messages, and protocols may be used with other communication systems and the HNB system was provided for exemplary purposes. For example, such procedures, messages, and protocols may be adapted to function with a Femtocell cell system that includes Femtocell access points and a Femtocell network controller (e.g., Generic Access Network Controller).

Similarly, many of the messages and protocol stacks were described with reference to particular HNB-AN functionality such as control plane functionality or user plane functionality. However, it should be apparent to one of ordinary skill in the art that such functionality may apply across multiple HNB-AN functions or may apply to a different HNB-AN function altogether. Moreover, it should be apparent to one of ordinary skill in the art that the above described messaging may include additional or alternative information elements to those enumerated above.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

XIII. ABBREVIATIONS AND DEFINITIONS

A. Abbreviations

| | |
|---|---|
| 3rd Generation Partnership Project | 3GPP |
| Authorization, Authentication, and Accounting | AAA |
| ATM Adaption Layer 2 | AAL2 |
| Access Control List | ACL |
| Advanced Encryption Standard | AES |
| Authentication and Key Agreement | AKA |
| Authentication Header | AH |
| Access Link Control Application Part | ALCAP |
| Automatic Location Identification | ALI |
| Access Network | AN |
| Automatic Number Identification | ANI |
| Advice of Charge | AoC |
| Access Point | AP |
| Access Point Name | APN |
| Absolute Radio Frequency Channel Number | ARFCN |
| Abstract Syntax Notation 1 | ASN.1 |
| Asynchronous Transfer Mode | ATM |
| Authentication Center | AuC |
| AUTREQ parameter | AUTN |
| User Authentication Request | AUTREQ |
| Base Station | BS |
| Base Station System | BSS |
| Base Transceiver Station | BTS |
| Conditional | C |

-continued

| | |
|---|---|
| Call Barring | CB |
| Cell Broadcast Center | CBC |
| Cipher Block Chaining | CBC |
| Call Control | CC |
| Context Create Acknowledgment | CCACK |
| Completion of Calls to Busy Subscriber | CCBS |
| Context Create Request | CCREQ |
| Charging Data Record | CDR |
| Cell Global Identification | CGI |
| Calling Party Number | CgPN |
| Call Hold | CH |
| Cipher Key | Ck |
| Calling Line Identification Presentation | CLIP |
| Calling Line Identification Restriction | CLIR |
| Call Management | CM |
| Connection Manager sublayer | CM-sub |
| Cable Modem Termination System | CMTS |
| Core Network | CN |
| Connected Line Identification Presentation | CoLP |
| Connected Line Identification Restriction | CoLR |
| Customer Premise Equipment | CPE |
| Cyclic Redundancy Code | CRC |
| Context Release Command | CRCMD |
| Context Release Complete | CRCMP |
| Coordinate Routing Database | CRDB |
| Circuit Switched | CS |
| Closed Subscriber Group | CSG |
| Cellular Text/Telephone Modem (from 3GPP 26.226) | CTM |
| Closed User Group | CUG |
| Call Waiting | CW |
| Domain Name System | DNS |
| Digital Subscriber Line | DSL |
| DSL Access Multiplexer | DSLAM |
| Direct Transfer Application Part | DTAP |
| Extensible Authentication Protocol | EAP |
| EAP of Local Area Networks | EAPOL |
| Electronic Code Book (AES mode) | ECB |
| Explicit Call Transfer | ECT |
| Emergency Location Information Delivery | ELID |
| Enhanced Observed Time Difference | E-OTD |
| Emergency Services | ES |
| ES Number | ESN |
| ES Protocol | ESP |
| Encapsulating Security Payload | ESP |
| ES Routing Digits | ESRD |
| ES Routing Key | ESRK |
| European Telecommunications Standards Institute | ETSI |
| Fault, Configuration, Accounting, Performance and Security Management | FCAPS |
| US Federal Communications Commission | FCC |
| Fully Qualified Domain Name | FQDN |
| A random number generated by the HNB | FRESH |
| General Access Network (unlicensed mobile access) | GAN |
| Generic Digits Parameter | GDP |
| GSM/EDGE Radio Access Network | GERAN |
| Gateway GPRS Support Node | GGSN |
| General Packet Radio Service | GPRS |
| Gateway Mobile Location Center | GMLC |
| GPRS Mobility Management and Session Management | GMM/SM |
| GPRS Mobility Management sublayer | GMM-sub |
| GPRS Radio Resource sublayer (GSM) | GRR-sub |
| GPRS Support Node | GSN |
| Global System for Mobile communications | GSM |
| GPRS Tunneling Protocol | GTP |
| Global Text Telephony (GSM) | GTT |
| Global Title Translation (SS7) | GTT |
| Hierarchical Cell Selection | HCS |
| Home Environment | HE |
| Home Enhanced Node B | HeNB |
| HeNB Gateway | HeNB-GW |
| Home Location Register | HLR |
| Hashed Message Authentication Code | HMAC |
| Home Node-B | HNB |
| HNB Access Network | HNB-AN |
| HNB Application Part | HNBAP |
| HNB Gateway | HNB-GW |
| Home PLMN | HPLMN |
| Initial Address Message | IAM |

| | |
|---|---|
| Internet Assigned Numbers Authority | IANA |
| Internet Control Message Protocol | ICMP |
| Identifier | ID |
| Intra Domain Non Access Stratum (NAS) Node Selector | IDDNS |
| Internet Engineering Task Force | IETF |
| Integrity Key | Ik |
| Internet Key Exchange Version 2 | IKEv2 |
| International Mobile station Equipment Identity | IMEI |
| International Mobile Subscriber Identity | IMSI |
| Internet Protocol | IP |
| IP Security | IPSec |
| IP version 4 | IPv4 |
| IP version 6 | IPv6 |
| Integrated Services Digital Network | ISDN |
| Internet Service Provider | ISP |
| ISDN User Part | ISUP |
| Initialization Vector | IV |
| Interworking Functionality | IWF |
| Interworking MSC | IWMSC |
| Layer 3 | L3 |
| Location Area | LA |
| Location Area Code | LAC |
| Lawfully Authorized Electronic Surveillance | LAES |
| Location Area Identifier | LAI |
| Location Area Update | LAU |
| Location Service | LCS |
| Lightweight EAP (same as EAP-Cisco) | LEAP |
| Logical Link Control | LLC |
| Logical Link Control sublayer | LLC-sub |
| Local Mobile Subscriber Identity | LMSI |
| Least Significant Bit | LSB |
| Location Service Protocol | LSP |
| Location Update | LU |
| Length and Value | LV |
| Mandatory | M |
| MTP3 User Adaptation Layer | M3UA |
| Media Access Control | MAC |
| Message Authentication Code (same as MIC) | MAC |
| MAC computed at HNB with Ik | MAC-I |
| Mobile Application Part | MAP |
| Mobile Country Code | MCC |
| Mobile Directory Number | MDN |
| Mobile Equipment | ME |
| Message Integrity Check (same as MAC) | MIC |
| Media Gateway | MGW |
| Mobility Management | MM |
| Mobility Management sublayer | MM-sub |
| Mobile Network Code | MNC |
| Mobile Originated | MO |
| Mobile Positioning Center | MPC |
| Multi-Party | MPTY |
| Mobile Station | MS |
| Most Significant Bit | MSB |
| Mobile Switching Center | MSC |
| Mobile Station International ISDN Number | MSISDN |
| Mobile Station Roaming Number | MSRN |
| Mobile Terminated | MT |
| Message Transfer Part Layer 1/2/3 | MTP 1/2/3 |
| Message Transfer Part Level 3 for Broadband | MTP3b |
| Network Access Identifier | NAI |
| Non Access Stratum | NAS |
| Network Address Translation | NAT |
| Non Call Associated Signaling | NCAS |
| Neighbor Configuration List | NCL |
| National Destination Code | NDC |
| Network to Node Interface | NNI |
| NAS Node Selection Function | NNSF |
| Network Service | NS |
| Network Service Access Point | NSAP |
| Network layer Service Indoor Base Station Identifier | NSAPI |
| Network Subsystem | NSS |
| Optional | O |
| Offset Code Book (AES mode) | OCB |
| Personal Communication Services | PCS |
| Packet Control Unit | PCU |
| Packet Data Channel | PDCH |
| Packet Data Convergence Protocol | PDCP |
| Position Determining Entity | PDE |
| Packet Data Network | PDN |
| Packet Data Protocol | PDP |
| Protocol Data Unit | PDU |
| Protected EAP | PEAP |
| Public Key Infrastructure | PKI |
| Public Land Mobile Network | PLMN |
| Packet Mobility Management | PMM |
| Point of Interface | POI |
| Paging Proceed Flag | PPF |
| Payload Protocol Identifier | PPI |
| Point-to-Point Protocol | PPP |
| Packet Switched | PS |
| Public Safety Answering Point | PSAP |
| Public Switched Telephone Network | PSTN |
| Point To Multipoint | PTM |
| Pseudo-ANI (either the ESRD or ESRK) | p-ANI |
| Packet-Temporary Mobile Subscriber Identity | P-TMSI (or PTMSI) |
| Either Packet TMSI or TMSI | (P)TMSI |
| Point To Point | PTP |
| Permanent Virtual Circuit | PVC |
| Quality of Service | QoS |
| Routing Area | RA |
| Radio Access Bearer | RAB |
| Routing Area Code | RAC |
| Remote Authentication Dial-In User Service | RADIUS |
| Routing Area Identifier | RAI |
| RANAP Adaptation Layer | RAL |
| Radio Access Network Application Part | RANAP |
| RANAP for HNB Application | RANAP-H |
| Parameter of AUTREQ | RAND |
| Routing Area Update | RAU |
| Authentication number generated from UE | RES |
| Radio Frequency | RF |
| Request for Comment (IETF Standard) | RFC |
| Radio Link Control | RLC |
| Radio Network Controller | RNC |
| Iu U-Plane | RNL |
| Radio Resource Management sublayer | RR-sub |
| Radio Resource Control | RRC |
| Radio Resource Management | RRM |
| Robust Security Network | RSN |
| RANAP Transport Adaptation | RTA |
| Real-Time Control Protocol | RTCP |
| Real-Time Protocol | RTP |
| RANAP User Adaptation | RUA |
| Service Area Code | SAC |
| Service Access Control | SAC |
| Service Area Identifier | SAI |
| System Architecture 1 | SA1 |
| Scrambling Code | SC |
| Skinny Call Control Protocol | SCCP |
| Stream Control Transmission Protocol | SCTP |
| Standalone Dedicated Control Channel | SDCC |
| Service Data Unit | SDU |
| Security Gateway | SeGW |
| Serving GPRS Support Node | SGSN |
| Subscriber Identity Module | SIM |
| Service Key | SK |
| Session Management | SM |
| Service Mobile Location Center | SMLC |
| Short Message Services | SMS |
| Short Message Service Gateway MSC | SMS-GMSC |
| Short Message Service Interworking MSC | SMS-IWMSC |
| Short Message Application Layer | SM-AL |
| Short Message Control Protocol | SM-CP |
| Short Message Transfer Layer | SM-TL |
| Short Message Relay Layer | SM-RL |
| Short Message Relay Protocol | SM-RP |
| Short Message Service Center | SM-SC |
| Short Message Control (entity) | SMC |
| Short Message Relay (entity) | SMR |
| SubNetwork Dependent Convergence Protocol | SNDCP |
| SNDCP PDU | SN-PDU |
| Selective Router | S/R |
| Source RNC | SRNC |
| Serving Radio Network Subsystem | SRNS |
| Supplementary Service | SS |
| Signaling System 7 | SS7 |
| Service-Specific Coordination Function | SSCF |
| Service Specific Connection Oriented Protocol | SSCOP |

-continued

| | |
|---|---|
| Service Set Identifier (aka "Network Name") | SSID |
| Secure Socket Layer | SSL |
| Station (802.11 client) | STA |
| Type Only | T |
| Timing Advance | TA |
| Transaction Capabilities Application Part | TCAP |
| Transmission Control Protocol | TCP |
| Time Difference of Arrival | TDOA |
| Tunnel Identifier | TID |
| Temporal Key Integrity Protocol | TKIP |
| Temporary Logical Link Identity | TLLI |
| Transport Layer Security | TLS |
| Type, Length, and Value | TLV |
| Temporary Mobile Subscriber Identity | TMSI |
| Time of Arrival | TOA |
| Transcoder and Rate Adaptation Unit | TRAU |
| Traffic Selector | TS |
| Text Telephone or Teletypewriter | TTY |
| Type and Value | TV |
| UMTS Absolute Radio Frequency Channel Number | UARFCN |
| User Datagram Protocol | UDP |
| User Equipment | UE |
| Unlicensed Mobile Access | UMA |
| Universal Mobile Telecommunications System | UMTS |
| Universal Subscriber Identity Module | USIM |
| Either SIM or USIM | (U)SIM |
| Unstructured Supplementary Service Data | USSD |
| Coordinated Universal Time | UTC |
| UMTS Terrestrial Radio Access Network | UTRAN |
| User User Signaling | UUS |
| Value Only | V |
| Visitor Location Register | VLR |
| Visited MSC | VMSC |
| Visited Public Land Mobile Network | VPLMN |
| Virtual Private Network | VPN |
| Wired Equivalent Privacy | WEP |
| World Geodetic System 1984 | WGS-84 |
| White-List | WL |
| Wireless Local Area Network | WLAN |
| Wi-Fi Protected Access | WPA |
| Wireless Service Provider | WSP |
| World Zone 1 | WZ 1 |
| Expected MAC-I calculated at UE | XMAC-I |
| Expected RES from VLR | XRES |

B. Definitions

Allowed CSG List: A list of CSG cells, each of which is identified by a CSG identity, allowed for a particular subscriber.

Access Control: It is the mechanism of ensuring that access to particular HNB is based on the subscription policy of the subscriber as well as that of the HNB.

Closed Subscriber Group (CSG): A list of subscribers which have access to mobile network using a particular HNB (a.k.a HeNB or Femtocell).

CSG Cell: A cell (e.g. HNB) which allows mobile network access to CSG only. A CSG cell may broadcast a specific CSG identifier over the air interface.

CSG Identity: The identity of the CSG cell. A CSG identity may be shared by multiple CSG cells.

CSG UE: A UE which has support for CSG white-list and can autonomously detect and select CSG cells.

E.164: A public networking addressing standard

Femtocell Access Network: The Femtocell access network constitutes of the HNB and the HNB-GW (same as HNB access network)

Legacy UE: A UE which does not have support for CSG white-list (e.g. R99 or pre-release 8 UE).

Operator: Licensed wireless service provider

White-List: It is the allowed CSG list stored on the UE or in the subscriber database record (such as in the HLR or HSS).

What is claimed is:

1. In a communication system comprising (i) a first network comprising a licensed wireless radio access network and a core network and (ii) a second network comprising a plurality of user hosted access points for establishing service regions of the second network using short range licensed wireless frequencies and a network controller for communicatively coupling user equipment operating in the service regions to the core network, a method of enabling emergency calling at a particular access point for a particular user equipment that is not authorized for services of the second network at a service region associated with the particular access point, the method comprising:

at the particular access point, receiving a service request message from the user equipment indicating an establishment cause of emergency call;

sending a registration request message to the network controller, wherein said registration request message comprises an identity of the particular user equipment and an indicator to indicate that said unauthorized particular user equipment requests emergency calling; and after registering said particular user equipment with the network controller, sending a message for routing by the network controller to the core network, said message comprising location information for the core network to identify a location from which the emergency call originates.

2. The method of claim 1, wherein said location information comprises a service area identity (SAI) assigned to the service region associated with the particular access point.

3. The method of claim 1, wherein said location information is used by the core network to identify a Public Safety Answering Point (PSAP) that serves a location identified by the location information.

4. The method of claim 1 further comprising sending a deregister message to the network controller at a completion of the emergency call, said deregister message for deregistering the particular user equipment from the second network.

5. The method of claim 1 further comprising receiving an identity of the particular user equipment prior to sending the registration request message.

6. The method of claim 5, wherein said identity of the particular user equipment is at least one of an International Mobile Subscriber Identity (IMSI) and a Temporary Mobile Subscriber Identity (TMSI).

7. The method of claim 1, wherein sending the message for routing by the network controller comprises sending a Radio Access Network Application Part (RANAP) message comprising a first header, wherein the RANAP message is encapsulated in a second header.

8. The method of claim 7, wherein the second header allows the network controller to allocate resources for emergency calling without needing to decode the encapsulated RANAP message.

9. The method of claim 1 further comprising receiving a registration accept message at the particular access point prior to sending the message for routing to the core network, said registration accept message enabling the particular user equipment to perform emergency calling from the service region associated with the particular access point.

10. The method of claim 1, wherein the particular access point is a Home Node B and the second network is a Home Node B Access Network.

11. In a communication system comprising (i) a first network comprising a licensed wireless radio access network and a core network and (ii) a second network comprising a plurality of user hosted access points for establishing service regions of the second network using short range licensed wireless frequencies and a network controller for communicatively coupling user equipment operating in the service regions to the core network, a method of enabling emergency calling at the network controller to enable a particular user equipment that is not authorized for services of the second network to perform an emergency call, the method comprising:

at the network controller, receiving a registration request message comprising an identity of the particular user equipment and an indicator to indicate that said unauthorized particular user equipment requests emergency calling;

after registering said particular user equipment, receiving a message comprising location information for the core network to identify a location from which the emergency call originates; and forwarding said message to the core network to establish an emergency call.

12. The method of claim 11, wherein said location information comprises a service area identity (SAI) assigned to a service region of the second network in which the particular user equipment is operating.

13. The method of claim 11, wherein said location information is used by the core network to identify a Public Safety Answering Point (PSAP) that serves a location identified by the location information.

14. The method of claim 11 further comprising deregistering the particular user equipment at a completion of the emergency call to prevent further access to services of the second network by the particular user equipment.

15. The method of claim 11, wherein receiving the message comprising the location information comprises receiving a Radio Access Network Application Part (RANAP) message comprising a first header, wherein the RANAP message is encapsulated in a second header.

16. The method of claim 15 further comprising allocating resources for emergency calling at the network controller based on information in the second header without decoding the encapsulated RANAP message.

17. The method of claim 15, wherein forwarding said message comprises forwarding the RANAP message without the second header.

18. The method of claim 11 further comprising sending a registration accept message to enable the particular user equipment to perform emergency calling.

19. In a communication system comprising (i) a first network comprising a licensed wireless radio access network and a core network and (ii) a second network comprising a plurality of user hosted access points for establishing service regions of the second network using short range licensed wireless frequencies and a network controller for communicatively coupling user equipment operating in the service regions to the core network, a computer readable storage medium of a particular access point storing a computer program for enabling emergency calling at the particular access point for a particular user equipment that is not authorized for services of the second network at a service region associated with the particular access point, the computer program executable by at least one processor, the computer program comprising:

a set of instructions for receiving a service request message from the user equipment indicating an establishment cause of emergency call;

a set of instructions for sending a registration request message to the network controller, wherein said registration request message comprises an identity of the particular user equipment and an indicator to indicate that said unauthorized particular user equipment requests emergency calling; and a set of instructions for sending a message for routing by the network controller to the core network, said message comprising location information for the core network to identify a location from which the emergency call originates.

20. In a communication system comprising (i) a first network comprising a licensed wireless radio access network and a core network and (ii) a second network comprising a plurality of user hosted access points for establishing service regions of the second network using short range licensed wireless frequencies and a network controller for communicatively coupling user equipment operating in the service regions to the core network, a computer readable storage medium of the network controller storing a computer program for enabling emergency calling at the network controller to enable a particular user equipment that is not authorized for services of the second network to perform an emergency call, the computer program executable by at least one processor, the computer program comprising:

a set of instructions for receiving a registration request message comprising an identity of the particular user equipment and an indicator to indicate that said unauthorized particular user equipment requests emergency calling;

a set of instructions for receiving a message after registering said particular user equipment, said message comprising location information for the core network to identify a location from which the emergency call originates; and a set of instructions for forwarding said message to the core network to establish the emergency call.

\* \* \* \* \*